United States Patent
Kim et al.

(10) Patent No.: US 11,375,402 B2
(45) Date of Patent: Jun. 28, 2022

(54) METHOD AND APPARATUS FOR DATA PROCESSING IN WIRELESS COMMUNICATION SYSTEM

(71) Applicant: Samsung Electronics Co., Ltd., Suwon-si (KR)

(72) Inventors: Donggun Kim, Seoul (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 16/946,445

(22) Filed: Jun. 22, 2020

(65) Prior Publication Data

US 2020/0322843 A1 Oct. 8, 2020

Related U.S. Application Data

(63) Continuation of application No. 16/101,284, filed on Aug. 10, 2018, now Pat. No. 10,694,422.

(30) Foreign Application Priority Data

Aug. 10, 2017 (KR) .......... 10-2017-0101912
Aug. 25, 2017 (KR) .......... 10-2017-0108078
(Continued)

(51) Int. Cl.
*H04L 12/801* (2013.01)
*H04W 4/70* (2018.01)
(Continued)

(52) U.S. Cl.
CPC ......... *H04W 28/065* (2013.01); *H04L 1/1809* (2013.01); *H04L 1/1841* (2013.01);
(Continued)

(58) Field of Classification Search
CPC ........... H04L 1/1809; H04L 1/1841; H04L 1/1848; H04W 4/70; H04W 16/28;
(Continued)

(56) References Cited

U.S. PATENT DOCUMENTS 6,807,428 B2 10/2004 Casaccia
7,296,206 B2 11/2007 Miyake et al.
(Continued)

FOREIGN PATENT DOCUMENTS

EP 2195978 B1 6/2016
WO 2012058487 A2 5/2012

OTHER PUBLICATIONS

Supplementary European Search Report in connection with European Application No. 18844736.1 dated Dec. 23, 2020, 10 pages.
(Continued)

*Primary Examiner* — Alpus Hsu

(57) ABSTRACT

The present disclosure relates to a communication scheme and system for the convergence of a 5G communication system for supporting a higher data transfer rate than a post-4G system and the IoT technology. The present disclosure may be applied to intelligent services (e.g., smart home, smart building, smart city, smart car or connected car, health care, digital education, retail business, security and safety services) based on the 5G communication technology and IoT-related technology. One embodiment of the present disclosure relates to a method and apparatus for processing data in a wireless communication system.

16 Claims, 52 Drawing Sheets

(30) Foreign Application Priority Data

| Sep. 8, 2017 | (KR) | .................. | 10-2017-0115121 |
| Sep. 14, 2017 | (KR) | .................. | 10-2017-0117856 |
| Sep. 20, 2017 | (KR) | .................. | 10-2017-0121362 |
| Oct. 10, 2017 | (KR) | .................. | 10-2017-0129077 |

(51) Int. Cl.
*H04W 16/28* (2009.01)
*H04W 28/02* (2009.01)
*H04W 76/10* (2018.01)
*H04W 76/27* (2018.01)
*H04W 28/06* (2009.01)
*H04L 47/34* (2022.01)
*H04L 1/18* (2006.01)
*H04W 80/02* (2009.01)

(52) U.S. Cl.
CPC ............ *H04L 1/1848* (2013.01); *H04L 47/34* (2013.01); *H04W 4/70* (2018.02); *H04W 16/28* (2013.01); *H04W 28/0278* (2013.01); *H04W 76/10* (2018.02); *H04W 76/27* (2018.02); *H04W 80/02* (2013.01)

(58) Field of Classification Search
CPC ........... H04W 28/0278; H04W 28/065; H04W 76/10; H04W 76/27; H04W 80/02
See application file for complete search history.

(56) References Cited

U.S. PATENT DOCUMENTS

| 7,505,412 | B2 | 3/2009 | Miyake et al. | |
| 7,633,892 | B2* | 12/2009 | Yi | .................. H04L 1/1841 |
| | | | | 370/300 |
| 8,023,454 | B2* | 9/2011 | Yi | .................. H04L 1/1848 |
| | | | | 370/335 |
| 8,270,348 | B2* | 9/2012 | Chun | .................. H04L 1/1854 |
| | | | | 370/328 |
| 8,730,969 | B2 | 5/2014 | Yi et al. | |
| 9,042,364 | B2 | 5/2015 | Yi et al. | |
| 9,585,048 | B2 | 2/2017 | Ozturk et al. | |
| 9,629,146 | B2 | 4/2017 | Yi et al. | |
| 9,722,731 | B2 | 8/2017 | Ozturk et al. | |
| 9,838,282 | B2 | 12/2017 | Dudda et al. | |
| 9,961,581 | B2 | 5/2018 | Bathwal et al. | |
| 9,999,049 | B2 | 6/2018 | Xiao et al. | |
| 10,142,884 | B2 | 11/2018 | Chauhan et al. | |
| 10,212,728 | B2 | 2/2019 | Lee et al. | |
| 10,341,059 | B2 | 7/2019 | Meyer et al. | |
| 10,396,931 | B2 | 8/2019 | Froberg Olsson et al. | |
| 2006/0251105 | A1 | 11/2006 | Kim et al. | |
| 2009/0046626 | A1 | 2/2009 | Shao et al. | |
| 2009/0086760 | A1 | 4/2009 | Vedantham et al. | |
| 2015/0039754 | A1 | 2/2015 | Gupta et al. | |
| 2015/0117357 | A1 | 4/2015 | Ozturk et al. | |
| 2017/0041984 | A1 | 2/2017 | Agrawal et al. | |
| 2017/0264562 | A1* | 9/2017 | Yi | .................. H04L 47/30 |

OTHER PUBLICATIONS

Sequans Communications, "RLC AM operation for NR," R2-1703635, 3GPP TSG-RAN WG2#97bis, Spokane, USA, Apr. 3-7, 2017, 5 pages.

Nokia Corporation, et al., "Combined RLC ARQ text proposals," R2-073901, 3GPP TSG-RAN WG2 Meeting #59bis, Shanghai, China, Oct. 8-12, 2007, 9 pages.

CATT, "Discussion on the PDCP PDU (RLC SDU) buffer," R2-090354, 3GPP TSG-RAN WG2#64bis, Ljubljana, Slovenia, Jan. 12-16, 2009, 3 pages.

International Search Report dated Nov. 16, 2018 in connection with International Patent Application No. PCT/KR2018/009191, 4 pages.

* cited by examiner

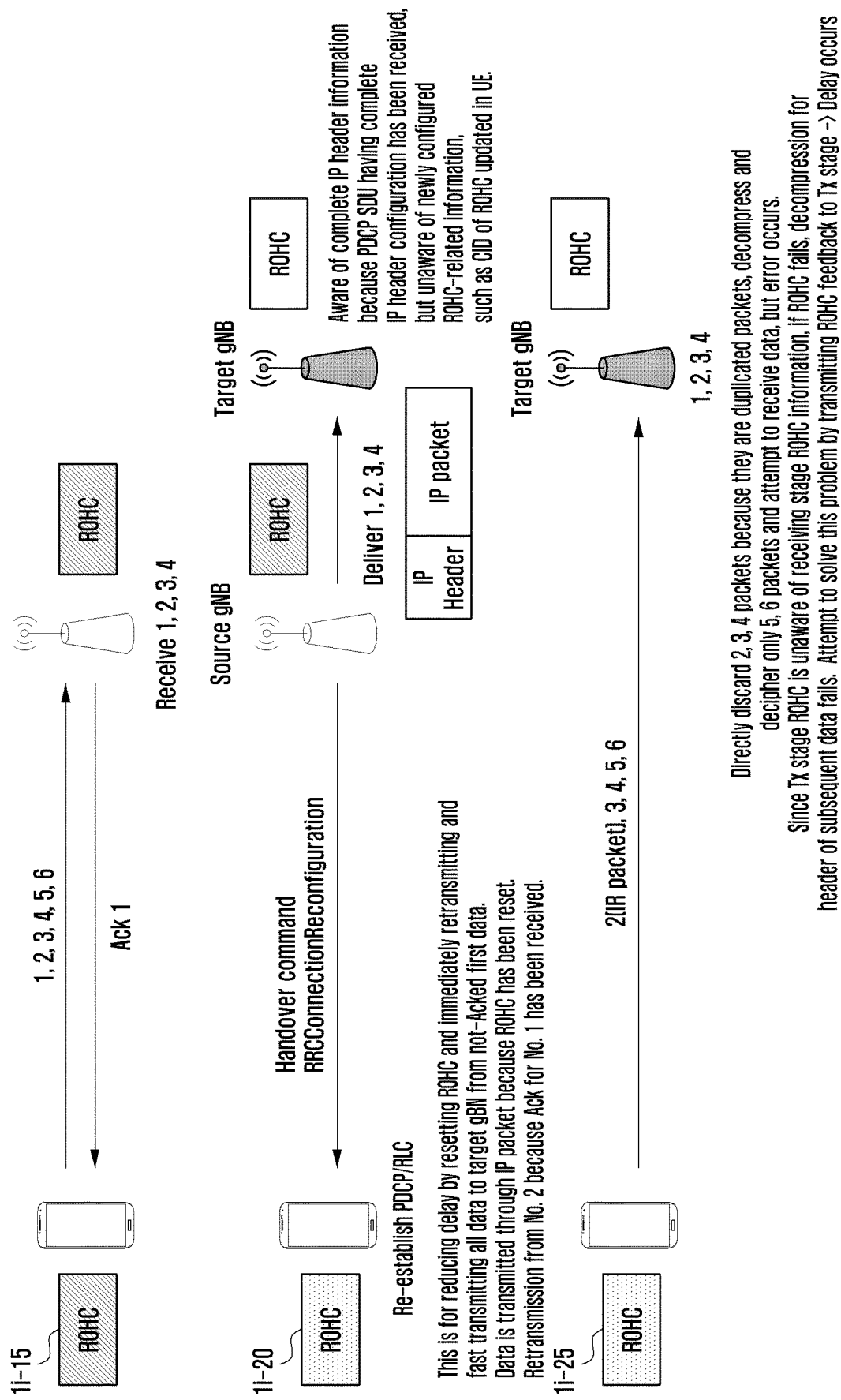

(1-2) embodiment

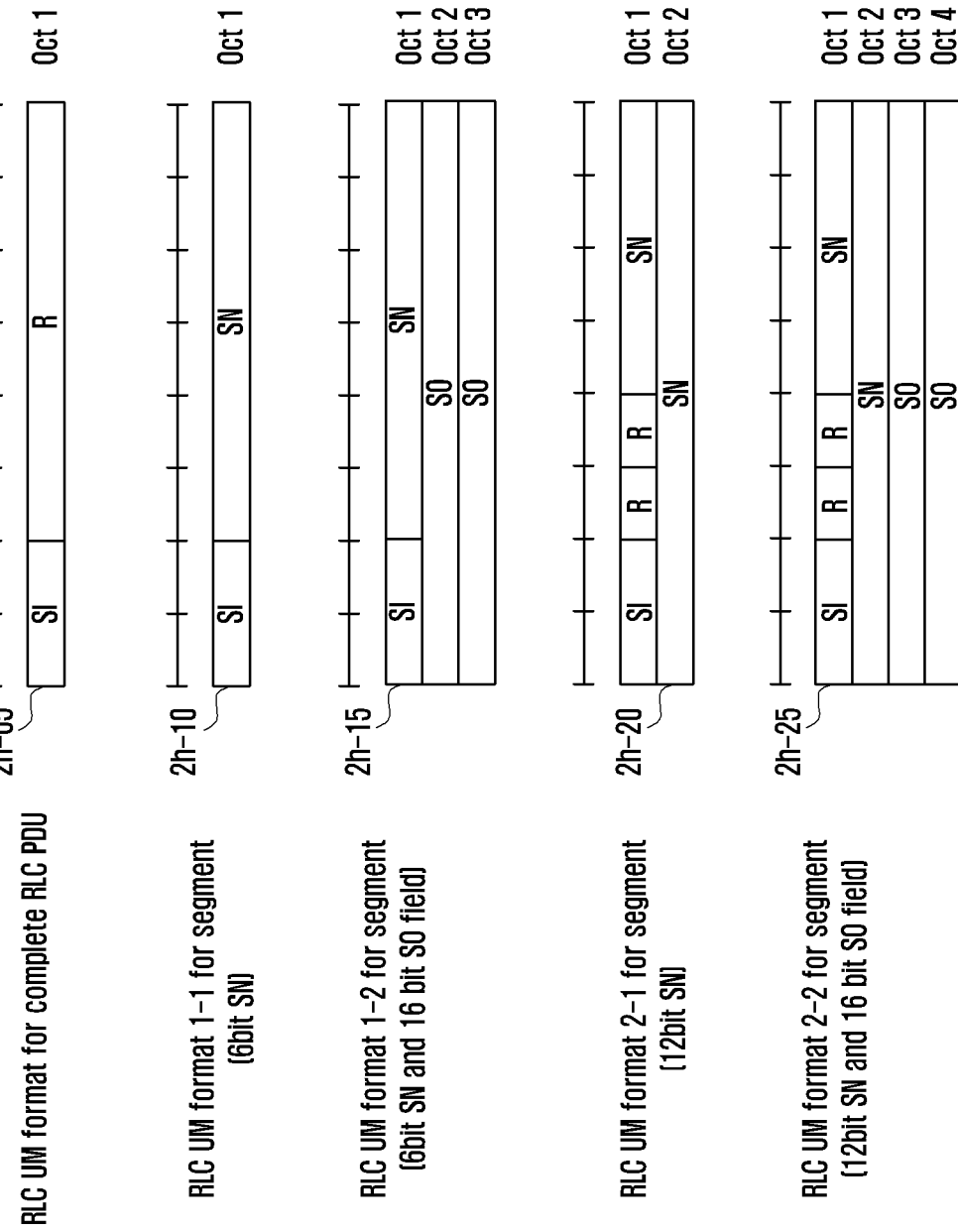

METHOD AND APPARATUS FOR DATA PROCESSING IN WIRELESS COMMUNICATION SYSTEM

CROSS-REFERENCE TO RELATED APPLICATIONS

This application is a continuation of application Ser. No. 16/101,284, filed Aug. 10, 2018, which claims priority under 35 U.S.C. § 119 to Korean Application No. 10-2017-0101912, filed Aug. 10, 2017, Korean Patent Application No. 10-2017-0108078, filed Aug. 25, 2017, Korean Patent Application No. 10-2017-0115121, filed Sep. 8, 2017, Korean Patent Application No. 10-2017-0117856, filed Sep. 14, 2017, Korean Patent Application No. 10-2017-0121362, filed Sep. 20, 2017, and Korean Patent Application No. 10-2017-0129077, filed Oct. 10, 2017, all filed in the Korean Intellectual Property Office, the disclosures of which are incorporated by reference herein in their entirety.

BACKGROUND

1. Field

The present disclosure relates to a data processing method and apparatus in a wireless communication system

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In a next-generation mobile communication system, a PDCP layer may use a header compression protocol for compressing a header. In order to apply the header compression protocol, however, a transmission stage PDCP layer and a reception stage PDCP layer must exchange header compression protocol information and must be synchronized. If the PDCP layer is outdated in a handover procedure or duplicated data is immediately discarded when it is processed, the header compression protocol information may be lost.

Furthermore, a next-generation mobile communication system requires a new RLC UM transmitting and receiving window operation capable of reducing overhead and unnecessary processing of a UE.

Furthermore, in a next-generation mobile communication system, an error may occur in a procedure of detecting a partial loss of a packet if a RLC layer detects a lost packet based on a sequence number. Accordingly, in order to solve this problem, there is a need for a new lost packet detection method.

An embodiment of the present disclosure proposes a method, by an apparatus, including receiving a plurality of data segments, determining whether at least one data segment of a first sequence number is missed, triggering a predetermined timer if the at least one data segment of the first sequence number is missed, and stopping and resetting the predetermined timer if the at least one data segment of the first sequence number is received.

An embodiment of the present disclosure proposes an apparatus including a transceiver, and a controller configured to receive a plurality of data segments, determine whether at least one data segment of a first sequence number is missed, trigger a predetermined timer if the at least one data segment of the first sequence number is missed, and stop and reset the predetermined timer if the at least one data segment of the first sequence number is received.

An embodiment of the present disclosure proposes a method, by an apparatus, including: identifying whether all data segments of a first sequence number are received, if the all data segments of the first sequence number is received, identifying whether the first sequence number is equal to a first state variable including a value of a lowest sequence number of data which is not reassembled, and if the first sequence number is equal to the first state variable, updating the first state variable to a lowest value of a sequence number for which data are not reassembled, the lowest value being greater than the first state variable, wherein at least one data segment of a sequence number lower than the updated first state variable is discarded if the at least one data segment is received after the update of the first state variable.

The method further includes reassembling data of the first sequence number using the all data segments if the all data segments of the first sequence number is received.

The method further includes: if at least one data segment of the first sequence number is received, identifying whether the first sequence number is outside of a reassembly window, and if the first sequence number is outside of the reassembly window, updating a second state variable to a next value of the first sequence number, the second state variable including a value of a sequence number following a highest sequence number of data segment which is received, wherein the reassembly window is updated based on the updated second state variable.

According to the method, the updated reassembly window includes a range lower than the updated second state variable and equal to or greater than a value remaining after subtracting a window size from the updated second state variable.

The method further includes: discarding data, which is not reassembled, of a sequence number outside of the updated reassembly window.

The method further includes: identifying whether the first state variable is outside of the updated reassembly window, and if the first state variable is outside of the updated reassembly window, updating the first state variable to a lowest value of a sequence number for which data are not reassembled, the lowest value being equal to or greater than a lowest value of a sequence number in the updated reassembly window.

An embodiment of the present disclosure proposes an apparatus including a transceiver, and a controller configured to identify whether all data segments of a first sequence number are received, if the all data segments of the first sequence number is received, identify whether the first sequence number is equal to a first state variable including a value of a lowest sequence number of data which is not reassembled, and if the first sequence number is equal to the first state variable, update the first state variable to a lowest value of a sequence number for which data are not reassembled, the lowest value being greater than the first state variable, wherein at least one data segment of a sequence number lower than the updated first state variable is discarded if the at least one data segment is received after the update of the first state variable.

The controller is further configured to reassembling data of the first sequence number using the all data segments if the all data segments of the first sequence number is received.

The controller is further configured to: if at least one data segment of the first sequence number is received, identify whether the first sequence number is outside of a reassembly window, and if the first sequence number is outside of the reassembly window, update a second state variable to a next value of the first sequence number, the second state variable including a value of a sequence number following a highest sequence number of data segment which is received, wherein the reassembly window is updated based on the updated second state variable.

According to the embodiment, the updated reassembly window includes a range lower than the updated second state variable and equal to or greater than a value remaining after subtracting a window size from the updated second state variable.

The controller is configured to: discard data, which is not reassembled, of a sequence number outside of the updated reassembly window.

The controller is configured to identify whether the first state variable is outside of the updated reassembly window, and if the first state variable is outside of the updated reassembly window, update the first state variable to a lowest value of a sequence number for which data are not reassembled, the lowest value being equal to or greater than a lowest value of a sequence number in the updated reassembly window.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1JB is a diagram illustrating a method of calculating the COUNT value of a PDCP PDU received by the reception PDCP layer entity in FIG. 1JA.

FIG. 1KB is a diagram illustrating a method of calculating the COUNT value of a PDCP PDU received by the reception PDCP layer entity in FIG. 1KA.

FIG. 1O shows a block diagram of an ENB in a wireless communication system to which a first embodiment of the present disclosure may be applied.

FIG. 2H shows RLC header formats which may be applied in the RLC UM according to a second embodiment of the present disclosure.

FIG. 2O illustrates a diagram showing a transmission operation of an RLC UM UE when the SI-based segmentation method according to the second embodiment of the present disclosure is applied.

FIGS. 31A and 31B illustrate diagrams showing a method of detecting a lost packet based on an RLC SN, a segment offset and an SI field according to a (3-2) embodiment of the present disclosure.

DETAILED DESCRIPTION

FIGS. 1A through 3L, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of the present disclosure is described in detail with reference to the accompanying drawings. In describing the present disclosure, a detailed description of a related known function or configuration will be omitted if it is deemed to make the gist of the present disclosure unnecessarily vague. Furthermore, terms to be described hereunder have been defined by taking into consideration functions in the present disclosure, and may be different depending on a user, an operator's intention or practice. Accordingly, each term should be defined based on contents throughout the entire specification.

In the following description, in describing the present disclosure, a detailed description of a related known function or configuration will be omitted if it is deemed to make the gist of the present disclosure unnecessarily vague. Embodiments of the present disclosure are described in detail with reference to the accompanying drawings.

In the following description, a term to denote an access node, a term to denote network entities, a term to denote messages, a term to denote an interface between network entities, and a term to denote a variety of types of identity information have been illustrated for convenience of description. Accordingly, the present disclosure is not limited to the following terms, and other terms to denote targets having equivalent technical meanings may be used.

Hereinafter, for convenience of description, in embodiments of the present disclosure, terms and names defined in the $3^{rd}$ generation partnership project long term evolution (3GPP LTE) standard or terms and names modified from the defined terms and names are used. However, the present disclosure is not limited to the terms and names and may be identically applied to systems based on other standards. In one embodiment of the present disclosure, an eNB may be interchangeably used with a gNB for convenience of description. That is, a base station described as an eNB may indicate a gNB.

Figure 1A:
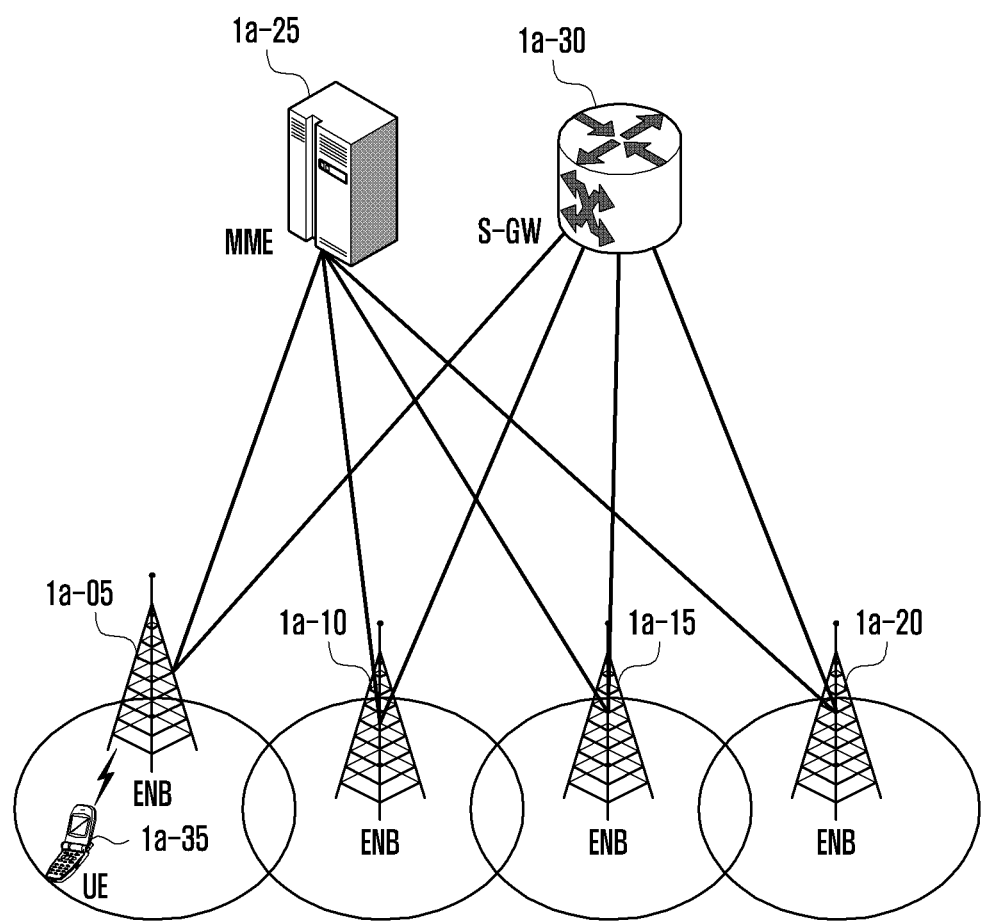
FIG. 1A illustrates a diagram showing the configuration of an LTE system to which the present disclosure may be applied.

FIG. 1A is a diagram showing the configuration of an LTE system to which the present disclosure may be applied.

Referring to FIG. 1A, the radio access network of the LTE system includes next-generation evolved Node Bs (hereinafter referred to as "ENBs", "Node Bs" or "base stations") 1a-05, 1a-10, 1a-15, and 1a-20, a mobility management entity (MME) 1a-25, and a serving-gate (S-GW) 1a-30. A user equipment (hereinafter referred to as a "UE or terminal") 1a-35 accesses an external network through the ENBs 1a-05~1a-20 and the S-GW 1a-30.

In FIG. 1A, the ENBs 1a-05~1a-20 correspond to the Node Bs of the existing UMTS system. The ENB is connected to the UE 1a-35 through a radio channel and performs a more complex function than the existing Node B. In the LTE system, all of types of user traffic including a real-time service, such as voice over IP (VoIP), through the Internet protocol, are served through a shared channel. Accordingly, a device that performs schedules by collecting state information, such as the buffer state, available transmission power state, and channel state of UEs, is necessary. The ENBs 1a-05~1a-20 are in charge of such a device. In general, one ENB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 1a-30 provides a data bearer and generates or removes a data bearer under the control of the MME 1a-25. The MME is in charge of various control functions in addition to a mobility management function for a UE, and is connected to multiple ENBs.

Figure 1B:
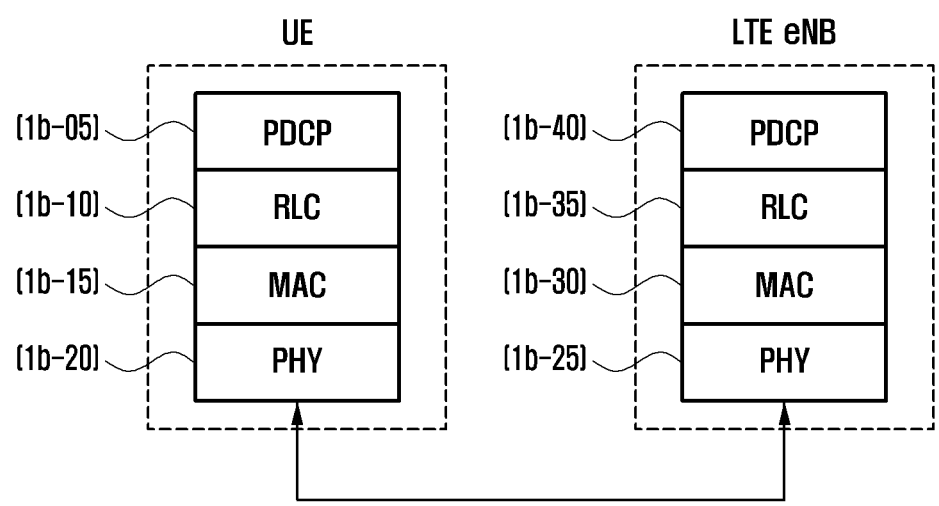
FIG. 1B illustrates a diagram showing radio protocol architecture in an LTE system to which the present disclosure may be applied.

FIG. 1B is a diagram showing radio protocol architecture in an LTE system to which the present disclosure may be applied.

Referring to FIG. 1B, the radio protocol of the LTE system includes packet data convergence protocols (PDCPs) 1b-05 and 1b-40, radio link control (RLC) 1b-10 and 1b-35, and medium access control (MAC) 1b-15 and 1b-30 in a UE and an ENB, respectively. The PDCPs 1b-05 and 1b-40 are in charge of an operation, such as IP header compression/restoration. Major functions of the PDCP 1b-05, 1b-40 are summarized as follows.

Header compression and decompression: ROHC only
 Transfer of user data
 In-sequence delivery of upper layer PDUs in PDCP re-establishment procedure for RLC AM
 Reordering function (for split bearers in DC (only support for RLC AM): PDCP PDU routing for transmission and PDCP PDU reordering for reception)

Duplicate detection of lower layer SDUs in PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The RLC 1b-10, 1b-35 reconfigures a PDCP packet data unit (PDU) in a proper size and performs an ARQ operation. Major functions of the RLC are summarized as follows.

Transfer of upper layer PDUs

ARQ function (Error Correction through ARQ (only for AM data transfer))

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC 1b-15, 1b-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels)

Scheduling information reporting

Error correction through HARQ

Priority handling between logical channels of one UE

Priority handling between UEs by means of dynamic scheduling

MBMS service identification

Transport format selection

Padding

A physical layer 1b-20, 1b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 1C:
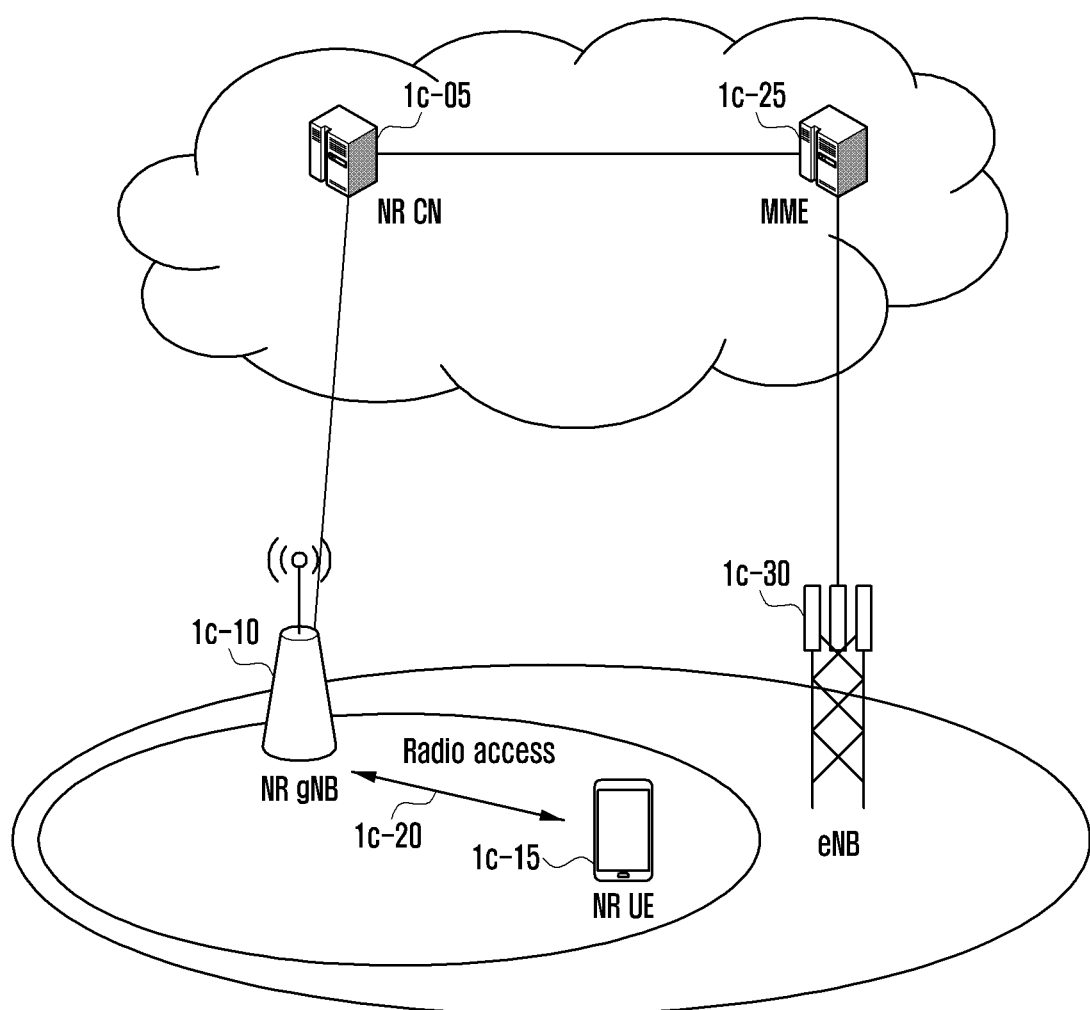
FIG. 1C illustrates a diagram showing the configuration of a next-generation mobile communication system to which the present disclosure may be applied.

FIG. 1C is a diagram showing the configuration of a next-generation mobile communication system to which the present disclosure may be applied.

Referring to FIG. 1C, the radio access network of a next-generation mobile communication system (hereinafter referred to as an "NR" or "5G") includes a new radio Node B (hereinafter referred to as an "NR gNB" or an "NR base station") 1c-10 and a new radio core network (NR CN) 1c-05. A new radio user equipment (hereinafter referred to as an "NR UE" or a "terminal") 1c-15 accesses an external network through the NR gNB 1c-10 and the NR CN 1c-05.

In FIG. 1C, the NR gNB 1c-10 corresponds to an evolved Node B (ENB) of the existing LTE system. The NR gNB is connected to the NR UE 1c-15 through a radio channel, and may provide an excellent service compared to the existing Node B. The NR requires a device for performing scheduling by collecting state information, such as the buffer state, available transmission power state, and channel state of UEs, because all of types of user traffic are served through a shared channel. The NR gNB 1c-10 is in charge of the device. In general, one NR gNB controls multiple cells. In order to implement ultra-high speed data transfer compared to the existing LTE, the NR may have the existing maximum bandwidth or more and may additionally graft the beam-forming technology using OFDM as a radio access technology. Furthermore, the NR adopts the AMC scheme that determines a modulation scheme and a channel coding rate based on the channel state of a UE. The NR CN 1c-05 performs functions, such as mobility support, a bearer configuration, and a QoS configuration. The NR CN 1c-05 is in charge of various control functions in addition to a mobility management function for a UE, and is connected to multiple ENBs. Furthermore, the NR may also operate in conjunction with the existing LTE system. The NR CN is connected to an MME 1c-25 through a network interface. The MME is connected to an ENB 1c-30, that is, the existing ENB.

Figure 1D:
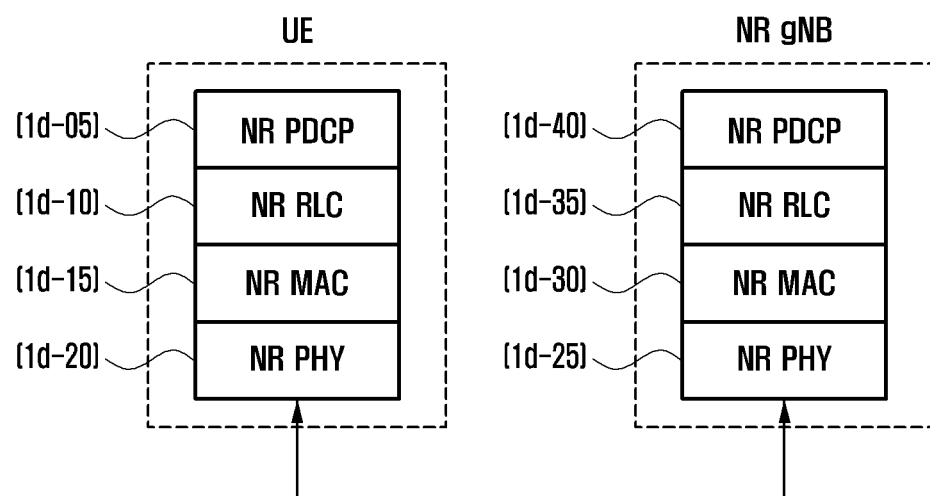
FIG. 1D illustrates a diagram showing radio protocol architecture of a next-generation mobile communication system to which the present disclosure may be applied.

FIG. 1D is a diagram showing radio protocol architecture of the NR to which the present disclosure may be applied.

Referring to FIG. 1D, the radio protocol of the NR includes NR PDCPs 1d-05 and 1d-40, NR RLC 1d-10 and 1d-35, and NR MAC 1d-15 and 1d-30, respectively, in a UE and an NR base station.

Major functions of the NR PDCP 1d-05, 1d-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

The reordering function of the NR PDCP entity refers to a function of sequentially reordering PDCP PDUs received from a lower layer based on a PDCP sequence number (SN). The reordering function may include a function of transmitting data to a higher layer in a reordered sequence, a function of directly transmitting data to a higher layer without taking the sequence into consideration, a function of reordering the sequence and recording lost PDCP PDUs, a function of making a status report on lost PDCP PDUs to the transmission side, and a function of requesting the retransmission of lost PDCP PDUs.

Major functions of the NR RLC 1d-10, 1d-35 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of the RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC entity refers to a function of transmitting RLC SDUs received from a lower layer to a higher layer in sequence, and may include a function of reassembling and transmitting multiple RLC SDUs if one RLC SDU has been originally segmented into the multiple RLC SDUs and received. The in-sequence delivery function may include a function of reordering received RLC PDUs based on an RLC SN (SN) or a PDCP SN, a function of reordering the sequence and recording lost RLC PDUs, a function of transmitting a status report on lost RLC PDUs to the transmission side, a function of requesting the retransmission of lost RLC PDUs, and a function of transmitting only RLC SDUs prior to a lost RLC SDU to a higher layer in sequence if a lost RLC SDU is present or a function of transmitting all of RLC SDUs received before a given timer expires to a higher layer in sequence when the timer expires although there is a lost RLC SDU or a function of transmitting all of RLC SDUs received so far to a higher layer when a given timer expires although there is a lost RLC SDU. Furthermore, the in-sequence delivery function may include a function of processing RLC PDUs in order that they are received (in order of arrival regardless of the sequence of a sequence number) and transmitting the RLC PDUs to a PDCP entity regardless of their sequence (i.e., out-of sequence delivery). The in-sequence delivery function may include a function of receiving segments placed in a buffer or segments to be received subsequently, reconfiguring the segments into one complete RLC PDU, processing the RLC PDU, and transmitting the RLC PDU to the PDCP entity. The NR RLC layer may not include a concatenation function. The concatenation function may be performed by the NR MAC layer or may be substituted with the multiplexing function of the NR MAC layer.

The out-of-sequence delivery function of the NR RLC entity refers to a function of directly transmitting RLC SDUs received from a lower layer to a higher layer regardless of their sequence. The out-of-sequence delivery function may include a function of reassembling multiple RLC SDUs if one RLC SDU has been originally segmented into the multiple RLC SDUs and received. The out-of-sequence delivery function may include a function of storing the RLC SN or PDCP SN of received RLC PDUs, reordering their sequence, and recording lost RLC PDUs.

The NR MAC 1d-15, 1d-30 may be connected to multiple NR RLC layer devices configured in one UE. Major functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 1d-20, 1d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 1E:
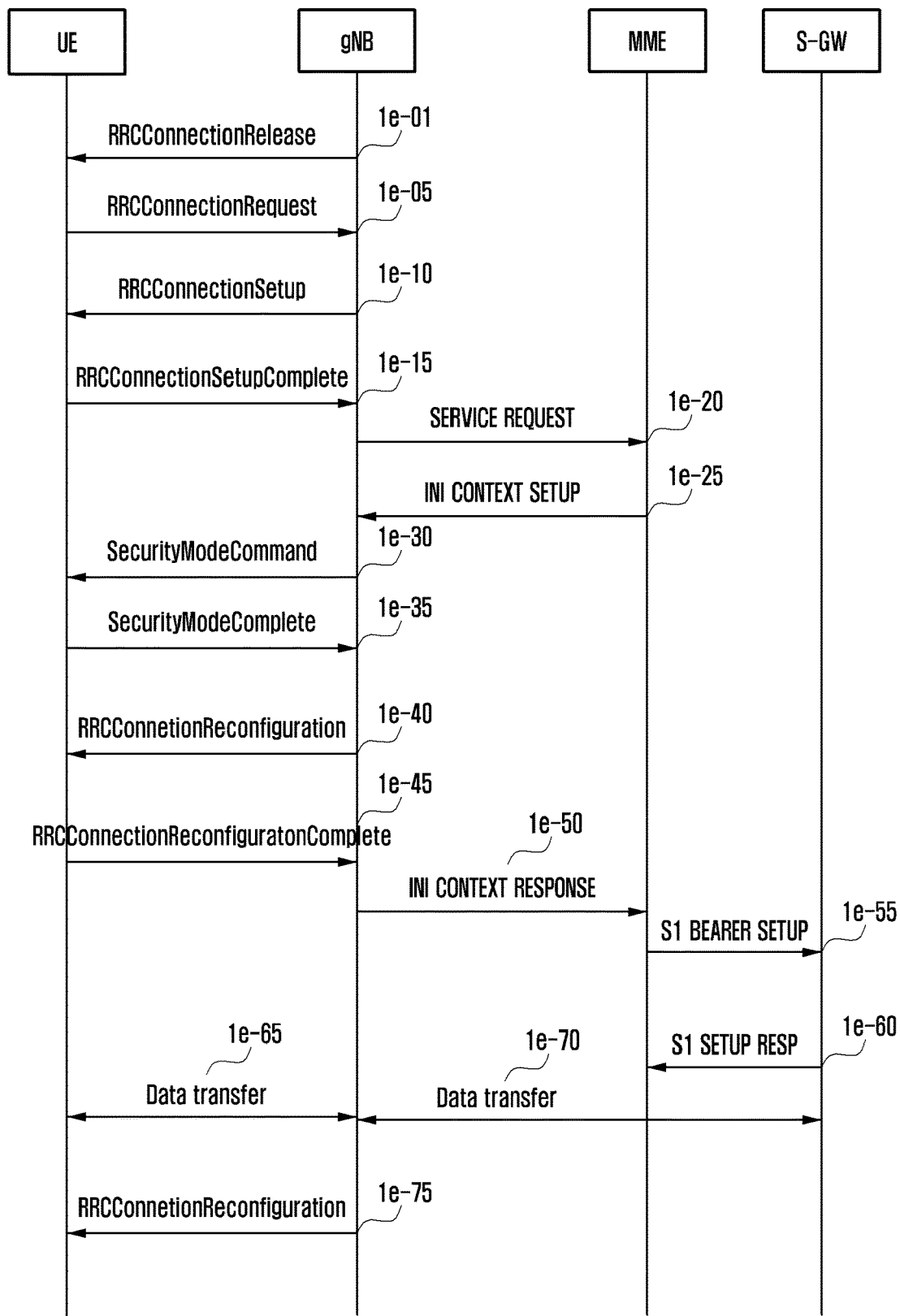
FIG. 1E is a diagram illustrating a procedure for a UE to switch from an RRC idle mode to an RRC connected mode and to establish a connection with a network according to a first embodiment of the present disclosure.

FIG. 1E is a diagram illustrating a procedure for a UE to switch from an RRC idle mode to an RRC connected mode and to establish a connection with a network according to a first embodiment of the present disclosure.

In FIG. 1E, if the UE that transmits and receives data in an RRC connected mode does not transmit and receive data for a given cause or for a given time, a gNB may transmit an RRCConnectionRelease message to the UE so that switches to an RRC idle mode (1e-01). When data to be transmitted subsequently occurs in the UE with which a connection is not now established (hereinafter referred to as "idle mode UE"), the UE performs an RRC connection establishment process with the gNB. The UE establishes backward transmission synchronization with the gNB through a random access process and transmits an RRCConnectionRequest message to the gNB (1e-05). The ID of the UE and a cause (establishmentCause) of establishing a connection are included in the RRCConnectionRequest message.

The gNB transmits an RRCConnectionSetup message so that the UE establishes an RRC connection (1e-10). The RRCConnectionSetup message includes configuration information for each service/bearer/each RLC entity or for each logical channel or for each bearer, and may include whether ROHC will be used for each bearer/each logical channel, ROHC configuration information (e.g., ROHC version, initial information), statusReportRequired information (information that the gNB instructs a PDCP Status report to the UE), drb-ContinueROHC information (configuration information that instructs to retain and use ROHC configuration information without any change, and it may be included in a MobilityControlInfo message and transmitted), an indicator (delayedRetransmission) to receive a PDCP Status report and retransmit it upon retransmission in handover, and so on. Furthermore, RRC connection configuration information, etc. is included in the RRCConnectionSetup message. The RRC connection is also called a signaling radio bearer (SRB) and is used to transmit and receive RRC messages, that is, control messages between the UE and the gNB.

The UE that has established the RRC connection transmits an RRCConnectionSetupComplete message to the gNB (1e-15). The RRCConnectionSetupComplete message may include a control message called SERVICE REQUEST that the UE requests a bearer configuration for a given service from the MME.

The gNB transmits the SERVICE REQUEST message, included in the RRCConnectionSetupComplete message, to the MME (1e-20). The MME determines whether to provide the service requested by the UE. If, as a result of the determination, the MME has determined to provide the service requested by the UE, the MME transmits an INITIAL CONTEXT SETUP REQUEST message to the gNB (1e-25). The INITIAL CONTEXT SETUP REQUEST message includes information, such as quality of service (QoS) information to be applied when a data radio bearer (DRB) is configured and security-related information to be applied to the DRB (e.g., security key, security algorithm). The gNB exchanges a SecurityModeCommand message 1e-30 and a SecurityModeComplete message 1e-35 with the UE in order to configure security.

When the security configuration is completed, the gNB transmits an RRCConnectionReconfiguration message to the UE (1e-40). The RRCConnectionReconfiguration message includes configuration information for each service/bearer/each RLC entity or for each logical channel or for each bearer, and may include whether ROHC will be used for each bearer/each logical channel, ROHC configuration information (e.g., ROHC version, initial information), statusReportRequired information (information that the gNB instructs a PDCP Status report to the UE), drb-ContinueROHC information (configuration information that instructs to retain and use ROHC configuration information without any change, and it may be included in a MobilityControlInfo message and transmitted), an indicator (delayedRetransmission) to receive a PDCP Status report and retransmit it upon retransmission in handover, and so on. Furthermore, the RRCConnectionReconfiguration message includes configuration information of a DRB in which user data will be processed. The UE configures the DRB by applying the information and transmits an RRCConnectionReconfigurationComplete message to the gNB (1e-45).

The gNB that has completed the DRB configuration along with the UE transmits an INITIAL CONTEXT SETUP COMPLETE message to the MME (1e-50). The MME that has received the message exchanges an S1 BEARER SETUP message and an S1 BEARER SETUP RESPONSE message with the S-GW in order to configure an S1 bearer (1e-55, 1e-60). The S1 bearer is a connection for data transmission configured between the S-GW and the gNB and corresponds to a DRB in a one-to-one manner. When the process is fully completed, the UE transmits and receives data through the gNB and the S-GW (1e-65, 1e-70). As described above, a known data transmission process basically includes three steps of an RRC connection configuration, a security configuration, and a DRB configuration.

Furthermore, in order to newly provide a configuration to the UE or add or change the configuration for a given cause, the gNB may transmit an RRCConnectionReconfiguration message to the UE (1e-75). The RRCConnectionReconfiguration message includes configuration information for each service/bearer/each RLC entity or for each logical channel or for each bearer, and may include whether ROHC will be used for each bearer/each logical channel, ROHC configuration information (e.g., ROHC version, initial information), statusReportRequired information (information that the gNB instructs a PDCP Status report to the UE), drb-ContinueROHC information (configuration information that instructs to retain and use ROHC configuration information without any change, and it may be included in a MobilityControlInfo message and transmitted), an indicator (delayedRetransmission) to receive a PDCP Status report and retransmit it upon retransmission in handover, and so on.

Figure 1F:
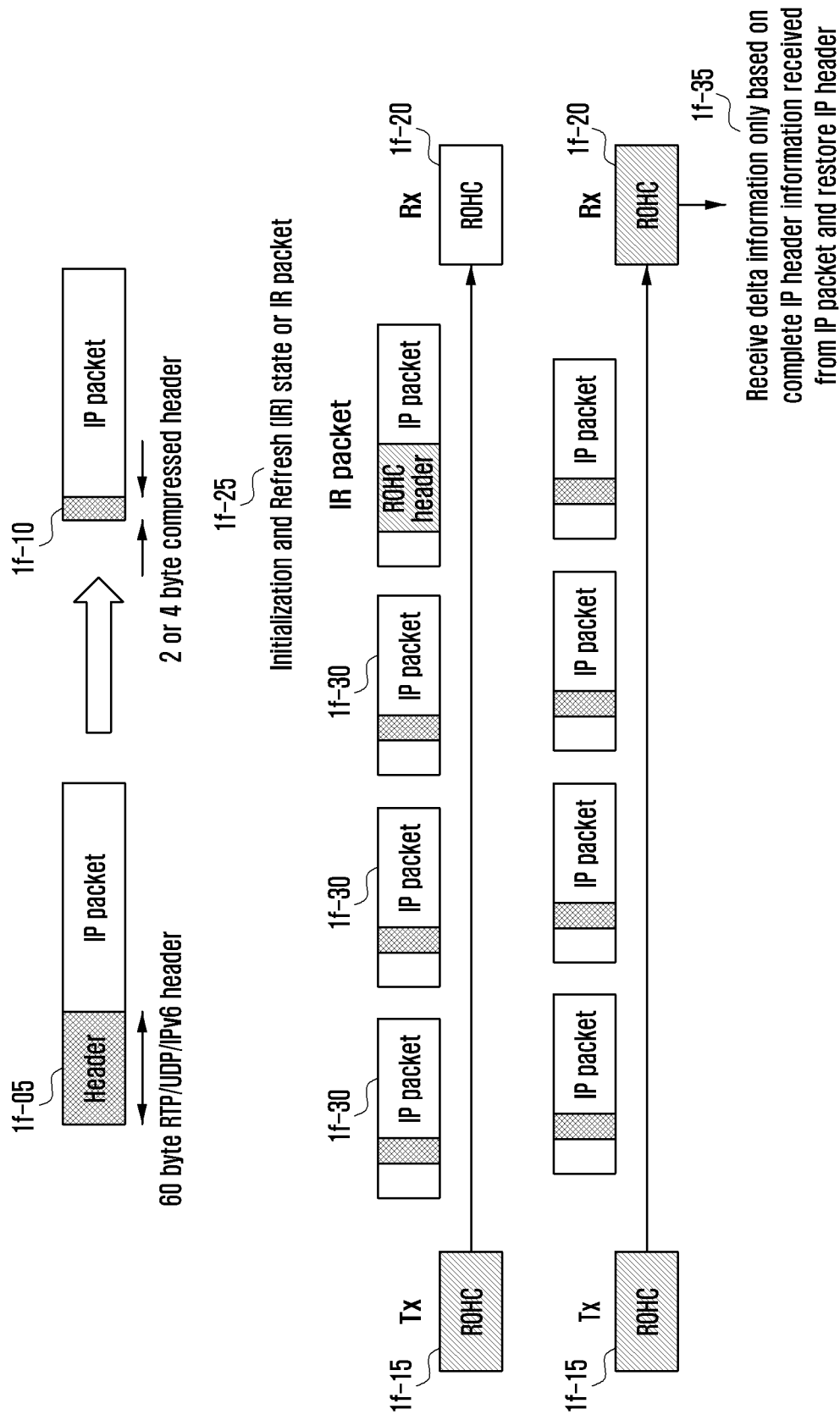
FIG. 1F is a diagram illustrating robust header compression (ROHC) according to a first embodiment of the present disclosure.

FIG. 1F is a diagram illustrating robust header compression (ROHC) according to a first embodiment of the present disclosure.

In FIG. 1F, the reason why the ROHC is applied as shown in 1f-05 and 1f-10 is that header overhead of an IP packet can be significantly reduced. For example, assuming that an iPv6 header is used, the IP header 1f-05 having a size of 60 bytes can be compressed into the header 1f-10 having a 2-byte or 4-byte size. The header compression method of the ROHC protocol does not use compression coding or source coding. That is, in the method of compressing a header in the ROHC protocol, first, a transmission PDCP entity and a reception PDCP entity share the entire header information (e.g., a source IP address, a destination IP address and a TCP/IP sequence number) of an IP header and configuration information (e.g., a context identifier (CID)) of the ROHC protocol. The entire information is included in an initialization and refresh state packet (IR) and transmitted. The transmission PDCP entity piggybacks the entire information on a PDCP data PDU and transmits it to the reception PDCP entity. The reception PDCP entity receives and shares the PDCP data PDU. Most of the shared information includes fixed information (e.g., a source IP address and a destination IP address) not changed until connection re-establishment and includes only some dynamically changing information (e.g., a CID and a TCP/IP sequence number). Accordingly, after the entire header information and the ROHC protocol configuration information are shared at once, the transmission PDCP entity may transmit only the dynamically changing information to the reception PDCP entity. Accordingly, by transmitting only the changed information without transmitting the entire information of the IP header, header overhead can be compressed and transmitted. Accordingly, the ROHC protocol can operate normally only when the reception PDCP entity receives the IR packet normally.

The ROHC may be applied in the PDCP layer entity. The ROHC protocol cannot be used normally if a transmission (Tx) stage PDCP layer entity 1f-15 and a reception (Rx) stage PDCP layer entity 1f-20 do not share the entire IP header information and ROHC protocol information and are not synchronized. That is, although the Tx stage compresses and transmits an IP header, the Rx stage does not decompress the IP header.

Accordingly, the Tx stage PDCP layer entity 1f-15 first transmits an IP packet 1f-25, including the entire IP header information and ROHC protocol information, to the Rx stage. The Rx stage PDCP layer entity 1f-20 receives the IP packet 1f-25 and completes synchronization with the Tx stage PDCP layer entity 1f-15. Thereafter, the ROHC protocol compresses and transmits the header of the IP packet (1f-30). Furthermore, the Rx stage PDCP layer entity 1f-20 performs a procedure of decompressing the ROHC compressed header (1f-35).

Figure 1G:
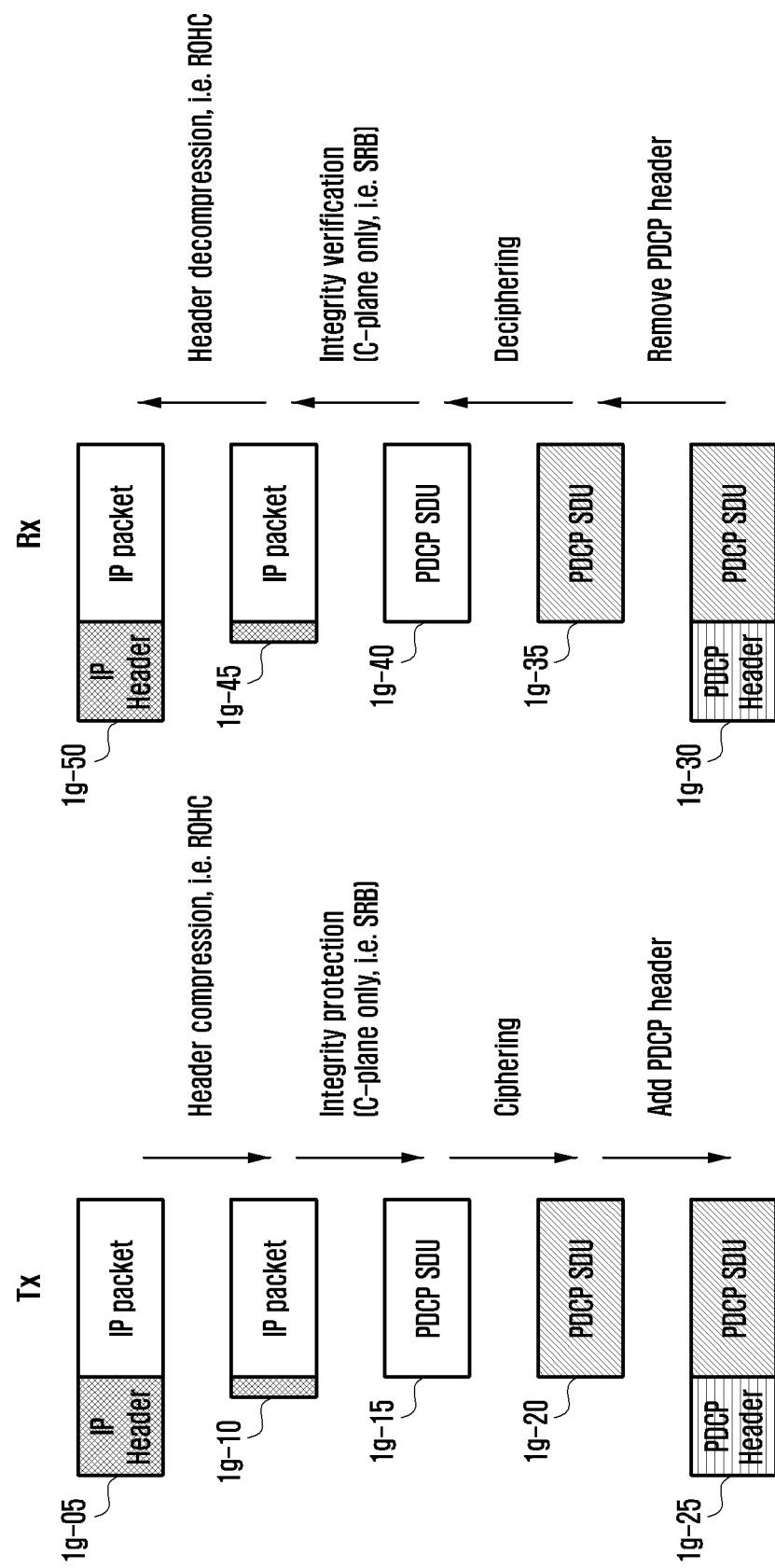
FIG. 1G is a diagram illustrating the data processing process of a transmission PDCP layer entity and a reception PDCP layer entity according to a first embodiment of the present disclosure.

FIG. 1G is a diagram illustrating the data processing process of a transmitting PDCP layer entity and a receiving PDCP layer entity according to a first embodiment of the present disclosure.

When an IP packet arrives at a transmitting PDCP layer entity (1g-05), if the ROHC protocol is used, the PDCP layer entity performs header compression on the IP header (1g-10), and performs integrity protection on control plane data or an SRB in the case of control plane data (1g-15). Furthermore, the PDCP layer entity performs ciphering on the data using a security key and a COUNT value (1g-20). Furthermore, the PDCP layer entity allocates a PDCP sequence number, configures a header field corresponding to the data (i.e., control plane data or user plane data), attaches a header to the encrypted data, and transmits the encrypted data to a lower layer (1g-25).

When the PDCP PDU is received from the lower layer, the receiving PDCP layer entity reads the PDCP sequence number and header fields of the PDCP header and removes the header (1g-30). Furthermore, the receiving PDCP layer entity performs deciphering on the data from which the header has been removed using the security key and the COUNT value (1g-35). Furthermore, the receiving PDCP layer entity performs integrity verification on control plane data or an SRB in the case of control plane data (1g-40). Furthermore, if the header has been compressed by the ROHC protocol, the receiving PDCP layer entity decompresses header compression and restores the original IP header (1g-45). Furthermore, the receiving PDCP layer entity transmits the restored IP packet to a higher layer (1g-50).

Figure 1H:
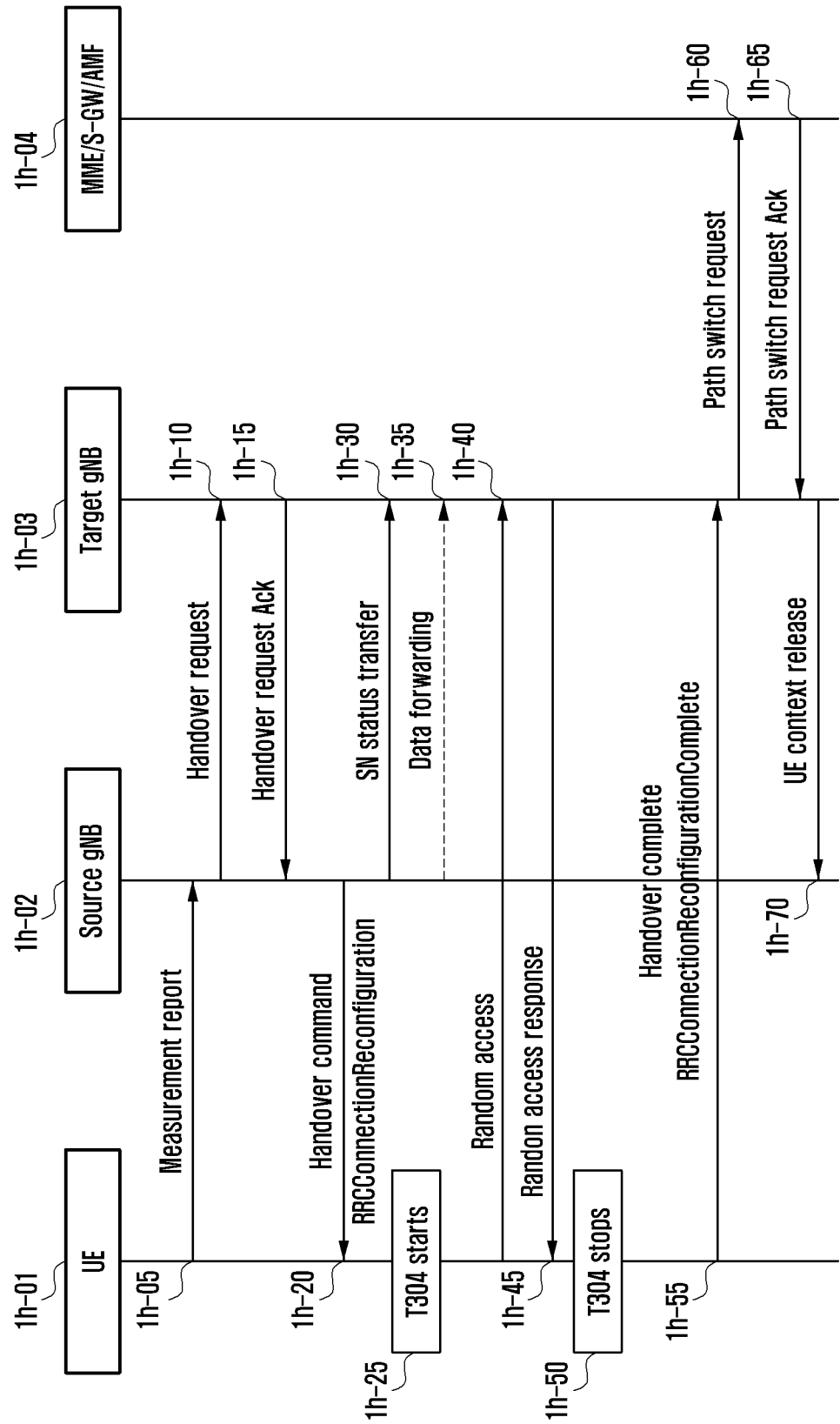
FIG. 1H is a diagram for illustrating the handover execution process of a next-generation mobile communication system according to a first embodiment of the present disclosure.

FIG. 1H is a diagram for illustrating the handover execution process of an NR according to a first embodiment of the present disclosure.

A UE 1h-01 in the connected mode state reports cell measurement information (Measurement report) to a source eNB 1h-02 if a periodic or given event is satisfied (1h-05). The source eNB determines whether the UE will perform handover to a neighboring cell based on the measurement information. The handover is a technology for changing the source eNB providing services to the UE in the connected mode state into a different eNB (or a different cell of the same eNB).

If the source eNB has determined the handover, it requests the handover by transmitting a handover (HO) request message to a new eNB that will provide services to the UE, that is, a target eNB 1h-03 (1h-10). If the target eNB accepts the handover request, it transmits an HO request Ack message to the source eNB (1h-15). The source eNB that has received the HO request Ack message transmits an HO command message to the UE (1h-20). The HO command message is transmitted from the source eNB to the UE using an RRCConnectionReconfiguration message (1h-20).

When the UE receives the RRCConnectionReconfiguration message, it stops data transmission and reception to and from the source eNB and starts a timer T304 (1h-25). If the UE is not successful in the handover to the target eNB for a given time, the timer T304 returns the UE to the UE's original configuration and changes the UE to the RRC idle state. The source eNB transmits a sequence number (SN) status for UL/DL data. If DL data is present, the source eNB forwards the DL data to the target eNB (1h-30, 1h-35). The UE attempts random access to the target cell instructed by the source eNB (1h-40). The random access is for allowing the UE to notify a target cell of its movement through the handover and also to be synchronized with the target cell. For the random access, the UE transmits a preamble, corresponding to a preamble ID provided by the source eNB or a randomly selected preamble ID, to the target cell. After a lapse of a given number of subframes since the preamble is transmitted, the UE monitors whether a random access response (RAR) message is transmitted by the target cell. The time interval for the monitoring is called a random access response window (RAR window). If the RAR is received for the given time (1h-45), the UE transmits an HO Complete message to the target eNB as an RRCConnectionReconfigurationComplete message (1h-55). When the RAR is successfully received from the target eNB as described above, the UE stops the timer T304 (1h-50).

The target eNB requests path switch from the MME in order to change the path of bearers configured toward the source eNB (1h-60, 1h-65) and notifies the source eNB of the release of the UE context of the UE (1h-70). Accordingly, the UE attempts data reception from RAR window start timing with respect to the target eNB. After the RAR is received, the UE starts transmission to the target eNB while transmitting the RRCConnectionReconfigurationComplete message.

Figure 1I:
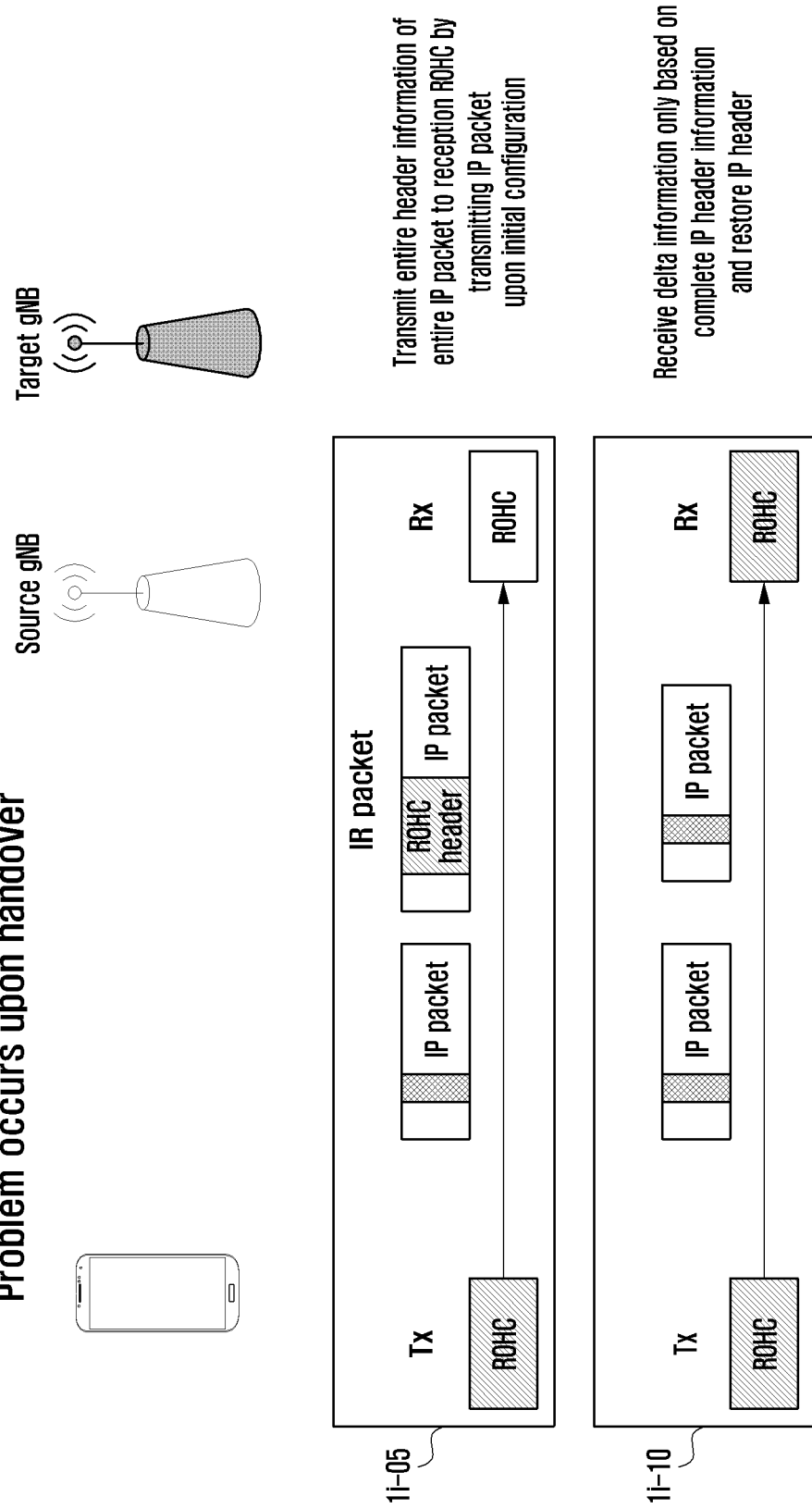
FIGS. 1IA and 1IB are diagrams illustrating a scenario in which a decompression error occurs in a receiving stage PDCP layer entity when Tx stage and Rx stage PDCP layer entities use the ROHC protocol in a handover procedure, such as FIG. 1H.

FIGS. 1IA and 1IB are diagrams illustrating a scenario in which a decompression error occurs in a Rx stage PDCP layer entity when Tx stage and Rx stage PDCP layer entities use the ROHC protocol in a handover procedure, such as FIG. 1H.

In FIGS. 1IA and 1IB, a UE establishes a connection with a source gNB. If the UE has received a configuration to use the ROHC protocol from the source gNB before it transmits data (it may be configured using an RRC message, such as 1e-10, 1e-40, 1e-75 of FIG. 1), the UE completes a bearer configuration and an ROHC protocol configuration, configures an IR packet, and transmits the IP packet. An Rx stage PDCP layer entity receives the IP packet and synchronizes the ROHC protocol with the Tx stage. That is, the Rx stage PDCP layer entity identifies and stores the entire header information of an IP packet header and ROHC protocol-related configuration information, and uses them to decompress a header compressed using the ROHC protocol (1i-05).

In the 1i-05, the ROHC protocol of the Tx stage PDCP layer entity and the ROHC protocol of the Rx stage PDCP layer entity re synchronized. In 1i-10, the Rx stage ROHC protocol may decompress and restore data transmitted by the Tx stage through the compression of an IP packet header using the ROHC protocol and forwards it to a higher layer.

In the scenario, it is assumed that the UE has transmitted data, corresponding to PDCP sequence number Nos. 1, 2, 3, 4, 5 and 6, to the gNB, the gNB has successfully received the PDCP sequence number No. 1 actually and thereafter has successfully received only the PDCP sequence number Nos. 2, 3 and 4, and the UE has received RLC ACK corresponding to the PDCP sequence number No. 1 (1i-15).

In the scenario, when the UE receives a handover command from the source gNB, it re-establishes a PDCP layer entity (i.e., PDCP re-establishment). To re-establish the PDCP layer entity means that the UE resets the ROHC protocol and continues to perform retransmission to the target gNB from the first PDCP sequence number for which ACK has not been received from a lower layer. Furthermore, the source gNB forwards the data, received from the UE, to the target gNB (1i-20). The target gNB has not been synchronized with the ROHC protocol of the PDCP layer entity of the UE because it newly configures its ROHC protocol with respect to a PDCP layer entity corresponding to the UE.

In the scenario, the UE completes a connection configuration with the target gNB, configures an IR packet including the entire header information and ROHC protocol configuration information in order to synchronize the ROHC protocol of the PDCP layer entity and the ROHC protocol of the PDCP layer entity of the target gNB, transmits the IR packet by piggybacking the IP packet on No. 2 data, that is, the first PDCP sequence number for which ACK has not been received from a lower layer, and also performs retransmission on the PDCP sequence number Nos. 3, 4, 5 and 6 (1i-25). The IP headers of IP packets corresponding to the PDCP sequence number Nos. 3, 4, 5 and 6 may have been compressed using the ROHC protocol.

However, the target gNB immediately discards the data for the PDCP sequence number Nos. 1, 2, 3 and 4 by considering the data to be a duplicated packet because the target gNB has already received the data (received from the source gNB) (furthermore, the same problem may occur with respect to an outdated packet in addition to a duplicated packet). Accordingly, since the IR packet piggybacked on the data of the PDCP sequence number No. 2 is lost, the ROHC protocol of the PDCP layer entity of the target gNB is not synchronized with the ROHC protocol of the PDCP layer entity of the UE. Accordingly, a decompression error occurs because decompression cannot be performed on data that has been compressed by the ROHC protocol and received. In this case, the ROHC protocol of the Rx stage PDCP layer entity transmits ROHC feedback in order to perform synchronization. In such a process, delay may occur.

Figure 1J:
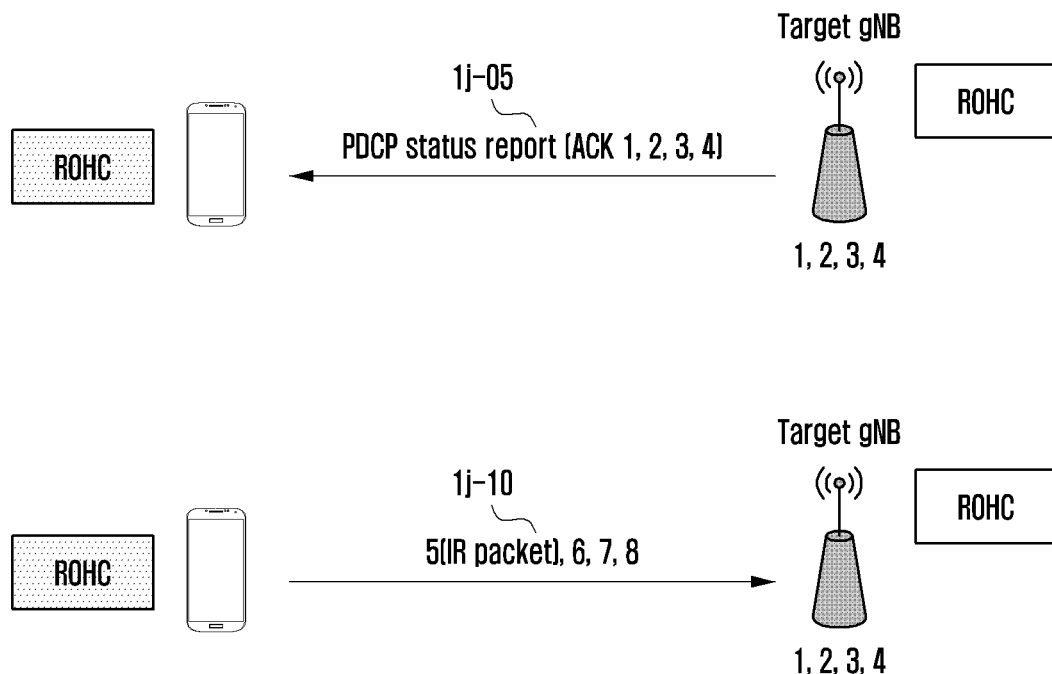
FIG. 1JA is a diagram illustrating a (1-1) embodiment for solving a problem, such as that in FIGS. 1IA and 1IB, in a next-generation mobile communication system.
Figure 1J:
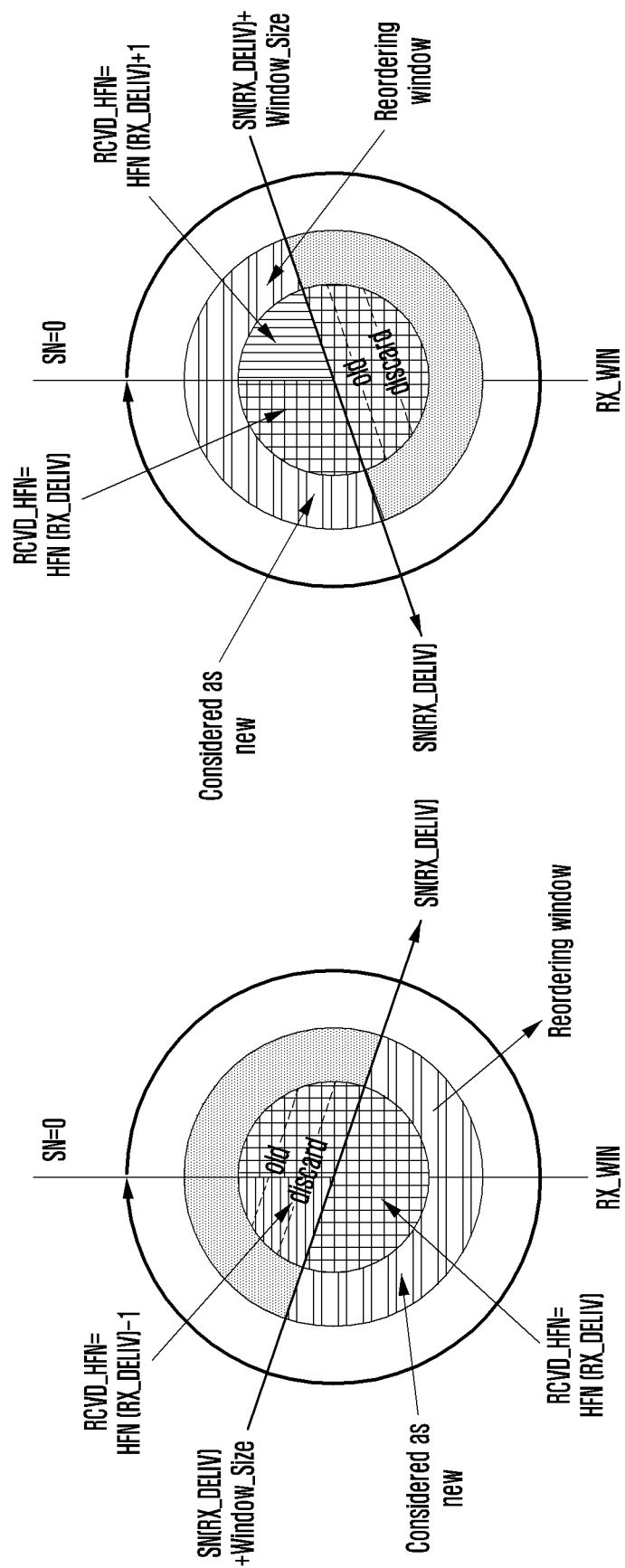

FIG. 1JA is a diagram illustrating a (1-1) embodiment for solving a problem, such as that in FIGS. 1IA and 1IB, in an NR.

In FIG. 1JA, after a UE receives a handover command from a gNB, performs a PDCP re-establishment procedure, and performs handover to a target gNB, it first waits for a PDCP status report without performing retransmission from the first PDCP PDU for which ACK has not been performed from a lower layer (1j-05). That is, the gNB may forward the PDCP status report to the UE when it transmits the handover command or may forward the PDCP status report to the UE after a given time. When the PDCP status report is received, the UE transmits new data not received by the target gNB and transmits an IR packet by piggybacking the IP packet on the new data. Accordingly, the target gNB can receive the IP packet normally without discarding the IP packet (1j-10). That is, when the handover command is received (i.e., when an RRC Connection Reconfiguration message is received), the UE can perform selective retransmission.

As a detailed procedure of performing the (1-1) embodiment of the present disclosure, the re-establishment procedure of Tx stage and Rx stage PDCP layer entities (also interchangeably used with a PDCP entity) according to the (1-1a) embodiment is as follows.

<PDCP Entity Re-Establishment>

When a higher layer requests PDCP entity re-establishment, a transmitting PDCP layer entity operates as follows.

In the case of an Unacknowledged Mode (UM) DRB (e.g., drb-ContinueROHC is included in MobilityControlInfo of a handover command message, that is, an RRC Connection Reconfiguration message. In general, it is configured upon performing handover to a different cell within a source gNB). If drb-ContinueROHC has not been configured, the entity resets ROHC with respect to the uplink and starts the ROHC in the IR state of a U mode.

In the case of an acknowledged mode (AM) DRB, the entity instructs UE connection configuration information (UE AS context) to be retained in a handover command message. If ROHC has been configured except a case where drb-ContinueROHC has been configured, the entity resets the ROHC with respect to the uplink and starts the ROHC in the IR state of a U mode.

In the case of a UM DRB and an SRB, the entity sets a TX_NEXT variable as an initial value (TX_NEXT: this state variable indicates the COUNT value of the next PDCP SDU to be transmitted. The initial value is 0.)

The entity applies a ciphering algorithm and key provided by a higher layer in the PDCP re-establishment procedure.

The entity applies an integrity protection algorithm and key provided by a higher layer in the PDCP re-establishment procedure.

In the case of a UM DRB, the entity performs the following processing on PDCP SDUs to which PDCP sequence numbers have already been assigned, but which have not yet been delivered to a lower layer.
Process the PDCP SDUs as if they have been received from a higher layer.
Transmit the PDCP SDUs in order of COUNT values assigned prior to the PDCP re-establishment procedure and does not start a PDCP discard timer.

In the case of an AM DRB, if the ROHC has been configured (e.g., in a handover command message) and drb-ContinueROHC has not been configured, the entity performs retransmission and transmission on PDCP SDUs not successfully received after a PDCP Status report is received, and performs the following procedure in order of COUNT values.
Perform header compression on the PDCP SDU.
Perform ciphering using the COUNT value corresponding to the PDCP SDU.
Forward the resulting PDCP data PDU on which the procedure has been performed to a lower layer.

In the case of an AM DRB, if it is not the case, the entity performs retransmission or transmission in order of COUNT values assigned prior to the PDCP re-establishment procedure from the first PDCP SDU whose successful delivering has not been confirmed from a lower layer, and performs the following procedure.
Perform header compression on the PDCP SDU.
Perform ciphering using the COUNT value corresponding to the PDCP SDU.
Forward the resulting PDCP data PDU on which the procedure has been performed to a lower layer.

When a higher layer requests PDCP entity re-establishment, the receiving PDCP layer entity operates as follows.
In the case of an SRB, the entity discards all of stored PDCP SDUs and PDCP PDUs.
In the case of a UM DRB, if drb-ContinueROHC has not been configured, the entity resets ROHC with respect to the downlink and starts the ROHC in the NC state of a U mode.
In the case of a UM DRB, the entity resets RX_NEXT and RX_REORD variables as initial values.
In the case of an SRB, the entity discards all of stored PDCP SDUs and PDCP PDUs.
The entity applies a ciphering algorithm and key provided by a higher layer in the PDCP re-establishment procedure.
The entity applies an integrity protection algorithm and key provided by a higher layer in the PDCP re-establishment procedure.

(Examples for the PDCP Entity Re-Establishment)

When upper layers request a PDCP entity re-establishment, the transmitting PDCP entity shall:
for UM DRBs, reset the header compression protocol for uplink and start with an IR state in U-mode if drb-ContinueROHC is not configured;
  for AM DRBs, reset the header compression protocol for uplink and start with an IR state in U-mode (if header compression protocol is configured and drb-Continue ROHC is not configured), except if upper layers indicate stored UE AS context is used and drb-ContinueROHC is configured;
for UM DRBs and SRBs, set TX_NEXT to the initial value;
for SRBs, discard all stored PDCP SDUs and PDCP PDUs;
apply the ciphering algorithm and key provided by upper layers during the PDCP entity re-establishment procedure;
apply the integrity protection algorithm and key provided by upper layers during the PDCP entity re-establishment procedure;
for UM DRBs, for each PDCP SDU already associated with a PDCP SN but for which a corresponding PDU has not previously been submitted to lower layers:
consider the PDCP SDUs as received from upper layer;
perform transmission of the PDCP SDUs in ascending order of the COUNT value associated to the PDCP SDU prior to the PDCP re-establishment without restarting the discard Timer.
for AM DRBs, if header compression protocol is configured and drb-ContinueROHC is not configured, after receiving PDCP status report, perform retransmission or transmission of PDCP SDUs for which the successful delivery has not been confirmed by PDCP status report and already associated with COUNT (or PDCP SN) in ascending order of the COUNT values associated to the PDCP SDU prior to the PDCP entity re-establishment as specified below;
perform header compression of the PDCP SDU;
perform ciphering of the PDCP SDU using the COUNT value associated with this PDCP SDU;
submit the resulting PDCP Data PDU to lower layer.
for AM DRBs, otherwise, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:
  perform header compression of the PDCP SDU;
  perform ciphering of the PDCP SDU using the COUNT value associated with this PDCP SDU;
  submit the resulting PDCP Data PDU to lower layer.

When upper layers request a PDCP entity re-establishment, the receiving PDCP entity shall:
  for SRBs, discard all stored PDCP SDUs and PDCP PDUs
  for UM DRBs, reset the header compression protocol for downlink and start with NC state in U-mode if drb-ContinueROHC is not configured;
  for UM DRBs and SRBs, set RX_NEXT and RX_REORD to the initial value;
  apply the ciphering algorithm and key provided by upper layers during the PDCP entity re-establishment procedure;
  apply the integrity protection algorithm and key provided by upper layers during the PDCP entity re-establishment procedure.

As a detailed procedure of performing the (1-1) embodiment of the present disclosure, a procedure for an Rx stage PDCP layer entity to process a received packet according to the (1-1a) embodiment is as follows.

<Operation for Receiving PDCP Entity to Process Received Packet (Receive Operation)>

Window state variables used in the operation for the Rx stage PDCP layer entity to process a received packet are as follows, and maintain COUNT values.
  HFN: indicates the hyper frame number (HFN) part of the window state variable.
  SN: indicates the sequence number (SN) part of the window state variable.
  RCVD_SN: indicates a PDCP sequence number included in the header of a received PDCP PDU
  RCVD_HFN: the HFN value of the received PDCP PDU calculated by the receiving PDCP layer entity
  RCVD_COUNT: the COUNT value of a received PDCP PDU=[RCVD_HFN, RCVD_SN].
  RX_NEXT: indicates the COUNT value of a next PDCP SDU expected to be received. The initial value is 0.
  RX_DELIV: indicates the COUNT value of the last PDCP SDU delivered to a higher layer. The initial value is $2^{32}-1$.
  RX_REORD: indicates the next COUNT value of a COUNT value corresponding to a PDCP PDU that has triggered a t-Reordering timer.
  t-Reordering: uses a timer value or section configured in a higher layer (RRC layer, RRC message, 1e-10, 1e-40, and 1e-75 of FIG. 1E). The timer is used to detect a lost PDCP PDU and only one timer is driven only at once.

(Examples for the Definitions of the Window State Variables)
  HFN(State Variable): the HFN part (i.e. the number of most significant bits equal to HFN length) of the State Variable.
  SN(State Variable): the SN part (i.e. the number of least significant bits equal to PDCP SN length) of the State Variable.
  RCVD_SN: the PDCP SN of the received PDCP Data PDU, included in the PDU header.
  RCVD_HFN: the HFN of the received PDCP Data PDU, calculated by the receiving PDCP entity.
  RCVD_COUNT: the COUNT of the received PDCP Data PDU=[RCVD_HFN, RCVD_SN].
  RX_NEXT: This state variable indicates the COUNT value of the next PDCP SDU expected to be received. The initial value is 0.
  RX_DELIV: This state variable indicates the COUNT value of the last PDCP SDU delivered to the upper layers. The initial value is $2^{32}-1$.
  RX_REORD: This state variable indicates the COUNT value following the COUNT value associated with the PDCP Data PDU which triggered t-Reordering.
  t-Reordering: The duration of the timer is configured by upper layers. This timer is used to detect loss of PDCP Data PDUs If t-Reordering is running, t-Reordering shall not be started additionally, i.e. only one t-Reordering per receiving PDCP entity is running at a given time.

<Actions when PDCP Data PDU is Received from Lower Layers>

Referring to FIG. 1JA, when a PDCP PDU is received from a lower layer, the receiving PDCP layer entity determines the COUNT value of the received PDCP PDU as follows. Furthermore, the receiving PDCP layer entity performs a procedure of determining the COUNT value of the PDCP PDU, processing the PDCP PDU, and updating window state variables as follows with reference to FIG. 1JA.

If a received RCVD_SN is RCVD_SN<=SN(RX_DELIV)-Window_Size,
    Perform update like RCVD_HFN=HFN(RX_DELIV)+1.
  Otherwise, if RCVD_SN is RCVD_SN>SN(RX_DELIV)+Window_Size,
    Perform update like RCVD_HFN=HFN(RX_DELIV)-1.
  If it is not the case,
    Perform update like RCVD_HFN=HFN(RX_DELIV).
  RCVD_COUNT is determined like RCVD_COUNT=[RCVD_HFN, RCVD_SN].

(Examples for the Actions when a PDCP Data PDU is Received from Lower Layers)

At reception of a PDCP Data PDU from lower layers, the receiving PDCP entity shall determine the COUNT value of the received PDCP Data PDU, i.e. RCVD_COUNT, as follows:
  if RCVD_SN<=SN(RX_DELIV)-Window_Size:
    RCVD_HFN=HFN(RX_DELIV)+1;
  else if RCVD_SN>SN(RX_DELIV)+Window_Size:
    RCVD_HFN=HFN(RX_DELIV)-1;
  else:
    RCVD_HFN=HFN(RX_DELIV);
  RCVD_COUNT=[RCVD_HFN, RCVD_SN].

After determining the COUNT value of the received PDCP PDU, the receiving PDCP layer entity updates window state variables and processes the PDCP PDU as follows.
  If RCVD_COUNT<=RX_DELIV or a PDCP PDU having a value of RCVD_COUNT has been previously received,
    Perform deciphering on the PDCP PDU using the RCVD_COUNT value and perform integrity verification.
    If integrity verification has failed,
      Indicate an integrity verification failure of a higher layer.
    Discard the PDCP PDU.

In other cases, the entity performs the following operation.
  Perform deciphering on the PDCP PDU using the RCVD_COUNT value and perform integrity verification.
    If integrity verification has failed,
      Indicate an integrity verification failure of a higher layer.
      Discard the PDCP PDU.
(Examples for the Actions when a PDCP Data PDU is Received from Lower Layers)
After determining the COUNT value of the received PDCP Data PDU=RCVD_COUNT, the receiving PDCP entity shall:
  if RCVD_COUNT<=RX_DELIV; or
  if the PDCP Data PDU with COUNT=RCVD_COUNT has been received before:
    perform deciphering and integrity verification of the PDCP Data PDU using COUNT=RCVD_COUNT;
    if integrity verification fails:
      indicate the integrity verification failure to upper layer;
    discard the PDCP Data PDU;
  else:
    perform deciphering and integrity verification of the PDCP Data PDU using COUNT=RCVD_COUNT;
    if integrity verification fails:
      indicate the integrity verification failure to upper layer;
      discard the PDCP Data PDU;
If the received PDCP PDU has not been discarded, the receiving PDCP layer entity operates as follows.
  The entity places the above-processed PDCP SDU in the reception buffer.
  If RCVD_COUNT>=RX_NEXT,
    Update RX_NEXT with RCVD_COUNT+1.
  If RCVD_COUNT is RX_DELIV+1]
    Perform header decompression and deliver to a higher layer in order of COUNT values.
      Deliver all of contiguous PDCP SDUs to a higher layer starting from COUNT=RX_DELIV+1.
      Update the RX_DELIV value with the COUNT value of the last PDCP SDU delivered to a higher layer.
    If an out-of-order delivery indicator (outOfOrderDelivery) has been set and the processed PDCP SDU has not been delivered to a higher layer,
      Deliver the PDCP SDU to a higher layer.
    If a t-Reordering timer is being driven and a PDCP SDU having a COUNT value of RX_REORD-1 has been delivered to a higher layer,
      Stop and reset the t-Reordering timer.
    If the t-Reordering timer is not driven (including a case where the t-Reordering timer has been stopped in the condition) and at least one PDCP SDU is placed in the buffer,
      Update the RX_REORD value with RX_NEXT.
      Start the t-Reordering timer.
(Examples for the Actions when a PDCP Data PDU is Received from Lower Layers)
If the received PDCP Data PDU with COUNT value=RCVD_COUNT is not discarded above, the receiving PDCP entity shall:
  store the resulting PDCP SDU in the reception buffer;
  if RCVD_COUNT>=RX_NEXT:
    update RX_NEXT to RCVD_COUNT+1;
  if RCVD_COUNT=RX_DELIV+1:
    deliver to upper layers in ascending order of the associated COUNT value after performing header decompression;
      all stored PDCP SDU(s) with consecutively associated COUNT value(s) starting from COUNT=RX_DELIV+1;
    update RX_DELIV to the COUNT value of the last PDCP SDU delivered to upper layers;
  if outOfOrderDelivery is configured and the resulting PDCP SDU has not been delivered to upper layers:
    deliver the resulting PDCP SDU to upper layers;
  if t-Reordering is running, and if the PDCP SDU with COUNT=RX_REORD-1 has been delivered to upper layers:
    stop and reset t-Reordering;
  if t-Reordering is not running (includes the case when t-Reordering is stopped due to actions above), and if there is at least one stored PDCP SDU:
    update RX_REORD to RX_NEXT;
    start t-Reordering.

<Actions of Receiving PDCP Layer Entity when t-Reordering Expires>
When the t-Reordering timer expires, the receiving PDCP layer entity operates as follows.
  After performing header decompression, the entity delivers PDCP SDUs to a higher layer in order of COUNT values.
    Deliver all of PDCP SDUs having COUNT values smaller than an RX_REORD value.
    Deliver all of PDCP SDUs having contiguous COUNT values starting from the RX_REORC value.
  The entity updates an RX_DELIV value with the COUNT value of the last PDCP SDU delivered to a higher layer.
  If at least one PDCP SDU is placed in the buffer,
    Update the RX_REORD value with an RX_NEXT value.
    Start the t-Reordering timer.
(Examples for the Actions when a t-Reordering Expires)
When t-Reordering expires, the receiving PDCP entity shall:
  deliver to upper layers in ascending order of the associated COUNT value after performing header decompression:
    all stored PDCP SDU(s) with associated COUNT value(s)<RX_REORD;
    all stored PDCP SDU(s) with consecutively associated COUNT value(s) starting from RX_REORD;
  update RX_DELIV to the COUNT value of the last PDCP SDU delivered to upper layers;
  if there is at least one stored PDCP SDU:
    update RX_REORD to RX_NEXT;
    start t-Reordering.

As a detailed procedure of performing the (1-1) embodiment of the present disclosure, the re-establishment procedure of the Tx stage and Rx stage PDCP entities according to a (1-1b) embodiment is as follows. In the (1-1b) embodiment, when a gNB performs retransmission upon handover through an RRC message (1e-10, 1e-40, 1e-75 of FIG. 1E) or a handover command message (RRC Connection Reconfiguration message, FIG. 1H-20 of FIG. 1H), the gNB may newly define an indicator (delayedRetransmission) indicating that it performs retransmission after receiving a PDCP status report, may include the indicator in the message, and may transmit the message.

<PDCP Entity Re-Establishment>

When a higher layer requests PDCP entity re-establishment, the transmitting PDCP layer entity operates as follows.

In the case of a UM DRB (e.g., drb-ContinueROHC is included in MobilityControlInfo of a handover command message, that is, an RRC Connection Reconfiguration message. In general, it is configured upon performing handover to a different cell within a source gNB). If drb-ContinueROHC has not been configured, the entity resets ROHC with respect to the uplink and starts the ROHC in the IR state of a U mode.

In the case of an AM DRB, the entity instructs UE connection configuration information (UE AS context) to be retained in a handover command message. If ROHC has been configured except a case where drb-ContinueROHC has been configured, the entity resets the ROHC with respect to the uplink and starts the ROHC in the IR state of a U mode.

In the case of a UM DRB and an SRB, the entity sets a TX_NEXT variable as an initial value (TX_NEXT: this state variable indicates the COUNT value of the next PDCP SDU to be transmitted. The initial value is 0.)

In the case of an SRB, the entity discards all of stored PDCP SDUs and PDCP PDUs.

The entity applies a ciphering algorithm and key provided by a higher layer in the PDCP re-establishment procedure.

The entity applies an integrity protection algorithm and key provided by a higher layer in the PDCP re-establishment procedure.

In the case of a UM DRB, the entity performs the following processing on PDCP SDUs to which PDCP sequence numbers have already been assigned, but which have not yet been delivered to a lower layer.

Process the PDCP SDUs as if they have been received from a higher layer.

Transmit the PDCP SDUs in order of COUNT values assigned prior to the PDCP re-establishment procedure and does not start a PDCP discard timer.

In the case of an AM DRB, if delayedRetransmission has been configured, the entity performs retransmission and transmission on PDCP SDUs not successfully received after a PDCP Status report is received, and performs the following procedure in order of COUNT values.

Perform header compression on the PDCP SDU.

Perform ciphering using the COUNT value corresponding to the PDCP SDU.

Forward the resulting PDCP data PDU on which the procedure has been performed to a lower layer.

In the case of an AM DRB, if it is not the case, the entity performs retransmission or transmission in order of COUNT values assigned prior to the PDCP re-establishment procedure from the first PDCP SDU whose successful delivering has not been confirmed from a lower layer, and performs the following procedure.

Perform header compression on the PDCP SDU.

Perform ciphering using the COUNT value corresponding to the PDCP SDU.

Forward the resulting PDCP data PDU on which the procedure has been performed to a lower layer.

When a higher layer requests the PDCP entity re-establishment, the receiving PDCP layer entity operates as follows.

In the case of an SRB, the entity discards all of stored PDCP SDUs and PDCP PDUs.

In the case of a UM DRB, drb-ContinueROHC has not been configured, the entity resets ROHC with respect to the downlink and starts the ROHC in the NC state of a U mode.

In the case of a UM DRB, the entity resets RX_NEXT and RX_REORD variables as initial values.

The entity applies a ciphering algorithm and key provided by a higher layer in the PDCP re-establishment procedure.

The entity applies an integrity protection algorithm and key provided by a higher layer in the PDCP re-establishment procedure.

(Examples for the PDCP Entity Re-Establishment)

When upper layers request a PDCP entity re-establishment, the UE shall additionally perform once the procedures described in this section. After performing the procedures in this section, the UE shall follow the procedures in subclause 5.2.

When upper layers request a PDCP entity re-establishment, the transmitting PDCP entity shall:

for UM DRBs, reset the header compression protocol for uplink and start with an IR state in U-mode if drb-ContinueROHC is not configured;

for AM DRBs, reset the header compression protocol for uplink and start with an IR state in U-mode (if header compression protocol is configured and drb-Continue ROHC is not configured), except if upper layers indicate stored UE AS context is used and drb-ContinueROHC is configured;

for UM DRBs and SRBs, set TX_NEXT to the initial value;

for SRBs, discard all stored PDCP SDUs and PDCP PDUs;

apply the ciphering algorithm and key provided by upper layers during the PDCP entity re-establishment procedure;

apply the integrity protection algorithm and key provided by upper layers during the PDCP entity re-establishment procedure;

for UM DRBs, for each PDCP SDU already associated with a PDCP SN but for which a corresponding PDU has not previously been submitted to lower layers:
consider the PDCP SDUs as received from upper layer;
perform transmission of the PDCP SDUs in ascending order of the COUNT value associated to the PDCP SDU prior to the PDCP re-establishment without restarting the discard Timer.

for AM DRBs, if delayedRetransmission is configured, after receiving PDCP status report, perform retransmission or transmission of PDCP SDUs for which the successful delivery has not been confirmed by PDCP status report and already associated with COUNT (or PDCP SN) in ascending order of the COUNT values associated to the PDCP SDU prior to the PDCP entity re-establishment as specified below;
perform header compression of the PDCP SDU;
perform ciphering of the PDCP SDU using the COUNT value associated with this PDCP SDU;
submit the resulting PDCP Data PDU to lower layer.

for AM DRBs, otherwise, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:

perform header compression of the PDCP SDU;
perform ciphering of the PDCP SDU using the COUNT value associated with this PDCP SDU;
submit the resulting PDCP Data PDU to lower layer.

When upper layers request a PDCP entity re-establishment, the receiving PDCP entity shall:
for SRBs, discard all stored PDCP SDUs and PDCP PDUs
for UM DRBs, reset the header compression protocol for downlink and start with NC state in U-mode if drb-ContinueROHC is not configured;
for UM DRBs and SRBs, set RX_NEXT and RX_REORD to the initial value;
apply the ciphering algorithm and key provided by upper layers during the PDCP entity re-establishment procedure;
apply the integrity protection algorithm and key provided by upper layers during the PDCP entity re-establishment procedure.

A procedure for an Rx stage PDCP entity to process a received packet according to a (1-1b) embodiment is the same as the procedure for an Rx stage PDCP entity to process a received packet according to the (1-1a) embodiment.

Figure 1K:
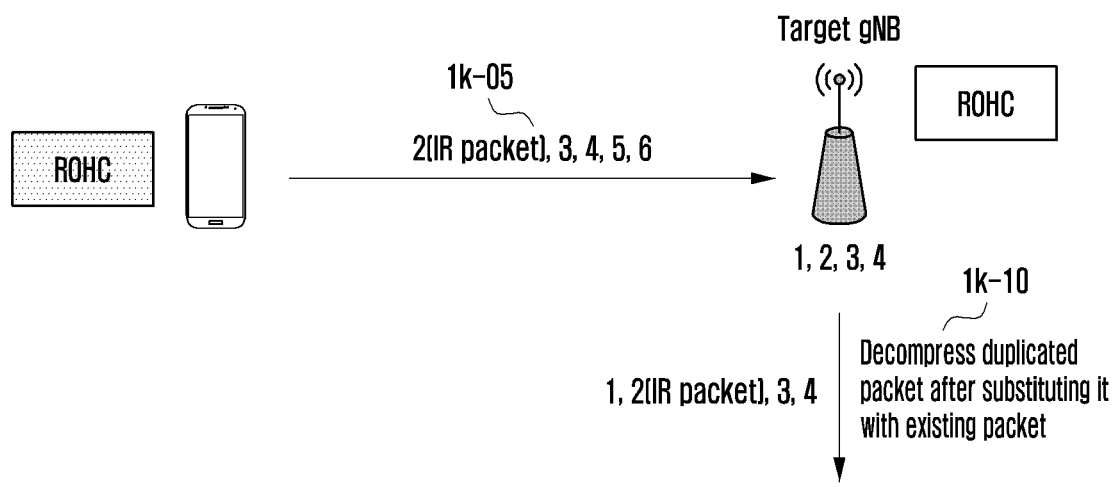
FIG. 1KA is a diagram illustrating a (1-2) embodiment for solving a problem, such as that in FIGS. 1IA and 1IB, in a next-generation mobile communication system.
Figure 1K:
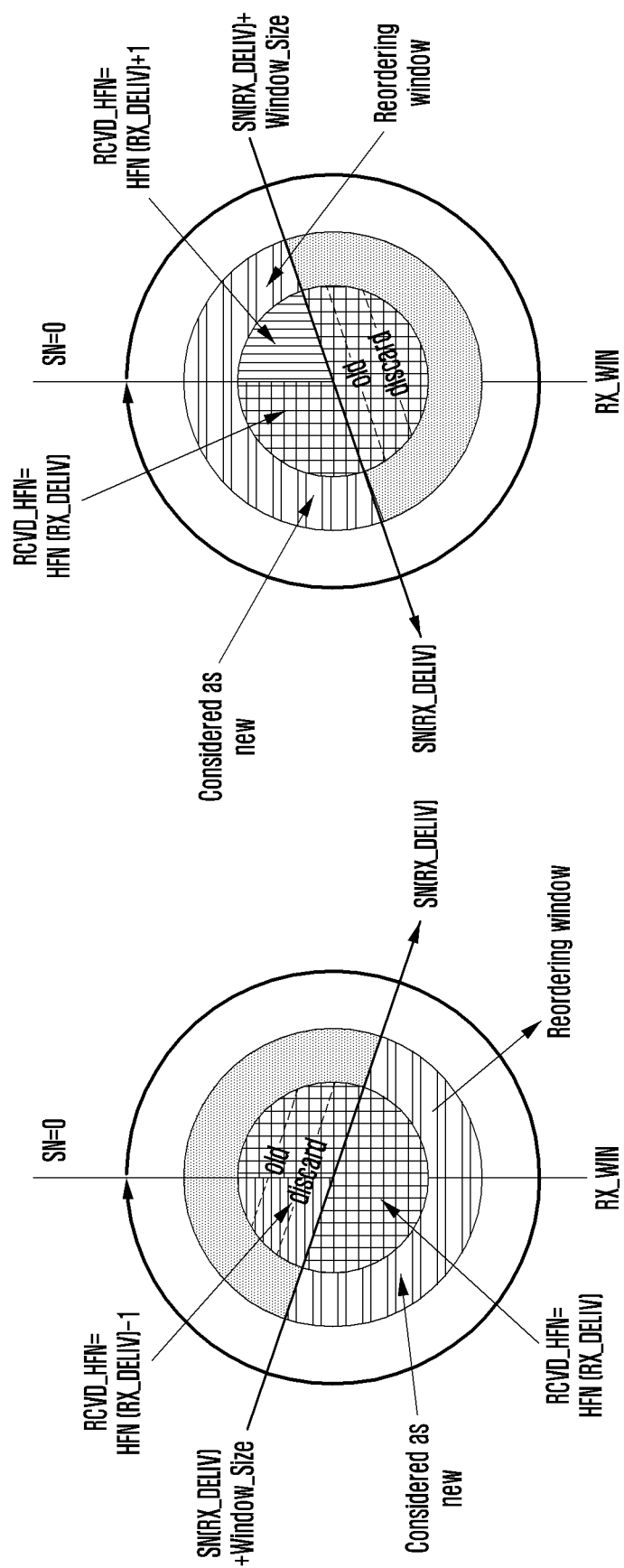

FIG. 1KA is a diagram illustrating a (1-2) embodiment for solving a problem, such as that in FIGS. 1IA and 1IB, in an NR.

In FIG. 1KA, after a UE receives a handover command from a gNB, performs a PDCP re-establishment procedure and performs handover to a target gNB, the UE performs retransmission in sequence from the first PDCP PDU for which ACK has not been confirmed from a lower layer. Accordingly, although the target gNB has already receives data corresponding to PDCP sequence number Nos. 2, 3 and 4, it performs transmission from the PDCP sequence number No. 2 because it has received ACK with respect to a PDCP sequence number No. 1 only (1k-05). Accordingly, the ROHC protocol of a Tx stage PDCP layer entity transmits an IR packet by piggybacking the IP packet on data corresponding to the PDCP sequence number No. 2. In the (1-2) embodiment of the present disclosure, an Rx stage PDCP entity decodes a packet without directly discarding the packet (a previously received duplicated packet may be replaced with a received packet if it is placed in the buffer) although the packet is outdated or duplicated, performs integrity verification, and performs header decompression. Accordingly, although an IR packet is piggybacked on a duplicated packet and received, the Rx stage PDCP layer entity may receive the IP packet, may identify the entire header information and ROHC protocol configuration information, and may complete synchronization with a Tx stage ROHC protocol. Accordingly, the Rx stage PDCP layer entity may successfully perform header decompression on a header-compressed PDCP PDU transmitted by the Tx stage (1k-10).

As a detailed procedure of performing the (1-2) embodiment of the present disclosure, a procedure for an Rx stage PDCP entity to process a received packet according to a (1-2a) embodiment is as follows.

<Operation for Receiving PDCP Entity to Process Received Packet (Receive Operation)>

Window state variables used for an operation for a receiving PDCP entity to process a received packet are as follows, and the window state variables maintain COUNT values.
HFN: indicates the hyper frame number (HFN) part of the window state variable.
SN: indicates the sequence number (SN) part of the window state variable.
RCVD_SN: indicates a PDCP sequence number included in the header of a received PDCP PDU
RCVD_HFN: the HFN value of the received PDCP PDU calculated by the receiving PDCP layer entity
RCVD_COUNT: the COUNT value of the received PDCP PDU=[RCVD_HFN, RCVD_SN].
RX_NEXT: indicates the COUNT value of a next PDCP SDU expected to be received. The initial value is 0.
RX_DELIV: indicates the COUNT value of the last PDCP SDU delivered to a higher layer. The initial value is $2^32-1$.
RX_REORD: indicates a next COUNT value of a COUNT value corresponding to a PDCP PDU that has triggered a t-Reordering timer.
t-Reordering: uses a timer value or section configured in a higher layer (RRC layer, RRC message, 1e-10, 1e-40. 1e-75 of FIG. 1E). The timer is used to detect a lost PDCP PDU, and only one timer is driven only at a time.

(Examples for the Definitions of Window State Variables)
HFN(State Variable): the HFN part (i.e. the number of most significant bits equal to HFN length) of the State Variable.
SN(State Variable): the SN part (i.e. the number of least significant bits equal to PDCP SN length) of the State Variable.
RCVD_SN: the PDCP SN of the received PDCP Data PDU, included in the PDU header.
RCVD_HFN: the HFN of the received PDCP Data PDU, calculated by the receiving PDCP entity.
RCVD_COUNT: the COUNT of the received PDCP Data PDU=[RCVD_HFN, RCVD_SN].

<Actions when PDCP Data PDU is Received from Lower Layers>

Referring to FIG. 1KA, when a PDCP PDU is received from a lower layer, the receiving PDCP layer entity determines the COUNT value of the received PDCP PDU as follows. Furthermore, the receiving PDCP layer entity performs a procedure of determining the COUNT value of the PDCP PDU, processing the PDCP PDU, and updating window state variables as follows with reference to FIG. 1KA.

If a received RCVD_SN is RCVD_SN<=SN(RX_DELIV)−Window_Size,
Perform update like RCVD_HFN=HFN(RX_DELIV)+1.
Otherwise, if RCVD_SN is RCVD_SN>SN(RX_DELIV)+Window_Size,
Perform update like RCVD_HFN=HFN(RX_DELIV)−1.
If it is not the case,
Perform update like RCVD_HFN=HFN(RX_DELIV).
RCVD_COUNT is determined like RCVD_COUNT=[RCVD_HFN, RCVD_SN].

(Examples for the Actions when a PDCP Data PDU is Received from Lower Layers)

At reception of a PDCP Data PDU from lower layers, the receiving PDCP entity shall determine the COUNT value of the received PDCP Data PDU, i.e. RCVD_COUNT, as follows:
if RCVD_SN<=SN(RX_DELIV)−Window_Size:
RCVD_HFN=HFN(RX_DELIV)+1;
else if RCVD_SN>SN(RX_DELIV)+Window_Size:
RCVD_HFN=HFN(RX_DELIV)−1;
else:
RCVD_HFN=HFN(RX_DELIV);
RCVD_COUNT=[RCVD_HFN, RCVD_SN].

After the COUNT value of the received PDCP PDU is determined, the receiving PDCP layer entity updates the window state variables and processes the PDCP PDU as follows.

If RCVD_COUNT<=RX_DELIV or a PDCP PDU having a value of RCVD_COUNT has been previously received (in the case of a duplicated packet, the existing PDCP PDU is replaced with a newly received PDCP PDU.)
 Perform deciphering on the PDCP PDU using the RCVD_COUNT value and perform integrity verification.
  If integrity verification has failed,
   Indicate an integrity verification failure of a higher layer.
 Perform header decompression on the PDCP PDU.
 Discard the PDCP PDU.
In other cases, the entity performs the following operation.
 Perform deciphering on the PDCP PDU using the RCVD_COUNT value and perform integrity verification.
  If integrity verification has failed,
   Indicate an integrity verification failure of a higher layer.
 Discard the PDCP PDU.

(Examples for the Actions when a PDCP Data PDU is Received from Lower Layers)
After determining the COUNT value of the received PDCP Data PDU=RCVD_COUNT, the receiving PDCP entity shall:
 if RCVD_COUNT<=RX_DELIV; or
 if the PDCP Data PDU with COUNT=RCVD_COUNT has been received before:
  perform deciphering and integrity verification of the PDCP Data PDU using COUNT=RCVD_COUNT (if duplicated, the duplicated one in the buffer can be newly replaced by the received one);
  if integrity verification fails:
   indicate the integrity verification failure to upper layer;
  perform header decompression;
  discard the PDCP Data PDU;
 else:
  perform deciphering and integrity verification of the PDCP Data PDU using COUNT=RCVD_COUNT;
  if integrity verification fails:
   indicate the integrity verification failure to upper layer;
   discard the PDCP Data PDU;
If the received PDCP PDU has not been discarded, the receiving PDCP layer entity operates as follows.
 The entity places the above-processed PDCP SDU in the reception buffer.
 If RCVD_COUNT>=RX_NEXT,
  Update RX_NEXT with RCVD_COUNT+1.
 If RCVD_COUNT is RX_DELIV+1]
  Deliver PDCP SDUs to a higher layer in order of COUNT values after performing header decompression.
   Deliver all the contiguous PDCP SDUs to a higher layer starting from COUNT=RX_DELIV+1.
  Update an RX_DELIV value with the COUNT value of the last PDCP SDU delivered to a higher layer.
 If an out-of-order delivery indicator (outOfOrderDelivery) has been configured and the processed PDCP SDU has not been delivered to a higher layer,
  Deliver the PDCP SDU to a higher layer.
 If a t-Reordering timer is being driven and a PDCP SDU having a COUNT value of RX_REORD−1 has been delivered to a higher layer,
  Stop and reset the t-Reordering timer.
 If the t-Reordering timer is not driven (including a case where the t-Reordering timer has been stopped in the condition) and at least one PDCP SDU is placed in the buffer,
  Update the RX_REORD value with RX_NEXT.
  Start the t-Reordering timer.

(Examples for the Actions when a PDCP Data PDU is Received from Lower Layers)
If the received PDCP Data PDU with COUNT value=RCVD_COUNT is not discarded above, the receiving PDCP entity shall:
 store the resulting PDCP SDU in the reception buffer;
 if RCVD_COUNT>=RX_NEXT:
  update RX_NEXT to RCVD_COUNT+1;
 if RCVD_COUNT=RX_DELIV+1:
  deliver to upper layers in ascending order of the associated COUNT value after performing header decompression;
  all stored PDCP SDU(s) with consecutively associated COUNT value(s) starting from COUNT=RX_DELIV+1;
  update RX_DELIV to the COUNT value of the last PDCP SDU delivered to upper layers;
 if outOfOrderDelivery is configured and the resulting PDCP SDU has not been delivered to upper layers:
  deliver the resulting PDCP SDU to upper layers;
 if t-Reordering is running, and if the PDCP SDU with COUNT=RX_REORD−1 has been delivered to upper layers:
  stop and reset t-Reordering;
 if t-Reordering is not running (includes the case when t-Reordering is stopped due to actions above), and if there is at least one stored PDCP SDU:
  update RX_REORD to RX_NEXT;
  start t-Reordering.

<Actions of Receiving PDCP Layer Entity when t-Reordering Expires>
When the t-Reordering timer expires, the receiving PDCP layer entity operates as follows.
 The entity delivers PDCP SDUs to a higher layer in order of COUNT values after performing header decompression.
  Deliver all PDCP SDUs having COUNT values smaller than an RX_REORD value.
  Deliver all PDCP SDUs having contiguous COUNT values starting from an RX_REORC value.
 The entity updates an RX_DELIV value with the COUNT value of the last PDCP SDU delivered to a higher layer.
 If at least one PDCP SDU is placed in the buffer,
  Update the RX_REORD value with an RX_NEXT value.
  Start a t-Reordering timer.

(Examples for the Actions when a t-Reordering Expires)
When t-Reordering expires, the receiving PDCP entity shall:
 deliver to upper layers in ascending order of the associated COUNT value after performing header decompression:
  all stored PDCP SDU(s) with associated COUNT value(s)<RX_REORD;
  all stored PDCP SDU(s) with consecutively associated COUNT value(s) starting from RX_REORD;

update RX_DELIV to the COUNT value of the last PDCP SDU delivered to upper layers;

if there is at least one stored PDCP SDU:

update RX_REORD to RX_NEXT;

start t-Reordering.

As a detailed procedure of performing the (1-2) embodiment of the present disclosure, the re-establishment procedure of a Tx stage and Rx stage PDCP entity according to a (1-2a) embodiment is as follows.

<PDCP Entity Re-Establishment Procedure (PDCP Entity Re-Establishment)>

When a higher layer requests the PDCP entity re-establishment, the transmitting PDCP layer entity operates as follows.

In the case of a UM DRB (e.g., drb-ContinueROHC is included in MobilityControlInfo of a handover command message, that is, an RRC Connection Reconfiguration message. In general, it is configured upon performing handover to a different cell within a source gNB). If drb-ContinueROHC has not been configured, the entity resets ROHC with respect to the uplink and starts the ROHC in the IR state of a U mode.

In the case of an AM DRB, the entity instructs UE connection configuration information (UE AS context) to be retained in a handover command message. If ROHC has been configured except a case where drb-ContinueROHC has been configured, the entity resets the ROHC with respect to the uplink and starts the ROHC in the IR state of a U mode.

In the case of a UM DRB and an SRB, the entity sets a TX_NEXT variable as an initial value (TX_NEXT: this state variable indicates the COUNT value of the next PDCP SDU to be transmitted. The initial value is 0.)

The entity applies a ciphering algorithm and key provided by a higher layer in the PDCP re-establishment procedure.

The entity applies an integrity protection algorithm and key provided by a higher layer in the PDCP re-establishment procedure.

In the case of a UM DRB, the entity performs the following processing on PDCP SDUs to which PDCP sequence numbers have already been assigned, but which have not yet been delivered to a lower layer.

Process the PDCP SDUs as if they have been received from a higher layer.

Transmit the PDCP SDUs in order of COUNT values assigned prior to the PDCP re-establishment procedure and does not start a PDCP discard timer.

In the case of an AM DRB, the entity performs retransmission or transmission in order of COUNT values assigned prior to the PDCP re-establishment procedure from the first PDCP SDU whose successful delivery has not been confirmed from a lower layer, and performs the following procedure.

Perform header compression on the PDCP SDU.

Perform ciphering using the COUNT value corresponding to the PDCP SDU.

Forward the resulting PDCP data PDU on which the procedure has been performed to a lower layer.

When a higher layer requests the PDCP entity re-establishment, the receiving PDCP layer entity operates as follows.

In the case of an SRB, the entity discards all of stored PDCP SDUs and PDCP PDUs.

In the case of a UM DRB, drb-ContinueROHC has not been configured, the entity resets ROHC with respect to the downlink and starts the ROHC in the NC state of a U mode.

In the case of a UM DRB, the entity resets RX_NEXT and RX_REORD variables as initial values.

In the case of an SRB, the entity discards all of stored PDCP SDUs and PDCP PDUs.

The entity applies a ciphering algorithm and key provided by a higher layer in the PDCP re-establishment procedure.

The entity applies an integrity protection algorithm and key provided by a higher layer in the PDCP re-establishment procedure.

(Examples for the PDCP Entity Re-Establishment)

When upper layers request a PDCP entity re-establishment, the UE shall additionally perform once the procedures described in this section. After performing the procedures in this section, the UE shall follow the procedures in subclause 5.2.

When upper layers request a PDCP entity re-establishment, the transmitting PDCP entity shall:

for UM DRBs, reset the header compression protocol for uplink and start with an IR state in U-mode if drb-ContinueROHC is not configured;

for AM DRBs, reset the header compression protocol for uplink and start with an IR state in U-mode (if header compression protocol is configured and drb-Continue ROHC is not configured), except if upper layers indicate stored UE AS context is used and drb-ContinueROHC is configured;

for UM DRBs and SRBs, set TX_NEXT to the initial value;

for SRBs, discard all stored PDCP SDUs and PDCP PDUs;

apply the ciphering algorithm and key provided by upper layers during the PDCP entity re-establishment procedure;

apply the integrity protection algorithm and key provided by upper layers during the PDCP entity re-establishment procedure;

for UM DRBs, for each PDCP SDU already associated with a PDCP SN but for which a corresponding PDU has not previously been submitted to lower layers:

consider the PDCP SDUs as received from upper layer;

perform transmission of the PDCP SDUs in ascending order of the COUNT value associated to the PDCP SDU prior to the PDCP re-establishment without restarting the discard Timer.

for AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:

perform header compression of the PDCP SDU as specified in the subclause 5.7.4;

perform ciphering of the PDCP SDU using the COUNT value associated with this PDCP SDU as specified in the subclause 5.8;

submit the resulting PDCP Data PDU to lower layer.

When upper layers request a PDCP entity re-establishment, the receiving PDCP entity shall:

for SRBs, discard all stored PDCP SDUs and PDCP PDUs for UM DRBs, reset the header compression protocol for downlink and start with NC state in U-mode [8] [9] if drb-ContinueROHC is not configured [3];

for UM DRBs and SRBs, set RX_NEXT and RX_REORD to the initial value;

apply the ciphering algorithm and key provided by upper layers during the PDCP entity re-establishment procedure;

apply the integrity protection algorithm and key provided by upper layers during the PDCP entity re-establishment procedure.

Figure 1L:
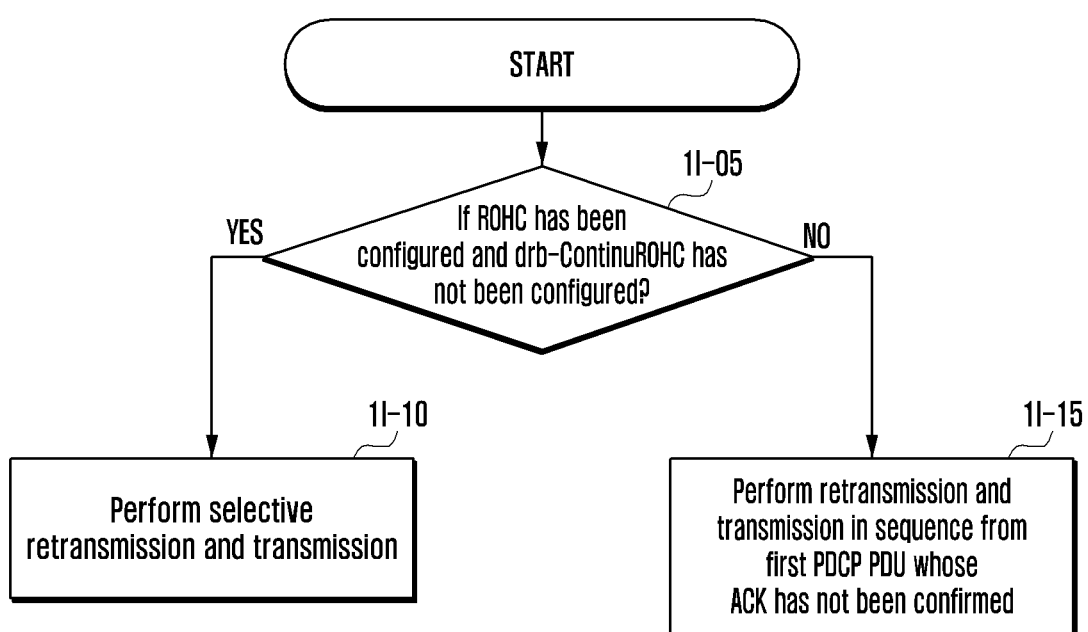
FIG. 1L illustrates a diagram showing an operation of the transmission PDCP layer entity of the (1-1) embodiment of the present disclosure.

FIG. 1L is a diagram showing an operation of the transmitting PDCP layer entity according to the (1-1) embodiment of the present disclosure.

In FIG. 1L, the transmitting PDCP layer entity performs a handover command message, and identifies whether ROHC has been configured and drb-ContinueROHC has not been configured when performing a PDCP re-establishment procedure (1l-05). If the ROHC has been configured and drb-ContinueROHC has not been configured, the transmitting PDCP layer entity selectively performs retransmission and transmission on PDCP PDUs only whose successful delivery has not been confirmed by the Rx stage as in the (1-1) embodiment (1l-10). In other cases, the transmitting PDCP layer entity performs retransmission and transmission in sequence from the first PDCP PDU whose ACK has not been confirmed (1l-15).

Figure 1M:
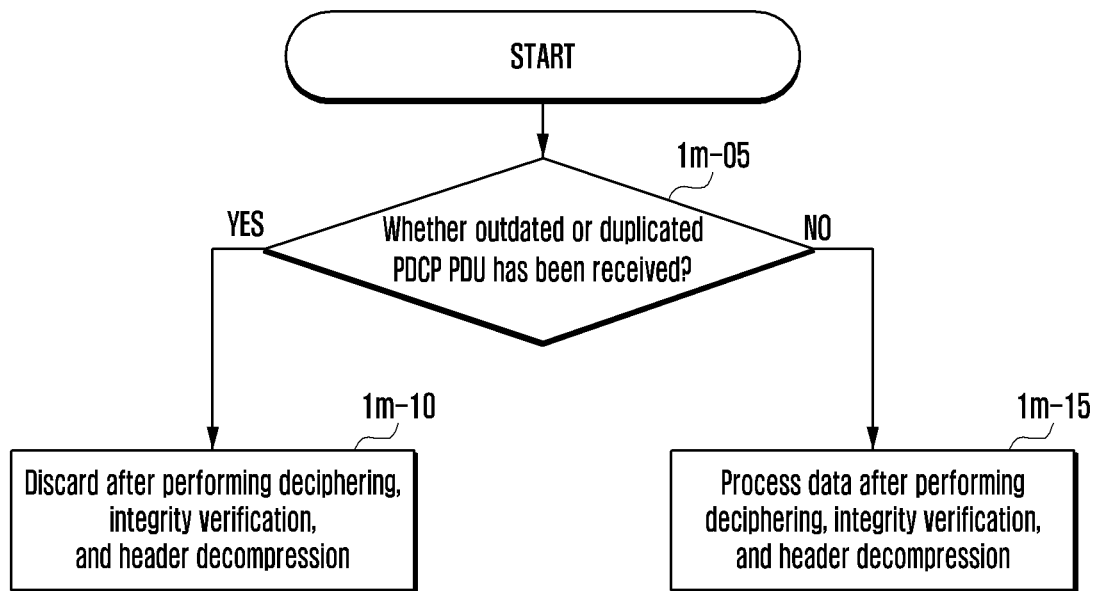
FIG. 1M illustrates a diagram showing an operation of the reception PDCP layer entity of the (1-2) embodiment of the present disclosure.

FIG. 1M is a diagram showing an operation of the receiving PDCP layer entity according to the (1-2) embodiment of the present disclosure.

In FIG. 1M, when a PDCP PDU is received, the receiving PDCP layer entity first identifies whether the PDCP PDU is an outdated or duplicated PDCP PDU (1m-05). If the PDCP PDU is an outdated or duplicated PDCP PDU, the receiving PDCP layer entity performs deciphering, integrity verification, and header decompression and then discards the PDCP PDU (1m-10). In the above, to perform header decompression is to identify an IR packet and to identify ROHC configuration information and the entire information of the IP header. Furthermore, if a duplicated PDCP PDU is received, the receiving PDCP layer entity may replace the existing PDCP PDU with a newly received PDCP PDU. If the received PDCP PDU has not been outdated or it is not a duplicated PDCP PDU, the receiving PDCP layer entity performs deciphering, integrity verification and header decompression, and performs data processing proposed in the second embodiment (1m-15).

Figure 1N:
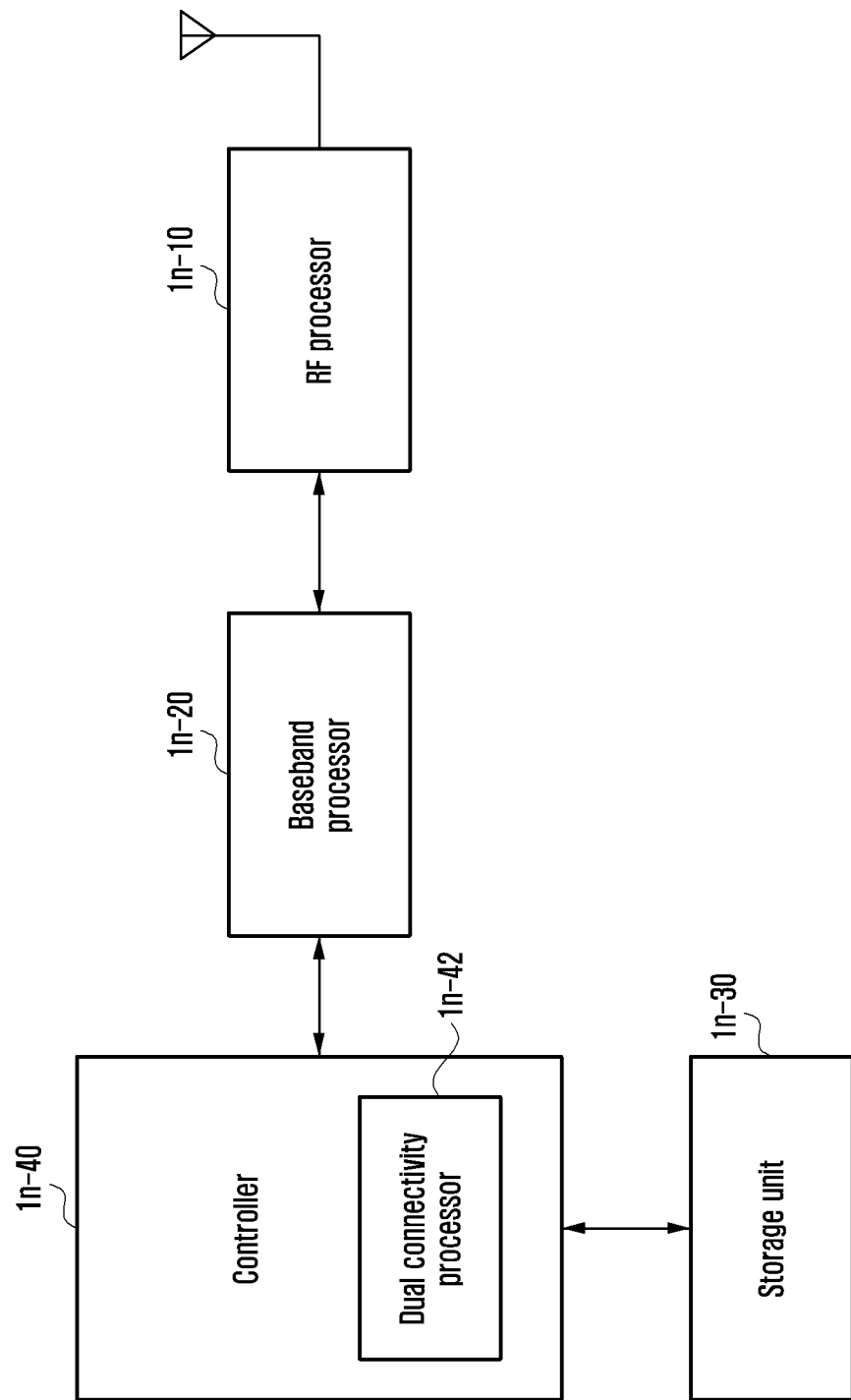
FIG. 1N shows the configuration of a UE to which a first embodiment of the present disclosure may be applied.
Figure 10:
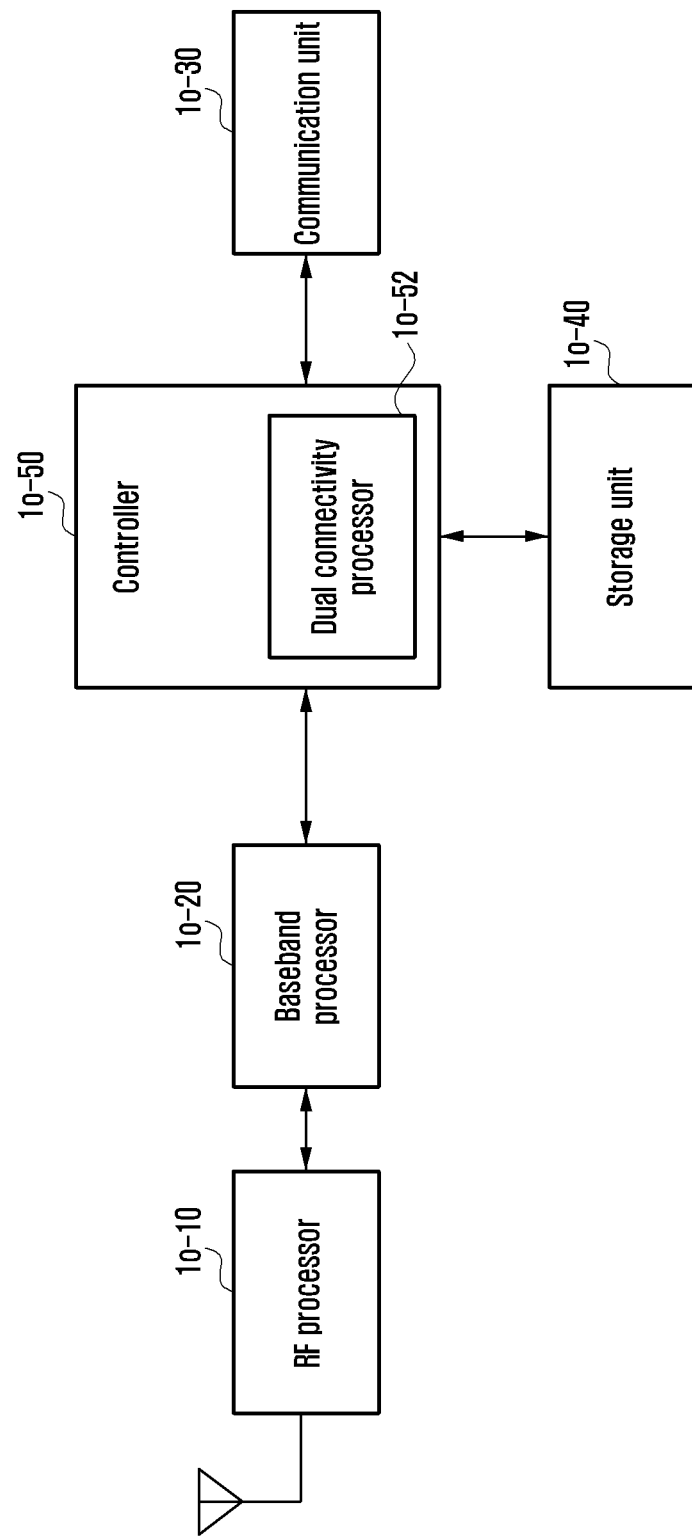

FIG. 1N shows the configuration of a UE to which a first embodiment of the present disclosure may be applied.

Referring to FIG. 1N, the UE includes a radio frequency (RF) processor 1n-10, a baseband processor 1n-20, a storage unit 1n-30, and a controller 1n-40.

The RF processor 1n-10 performs functions for transmitting/receiving a signal through a radio channel, such as the band conversion and amplification of a signal. That is, the RF processor 1n-10 up-converts a baseband signal received from the baseband processor 1n-20 into an RF band signal, transmits the RF band signal through an antenna, and down-converts an RF band signal received through the antenna into a baseband signal. For example, the RF processor 1n-10 may include a transmission filter, a reception filter, an amplifier, a mixer, an oscillator, a digital to analog convertor (DAC), and an analog to digital convertor (ADC). In FIG. 1N, only one antenna has been illustrated, but the UE may include multiple antennas. Furthermore, the RF processor 1n-10 may include multiple RF chains. Furthermore, the RF processor 1n-10 may perform beamforming. For the beamforming, the RF processor 1n-10 may adjust the phase and size of each of signals transmitted/received through multiple antennas or antenna elements. Furthermore, the RF processor may perform MIMO. When the MIMO operation is performed, the RF processor may receive multiple layers. The RF processor 1n-10 may properly configure multiple antenna or antenna elements under the control of the controller, and may perform received beam swiping or adjust the direction and beam width of the received beam so that the received beam cooperates with a transmitted beam.

The baseband processor 1n-20 performs a baseband signal and inter-bit stream conversion function based on the physical layer standard of a system. For example, when data is transmitted, the baseband processor 1n-20 generates complex symbols by coding and modulating a transmission bit stream. Furthermore, when data is received, the baseband processor 1n-20 reconstructs a reception bit stream from a baseband signal received from the RF processor 1n-10 through modulation and demodulation. For example, if an orthogonal frequency division multiplexing (OFDM) scheme is applied, when data is transmitted, the baseband processor 1n-20 generates complex symbols by coding and modulating a transmission bit stream, maps the complex symbols to subcarriers, and then configures OFDM symbols through inverse fast Fourier transform (IFFT) operation and cyclic prefix (CP) insertion. Furthermore, when data is received, the baseband processor 1n-20 segments a baseband signal received from the RF processor 1n-10 in an OFDM symbol unit, reconstructs signals mapped to subcarriers through fast Fourier transform (FFT) operation, and reconstructs a reception bit stream through modulation and demodulation.

The baseband processor 1n-20 and the RF processor 1n-10 transmit and receive signals as described above. Accordingly, the baseband processor 1n-20 and the RF processor 1n-10 may be called a transmitter, a receiver, a transceiver or a communication unit. Furthermore, at least one of the baseband processor 1n-20 and the RF processor 1n-10 may include multiple communication modules in order to support different multiple radio access technologies. Furthermore, at least one of the baseband processor 1n-20 and the RF processor 1n-10 may include different communication modules in order to process signals of different frequency bands. For example, the different radio access technologies may include an LTE network and an NR network. Furthermore, the different frequency bands may include a super high frequency (SHF) (e.g., 2.5 GHz, 5 GHz) band and a millimeter wave (e.g., 60 GHz) band.

The storage unit 1n-30 stores data, such as a basic program, an application program, and configuration information for the operation of the UE. The storage unit 1n-30 provides stored data in response to a request from the controller 1n-40.

The controller 1n-40 controls an overall operation of the UE. For example, the controller 1n-40 transmits/receives a signal through the baseband processor 1n-20 and the RF processor 1n-10. Furthermore, the controller 1n-40 writes data in the storage unit 1n-30 and reads data from the storage unit 1n-30. To this end, the controller 1n-40 may include at least one processor. For example, the controller 1n-40 may include a communication processor (CP) performing control for communication and an application processor (AP) controlling a higher layer, such as an application program. Furthermore, the controller 1n-40 may include a dual connectivity processor 1n-42 configured to perform processing for an operation in a multi-connection mode.

FIG. 1O shows a block diagram of a gNB in a wireless communication system to which a first embodiment of the present disclosure may be applied.

As shown in the drawing, the gNB may include an RF processor 1o-10, a baseband processor 1o-20, a communication unit 1o-30, a storage unit 1o-40 and a controller 1o-50.

The RF processor 1o-10 performs a function for transmitting/receiving a signal through a radio channel, such as the band conversion and amplification of a signal. That is, the RF processor 1o-10 up-converts a baseband signal received from the baseband processor 1o-20 into an RF band signal, transmits the RF band signal through an antenna, and down-converts an RF band signal received through the antenna into a baseband signal. For example, the RF processor 1o-10 may include a transmission filter, a reception filter, an amplifier, a mixer, an oscillator, a DAC, and an ADC. In FIG. 1O, only one antenna has been illustrated, but the gNB may include multiple antennas. Furthermore, the RF processor 1o-10 may include multiple RF chains. Furthermore, the RF processor 1o-10 may perform beamforming. For the beamforming, the RF processor 1o-10 may adjust the phase and size of each of signals transmitted/received multiple antennas or antenna elements. The RF processor may perform a downlink MIMO operation by transmitting one or more layers.

The baseband processor 1o-20 performs a baseband signal and inter-bit stream conversion function based on the physical layer standard of a first radio access technology. For example, when data is transmitted, the baseband processor 1o-20 generates complex symbols by coding and modulating a transmission bit stream. Furthermore, when data is received, the baseband processor 1o-20 reconstructs a reception bit stream from a baseband signal received from the RF processor 1o-10 through modulation and demodulation. For example, if the OFDM scheme is applied, when data is transmitted, the baseband processor 1o-20 generates complex symbols by coding and modulating a transmission bit stream, maps the complex symbols to subcarriers, and configures OFDM symbols through IFFT operation and CP insertion. Furthermore, when data is received, the baseband processor 1o-20 segments a baseband signal received from the RF processor 1o-10 in an OFDM symbol unit, reconstructs signals mapped to subcarriers through FFT operation, and then reconstructs a reception bit stream through modulation and demodulation. The baseband processor 1o-20 and the RF processor 1o-10 transmit and receive signals as described above. Accordingly, the baseband processor 1o-20 and the RF processor 1o-10 may be called a transmitter, a receiver, a transceiver, a communication unit or a wireless communication unit.

The communication unit 1o-30 provides an interface for performing communication with other nodes within a network.

The storage unit 1o-40 stores data, such as a basic program, an application program, and configuration information for the operation of the gNB. Specifically, the storage unit 1o-40 may store information on a bearer allocated to an accessed UE and measurement results reported by an accessed UE. Furthermore, the storage unit 1o-40 may store information, that is, a criterion by which whether to provide a UE with multiple connections is determined. Furthermore, the storage unit 1o-40 provides stored data in response to a request from the controller 1o-50.

The controller 1o-50 controls an overall operation of the gNB. For example, the controller 1o-50 transmits/receives a signal through the baseband processor 1o-20 and the RF processor 1o-10 or through the communication unit 1o-30. Furthermore, the controller 1o-50 writes data in the storage unit 1o-40 and reads data from the storage unit 1o-40. To this end, the controller 1o-50 may include at least one processor. Furthermore, the controller 1o-50 may include a dual connectivity processor 1o-52 configured to perform processing for an operation in a multi-connection mode.

Figure 1P:
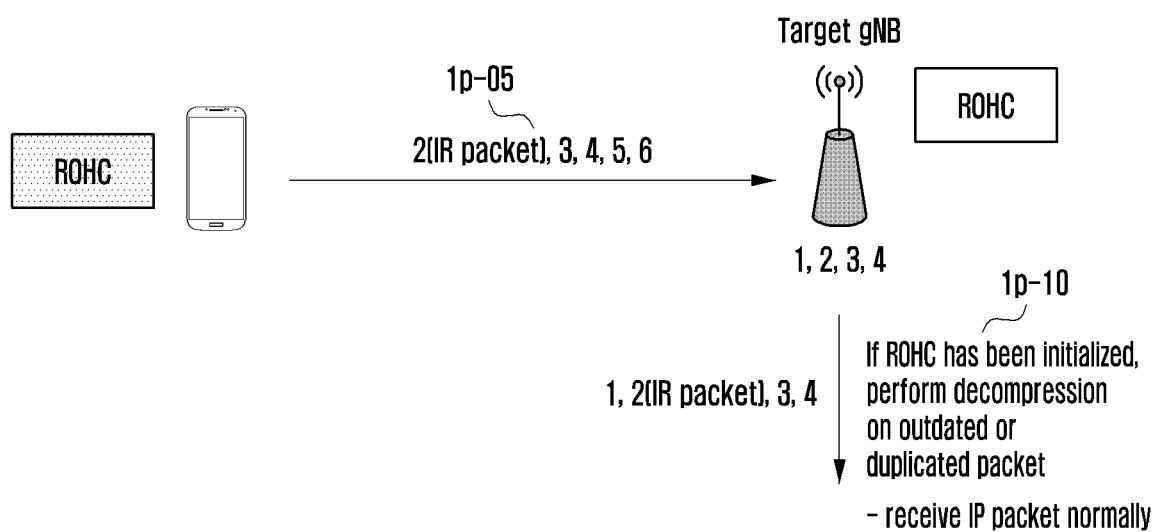
FIG. 1P is a diagram illustrating a (1-3) embodiment for solving a problem, such as that in FIGS. 1IA and 1IB, in a next-generation mobile communication system of the present disclosure.

FIG. 1P is a diagram illustrating a (1-3) embodiment for solving a problem, such as that in FIGS. 1IA and 1IB, in an NR of the present disclosure.

In FIG. 1P, after a UE receives a handover command from a gNB, performs a PDCP re-establishment procedure, and performs handover to a target gNB, the UE performs retransmission in sequence from the first PDCP PDU for which ACK has not been confirmed from a lower layer. Accordingly, although the UE has already received data corresponding to PDCP sequence number Nos. 2, 3 and 4 from the target gNB, the UE performs transmission from the PDCP sequence number No. 2 because it has received ACK for only the PDCP sequence number No. 1. Accordingly, the ROHC protocol of a Tx stage PDCP layer entity transmits an IR packet by piggybacking the IP packet on data corresponding to the PDCP sequence number No. 2 (the IR packet is an important packet for resetting and configuring the ROHC protocol and may also be duplicated in data corresponding to the PDCP sequence number Nos. 3 and 4 and transmitted by piggybacking it on the data) (1p-05).

In the (1-3) embodiment of the present disclosure, if an ROHC protocol has been reset, for example, if an Rx stage PDCP entity is in the NC state (No context state) of an undirectional mode (U mode), although an IP packet is an outdated or duplicated packet, the Rx stage PDCP entity decodes the IP packet without directly discarding it, performs integrity verification, and performs header decompression so that the IR packet is received normally without being lost. The operation may be performed by the reception ROHC protocol in the NC state (No Context) or static context (SC) state of an undirectional mode (U mode) or bidirectional optimistic mode (O mode) or bidirectional reliable Mode (R mode). That is, although an IP packet is an outdated or duplicated packet, the Rx stage PDCP entity decodes the IP packet without directly discarding it, performs integrity verification and performs header decompression. Accordingly, although an IR packet is piggybacked on a duplicated packet and received, the Rx stage PDCP layer entity may receive the IP packet, may identify the entire header information and ROHC protocol configuration information, and may complete synchronization with a Tx stage ROHC protocol. Accordingly, the Rx stage PDCP entity can successfully perform header decompression on header-compressed PDCP PDUs transmitted by the Tx stage (1p-10).

Furthermore, in the (1-3) embodiment, if a gNB configures out-of-delivery with respect to a bearer or PDCP entity as a PDCP entity configuration (pdcp-config), a logical channel configuration (logicalchannelconfig) or a bearer configuration (drb-config) through an RRC message, an operation for the receiving PDCP entity to process a received packet for supporting out-of-delivery in the PDCP entity is materialized.

Furthermore, in the (1-3) embodiment, in a scenario in which a gNB transmits DL data to a UE (in the case of an AM DRB) and the UE receives the DL data, an Rx stage PDCP re-establishment procedure for solving a header decompression failure problem that may occur when the UE performs handover is materialized.

For example, a UE may receive DL data from a gNB through an AM bearer (means a bearer driven in the AM of the RLC layer supporting an ARQ function). That is, although the gNB has transmitted PDCP PDUs, corresponding to PDCP sequence number Nos. 0, 1, 2, 3 and 4, to the UE as the DL data, the receiving PDCP entity of the UE may first receive the PDCP PDUs corresponding to the PDCP sequence number Nos. 1, 3 and 4 out of sequence in the transmission process. In this case, if the sequence of the PDCP PDUs must be ordered and the PDCP PDUs must be transmitted (if an out-of-order delivery indicator has not been indicated through an RRC configuration), the receiving PDCP layer of the UE analyzes a header for the PDCP PDUs corresponding to the PDCP sequence number Nos. 1, 3 and 4, performs deciphering, performs integrity verification, and places the PDCP PDUs in the buffer (header decompression is performed after the sequence is ordered and the PDCP PDUs are delivered to a higher layer. The header decompression means decompression for the TCP/IP header of IP packet of a PDCP SDU (the data part of a PDCU PDU) not a PDCP header). In this case, if the gNB determines handover and instructs a handover command to the UE through an RRC message (RRCConnectionReconfiguration), the receiving PDCP layer entity of the UE that has received the RRC message re-establishes the PDCP layer entity (PDCP reestablishment). That is, the receiving PDCP layer entity immediately resets ROHC. Furthermore, the receiving PDCP layer entity subsequently receives an IR packet and completes an ROHC configuration. If the PDCP PDUs corresponding to the PDCP sequence number Nos. 0 and 2 in addition to the PDCP sequence number Nos. 1, 3 and 4 are received, the receiving PDCP layer entity needs to perform header decompression and deliver the PDCP PDUs to a higher layer because the sequence of the PDCP PDUs may be reordered. However, in this case, the TCP/IP header of the PDCP SDUs corresponding to the PDCP sequence number Nos. 1, 3 and 4 has been compressed based on a previous ROHC configuration, and the PDCP SDUs corresponding to the PDCP sequence number Nos. 0 and 2 has been compressed based on a new ROHC configuration. Accordingly, when header decompression is performed on the TCP/IP header of the PDCP SDUs corresponding to the PDCP sequence number Nos. 1, 3 and 4, a failure or error may occur because the header decompression is performed based on the new ROHC configuration.

Accordingly, in order to solve this problem, in a PDCP re-establishment procedure according to the (1-3) embodiment of the present disclosure, there is proposed a method of decompressing the TCP/IP header of PDCP SDUs using the existing ROHC, placing the PDCP SDUs in the buffer, and then resetting the ROHC if receiving PDCP entity re-establishment needs to be performed and the PDCP SDUs are placed in the buffer before the ROHC is reset. The proposed method is an operation suitable for a case where drb-ContinueROHC (i.e., an indicator indicating that a current ROHC configuration needs to be used without any change) has not been configured. The reason for this is that this means that if drb-ContinueROHC has been configured, a current ROHC configuration is used without any change and thus the ROHC will not be reset. Accordingly, as in the above procedure, header decompression does not need to be performed on PDCP PDUs placed in the buffer.

A detailed procedure of performing the (1-3) embodiment of the present disclosure and a procedure for an Rx stage PDCP entity to process a received packet according to a (1-3a) embodiment are as follows.

<Operation of Receiving PDCP Entity to Process Received Packet (Receive Operation)>

Window state variables used in an operation for the receiving PDCP entity to process a received packet are as follows, and the window state variables maintain COUNT values.

HFN: indicates the hyper frame number (HFN) part of the window state variable.

SN: indicates the sequence number (SN) part of the window state variable.

RCVD_SN: indicates a PDCP sequence number included in the header of a received PDCP PDU RCVD_HFN: the HFN value of the received PDCP PDU calculated by the receiving PDCP layer entity RCVD_COUNT: the COUNT value of the received PDCP PDU=[RCVD_HFN, RCVD_SN].

RX_NEXT: indicates the COUNT value of a next PDCP SDU expected to be received. The initial value is 0.

RX_DELIV: indicates the COUNT value of the first PDCP SDU not delivered to a higher layer. The initial value is 0.

RX_REORD: indicates a next COUNT value of a COUNT value corresponding to a PDCP PDU that has triggered a t-Reordering timer.

t-Reordering: use a timer value or section configured in a higher layer (RRC layer, configured through an RRC message, 1e-10, 1e-40. 1e-75 of FIG. 1E). The timer is used to detect a lost PDCP PDU, and only one timer is driven only at a time.

(Examples for the Definitions of Window State Variable)

HFN(State Variable): the HFN part (i.e. the number of most significant bits equal to HFN length) of the State Variable.

SN(State Variable): the SN part (i.e. the number of least significant bits equal to PDCP SN length) of the State Variable.

RCVD_SN: the PDCP SN of the received PDCP Data PDU, included in the PDU header.

RCVD_HFN: the HFN of the received PDCP Data PDU, calculated by the receiving PDCP entity.

RCVD_COUNT: the COUNT of the received PDCP Data PDU=[RCVD_HFN, RCVD_SN].

RX_NEXT: This state variable indicates the COUNT value of the next PDCP SDU expected to be received. The initial value is 0.

RX_DELIV: This state variable indicates the COUNT value of the first PDCP SDU not delivered to the upper layers. The initial value is 0.

RX_REORD: This state variable indicates the COUNT value following the COUNT value associated with the PDCP Data PDU which triggered t-Reordering.

t-Reordering: The duration of the timer is configured by upper layers. This timer is used to detect loss of PDCP Data PDUs. If t-Reordering is running, t-Reordering shall not be started additionally, i.e. only one t-Reordering per receiving PDCP entity is running at a given time.

<Actions when PDCP Data PDU is Received from Lower Layers>

When a PDCP PDU is received from a lower layer, a receiving PDCP layer entity determines the COUNT value of the received PDCP PDU as follows.

If the received RCVD_SN is RCVD_SN<=SN(RX_DELIV)−Window_Size,

Perform update like RCVD_HFN=HFN(RX_DELIV)+1.
Otherwise, if RCVD_SN is RCVD_SN>SN(RX_DELIV)+Window_Size,
Perform update like RCVD_HFN=HFN(RX_DELIV)−1.
If it is not the case,
Perform update like RCVD_HFN=HFN(RX_DELIV).
RCVD_COUNT is determined like RCVD_COUNT=[RCVD_HFN, RCVD_SN].
(Examples for the Actions when a PDCP Data PDU is Received from Lower Layers)
At reception of a PDCP Data PDU from lower layers, the receiving PDCP entity shall determine the COUNT value of the received PDCP Data PDU, i.e. RCVD_COUNT, as follows:
if RCVD_SN<=SN(RX_DELIV)−Window_Size:
RCVD_HFN=HFN(RX_DELIV)+1;
else if RCVD_SN>SN(RX_DELIV)+Window_Size:
RCVD_HFN=HFN(RX_DELIV)−1;
else:
RCVD_HFN=HFN(RX_DELIV);
RCVD_COUNT=[RCVD_HFN, RCVD_SN].
After the COUNT value of the received PDCP PDU is determined, the receiving PDCP layer entity updates window state variables and processes the PDCP PDU as follows.
If RCVD_COUNT<RX_DELIV or a PDCP PDU having a value of RCVD_COUNT has been previously received (in the case of a packet that has expired or is overdue or out of a window or in the case of a duplicated packet)
Perform deciphering on the PDCP PDU using the RCVD_COUNT value and perform integrity verification.
If integrity verification has failed,
Indicate an integrity verification failure in a higher layer and discards the received PDCP Data PDU (the data part of the PDCP PDU).
If ROHC is in the NC state of the U mode (or if the ROHC has been reset and have not been reset)
Perform header decompression on the received packet (if it has not been discarded).
Discard the PDCP Data PDU (if it has not been discarded).
In other cases, the entity performs the following operation.
Perform deciphering on the PDCP PDU using the RCVD_COUNT value and perform integrity verification.
If integrity verification has failed,
Indicate an integrity verification failure of a higher layer.
Discard the PDCP PDU.
(Examples for the Actions when a PDCP Data PDU is Received from Lower Layers)
After determining the COUNT value of the received PDCP Data PDU=RCVD_COUNT, the receiving PDCP entity shall:
if RCVD_COUNT<RX_DELIV; or
if the PDCP Data PDU with COUNT=RCVD_COUNT has been received before:
perform deciphering and integrity verification of the PDCP Data PDU using COUNT=RCVD_COUNT;
if integrity verification fails:
indicate the integrity verification failure to upper layer and discard the PDCP Data PDU;
if header compression protocol is NC state in U-mode (or header compression protocol is reset and not reconfigured);
performs header decompression (otherwise already discarded);
discard the PDCP Data PDU (otherwise already discarded);
else:
perform deciphering and integrity verification of the PDCP Data PDU using COUNT=RCVD_COUNT;
if integrity verification fails:
indicate the integrity verification failure to upper layer;
discard the PDCP Data PDU;
If the received PDCP PDU has not been discarded, the receiving PDCP layer entity operates as follows.
The entity places the above-processed PDCP SDU in the reception buffer.
If RCVD_COUNT>=RX_NEXT,
Update RX_NEXT with RCVD_COUNT+1.
If an out-of-order delivery indicator (outOfOrderDelivery) has been configured (it an out-of-delivery operation has been indicated),
Deliver the PDCP SDU to a higher layer.
If RCVD_COUNT is equal to RX_DELIV,
Deliver the PDCP SDUs to a higher layer in order of COUNT values after header decompression.
Deliver all of contiguous PDCP SDUs to a higher layer starting from COUNT=RX_DELIV value.
Update an RX_DELIV value with the COUNT value of the first PDCP SDU having a COUNT value equal to or greater than a current RX_DELIV value and not delivered to a higher layer.
If a t-Reordering timer is being driven and the RX_DELIV value is greater than or equal to an RX_REORD value,
Stop and reset the t-Reordering timer.
If the t-Reordering timer is not driven (including a case where the t-Reordering timer has been stopped in the condition) and RX_DELIV is smaller than RX_NEXT,
Update the RX_REORD value with RX_NEXT.
Start the t-Reordering timer.
(Examples for the Actions when a PDCP Data PDU is Received from Lower Layers)
If the received PDCP Data PDU with COUNT value=RCVD_COUNT is not discarded above, the receiving PDCP entity shall:
store the resulting PDCP SDU in the reception buffer;
if RCVD_COUNT>=RX_NEXT:
update RX_NEXT to RCVD_COUNT+1;
if outOfOrderDelivery is configured:
deliver the resulting PDCP SDU to upper layers;
if RCVD_COUNT=RX_DELIV:
deliver to upper layers in ascending order of the associated COUNT value after performing header decompression;
all stored PDCP SDU(s) with consecutively associated COUNT value(s) starting from COUNT=RX_DELIV;
update RX_DELIV to the COUNT value of the first PDCP SDU which has not been delivered to upper layers, with COUNT value>=RX_DELIV;
if t-Reordering is running, and if RX_DELIV>=RX_REORD:
stop and reset t-Reordering;

if t-Reordering is not running (includes the case when t-Reordering is stopped due to actions above), and RX_DELIV<RX_NEXT:
   update RX_REORD to RX_NEXT;
   start t-Reordering.

<Actions of Receiving PDCP Layer Entity when t-Reordering Expires>

When the t-Reordering timer expires, the receiving PDCP layer entity operates as follows.
   Deliver PDCP SDUs to a higher layer in order of COUNT values on which header decompression has been performed.
      Deliver all PDCP SDUs having COUNT values smaller than an RX_REORD value.
      Deliver all PDCP SDUs having contiguous COUNT values starting from the RX_REORD value.
   Update an RX_DELIV value with the COUNT value of the first PDCP SDU having a COUNT value greater than or equal to the RX_REORD value and not delivered to a higher layer.
   If the RX_DELIV value is small than an RX_NEXT value,
      Update the RX_REORD value with the RX_NEXT value.
   Start the t-Reordering timer.

(Examples for the Actions when a t-Reordering Expires)

When t-Reordering expires, the receiving PDCP entity shall:
   deliver to upper layers in ascending order of the associated COUNT value after performing header decompression:
      all stored PDCP SDU(s) with associated COUNT value(s)<RX_REORD;
      all stored PDCP SDU(s) with consecutively associated COUNT value(s) starting from RX_REORD;
   update RX_DELIV to the COUNT value of the first PDCP SDU which has not been delivered to upper layers, with COUNT value>=RX_REORD;
   if RX_DELIV<RX_NEXT:
      update RX_REORD to RX_NEXT;
      start t-Reordering.

As a detailed procedure of performing the (1-3) embodiment of the present disclosure, the re-establishment procedure of a Tx stage and Rx stage PDCP entity according to a (1-3b) embodiment is as follows.

<PDCP Entity Re-Establishment Procedure (PDCP Entity Re-Establishment)>

When a higher layer requests the PDCP entity re-establishment, the transmitting PDCP layer entity operates as follows.
   In the case of a UM DRB and an AM DRB (e.g., drb-ContinueROHC is included in MobilityControlInfo of a handover command message, that is, an RRC Connection Reconfiguration message. In general, it is configured upon performing handover to a different cell within a source gNB). If drb-ContinueROHC has not been configured, the entity resets ROHC with respect to the uplink and starts the ROHC in the IR state of a U mode.
   In the case of a UM DRB and an SRB, the entity sets a TX_NEXT variable as an initial value (TX_NEXT: this state variable indicates the COUNT value of the next PDCP SDU to be transmitted. The initial value is 0.)
   The entity applies a ciphering algorithm and key provided by a higher layer in the PDCP re-establishment procedure.
   The entity applies an integrity protection algorithm and key provided by a higher layer in the PDCP re-establishment procedure.
   In the case of a UM DRB, the entity performs the following processing on PDCP SDUs to which PDCP sequence numbers have already been assigned, but which have not yet been delivered to a lower layer.
      Process the PDCP SDUs as if they have been received from a higher layer.
      Transmit the PDCP SDUs in order of COUNT values assigned prior to the PDCP re-establishment procedure and does not start a PDCP discard timer.
   In the case of an AM DRB, the entity performs retransmission or transmission in order to COUNT values assigned prior to the PDCP re-establishment procedure from the first PDCP SDU whose successful delivery has not been confirmed from a lower layer, and performs the following procedure.
      Perform header compression on the PDCP SDU.
      Perform ciphering and integrity protection using a COUNT value corresponding to the PDCP SDU.
      Forward the resulting PDCP data PDU on which the procedure has been performed to a lower layer.

When a higher layer requests the PDCP entity re-establishment, the receiving PDCP layer entity operates as follows.
   In the case of an SRB, the entity discards all of stored PDCP SDUs and PDCP PDUs.
   In the case of a UM DRB, if the t-Reordering timer is driven,
      Stop and reset the t-Reordering timer.
      Perform header decompression and deliver all the PDCP SDUs to a higher layer in ascending order of the COUNT values.
   In the case of an AM DRB, if drb-ContinueROHC has not been configured, the entity performs header decompression on all PDCP PDUs now placed in the reception buffer and places the header-decompressed PDCP SDUs in the reception buffer.
   In the case of a UM DRB and an AM DRB, drb-ContinueROHC has not been configured, the entity resets ROHC with respect to the downlink and starts the ROHC in the NC state of a U mode.
   In the case of a UM DRB and SRBs, the entity sets RX_NEXT and RX_DELIV variables as initial values.
   The entity applies a ciphering algorithm and key provided by a higher layer in the PDCP re-establishment procedure.
   The entity applies an integrity protection algorithm and key provided by a higher layer in the PDCP re-establishment procedure.

(Examples for the PDCP Entity Re-Establishment)

When upper layers request a PDCP entity re-establishment, the transmitting PDCP entity shall:
   for UM DRBs and AM DRBs, reset the header compression protocol for uplink and start with an IR state in U-mode if drb-ContinueROHC is not configured;
   for UM DRBs and SRBs, set TX_NEXT to the initial value;
   for SRBs, discard all stored PDCP SDUs and PDCP PDUs;
   apply the ciphering algorithm and key provided by upper layers during the PDCP entity re-establishment procedure;

apply the integrity protection algorithm and key provided by upper layers during the PDCP entity re-establishment procedure;

for UM DRBs, for each PDCP SDU already associated with a PDCP SN but for which a corresponding PDU has not previously been submitted to lower layers:
consider the PDCP SDUs as received from upper layer;
perform transmission of the PDCP SDUs in ascending order of the COUNT value associated to the PDCP SDU prior to the PDCP re-establishment without restarting the discard Timer.

for AM DRBs, from the first PDCP SDU for which the successful delivery of the corresponding PDCP Data PDU has not been confirmed by lower layers, perform retransmission or transmission of all the PDCP SDUs already associated with PDCP SNs in ascending order of the COUNT values associated to the PDCP SDU prior to the PDCP entity re-establishment as specified below:
perform header compression of the PDCP SDU;
perform integrity protection and ciphering of the PDCP SDU using the COUNT value associated with this PDCP SDU;
submit the resulting PDCP Data PDU to lower layer.

When upper layers request a PDCP entity re-establishment, the receiving PDCP entity shall:
for SRBs, discard all stored PDCP SDUs and PDCP PDUs
for UM DRBs, if t-Reordering is running:
stop and reset t-Reordering;
deliver all stored PDCP SDUs to the upper layers in ascending order of associated COUNT values after performing header decompression;
for AM DRBs, perform header decompression for all stored PDCP PDUs and store them in the reception buffer if drb-ContinueROHC is not configured;
for UM DRBs and AM DRBs, reset the header compression protocol for downlink and start with NC state in U-mode if drb-ContinueROHC is not configured;
for UM DRBs and SRBs, set RX_NEXT and RX_DELIV to the initial value;
apply the ciphering algorithm and key provided by upper layers during the PDCP entity re-establishment procedure;
apply the integrity protection algorithm and key provided by upper layers during the PDCP entity re-establishment procedure.

In the procedure, in the case of an AM DRB driven in the AM RLC layer entity, the reason why the following operation is performed when the receiving PDCP layer entity performs PDCP re-establishment is as follows.

In the case of the AM DRB, if drb-ContinueROHC has not been configured, the entity performs header decompression on all PDCP PDUs now placed in the reception buffer and places the header-decompressed PDCP SDUs in the reception buffer.

For AM DRBs, perform header decompression for all stored PDCP PDUs and store them in the reception buffer if drb-ContinueROHC is not configured;

The reason why the operation is performed is as follows.

For example, a UE may receive DL data from a gNB through an AM bearer (means a bearer driven in the AM of the RLC layer supporting an ARQ function). That is, although the gNB has transmitted PDCP PDUs, corresponding to PDCP sequence number Nos. 0, 1, 2, 3 and 4, to the UE as the DL data, the receiving PDCP entity of the UE may first receive the PDCP PDUs corresponding to the PDCP sequence number Nos. 1, 3 and 4 out of sequence in the transmission process. In this case, if the sequence of the PDCP PDUs must be ordered and the PDCP PDUs must be transmitted (if an out-of-order delivery indicator has not been indicated through an RRC configuration), the receiving PDCP layer of the UE analyzes a header for the PDCP PDUs corresponding to the PDCP sequence number Nos. 1, 3 and 4, performs deciphering, performs integrity verification, and places the PDCP PDUs in the buffer (header decompression is performed after the sequence is ordered and the PDCP PDUs are delivered to a higher layer. The header decompression means decompression for the TCP/IP header of IP packet of a PDCP SDU (the data part of a PDCU PDU) not a PDCP header). In this case, if the gNB determines handover and instructs a handover command to the UE through an RRC message (RRCConnectionReconfiguration), the receiving PDCP layer entity of the UE that has received the RRC message re-establishes the PDCP layer entity (PDCP reestablishment). That is, the receiving PDCP layer entity immediately resets ROHC. Furthermore, the receiving PDCP layer entity subsequently receives an IR packet and completes an ROHC configuration. If the PDCP PDUs corresponding to the PDCP sequence number Nos. 0 and 2 in addition to the PDCP sequence number Nos. 1, 3 and 4 are received, the receiving PDCP layer entity needs to perform header decompression and deliver the PDCP PDUs to a higher layer because the sequence of the PDCP PDUs may be reordered. However, in this case, the TCP/IP header of the PDCP SDUs corresponding to the PDCP sequence number Nos. 1, 3 and 4 has been compressed based on a previous ROHC configuration, and the PDCP SDUs corresponding to the PDCP sequence number Nos. 0 and 2 has been compressed based on a new ROHC configuration. Accordingly, when header decompression is performed on the TCP/IP header of the PDCP SDUs corresponding to the PDCP sequence number Nos. 1, 3 and 4, a failure or error may occur because the header decompression is performed based on the new ROHC configuration.

Accordingly, in order to solve this problem, in a PDCP re-establishment procedure according to the (1-3) embodiment of the present disclosure, there is proposed a method of decompressing the TCP/IP header of PDCP SDUs using the existing ROHC, placing the PDCP SDUs in the buffer, and then resetting the ROHC if receiving PDCP entity re-establishment needs to be performed and the PDCP SDUs are placed in the buffer before the ROHC is reset. The proposed method is an operation suitable for a case where drb-ContinueROHC (i.e., an indicator indicating that a current ROHC configuration needs to be used without any change) has not been configured. The reason for this is that this means that if drb-ContinueROHC has been configured, a current ROHC configuration is used without any change and thus the ROHC will not be reset. Accordingly, as in the above procedure, header decompression does not need to be performed on PDCP PDUs placed in the buffer.

In the entire description of the present disclosure, the meaning "in sequence" may mean ascending order, for example.

Figure 1Q:
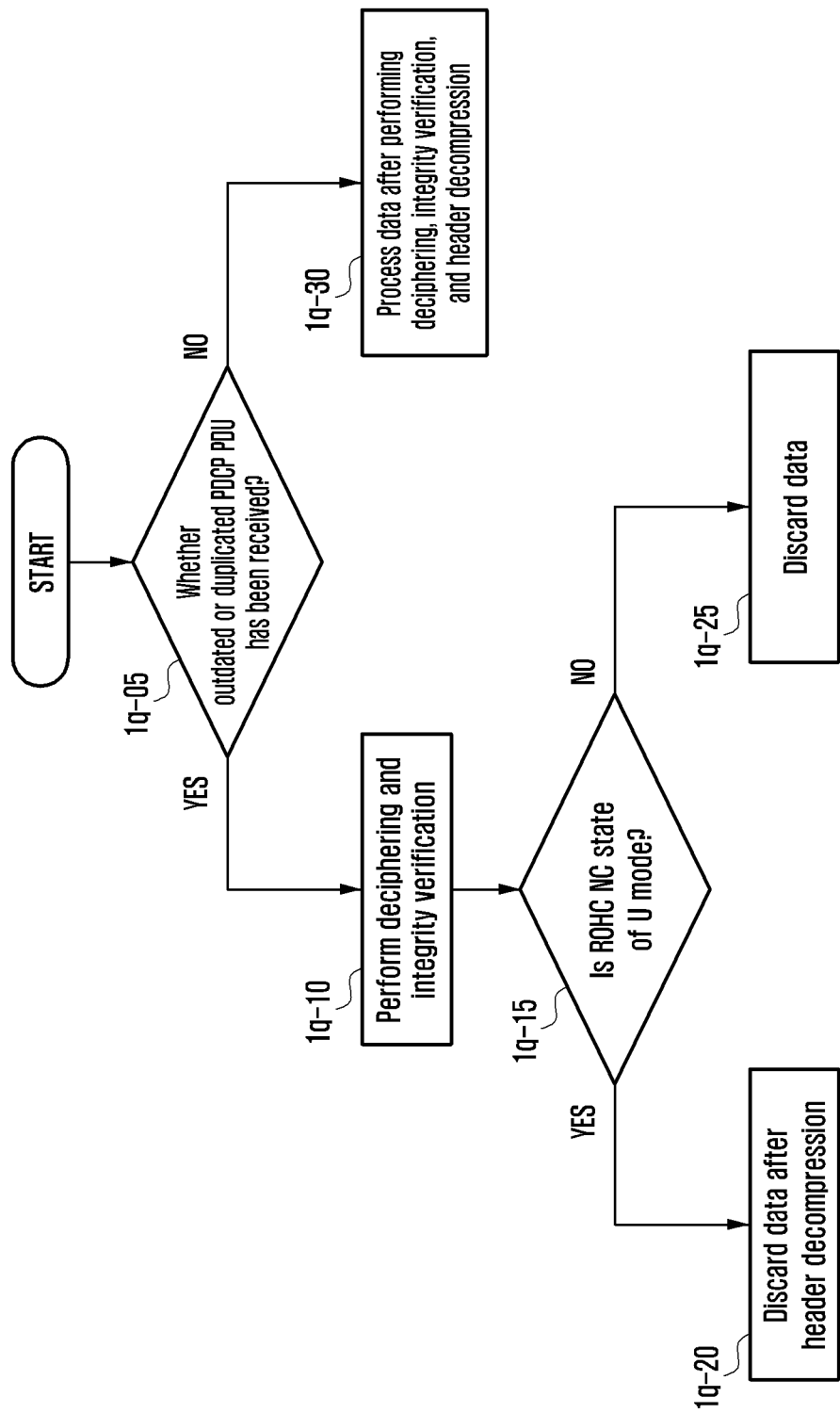
FIG. 1Q illustrates a diagram showing an operation when the reception PDCP layer entity receives an outdated or duplicated PDCP PDU according to the (1-3) embodiment of the present disclosure.

FIG. 1Q is a diagram showing an operation when the receiving PDCP layer entity receives an outdated or duplicated PDCP PDU according to the (1-3) embodiment of the present disclosure.

Referring to FIG. 1Q, the receiving PDCP layer entity identifies whether outdated or duplicated data has been received (1q-05). If the received PDCP PDU has been outdated or duplicated, first, the receiving PDCP layer entity performs deciphering and integrity verification (1q-10). If integrity verification fails, the receiving PDCP layer entity reports the failure to a higher layer and immediately discards the PDCP PDU. Thereafter, the receiving PDCP layer entity identifies whether the mode and state of current ROHC is the NC state of a U mode (1*q*-15). If the mode and state of the current ROHC is the NC state of the U mode, the receiving PDCP layer entity performs header decompression (checks whether an IR packet is present and updates ROHC configuration information if it is present), and discards the data (1*q*-20). If the mode and state of the current ROHC is a state other than the NC state of the U mode, the receiving PDCP layer entity discards the data (1*q*-25).

If the received PDCP PDU has not been outdated or duplicated, the receiving PDCP layer entity performs deciphering and integrity verification, performs header decompression, and then performs data processing (1*q*-30).

Figure 1R:
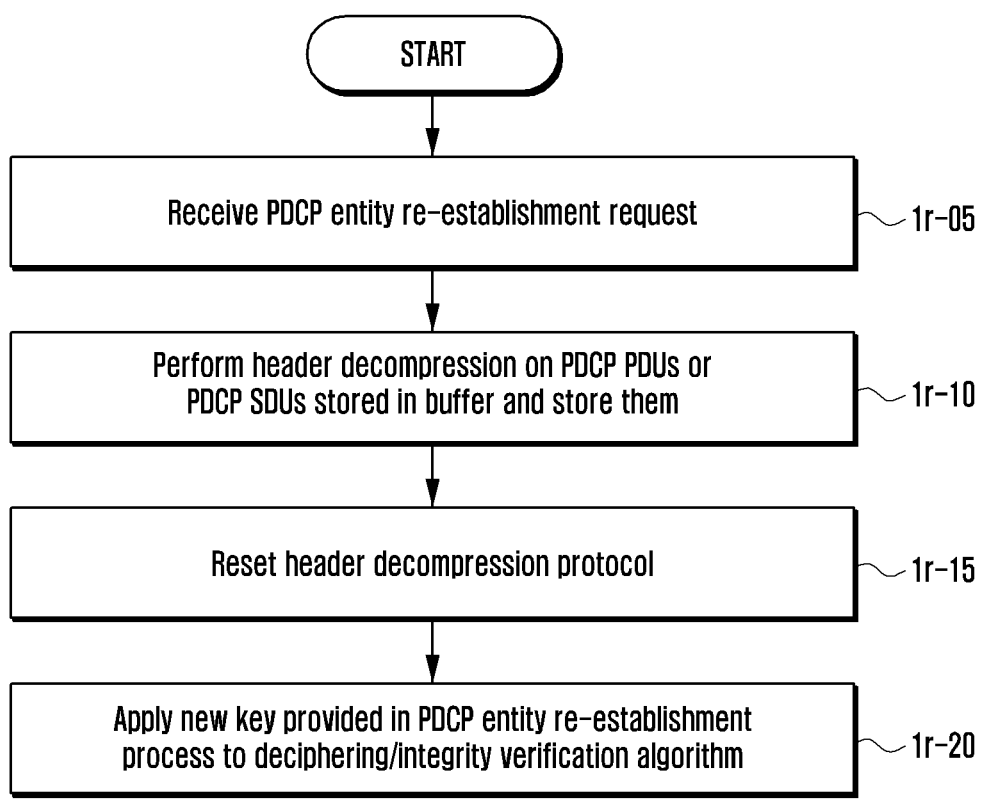
FIG. 1R illustrates a diagram showing an operation when the reception PDCP layer entity operating in an AM DRB receives a PDCP entity re-establishment request according to the (1-3) embodiment of the present disclosure.

FIG. 1R is a diagram showing an operation when the receiving PDCP layer entity operating in an AM DRB receives a PDCP entity re-establishment request according to the (1-3) embodiment of the present disclosure.

In FIG. 1R, when the receiving PDCP layer entity receives a PDCP entity re-establishment request (1*r*-05), it performs header decompression on PDCP PDUs or PDCP SDUs now placed in the buffer and places them in the buffer (1*r*-10). Furthermore, the receiving PDCP layer entity resets a header decompression protocol (1*r*-15). Furthermore, the receiving PDCP layer entity applies a new key provided in the PDCP entity re-establishment process to a deciphering/integrity verification algorithm (1*r*-20).

In FIGS. 1IA and 1IB, the problem has been described by taking the uplink as an example, but the same problem may occur in the downlink. That is, in FIGS. 1IA and 1IB, the UE may become a source gNB or target gNB. The source gNB or target gNB may operate as a single gNB, so the same problem may occur in a handover process or PDCP reestablishment process in the downlink. Accordingly, the methods proposed in the (1-1) embodiment, (1-2) embodiment and (1-3) embodiment of the present disclosure may be applied to both the uplink and downlink.

That is, in the (1-1) embodiment, (1-2) embodiment and (1-3) embodiment of the present disclosure, the uplink has been illustrated, the UE describes the operation of the transmitting PDCP entity, and the gNB describes the operation of the receiving PDCP entity. Accordingly, in the case of the downlink, the gNB may perform the operation of the transmitting PDCP entity, and the UE may perform the operation of the receiving PDCP entity. That is, the transmitting PDCP entity operation and receiving PDCP entity operation proposed in the present disclosure may be applied to both the uplink and downlink.

In the present disclosure, to perform header decompression has a meaning including a procedure for ROHC to identify the header of a TCP/IP packet or higher layer packet and an operation of identifying information of an IR packet if the TCP/IP packet or higher layer packet is the IR packet and updating configuration information of the ROHC based on the information. Furthermore, to perform header decompression has a meaning that if a header has been compressed, configuration information of ROHC is identified, decompression is performed, and the header is restored to a decompressed header.

Figure 2A:
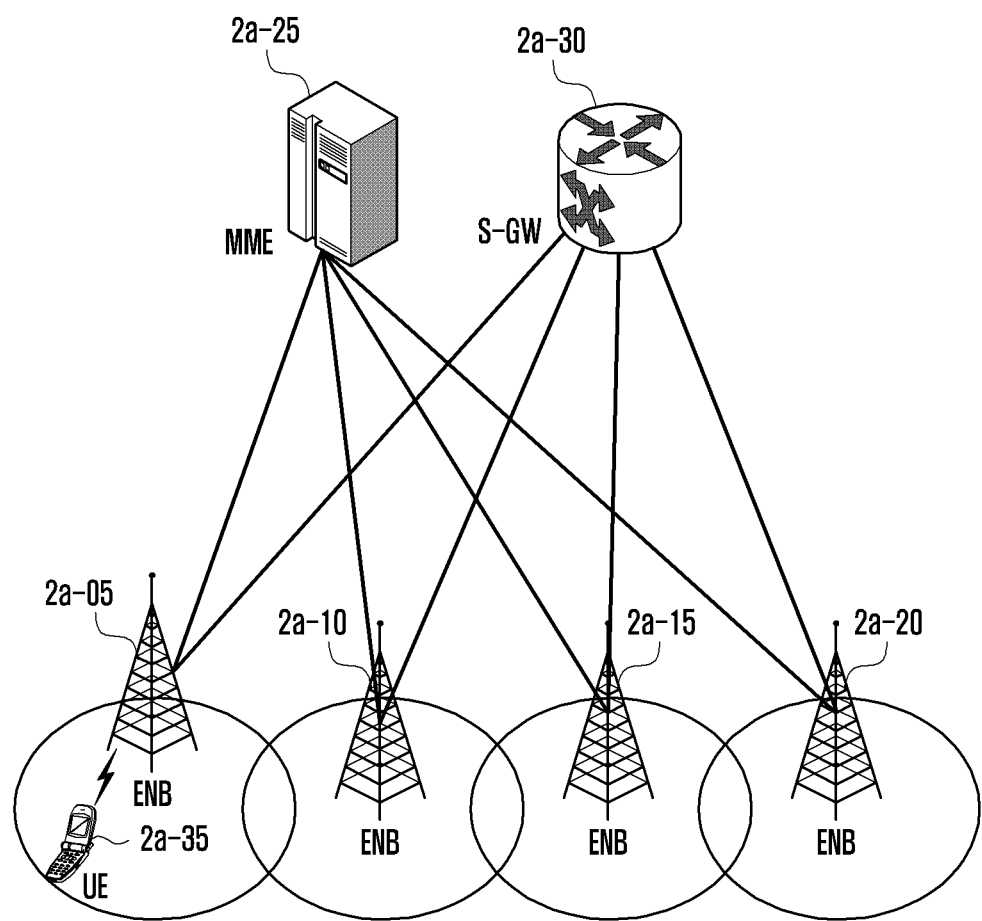
FIG. 2A illustrates a diagram showing the configuration of an LTE system to which the present disclosure may be applied.

FIG. 2A is a diagram showing the configuration of an LTE system to which the present disclosure may be applied.

Referring to FIG. 2A, the radio access network of the LTE system includes next-generation evolved Node Bs (hereinafter referred to as "ENBs", "Node Bs" or "base stations") 2*a*-05, 2*a*-10, 2*a*-15, and 2*a*-20, an MME 2*a*-25, and an S-GW 2*a*-30. A UE 2*a*-35 accesses an external network through the ENBs 2*a*-05~2*a*-20 and the S-GW 2*a*-30.

In FIG. 2A, the ENBs 2*a*-05~2*a*-20 correspond to the Node Bs of the existing UMTS system. The ENB is connected to the UE 2*a*-35 through a radio channel and performs a more complex function than the existing Node B. In the LTE system, all of types of user traffic including a real-time service, such as VoIP, through the Internet protocol, are served through a shared channel. Accordingly, a device that performs schedules by collecting state information, such as the buffer state, available transmission power state, and channel state of UEs, is necessary. The ENBs 2*a*-05~2*a*-20 are in charge of such a device. In general, one ENB controls multiple cells. For example, in order to implement the transfer rate of 100 Mbps, the LTE system uses OFDM as a radio access technology in the 20 MHz bandwidth, for example. Furthermore, the LTE system adopts an AMC scheme for determining a modulation scheme and a channel coding rate based on the channel state of a UE. The S-GW 2*a*-30 provides a data bearer and generates or removes a data bearer under the control of the MME 2*a*-25. The MME is in charge of various control functions in addition to a mobility management function for a UE, and is connected to multiple ENBs.

Figure 2B:
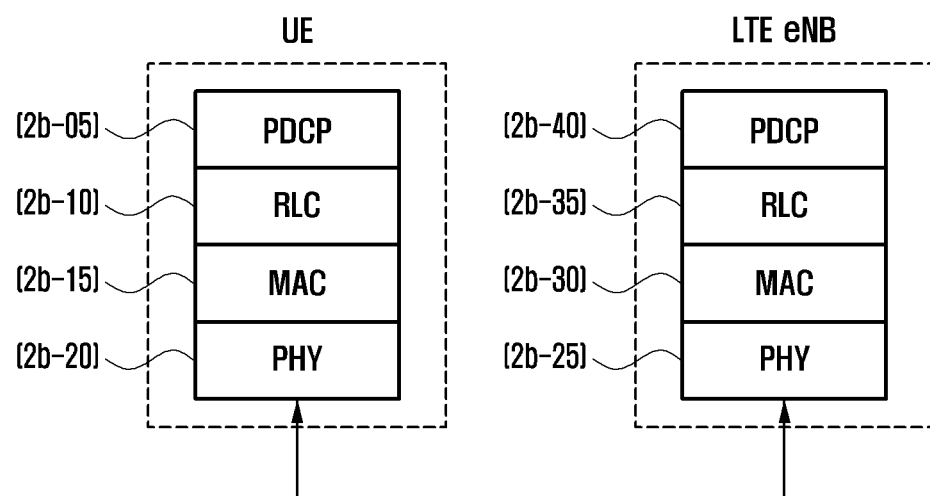
FIG. 2B illustrates a diagram showing radio protocol architecture in an LTE system to which the present disclosure may be applied.

FIG. 2B is a diagram showing radio protocol architecture in an LTE system to which the present disclosure may be applied.

Referring to FIG. 2B, the radio protocol of the LTE system includes PDCPs 2*b*-05 and 2*b*-40, RLC 2*b*-10 and 2*b*-35, and MAC 2*b*-15 and 2*b*-30 in a UE and an ENB, respectively. The PDCPs 2*b*-05 and 2*b*-40 are in charge of an operation, such as IP header compression/restoration. Major functions of the PDCP 2*b*-05, 2*b*-40 are summarized as follows.

Header compression and decompression: ROHC only
Transfer of user data
In-sequence delivery of upper layer PDUs in PDCP re-establishment procedure for RLC AM
Reordering function (for split bearers in DC (only support for RLC AM): PDCP PDU routing for transmission and PDCP PDU reordering for reception)
Duplicate detection of lower layer SDUs in PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The RLC 2*b*-10, 2*b*-35 reconfigures a PDCP packet data unit (PDU) in a proper size and performs an ARQ operation. Major functions of the RLC are summarized as follows.

Transfer of upper layer PDUs
ARQ function (Error Correction through ARQ (only for AM data transfer))
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 2*b*-15, 2*b*-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping between logical channels and transport channels
        Multiplexing/demultiplexing of MAC SDUs belonging to one or different logical channels into/from transport blocks (TB) delivered to/from the physical layer on transport channels)
    Scheduling information reporting
    Error correction through HARQ
    Priority handling between logical channels of one UE
    Priority handling between UEs by means of dynamic scheduling
    MBMS service identification
    Transport format selection
    Padding A physical layer $2b$-20, $2b$-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 2C:
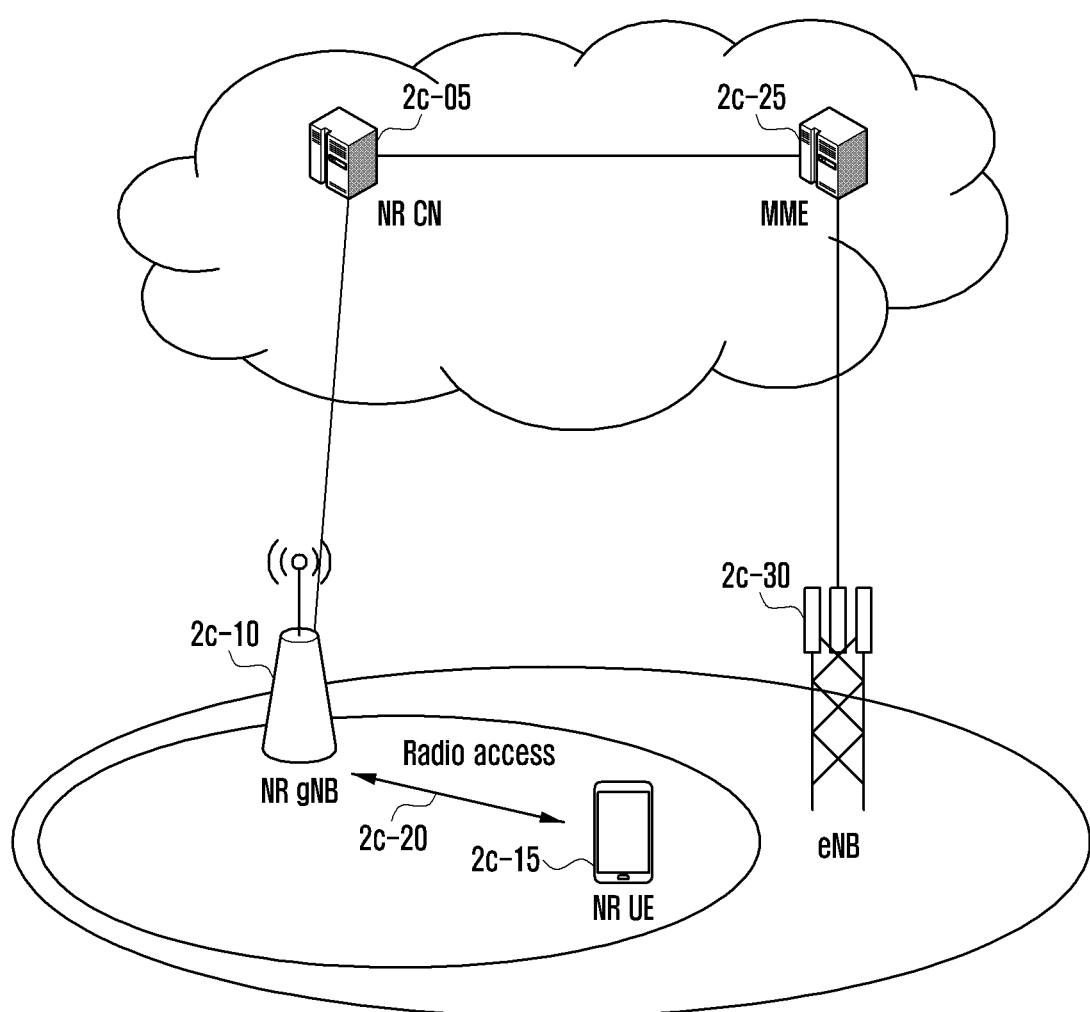
FIG. 2C illustrates a diagram showing the configuration of a next-generation mobile communication system to which the present disclosure may be applied.

FIG. 2C is a diagram showing the configuration of an NR to which the present disclosure may be applied.

Referring to FIG. 2C, the radio access network of an NR or 5G includes an NR gNB $2c$-10 and an NR CN $2c$-05. An NR UE $2c$-15 accesses an external network through the NR gNB $2c$-10 and the NR CN $2c$-05.

In FIG. 2C, the NR gNB $2c$-10 corresponds to an evolved Node B (ENB) of the existing LTE system. The NR gNB is connected to the NR UE $2c$-15 through a radio channel, and may provide an excellent service compared to the existing Node B. The NR requires a device for performing scheduling by collecting state information, such as the buffer state, available transmission power state, and channel state of UEs, because all of types of user traffic are served through a shared channel. The NR gNB $2c$-10 is in charge of the device. In general, one NR gNB controls multiple cells. In order to implement ultra-high speed data transfer compared to the existing LTE, the NR may have the existing maximum bandwidth or more and may additionally graft the beamforming technology using OFDM as a radio access technology. Furthermore, the NR adopts the AMC scheme that determines a modulation scheme and a channel coding rate based on the channel state of a UE. The NR CN $2c$-05 performs functions, such as mobility support, a bearer configuration, and a QoS configuration. The NR CN $2c$-05 is in charge of various control functions in addition to a mobility management function for a UE, and is connected to multiple ENBs. Furthermore, the NR may also operate in conjunction with the existing LTE system. The NR CN is connected to an MME $2c$-25 through a network interface. The MME is connected to an ENB $2c$-30, that is, the existing ENB.

Figure 2D:
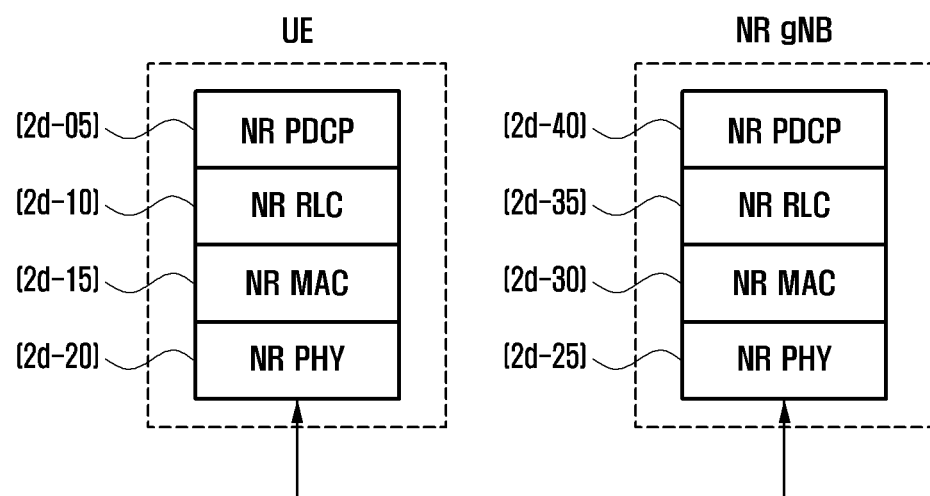
FIG. 2D illustrates a diagram showing radio protocol architecture of a next-generation mobile communication system to which the present disclosure may be applied.

FIG. 2D is a diagram showing radio protocol architecture of an NR to which the present disclosure may be applied.

Referring to FIG. 2D, the radio protocol of the NR includes NR PDCPs $2d$-05 and $2d$-40, NR RLC $2d$-10 and $2d$-35, and NR MAC $2d$-15 and $2d$-30, respectively, in a UE and an NR base station. Major functions of the NR PDCP $2d$-05, $2d$-40 may include some of the following functions.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink.

The reordering function of the NR PDCP entity refers to a function of sequentially reordering PDCP PDUs received from a lower layer based on a PDCP sequence number (SN). The reordering function may include a function of transmitting data to a higher layer in a reordered sequence, a function of directly transmitting data to a higher layer without taking the sequence into consideration, a function of reordering the sequence and recording lost PDCP PDUs, a function of making a status report on lost PDCP PDUs to the transmission side, and a function of requesting the retransmission of lost PDCP PDUs.

Major functions of the NR RLC $2d$-10, $2d$-35 may include some of the following functions.

Transfer of upper layer PDUs
    In-sequence delivery of upper layer PDUs
    Out-of-sequence delivery of upper layer PDUs
    Error Correction through ARQ
    Concatenation, segmentation and reassembly of the RLC SDUs
    Re-segmentation of RLC data PDUs
    Reordering of RLC data PDUs
    Duplicate detection
    Protocol error detection
    RLC SDU discard
    RLC re-establishment The in-sequence delivery function of the NR RLC entity refers to a function of transmitting RLC SDUs received from a lower layer to a higher layer in sequence, and may include a function of reassembling and transmitting multiple RLC SDUs if one RLC SDU has been originally segmented into the multiple RLC SDUs and received. The in-sequence delivery function may include a function of reordering received RLC PDUs based on an RLC SN (SN) or a PDCP SN, a function of reordering the sequence and recording lost RLC PDUs, a function of transmitting a status report on lost RLC PDUs to the transmission side, a function of requesting the retransmission of lost RLC PDUs, and a function of transmitting only RLC SDUs prior to a lost RLC SDU to a higher layer in sequence if a lost RLC SDU is present or a function of transmitting all of RLC SDUs received before a given timer expires to a higher layer in sequence when the timer expires although there is a lost RLC SDU or a function of transmitting all of RLC SDUs received so far to a higher layer when a given timer expires although there is a lost RLC SDU. Furthermore, the in-sequence delivery function may include a function of processing RLC PDUs in order that they are received (in order of arrival regardless of the sequence of a sequence number) and transmitting the RLC PDUs to a PDCP entity regardless of their sequence (i.e., out-of sequence delivery). The in-sequence delivery function may include a function of receiving segments placed in a buffer or segments to be received subsequently, reconfiguring the segments into one complete RLC PDU, processing the RLC PDU, and transmitting the RLC PDU to the PDCP entity. The NR RLC layer may not include a concatenation function. The concatenation function may be performed by the NR MAC layer or may be substituted with the multiplexing function of the NR MAC layer.

The out-of-sequence delivery function of the NR RLC entity refers to a function of directly transmitting RLC SDUs received from a lower layer to a higher layer regardless of their sequence. The out-of-sequence delivery function may include a function of reassembling multiple RLC SDUs if one RLC SDU has been originally segmented into the multiple RLC SDUs and received. The out-of-sequence delivery function may include a function of storing the RLC SN or PDCP SN of received RLC PDUs, reordering their sequence, and recording lost RLC PDUs.

The NR MAC 2d-15, 2d-30 may be connected to multiple NR RLC layer devices configured in one UE. Major functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 2d-20, 2d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 2E:
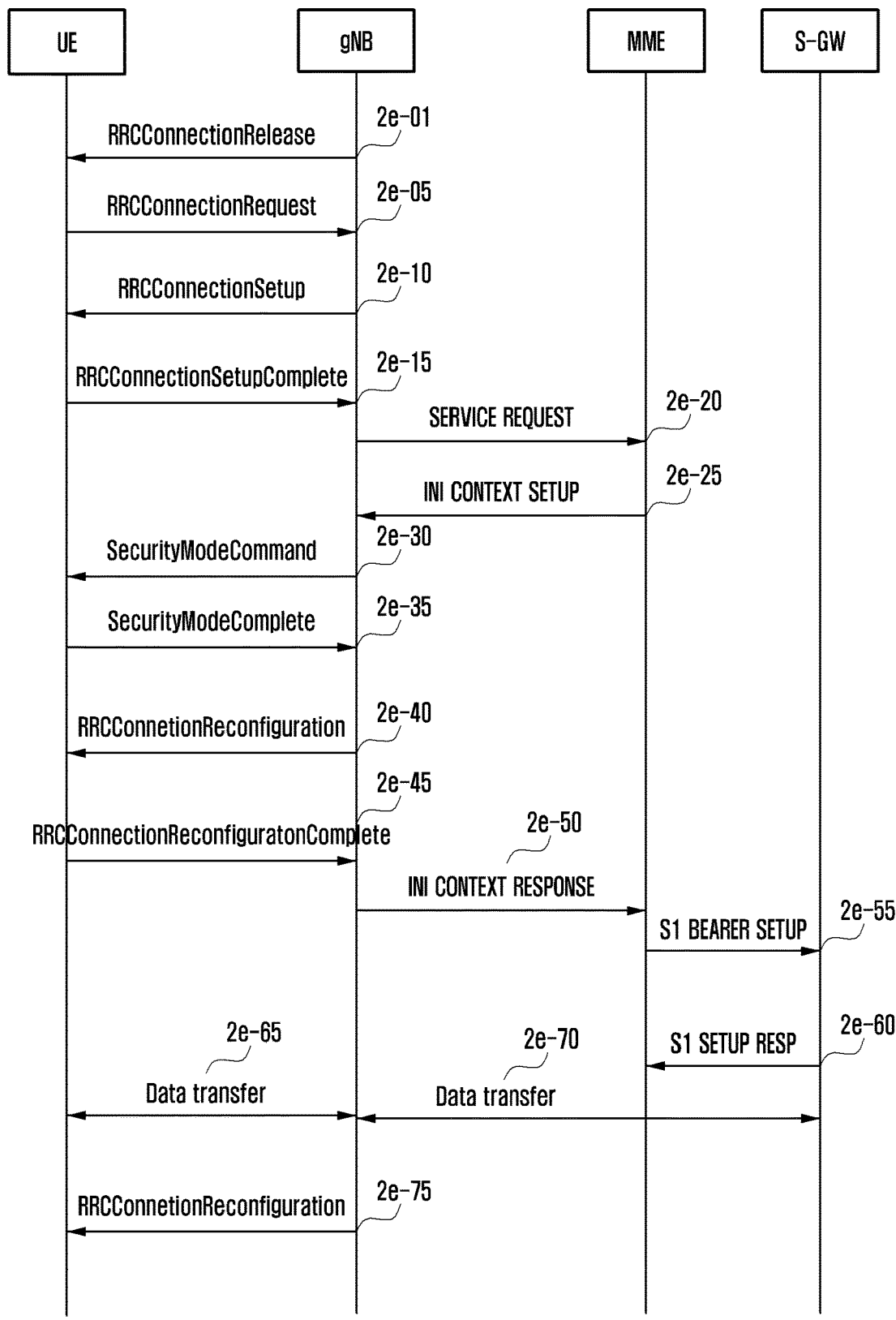
FIG. 2E is a diagram illustrating a procedure for a UE to switch from an RRC idle mode to an RRC connected mode and to establish a connection with a network according to a second embodiment of the present disclosure.

FIG. 2E is a diagram illustrating a procedure for a UE to switch from an RRC idle mode to an RRC connected mode and to establish a connection with a network according to a second embodiment of the present disclosure.

In FIG. 2E, if the UE that transmits and receives data in an RRC connected mode does not transmit and receive data for a given cause or for a given time, a gNB may transmit an RRCConnectionRelease message to the UE so that switches to an RRC idle mode (2e-01). When data to be transmitted subsequently occurs in the UE with which a connection is not now established (hereinafter referred to as "idle mode UE"), the UE performs an RRC connection establishment process with the gNB. The UE establishes backward transmission synchronization with the gNB through a random access process and transmits an RRCConnectionRequest message to the gNB (2e-05). The ID of the UE and a cause (establishmentCause) of establishing a connection are included in the RRCConnectionRequest message.

The gNB transmits an RRCConnectionSetup message so that the UE establishes an RRC connection (2e-10). The RRCConnectionSetup message may include the length of an RLC SN to be used when the RLC AM or UM is used for each service/bearer/RLC entity or for each logical channel, the length of an SO field applied when a segmentation operation is performed, an indicator indicating whether or not to use an RLC SN with respect to a complete RLC PDU, information for configuring window variables such as RX_Next_Segment and TX_Next_Segment to be used in a Tx stage/Rx stage in the RLC UM, information such as an initial value, and whether or not to perform an SI-based segmentation operation (the information may be included in rlc-config configuration information, that is, RLC configuration information). Furthermore, the RRCConnectionSetup message includes RRC connection configuration information, etc. The RRC connection is also called a signaling radio bearer (SRB) and used for RRC message transmission and reception, that is, a control message between a UE and a gNB.

The UE that has established the RRC connection transmits an RRCConnectionSetupComplete message to the gNB (2e-15). The RRCConnectionSetupComplete message may include a control message called SERVICE REQUEST that the UE requests a bearer configuration for a given service from the MME.

The gNB transmits the SERVICE REQUEST message, included in the RRCConnectionSetupComplete message, to the MME (2e-20). The MME determines whether to provide the service requested by the UE. If, as a result of the determination, the MME has determined to provide the service requested by the UE, the MME transmits an INITIAL CONTEXT SETUP REQUEST message to the gNB (2e-25). The INITIAL CONTEXT SETUP REQUEST message includes information, such as quality of service (QoS) information to be applied when a data radio bearer (DRB) is configured and security-related information to be applied to the DRB (e.g., security key, security algorithm).

The gNB exchanges a SecurityModeCommand message 2e-30 and a SecurityModeComplete message 2e-35 with the UE in order to configure security. When the security configuration is completed, the gNB transmits an RRCConnectionReconfiguration message to the UE (2e-40). The RRCConnectionSetup message may include the length of an RLC SN to be used when the RLC AM or UM is used for each service/bearer/RLC entity or for each logical channel, the length of an SO field applied when a segmentation operation is performed, an indicator indicating whether or not to use an RLC SN with respect to a complete RLC PDU, information for configuring window variables such as RX_Next_Segment and TX_Next_Segment to be used in a Tx stage/Rx stage in the RLC UM, information such as an initial value, and whether or not to perform an SI-based segmentation operation (the information may be included in rlc-config configuration information, that is, RLC configuration information). Furthermore, the RRCConnectionReconfiguration message includes configuration information of a DRB in which user data will be processed. The UE configures the DRB by applying the information and transmits an RRCConnectionReconfigurationComplete message to the gNB (2e-45).

The gNB that has completed the DRB configuration along with the UE transmits an INITIAL CONTEXT SETUP COMPLETE message to the MME (2e-50). The MME that has received the message exchanges an S1 BEARER SETUP message and an S1 BEARER SETUP RESPONSE message with the S-GW in order to configure an S1 bearer (2e-55, 2e-60). The S1 bearer is a connection for data transmission configured between the S-GW and the gNB and corresponds to a DRB in a one-to-one manner. When the process is fully completed, the UE transmits and receives data through the gNB and the S-GW (2e-65, 2e-70).

As described above, a known data transmission process basically includes three steps of an RRC connection configuration, a security configuration, and a DRB configuration. Furthermore, in order to newly provide a configuration to the UE or add or change the configuration for a given cause, the gNB may transmit an RRCConnectionReconfiguration message to the UE (2e-75). The RRCConnectionSetup message may include the length of an RLC SN to be used when the RLC AM or UM is used for each service/bearer/RLC entity or for each logical channel, the length of an SO field applied when a segmentation operation is performed, an indicator indicating whether or not to use an RLC SN with respect to a complete RLC PDU, information for configuring window variables such as RX_Next_Segment and TX_Next_Segment to be used in a Tx stage/Rx stage in the RLC UM, information such as an initial value, and whether or not to perform an SI-based segmentation operation (the information may be included in rlc-config configuration information, that is, RLC configuration information).

Figure 2F:
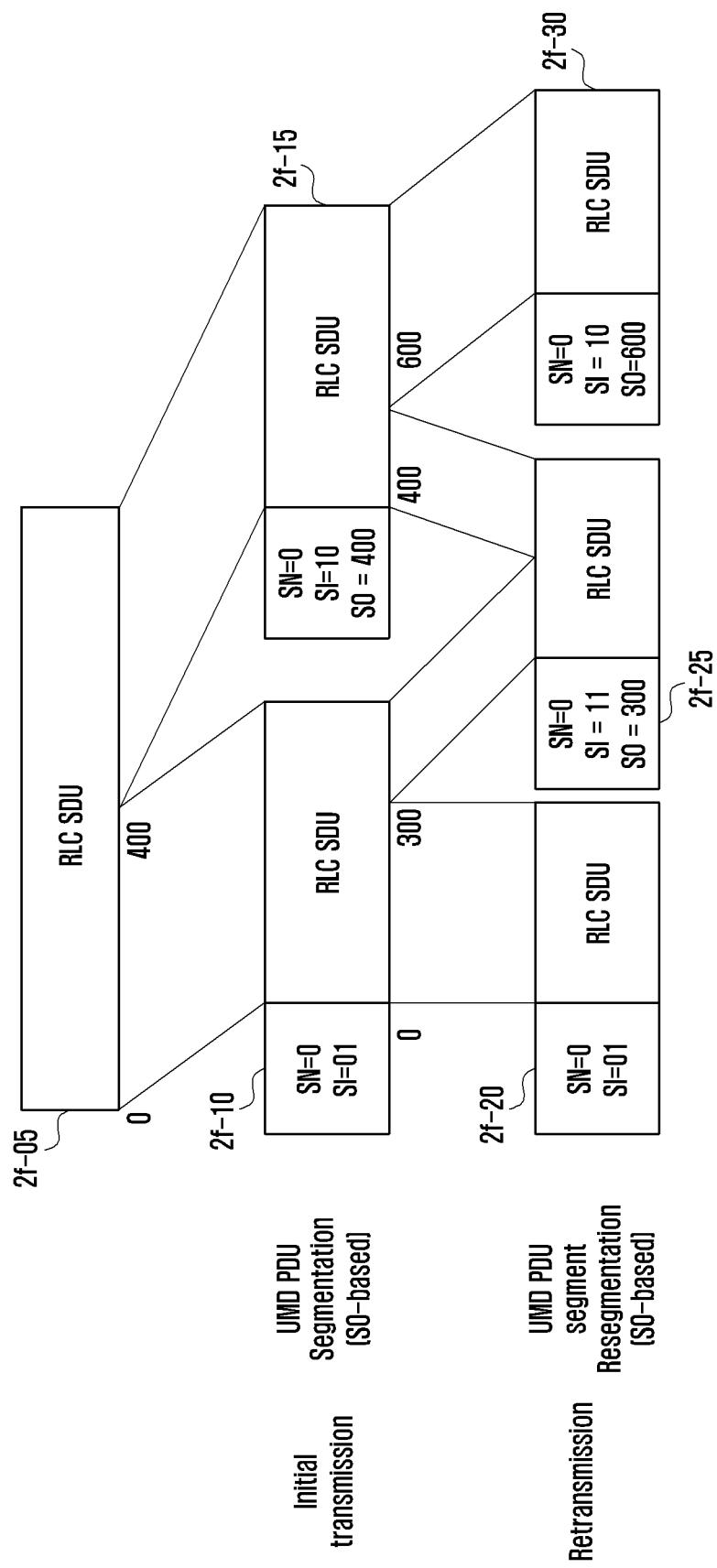
FIG. 2F illustrates a diagram showing an SO-based segmentation operation proposed in an RLC layer RLC AM according to a second embodiment of the present disclosure.

FIG. 2F is a diagram showing an SO-based segmentation operation proposed in an RLC layer RLC AM according to a second embodiment of the present disclosure.

The present disclosure may apply a procedure and method for performing a segmentation operation on a packet received from a higher layer based on a segment offset (SO) in the RLC layer. In the proposed method, an integrated segmentation operation may be performed regardless of a case where transmission is initially performed and a case where retransmission is performed when a segmentation operation is performed. Furthermore, concatenation may not be performed in the RLC layer. Furthermore, whether an RLC SDU, that is, a data part at the back of an RLC header, is a complete RLC SDU that has not been segmented, the first RLC SDU segment that has been segmented, the middle RLC SDU segment that has been segmented or the last RLC SDU segment that has been segmented may be determined by introducing an SI field into an RLC header. Furthermore, there is no a length field indicative of the length of an RLC header.

In FIG. 2F, an RLC layer receives a PDCP PDU (RLC SDU) 2*f*-05 from a PDCP layer that is a higher layer. The RLC SDU may be processed in a size indicated by a MAC layer. If an RLC SDU is segmented, it may include segmentation information of a header and may form an RLC PDU. The RLC PDU includes an RLC header and RLC payload (RLC SDU). The RLC header may include the property (data or control information) and segmentation information of the RLC PDU, and may include a data/control (D/C) field, a P field, an segmentation information (SI) field, a sequence number (SN) field and a segment offset (SO) field. In the above, in the RLC UM in which an ARQ is not supported, the P field is not present and may be substituted with a reserved field.

Referring to Table 1, the D/C field is 1 bit and is used to indicate whether a formed RLC PDU is a control PDU or a data PDU.

TABLE 1

| Value | Description |
|-------|-------------|
| 0 | Control PDU |
| 1 | Data PDU |

The SN field indicates the sequence number of an RLC PDU and may have a given length. For example, the SN field may have a 12-bit or 18-bit length.

The SO field may have a size of 2 bytes and indicates that an RLC SDU segment has been first segmented at which location of the RLC SDU. The SO field is used to indicate the first byte of a segmented segment.

The P field may enable an Rx stage to perform an RLC status report by setting the P field to 1 when a condition in which polling is triggered occurs in a Tx stage. That is, the P field enables ACK/NACK information about RLC PDUs received so far to be delivered to the Tx stage.

When the RLC SDU 2*f*-05 is received, the RLC layer may generate an RLC header and generate an RLC PDU by directly inserting an RLC SN into the RLC SDU. If a segmentation operation is necessary for a given cause, RLC PDUs may be generated by updating an SI field and adding an SO field to the RLC header as in 2*f*-10 and 2*f*-15. That is, the SO field may be added or may not be added to a segmented segment depending on a given condition after a segmentation operation. The given condition is determined based on an SI field to be described below. A given reason why the segmentation operation is necessary may include a case where a segmentation operation for a given MAC SDU (RLC PDU) has been requested from the RLC layer because the size of a MAC subheader and MAC SDU that has now been generated is greater than the size of a transmission resource allocated by the MAC layer.

The SN field is the sequence number of an RLC PDU, and may reuse a PDCP SN if the PDCP SN is necessary or configured. The SO field is a field having a given length and may indicate that the first byte of a segmented RLC PDU data field (RLC SDU) corresponds to which byte of the original RLC PDU data field (RLC SDU) at the time of initial transmission. At the time of retransmission, the SO field may indicate that the first byte of a re-segmented RLC PDU data field corresponds to which byte of the original RLC PDU data field (RLC SDU). The length of the SO field may have a fixed length (e.g., 2 bytes) or may be configured by an RRC message (e.g., RRCConnectionSetup or RRC-ConnectionReconfiguration message, 2*e*-10, 2*e*-40, 2*e*-75). Referring to Table 2, the SI field may be defined as follows or may be called a different name.

TABLE 2

| Value | Description |
|-------|-------------|
| 00 | Complete RLC PDU |
| 01 | First segment of RLC PDU |
| 10 | Last segment of RLC PDU |
| 11 | Middle segment of RLC PDU |

If the SI field is 00, it indicates a complete RLC PDU that has not been segmented. In this case, an SO field is not necessary for an RLC header. If the SI field is 01, it indicates the first RLC PDU segment that has been segmented. In this case, an SO field is not necessary for an RLC header. The reason for this is that in the case of the first segment, an SO field always indicates 0. If the SI field is 10, it indicates the last RLC PDU segment that has been segmented. In this case, an SO field is necessary for an RLC header. If the SI field is 11, it indicates the middle RLC PDU segment that has been segmented. In this case, an SO field is necessary for an RLC header. A mapping relation between the 2-bit and the four types of information (i.e., the complete RLC PDU, the first segment, the last segment and the middle segment) may have a total of 4×3×2×1=24 types. Table 2 shows an example of the 24 types. The present disclosure includes all of the 24 cases mapping relation.

If the RLC PDUs 2*f*-10 and 2*f*-15 fail in transmission, retransmission may be performed. In this case, if a transmission resource is not sufficient, re-segmentation may be performed like 2*f*-20, 2*f*-25, and 2*f*-30. When the Re-segmentation is performed, the SI fields and SO field of newly generated RLC PDUs 2*f*-20, 2*f*-25 and 2*f*-30 may be updated. In the case of the RLC PDU 2*f*-20, SI is updated with 01 and an SO field is not necessary because the RLD PDU is the first segment.

In the case of the RLC PDU 2*f*-25, since it is the middle segment, SI is updated with 11, and an SO field is updated with 300 so that the SO field may indicate that the first byte of an RLC PDU data field (RLC SDU) corresponds to which byte of the original RLC PDU data field (RLC SDU). In the case of the RLC PDU 2*f*-30, since it is the last segment, SI is updated with 10 and an SO field is updated with 600 so that the SO field may indicate that the first byte of an RLC PDU data field (RLC SDU) corresponds to which byte of the original RLC PDU data field (RLC SDU).

Figure 2G:
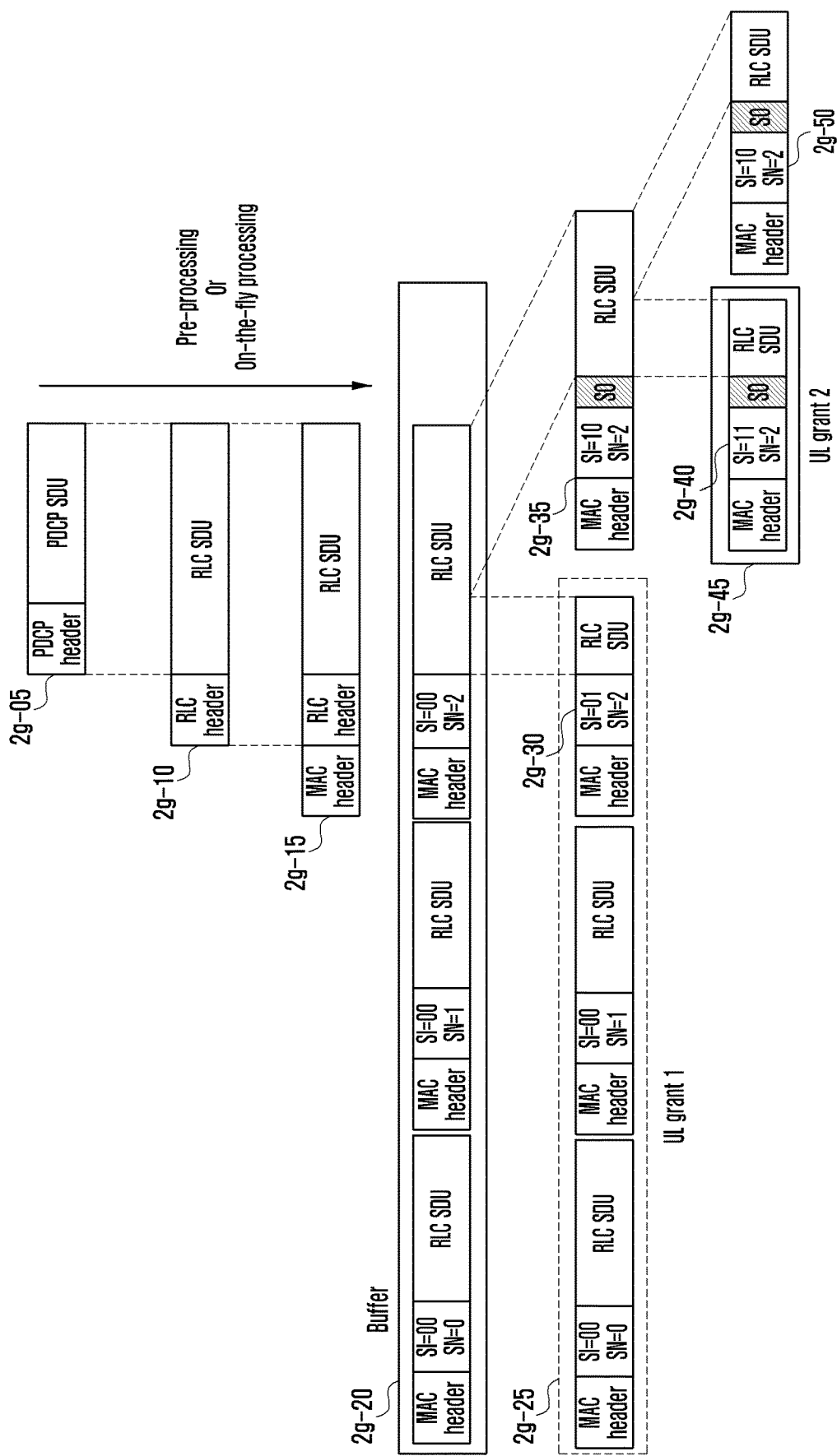
FIG. 2G illustrates a diagram showing a data processing operation to which the SO-based segmentation method of the RLC AM according to the second embodiment of the present disclosure has been applied.

FIG. 2G is a diagram showing a data processing operation to which the SO-based segmentation method of the RLC AM according to the second embodiment of the present disclosure has been applied.

In FIG. 2G, when an IP packet arrives at a PDCP layer, a PDCP header may be attached and a PDCP PDU (or RLC SDU) 2g-05 may be delivered to an RLC layer. The RLC layer may complete an RLC PDU 2g-10 by first generating an RLC header, assigning an RLC SN and configuring the RLC header, and may deliver the RLC PDU to a MAC layer. The MAC layer may calculate the size of a MAC SDU (or RLC PDU), may configure an L field, may configure a corresponding logical channel identifier, may configure an MAC subheader 2g-15, and may place the MAC subheader in a buffer 2g-20. Accordingly, according to such a method, data pre-processing may be performed on data packets received by the PDCP layer before a transmission resource (UL grant) is received from a gNB, and the data packets may be placed in the buffer. Alternatively, data processing may be directly performed on the data packets (on-the-fly processing) right after the transmission resource is received. If an uplink transmission resource (UL grant 1) 2g-25 has been received from a gNB, but a segmentation operation needs to be performed because the uplink transmission resource is not sufficient, after a segmentation operation is performed like 2g-30, an SI field may be configured in the RLC header of each segment based on each segment, and the RLC headers of the segments may be newly configured (2g-30, 2g35). Furthermore, as described in FIG. 2F, in the middle segment or the last segment other than the first segment, an SO field needs to be added and a corresponding offset needs to be indicated. Accordingly, an SO field may be added to the RLC header like 2g-35. Furthermore, a MAC PDU configured based on the uplink transmission resource may be transmitted.

If a second uplink transmission resource (UL grant 2) 2g-45 has been received, but a segmentation operation is necessary once more because the size of the transmission resource is insufficient, SI fields are updated and SO fields are updated or added based on newly segmented segments, and RLC headers are configured like 2g-40 and 2g-50. Furthermore, MAC PDUs are configured based on the uplink transmission resource (UL grant 2) and transmitted.

The SO-based segmentation method is characterized in that although a segmentation operation is performed, the RLC SNs of the original RLC PDUs of segmented segments are the same. Accordingly, segments segmented from one RLC PDU have the same RLC SNs of the original RLC PDUs (2g-30, 2g-35, 2g-40, 2g-40, 2g-50).

An RLC layer may operate in an RLC acknowledged mode (AM) mode, an RLC unacknowledged mode (UM) mode, and an RLC transparent mode (TM). In the RLC AM, the RLC layer supports an ARQ function, and a Tx stage may receive an RLC status report from an Rx stage and may perform retransmission on lost (ACKed) RLC PDUs through the status report. If the retransmission is performed, a re-segmentation operation may be performed when an uplink transmission resource is not sufficient. Accordingly, reliable transmission of data not having an error is guaranteed, and services that require high reliability are provided. In order to efficiently support the ARQ function, accurate information about lost RLC PDUs is necessary. Accordingly, an SO field may be usefully used. That is, which RLC PDU has been lost and which part of an RLC PDU has been lost may be indicated more specifically in an RLC status report through the SO field. When a Tx stage receives detailed information of a lost RLC PDU through an SO field, it may perform retransmission by performing an SO-based segmentation operation based on the detailed information.

In contrast, in the RLC UM, the ARQ function is not supported. Accordingly, an RLC status report is not performed and a retransmission function is not present. In the RLC UM, the RLC layer of a Tx stage functions to configure RLC headers for PDCP PDUs (RLC SDUs) received from a higher layer when it receives an uplink transmission resource or before it receives the uplink transmission resource and to deliver them to a lower layer. Accordingly, the RLC UM enables continuous data transmission without transmission delay and may be useful for services sensitive to transmission delay.

In order to reduce unnecessary overhead in the RLC UM in an NR, various embodiments of the present disclosure propose a method of using an RLC SN for only an RLC PDU segment (or a segmented RLC PDU) without using an RLC SN (i.e., SN) for a complete RLC PDU (i.e., a not-segmented RLC PDU).

FIG. 2H shows RLC header formats which may be applied in the RLC UM according to a second embodiment of the present disclosure.

FIG. 2H shows RLC header formats when a sequence number of a 6-bit or 12-bit length is used in the SO field-based and SI field-based segmentation operations described in FIG. 2F if the RLC UM (not supporting an ARQ) is used in the present disclosure.

The RLC header format may include some of the fields described in FIG. 2F or other new fields, and may have a different structure depending on the length of fields, such as a different RLC SN length and SO field length, and the location of each field. R refers to a reserved bit. The RLC header format may not include an RF field and an FI field or an E field. Furthermore, the RLC header format may use an integrated header regardless of RLC headers in the case of first transmission and retransmission. The SI field functions to indicate a complete RLC SDU (complete RLC PDU) on which a segmentation operation has not been performed and the first segment, middle segment and last segment on which a segmentation operation has been performed, as described in FIG. 2F. As described in FIG. 2F, in the case of a complete RLC SDU on which a segmentation operation has not been performed and the first segment on which a segmentation operation has been performed, an RLC header may have a format of 2h-10 (if the RLC SN of a 6-bit length is used) or 2h-20 (if the RLC SN of a 12-bit length is used) because an SO field is not necessary. However, in the middle segment and the last segment on which a segmentation operation has been performed, an RLC header format, such as 2h-15 (if the RLC SN of a 6-bit length is used) or 2h-25 (if the RLC SN of a 12-bit length is used), may be used because an offset needs to be indicated using an SO field.

In the complete RLC PDU (i.e., an RLC PDU on which a segmentation operation has not been performed), an RLC SN is not necessary. The reason why the RLC SN is necessary includes several reasons. That is, the RLC SN is necessary for sequence reordering, duplication check, lost packet detection ARQ function support, and a segmented segment reassembly. However, in an NR, sequence reordering does not need to be performed in the RLC layer. Duplicated check may be instead performed in the PDCP layer. Lost packet detection and ARQ function are not supported in the RLC UM. Accordingly, the RLC SN is necessary for only a segmented RLC PDU segment. Accordingly, the RLC SN may not be used in a complete RLC PDU.

The present disclosure proposes using a header format, such as 2*h*-05, without using an RLC SN in a complete RLC PDU. That is, with respect to an RLC PDU on which a segmentation operation has not been performed in a Tx stage, the SI field of the header of 2*h*-05 is indicated by 00 to indicate that a corresponding RLC PDU is a complete RLC PDU and that an RLC SN is not present. An Rx stage may identify the SI field of the header and may be aware that there is no RLC SN if the SI field is 00. Accordingly, a corresponding RLC PDU is not related to the length of an RLC SN. A 1-byte header, such as 2*h*-05, may be used with respect to a complete RLC PDU. Furthermore, in the case of the first RLC PDU segment on which a segmentation operation has been performed, an RLC header may have the format of 2*h*-10 (if the RLC SN of a 6-bit length is used) or 2*h*-20 (if the RLC SN of a 12-bit length is used) because an SO field is not necessary as described above. However, in the case of a middle segment and last segment produced by performing a segmentation operation, an RLC header format, such as 2*h*-15 (if the RLC SN of a 6-bit length is used) or 2*h*-25 (if the RLC SN of a 12-bit length is used), may be used because an offset needs to be indicated using an SO field. As described above, with respect to a segment on which a segmentation operation has been performed, an RLC SN is necessary. The reason for this is that which segment corresponds to which RLC SN can be identified based on an RLC SN. An Rx stage may generate a complete RLC PDU by performing reassembly based on the identified RLC SN, may perform data processing, and may deliver the RLC SDU to a higher layer.

In the complete RLC PDU, whether or not to use an RLC SN may be set as in FIG. 2E for each bearer or for each logical channel through the RRC message 2*e*-10, 2*e*-40 or 2*e*-75.

Furthermore, in order to reduce unnecessary overhead in the RLC UM of an NR, various embodiments of the present disclosure propose an RLC UM transmitting and receiving window operation method not having a timer in order to efficiently drive a method of using an RLC SN for only an RLC PDU segment (or a segmented RLC PDU) without using an RLC SN for a complete RLC PDU (i.e., a not-segmented RLC PDU).

Figure 2I:
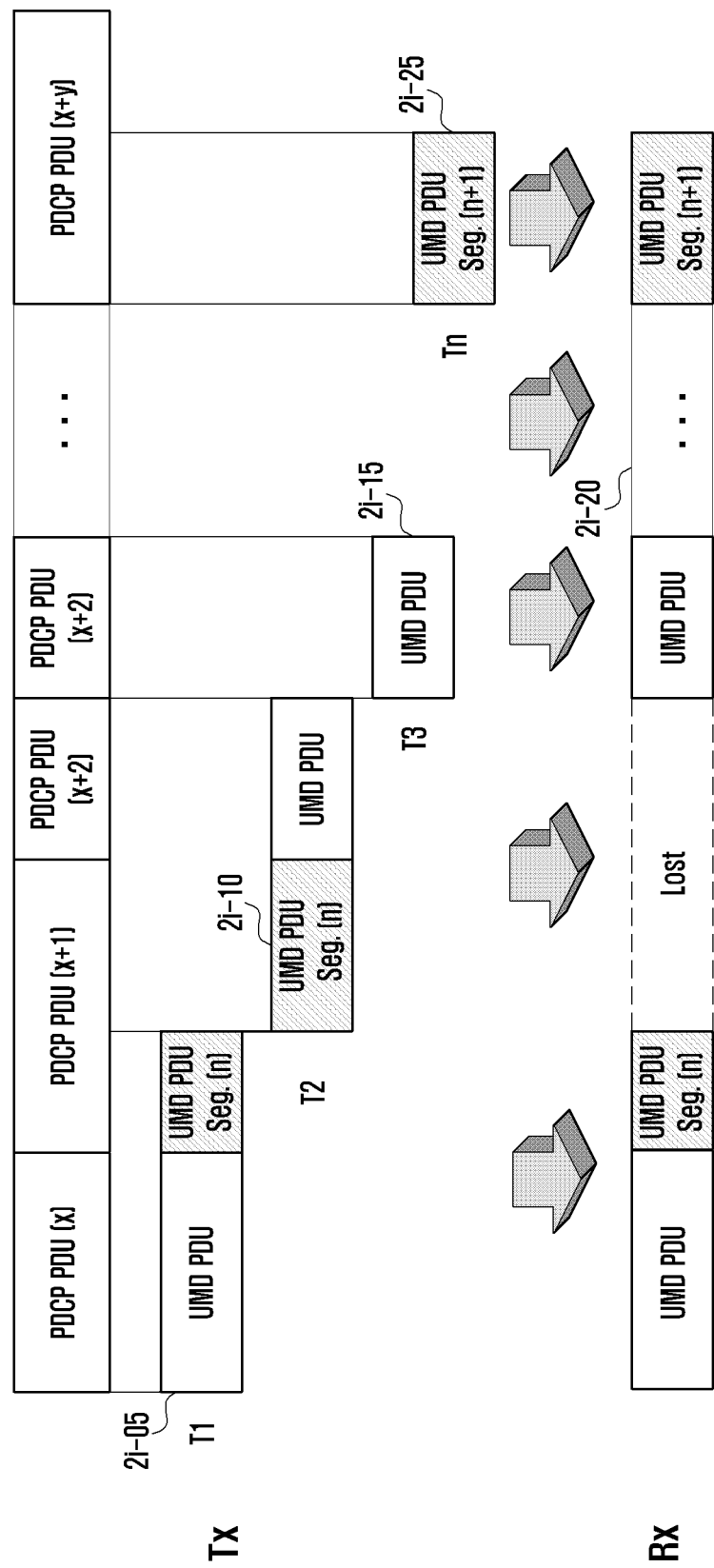
FIG. 2I illustrates a diagram showing a cause why it is difficult to use a timer in the RLC UM transmission and reception operation of a next-generation mobile communication system.

FIG. 2I is a diagram showing a cause why it is difficult to use a timer in the RLC UM transmission and reception operation of an NR.

As proposed above in the present disclosure, in the RLC UM of an NR, a complete RLC PDU (unacknowledged mode data (UMD) PDU) does not have an RLC SN, and only an RLC PDU segment (UMD PDU segment) includes an RLC SN. Accordingly, as in 2*i*-05 of FIG. 2H, a UMD PDU does not have an RLC SN and a UMD PDU segment has an RLC SN.

It is assumed that in a time T1 of FIG. 2I, a UMD PDU and a segmented UMD PDU segment having an RLC SN n have been transmitted as in 2*i*-05 and have been successfully received by an Rx stage. Furthermore, it is assumed that in a time T2, a UMD PDU segment having an RLC SN n, which has been segmented from the UMD PDU, as in 2*i*-10, and another UMD PDU have been transmitted and have not received by an Rx stage. Furthermore, in a time T3, one UMD PDU has been transmitted as in 2*i*-15 and has been successfully received by the Rx stage. Furthermore, only not-segmented UMD PDUs have continued to be subsequently transmitted and have been successfully received by the Rx stage. Furthermore, it is assumed that in a time Tn, a segmentation operation has been performed, a UMD PDU segment having an RLC SN n+1 has been transmitted by the Tx stage as in 2*i*-25 and has been successfully received by the Rx stage.

In such a scenario, it is assumed that a scheme for discarding a UMD PDU segment placed in a buffer based on a timer is applied. Since a UMD PDU segment has been lost in the time T2, the UMD PDU segment received in the time T1 has been placed in the buffer, and it is necessary to determine whether or not to discard the UMD PDU segment received in the time T1 if the UMD PDU segment missed in T2 is not received for a given time (i.e., discard the UMD PDU segment using a timer). The time when the timer may be triggered is as follows.

1. Timer triggering when the UMD PDU segment is received in T1

In this case, the timer may have been triggered although the remaining segment of a UMD PDU to which the UMD PDU segment belongs has not been transmitted by the Tx stage. The UMD PDU segment placed in the buffer is discarded so early because the timer is triggered so early, so an unnecessary loss may occur.

2. Timer triggering when the not-segmented UMD PDU is received in T3

In this case, the timer triggering time is not accurate because the UMD PDU does not have an RLC SN and thus may be a normally received UMD PDU or a UMD PDU that has been duplicated or outdated or that has been reached too late.

3. Timer triggering when a next RLC SN n+1 is received in Tn and a loss of some of a UMD PDU corresponding to the RLC SN n is detected.

In this case, segments may continue to be unnecessarily retained in the buffer because the timer is triggered too late. That is, if a not-segmented UMD PDU continues to be received, the detection of a missed UMD PDU segment may be very late.

As described above, in the RLC UM transmission and reception operation of an NR, it is not preferred to apply the timer because a not-segmented UMD PDU does not include an RLC SN.

However, if the timer is applied, the simplest method is to trigger the timer when a segmented segment is received.

The present disclosure proposes a data transmission operation and data reception operation of RLC UM according to a segmentation method and RLC UM reception method as follows.

A (2-1a) embodiment and (2-1b) embodiment: data transmission operation and data reception operation of RLC UM, which apply an SO-based segmentation method and use only a window as an RLC UM reception method.

A (2-2) embodiment: data transmission operation and data reception operation of RLC UM, which apply an SI-based segmentation method and use only a window as an RLC UM reception method.

A (2-3) embodiment: a data transmission operation and data reception operation of RLC UM, which apply an SO-based segmentation method and use a window and timer as an RLC UM reception method.

Hereinafter, a data transmission operation and data reception operation of RLC UM according to a segmentation method and RLC UM reception method are proposed.

The (2-1a) embodiment and the (2-1b) embodiment: data transmission operation and data reception operation of RLC UM, which apply an SO-based segmentation method and use only a window as an RLC UM reception method.

In order to reduce unnecessary overhead in the RLC UM of an NR, various embodiments of the present disclosure propose an RLC UM transmitting and receiving window operation method not having a timer in order to efficiently drive a method of using an RLC SN for only an RLC PDU segment (or a segmented RLC PDU) without using an RLC SN for a complete RLC PDU (i.e., a not-segmented RLC PDU). In this method, duplication check is not performed based on an RLC SN.

First, window variables to be used for a window operation may be defined as follows.

A transmitting RLC entity may define a Tx state variable "TX_Next_Segment" and assign an RLC SN to a segmented UMD PDU segment.

1) Tx State Variable in TX_Next_Segment-UM

A TX_Next segment indicates an RLC SN value to be assigned to a UMD PDU including a segment of a next RLC SDU, and an initial value thereof may be set to 0. The transmitting RLC entity may update the TX_Next_Segment value whenever the first segment of a UMD PDU corresponding to TX_Next_Segment is delivered to a higher layer or the transmitting RLC entity may update the TX_Next_Segment value whenever the last segment of a UMD PDU corresponding to TX_Next_Segment is delivered to a higher layer (how variable will be updated may be determined according to definition).

(Examples for the Definition for the Window State Variable)

1) TX_Next_Segment-UM Transmit State Variable

This state variable holds the value of the SN to be assigned for a UMD PDU containing a segment of the next RLC SDU. It is initially set to 0, and is updated whenever the UM RLC entity delivers the first segment of a UMD PDU with SN=TX_Next_Segment (It can be updated whenever the UM RLC entity delivers the last segment of a UMD PDU with SN=TX_Next_Segment. It depends on how to define it).

A receiving RLC entity may define a window variable RX_Next_Segment and drive a receiving window with respect to a segmented UMD PDU segment.

2) Reception State Variable Having Highest Sequence Number in RX_Next_Segment-UM RX_Next_Segment indicates a next RLC SN of the highest RLC SN from among received UMD PDU segments. This variable plays a role as an upper window edge of a receiving window and an initial value thereof is set to 0. In the case of STCH, this variable may be reset as the RLC SN of the first received UMD PDU segment.

Each receiving UM RLC entity shall maintain the following state variable.

(Examples for the Definition for the Window State Variable)

2) RX_Next_Segment-UM Highest Received State Variable

This state variable holds the value of the SN following the SN of the UMD PDU with the highest SN among received UMD PDUs containing segment, and it serves as the higher edge of the receive (or reordering) window. It is initially set to 0. For RLC entity configured for STCH, it is initially set to the SN of the first received UMD PDU containing segment.

A transmission operation and reception operation in the RLC UM of are as follows.

1) UM Data Transfer
Transmit Operations
General

An operation may be performed according to one of the (2-1a) embodiment and the (2-1b) embodiment.

(2-1a) Embodiment

When a UMD PDU including a segment is delivered to a lower layer, a transmitting RLC entity operates as follows.
If the UMD PDU has included the first segment,
Assign an RLC SN, such as TX_Next_Segment, to an RLC SDU and increase TX_Next_Segment by 1.
Set the RLC SN of the UMD PDU as the RLC SN of the corresponding RLC SDU.
(Examples for Transmission of UMD PDU)
When delivering an UMD PDU that contains a segment of a RLC SDU, to lower layer, the transmitting side of an UM RLC entity shall:
if the UMD PDU contains the first segment, associate a SN with the RLC SDU equal to TX_Next_Segment and increment TX_Next_Segment by one;
set the SN of the UMD PDU to the SN of the corresponding RLC SDU.

(2-1b) Embodiment

When a UMD PDU including a segment is delivered to a lower layer, a transmitting RLC entity operates as follows.
If the UMD PDU has included the last segment,
Assign an RLC SN, such as TX_Next_Segment, to an RLC SDU and increase TX_Next_Segment by 1.
Set the RLC SN of the UMD PDU as the RLC SN of the corresponding RLC SDU.
(Examples for Transmission of UMD PDU)
When delivering an UMD PDU that contains a segment of a RLC SDU, to lower layer, the transmitting side of an UM RLC entity shall:
if the UMD PDU contains the last segment, associate a SN with the RLC SDU equal to TX_Next_Segment and increment TX_Next_Segment by one;
set the SN of the UMD PDU to the SN of the corresponding RLC SDU.

2) Receive Operations
General

A receiving RLC entity maintains a receiving window as follows based on an RX_Next_Segment state variable.
If an RLC SN is within an (RX_Next_Segment−UM_Window_Size)<=SN<RX_Next_Segment section, the entity determines that the RLC SN is within the window,
If the RLC SN is out of the section, the entity determines the RLC SN is out of the window.
When a UMD PDU including a complete RLC SDU that has not been segmented is received from a lower layer, the actions of a receiving RLC entity are as follows.
After a UMD PDU header is removed, the entity delivers the RLC SDU to a higher layer.
When a UMD PDU including a segmented segment is received from a lower layer, the actions of the receiving RLC entity are as follows.
Store the received UDM PDU in the reception buffer.
Update a related window state variable, perform reassembly, and deliver RLC SDUs to a higher layer.
(Examples for Reception of UMD PDU)
The receiving UM RLC entity shall maintain a receive (or reordering) window according to state variable RX_Next_Segment as follows:

a SN falls within the receive (or reordering) window if (RX_Next_Segment−UM_Window_Size) <=SN<RX_Next_Segment;

a SN falls outside of the receive (or reordering) window otherwise.

When receiving an UMD PDU that contains a complete RLC SDU, from lower layer, the receiving UM RLC entity shall:

deliver RLC SDU to the upper layer after removing UMD PDU header

When receiving an UMD PDU that contains a segment of a RLC SDU, from lower layer, the receiving UM RLC entity shall:

place the received UMD PDU in the reception buffer:
update state variable, reassemble and deliver RLC SDUs to upper;

3) Actions of Reception RLC Entity when UMD PDU is Placed in Reception Buffer

When a UMD PDU having an RLC SN x is placed in the reception buffer, the receiving RLC entity operates as follows.

If the RLC SN x is out of a window,
Update RX_Next_Segment with x+1,
Discard UMD PDUs moved by the updated RX_Next_Segment variable and out of the receiving window.
The entity attempts reassembly with other UMD PDU segments placed in the buffer with respect to the received UMD PDU. If the reassembly is possible, the entity configures a complete RLC SDU, removes a UMD PDU header, and delivers reassembled RLC SDUs to a higher layer in sequence (if necessary, the RLC SDUs are not delivered in sequence, but may be delivered in order that they are reassembled).

(Examples for the Actions when an UMD PDU is Placed in the Reception Buffer)

When an UMD PDU with SN=x is placed in the reception buffer, the receiving UM RLC entity shall:

if x falls outside of the receive (or reordering) window:
update RX_Next_Segment to x+1;
discard any UMD PDUs that falls outside of the reordering window;
reassemble RLC SDUs from any UMD PDUs, remove UMD PDU header when doing so and deliver the reassembled RLC SDUs to upper layer in ascending order of the RLC SN.

Figure 2J:
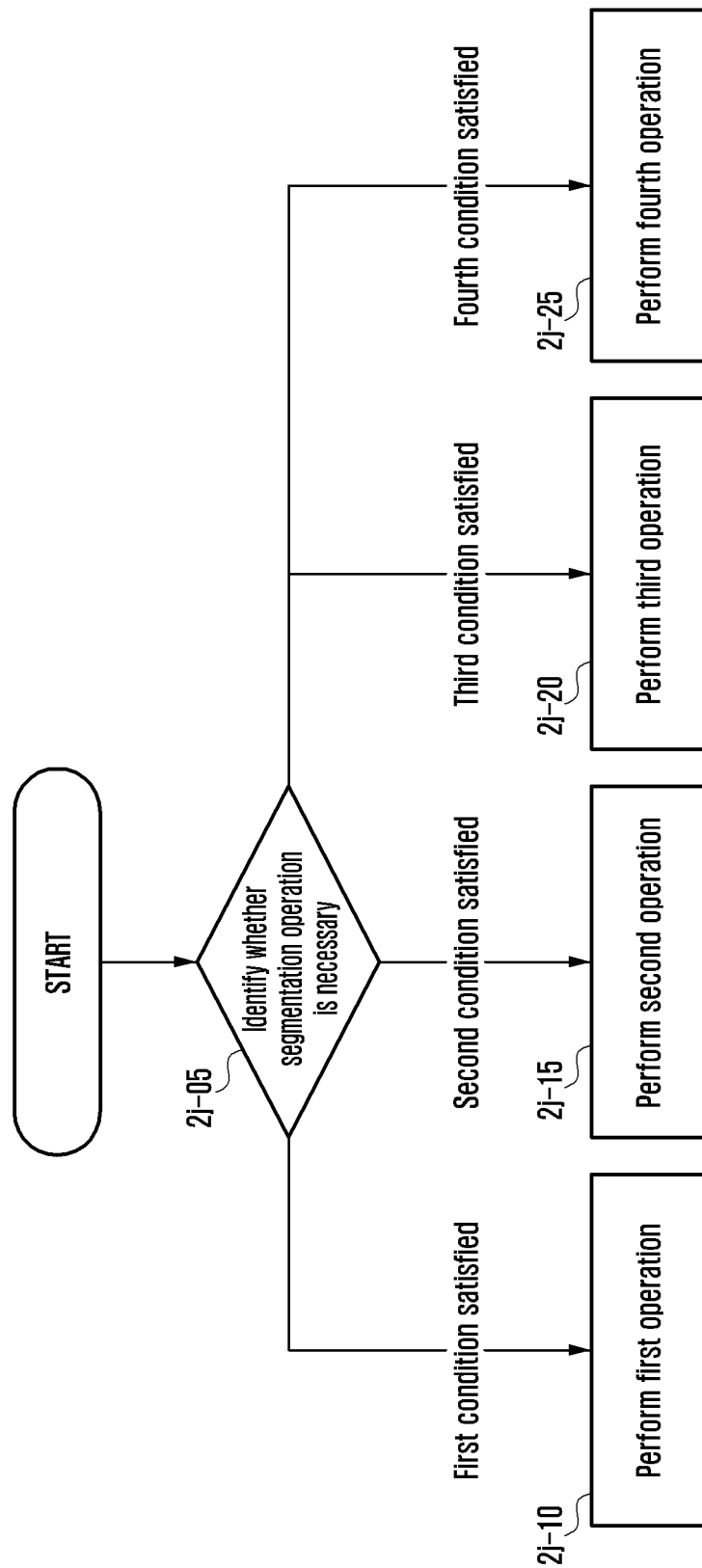
FIG. 2J illustrates a diagram showing a transmission operation of an RLC UM UE according to a second embodiment of the present disclosure.

FIG. 2J is a diagram showing a transmission operation of an RLC UM UE according to a second embodiment of the present disclosure.

The UE may perform a segmentation operation when a request necessary to perform the segmentation operation on an RLC SDU (PDCP PDU) received from a higher layer is received from a lower layer in the RLC UM. Furthermore, in the case of an RLC PDU whose RLC header has already been configured and which has been transmitted to a lower layer, when there is a segmentation request from the lower layer, the UE may perform the segmentation operation, may newly configure or update an RLC header, and may deliver an RLC PDU back to the lower layer. When the UE configures the RLC header of the RLC SDU, first, the UE identifies whether there is a need for the segmentation operation (2j-05). If there is a need for the segmentation operation, the UE assigns different RLC SNs to respective RLC SDUs on which the segmentation operation is performed and assigns the same RLC SN to segments belonging to the same RLC SDU.

If a first condition is satisfied, the UE performs a first operation (2j-10).

If a second condition is satisfied, the UE performs a second operation (2j-15).

If a third condition is satisfied, the UE performs a third operation (2j-20).

If a fourth condition is satisfied, the UE performs a fourth operation (2j-25).

The first condition refers to a case where a segmentation operation is not performed on an RLC SDU because the segmentation operation is not necessary for the RLC SDU.

The second condition refers to a case where an RLC header for the first RLC SDU segment needs to be configured after a segmentation operation is performed because the segmentation operation is necessary for an RLC SDU.

The third condition refers to a case where an RLC header for the middle RLC SDU segment not the first and last RLC SDUs needs to be configured after a segmentation operation is performed because the segmentation operation is necessary for an RLC SDU.

The fourth condition refers to a case where an RLC header for the last RLC SDU segment needs to be configured after a segmentation operation is performed because the segmentation operation is necessary for an RLC SDU.

The first operation refers to an operation for the UE to not use an RLC SN, to configure a 1-byte RLC header, and to set an SI field to 00 when configuring the 1-byte RLC header. Furthermore, a current TX_Next_Segment value is retained.

The second operation refers to an operation for the UE to set an SI field to 01 when configuring an RLC header and to assign the RLC SN of an RLC SDU to which belongs to an RLC SDU segment as the RLC SN of the RLC SDU segment. If the (1-1) embodiment is applied, a current TX_Next_Segment value is increased by 1. If the (1-2) embodiment is applied, a current TX_Next_Segment value is retained.

The third operation refers to an operation for the UE to set an SI field to 11 when configuring an RLC header and to assign the RLC SN of an RLC SDU to which an RLC SDU segment belongs as the RLC SN of the RLC SDU segment.

The fourth operation refers to an operation for the UE to set an SI field to 10 when configuring an RLC header and to assign the RLC SN of an RLC SDU to which an RLC SDU segment belongs as the RLC SN of the RLC SDU segment. If the (1-1) embodiment is applied, a current TX_Next_Segment value is retained. If the (1-2) embodiment is applied, a current TX_Next_Segment value is increased by 1.

Figure 2K:
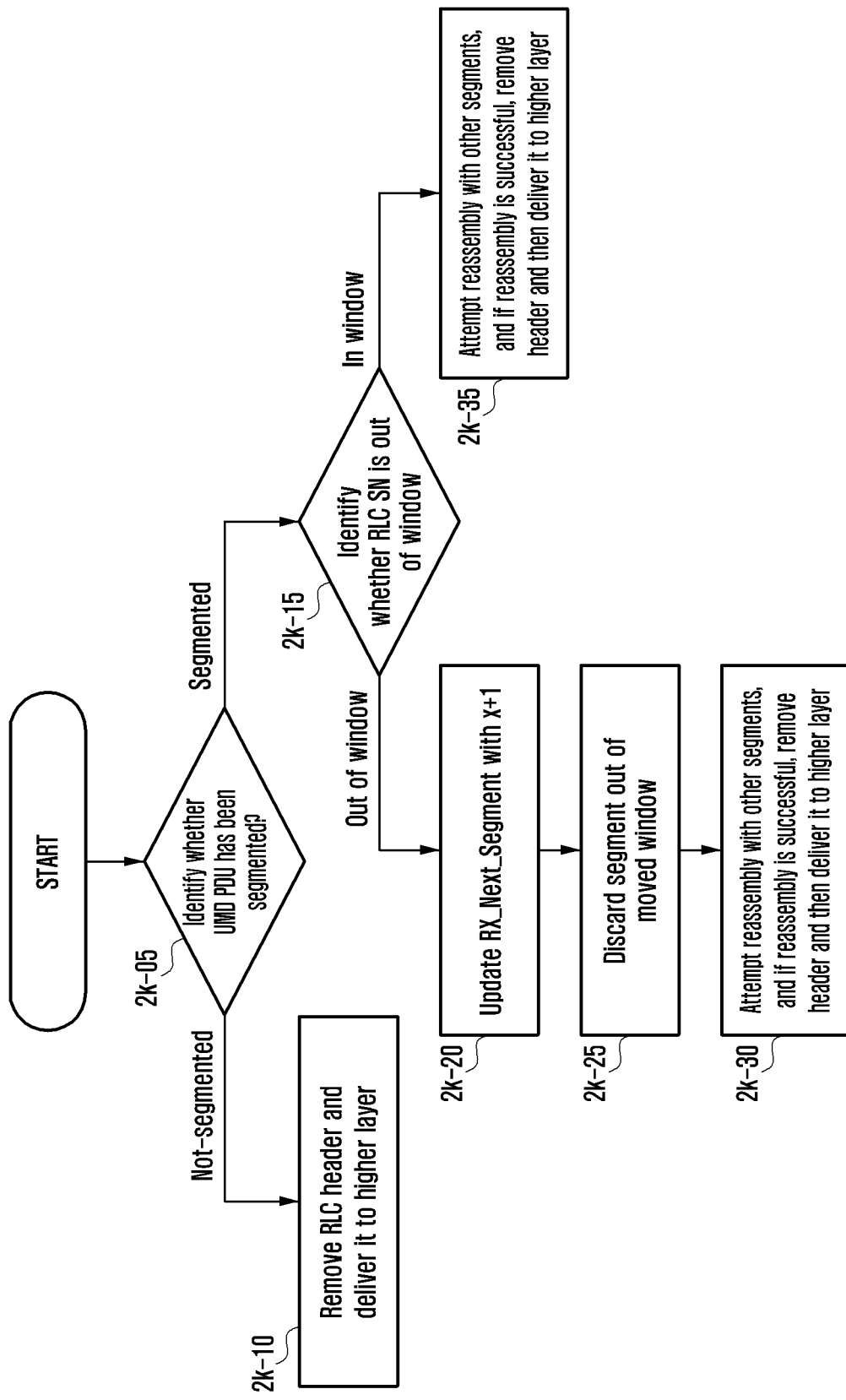
FIG. 2K illustrates a diagram showing a reception operation of an RLC UM UE according to a second embodiment of the present disclosure.

FIG. 2K is a diagram showing a reception operation of an RLC UM UE according to a second embodiment of the present disclosure.

In FIG. 2K, when a receiving RLC entity receives a UMD PDU from a lower layer, first, it identifies whether the UMD PDU has been segmented (2k-05). If the UMD PDU including a complete RLC SDU that has not been segmented is received from the lower layer, the actions of the receiving RLC entity are as follows. After removing a UMD PDU header, the receiving RLC entity delivers the RLC SDU to a higher layer (2k-10). If the UMD PDU including a segmented segment is received from a lower layer, the receiving RLC entity identifies whether the RLC SN of the received UMD PDU has been out of a window (2k-15). If an RLC SN x is out of the window, the receiving RLC entity updates RX_Next_Segment with x+1 (2k-20) and discards UMD PDUs out of a receiving window moved by an updated RX_Next_Segment variable (2k-25). The receiving RLC entity attempts reassembly with other UMD PDU segments placed in the buffer with respect to the received UMD PDU. If the reassembly is possible, the receiving RLC entity configures a complete RLC SDU, removes a UMD PDU header, and delivers the reassembled RLC SDUs to a higher layer in sequence (if necessary, the RLC SDUs are not delivered in sequence, but may be delivered in order that they are reassembled) (2k-30). If the RLC SN of the received UMD PDU has not been out of the window, the receiving RLC entity attempts reassembly with other UMD PDU segments placed in the buffer with respect to the received UMD PDU. If the reassembly is possible, the receiving RLC entity configures a complete RLC SDU, removes a UMD PDU header, and delivers the reassembled RLC SDUs to a higher layer in sequence (if necessary, the RLC SDUs are not delivered in sequence, but may be delivered in order that they are reassembled) (2k-35).

The transmitting and receiving window operation of the RLC UM in an NR when the SO-based segmentation method described in FIG. 2F is applied has been proposed above. A transmitting and receiving window operation of the RLC UM in an NR when the SI-based segmentation method according to various embodiments of the present disclosure is applied are described below.

A (2-2) embodiment: a data transmission operation and data reception operation of RLC UM, which applies the SI-based segmentation method and uses only a window as an RLC UM reception method.

Figure 2L:
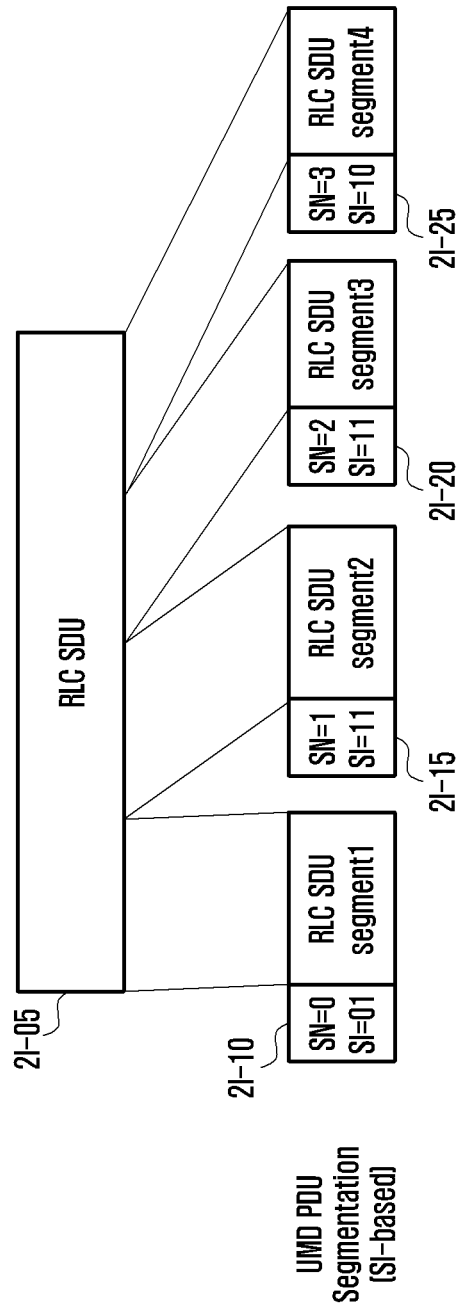
FIG. 2L is a diagram illustrating an SI field-based segmentation method proposed for the RLC UM according to a second embodiment of the present disclosure.

FIG. 2L is a diagram illustrating an SI field-based segmentation method proposed for the RLC UM according to a second embodiment of the present disclosure.

The SI field-based segmentation method proposed in FIG. 2L has an advantage in that an SO field is not necessary, that is, overhead is very small, compared to the SO field- and SI field-based segmentation method proposed in FIG. 2F. That is, overhead is reduced and the waste of a transmission resource can be reduced because an SO field corresponding to 2 bytes is not necessary.

The greatest difference between the segmentation method of FIG. 2F and the SI field-based segmentation method of FIG. 2L includes two points.

1. Assignment of an RLC SN: In FIG. 2F, although several segments are generated through a segmentation operation for one RLC PDU, they have the same RLC SN. That is, although four segments of a segment 1, a segment 2, a segment 3 and a segment 4 are generated by performing a segmentation operation on one RLC PDU, the four segments have the same RLC SN. The four segments may be classified by indicating an offset in the SO field of each segment. In contrast, in the SI field-based segmentation method of FIG. 2L, as described above, when four segments 2l-10, 2l-15, 2l-20 and 2l-25 are generated with respect to one RLC PDU 2l-05, different RLC SNs are assigned to the four segments. That is, RLC SNs 0, 1, 2 and 3 are assigned to the respective segments, and SI fields are set in the four segments depending on the first segment, the middle segment, and the last segment. Accordingly, the sequence of each segment may be identified based on the SI field. If three or more segments are generated, several segments (i.e., segments having the same SI field) in the middle may be classified in order of RLC SNs. Accordingly, an Rx stage can perform reassembly by only a combination of the RLC SNs and the SI fields (without an SO field).

2. An SO field not used: In FIG. 2F, segments need to be identified using SO fields because the same RLC SN is assigned to the segments. In FIG. 2L, an SO field is not necessary because different RLC SNs are assigned to segments and an SI field is also set.

Referring to Table 3, the SI field may be defined as follows or may be called a different name.

TABLE 3

| Value | Description |
| --- | --- |
| 00 | Complete RLC PDU |
| 01 | First segment of RLC PDU |
| 10 | Last segment of RLC PDU |
| 11 | Middle segment of RLC PDU |

If the SI field is 00, it indicates a complete RLC PDU that has not been segmented. If the SI field is 01, it indicates the first RLC PDU segment that has been segmented. If the SI field is 10, it indicates the last RLC PDU segment that has been segmented. If the SI field is 11, it indicates the middle RLC PDU segment that has been segmented. A mapping relation between the 2-bit and the four types of information (i.e., the complete RLC PDU, the first segment, the last segment and the middle segment) may have a total of 4×3×2×1=24 types. Table 3 shows an example of the 24 types. The present disclosure includes all of the 24 cases mapping relation.

Figure 2M:
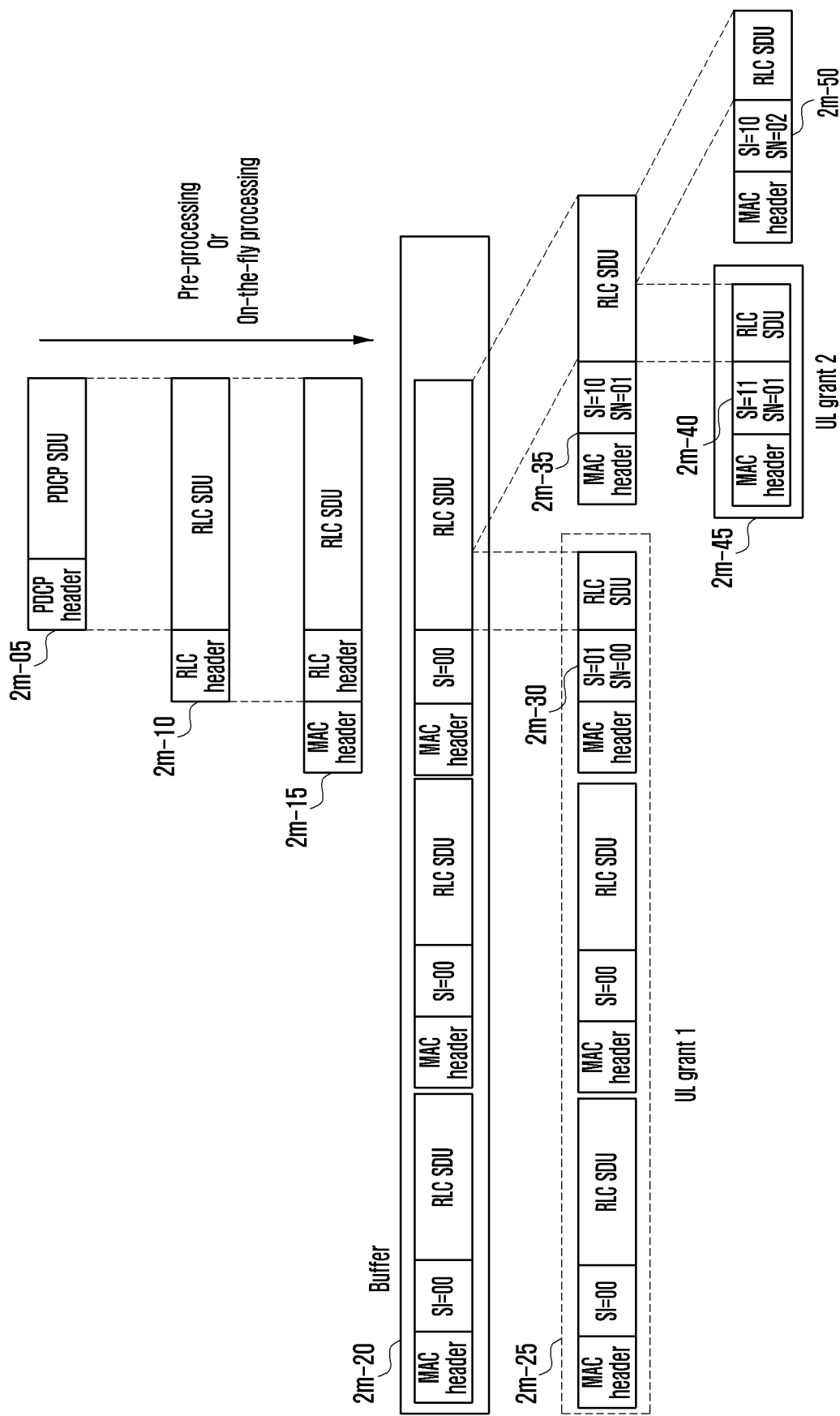
FIG. 2M illustrates a diagram showing a data processing operation to which the SI-based segmentation method of the RLC UM according to the second embodiment of the present disclosure has been applied.

FIG. 2M is a diagram showing a data processing operation to which the SI-based segmentation method of the RLC UM according to the second embodiment of the present disclosure has been applied.

In FIG. 2M, when an IP packet arrives at a PDCP layer, a PDCP header may be attached to the IP packet, and a PDCP PDU (or RLC SDU) 2m-05 may be delivered to an RLC layer. The RLC UM proposed in the present disclosure is characterized in that an RLC SN is not assigned to an RLC PDU on which a segmentation operation has not been performed. Accordingly, the RLC layer may complete an RLC PDU 2m-10 by first configuring an RLC header without assigning an RLC SN, and may deliver the RLC PDU to a MAC layer. The MAC layer may configure a MAC subheader 2m-15 by calculating the size of a MAC SDU (or RLC PDU), configuring an L field and configuring a corresponding logical channel identifier, and may place the MAC subheader in a buffer 2m-20. Accordingly, according to such a method, the PDCP layer may perform data pre-processing on received data packets before it receives a transmission resource (UL grant) from a gNB, and may place the data packets in the buffer. Alternatively, the PDCP layer may perform data processing (on-the-fly processing) on the received data packets right after it receives a transmission resource. If an uplink transmission resource (UL grant 1) 2m-25 has been received from a gNB, but a segmentation operation needs to be performed because the uplink transmission resource is not sufficient, the PDCP layer may assign different RLC SNs to the RLC headers of segments, respectively, as in 2m-30, may set SI fields in the segments depending on whether the segment is the first segment, middle segment or last segment with respect to the original RLC PDU, and may newly configure the RLC headers of the segments (2m-30, 2m-35). Furthermore, the PDCP layer may configure a MAC PDU suitable for the uplink transmission resource and transmit it. If a second uplink transmission resource (UL grant 2) 2m-45 has been received, but a segmentation operation needs to be performed again because the size of the transmission resource is insufficient, the PDCP layer applies the same RLC SN as that of the original segment to the first segment re-segmented from the original segment as in 2m-40, and performs updates on the SI fields depending on the first segment, middle segment or last segment with respect to the original RLC PDU. Furthermore, the PDCP layer may assign a new RLC SN to a newly segmented segment as in 2m-50, may set an SI field in a segment generated by performing a segmentation operation depending on whether the corresponding segment is the first segment, middle segment or last segment with respect to the original RLC PDU, and may newly configure an RLC header.

Accordingly, it may be seen that the transmission and reception operation may well operate even in a data pre-processing procedure in the RLC UM of FIG. 2H proposed in the present disclosure as described above.

Figure 2N:
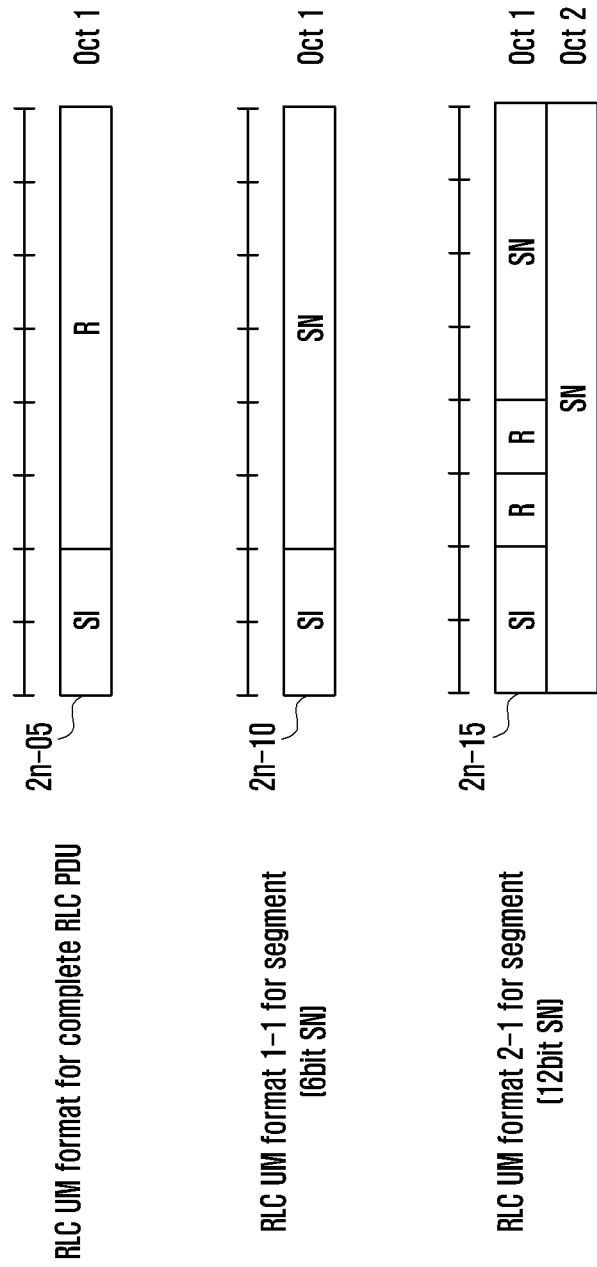
FIG. 2N shows RLC header formats which may be applied in the RLC UM according to a second embodiment of the present disclosure.
Figure 20:
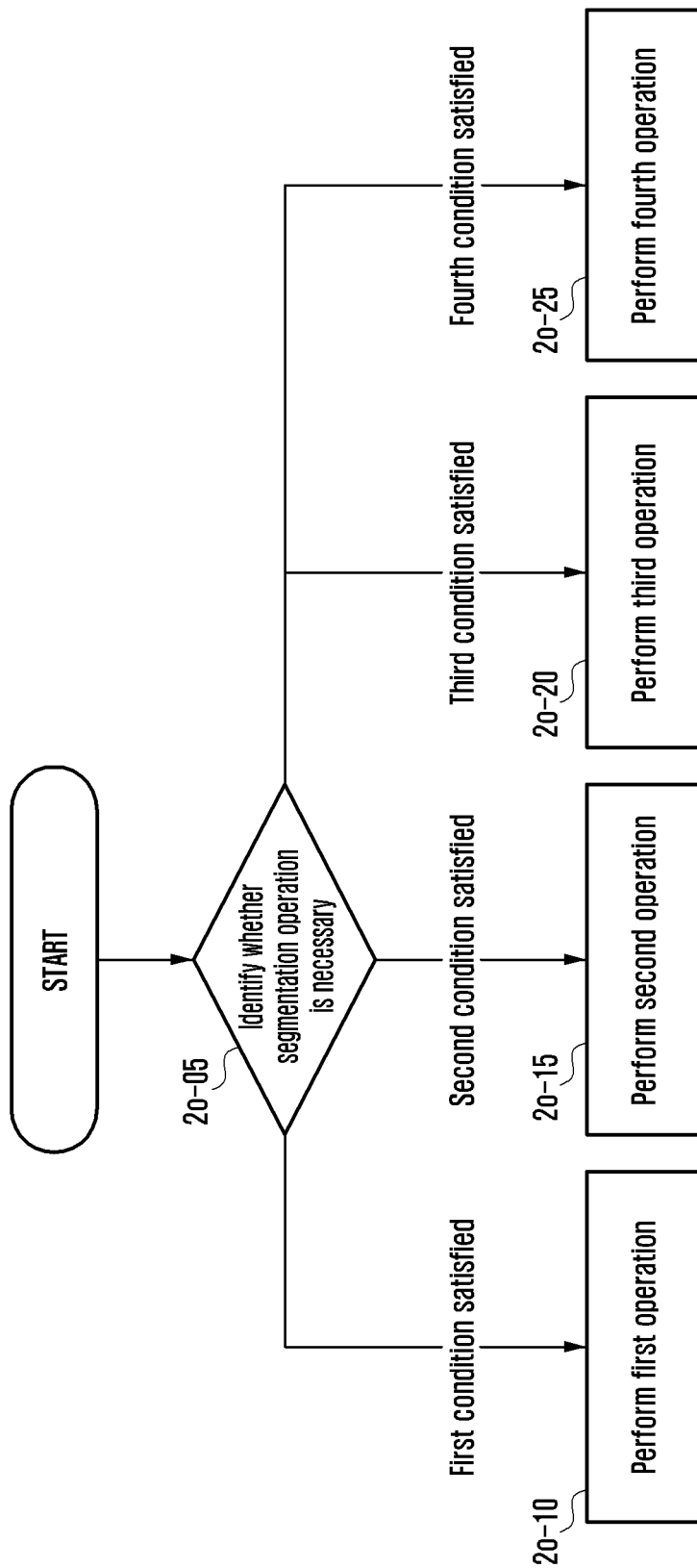

FIG. 2N shows RLC header formats which may be applied in the RLC UM according to a second embodiment of the present disclosure.

FIG. 2N shows RLC header formats when a sequence number of a 6-bit or 12-bit length is used as in the SI field-based segmentation operation of FIG. 2H if the RLC UM (if the ARQ is no supported) is used in the present disclosure.

The RLC header format may include some of the fields described in FIG. 2H or another new field, and may have a different structure depending on the length of each field, such as a different RLC SN length, or the location of each field. R refers a reserved bit, and the RLC header format may not include an RF field and an E field. The SI field functions to indicate a complete RLC PDU on which a segmentation operation has not been performed and the first segment, middle segment and last segment on which a segmentation operation has been performed, as described in FIG. 2L.

In the case of the RLC UM proposed in the present disclosure, an RLC SN does not need to be used for a complete RLC PDU (i.e., an RLC PDU on which a segmentation operation has not been performed). The reason why an RLC SN is necessary is several. That is, an RLC SN is necessary for sequence reordering, duplication check, lost packet detection and ARQ function support, and a segmented segment reassembly. However, in the NR, sequence reordering does not need to be performed in the RLC layer, and duplication check may be instead performed in the PDCP layer. In the RLC UM, lost packet detection and ARQ function are not supported. Accordingly, an RLC SN is necessary for only a segmented RLC PDU segment. Accordingly, an RLC SN is not necessary for a complete RLC PDU.

Various embodiments of the present disclosure propose that in the case of the RLC UM, an RLC SN is not used, but a header format, such as 2n-05, is used in a complete RLC PDU. That is, a Tx stage may indicate the SI field of the header 2n-05 by 00 with respect to an RLC PDU on which a segmentation operation is not performed, and may indicate that there is no RLC SN by indicating that the RLC PDU is a complete RLC PDU. An Rx stage may identify the SI field of the header and may be aware that an RLC SN is not present if the SI field is 00. Accordingly, the header structure is not related to the length of an RLC SN. A 1-byte header, such as 2n-05, may be used for a complete RLC PDU. Furthermore, in the case of the first RLC PDU segment on which a segmentation operation has been performed, as described above, an RLC header may have a format of 2n-10 (if the RLC SN of a 6-bit length is used) or 2n-15 (if the RLC SN of a 12-bit length is used) by assigning an RLC SN. In contrast, in the case of a middle segment and the last segment on which a segmentation operation has been performed, new contiguous RLC SNs not the same RLC SN may be assigned, corresponding SI fields may be configured based on respective segments, and RLC header formats, such as 2n-10 (if the RLC SN of a 6-bit length is used) and 2n-15 (if the RLC SN of a 12-bit length is used), may be used. As described above, an RLC SN is necessary for a segment on which a segmentation operation has been performed. The reason for this is that it is possible to determine that which segments are segments having the sequence of which RLC SNs only when the RLC SNs are present. Accordingly, the Rx stage may generate a complete RLC PDU by performing reassembly based on the RLC SNs, may perform data processing, and may deliver RLC SDUs to a higher layer. Accordingly, the Rx stage ca reassemble segmented segments into a complete RLC PDU using RLC SNs and SI fields.

In the complete RLC PDU, whether or not to use the RLC SNs may be set as in FIG. 2E for each bearer or for each logical channel through the RRC message 2e-10, 2e-40 or 2e-75.

In the RLC UM according to various embodiments of the present disclosure, a Tx stage operation of applying an SI-based segmentation method without using a sequence number is as follows.

In a Tx stage RLC layer entity, if an RLC SN is configured to be not used, the Tx stage may perform transmission by attaching a 1-byte RLC header, such as 2n-05 not having an RLC SN, to an RLC SDU on which the segmentation operation has not been performed (i.e., performing an operation of setting an SI field to 00 when configuring an RLC header and configuring an RLC header) and delivering the RLC SDU to a lower layer. However, if a segmentation operation has been performed on an RLC SDU even in the case where an RLC SN has been configured to be not used in order to reduce overhead, an RLC SN needs to be added and an SI field needs to be set, as described in FIG. 2H. The reason why new contiguous RLC SNs are assigned to segmented RLC SDUs for each segment and SI fields are set to form an RLC header is that an Rx stage ca receive the segmented RLC SDU segments and restore a complete RLC SDU by reassembling them. Accordingly, in the RLC UM, if a segmentation operation has been performed even in the case where an RLC SN has been configured to be not used, an RLC header, such as 2n-10 or 2n-15, needs to be applied.

In summary, depending on whether a segmentation operation has been performed on an RLC SDU, that is, in the case of an RLC SDU on which a segmentation operation has not been performed, the Tx stage attaches a 1-byte RLC header, such as 2n-05 not having an RLC SN, to the RLC SDU, and transmits the RLC SDU to a lower layer. In the case of an RLC SDU on which a segmentation operation has been performed, as described above, the Tx stage updates a corresponding SI field depending on the type (i.e., first, middle or last) of segmented segment, configures an RLC header by adding different contiguous RLC SNs to respective segments in sequence, and delivers a completed RLC SDU to a lower layer.

In the RLC UM according to various embodiments of the present disclosure, an Rx stage operation for the Tx stage operation of applying an SI-based segmentation method without using a sequence number is as follows.

An Rx stage RLC layer entity receives an RLC PDU, identifies an SI field in an RLC header, and identifies whether the received RLC PDU is an RLC PDU on which a segmentation operation has not been performed (i.e., a complete RLC PDU) or an RLC PDU on which a segmentation operation has been performed (i.e., a segment). If the received RLC PDU is an RLC SDU on which a segmentation operation has not been performed, the Rx stage RLC layer entity may delete an RLC header and uploads it to a higher layer. If the received RLC PDU is an RLC SDU on which a segmentation operation has been performed, the Rx stage RLC layer entity may identify an SI field, may determine that a corresponding segment is the first, middle or last segment, may place and list the segments according to RLC SNs by taking the RLC SNs into consideration, may generate a complete RLC SDU by reassembling RLC SDU segments when a reassembly function is triggered by a window or timer, and may deliver the complete RLC SDU to a higher layer. If the reassembly is impossible, the Rx stage RLC layer entity discards the RLC SDU segments (or when the timer expires, the Rx stage RLC layer entity may discard packets placed in the buffer).

Hereinafter, in order to reduce unnecessary overhead in the RLC UM of an NR when an SI-based segmentation method proposed in FIG. 2L is applied, there is proposed an RLC UM transmitting and receiving window operation method not having a timer in order to efficiently drive a method of using an RLC SN for only an RLC PDU segment (or a segmented RLC PDU) without using an RLC SN for a complete RLC PDU (i.e., a not-segmented RLC PDU). Furthermore, in this method, duplication check is not performed based on an RLC SN.

First, window variables to be used in the window operation may be defined as follows.

A transmitting RLC entity may define a Tx state variable TX_Next_Segment and assign an RLC SN to a segmented UMD PDU segment.

1) Tx State Variable in TX_Next_Segment-UM
A TX_Next segment indicates an RLC SN value to be assigned to a UMD PDU including a segment of a next RLC SDU, and an initial value thereof may be set to 0. The transmitting RLC entity may update a TX_Next_Segment value whenever the first segment of a UMD PDU corresponding to TX_Next_Segment is delivered to a higher layer or may update the TX_Next_Segment value whenever the last segment of a UMD PDU corresponding to TX_Next_Segment is delivered to a higher layer (how the variable will be updated may be determined by definition).

(Examples for the Definition for the Window State Variable)
1) TX_Next_Segment-UM Transmit State Variable
This state variable holds the value of the SN to be assigned for a UMD PDU containing a segment of the next RLC SDU. It is initially set to 0, and is updated whenever the UM RLC entity delivers the first segment of a UMD PDU with SN=TX_Next_Segment (It can be updated whenever the UM RLC entity delivers the last segment of a UMD PDU with SN=TX_Next_Segment. It depends on how to define it).

A receiving RLC entity may define a window variable RX_Next_Segment and drive a receiving window with respect to a segmented UMD PDU segment.

2) Reception State Variable Having Highest Sequence Number in RX_Next_Segment-UM
RX_Next_Segment indicates a next RLC SN of the highest RLC SN from among received UMD PDU segments. This variable plays a role as an upper window edge of a receiving window and an initial value thereof is set to 0. In the case of STCH, this variable may be reset as the RLC SN of the first received UMD PDU segment.

Each receiving UM RLC entity shall maintain the following state variable:
(Examples for the Definition for the Window State Variable)
2) RX_Next_Segment-UM Highest Received State Variable
This state variable holds the value of the SN following the SN of the UMD PDU with the highest SN among received UMD PDUs containing segment, and it serves as the higher edge of the receive (or reordering) window. It is initially set to 0. For RLC entity configured for STCH, it is initially set to the SN of the first received UMD PDU containing segment.

In the RLC UM of an NR, transmit operations and receive operations are as follows.

1) UM Data Transfer
Transmit Operations
General
When a UMD PDU including a segment is delivered to a lower layer, the transmitting RLC entity operates as follows.
The RLC SN of the UMD PDU including a segment is set as TX_Next_Segment and TX_Next_Segment value is increased by 1.
(Examples for Transmission of UMD PDU)
When delivering an UMD PDU that contains a segment of a RLC SDU, to lower layer, the transmitting side of an UM RLC entity shall:
set the SN of a UMD PDU containing a segment to TX_Next_Segment, and then increment TX_Next_Segment by one.

2) Receive Operations
General
A receiving RLC entity retains a receiving window as follows based on an RX_Next_Segment state variable.
If an RLC SN is within (RX_Next_Segment−UM_Window_Size)<=SN<RX_Next_Segment section, the receiving RLC entity determines that the RLC SN is within the window,
If the RLC SN is out of the section, the receiving RLC entity determines the RLC SN is out of the window.
When a UMD PDU including a complete RLC SDU that has not been segmented is received from a lower layer, the actions of the receiving RLC entity are as follows.
After removing a UMD PDU header, the receiving RLC entity delivers the RLC SDU to a higher layer.
When a UMD PDU including a segmented segment is received from a lower layer, the actions of the receiving RLC entity are as follows.
Store the received UDM PDU in the reception buffer.
Update a related window state variable, reassemble RLC SDUs, and deliver the RLC SDUs to a higher layer.
(Examples for Reception of UMD PDU)
The receiving UM RLC entity shall maintain a receive (or reordering) window according to state variable RX_Next_Segment as follows:
a SN falls within the receive (or reordering) window if (RX_Next_Segment−UM_Window_Size)
<=SN<RX_Next_Segment;
a SN falls outside of the receive (or reordering) window otherwise.
When receiving an UMD PDU that contains a complete RLC SDU, from lower layer, the receiving UM RLC entity shall:
deliver RLC SDU to the upper layer after removing UMD PDU header When receiving an UMD PDU that contains a segment of a RLC SDU, from lower layer, the receiving UM RLC entity shall:
  place the received UMD PDU in the reception buffer:
  update state variable, reassemble and deliver RLC SDUs to upper;
3) Actions of Receiving RLC Entity when UMD PDU is Placed in Reception Buffer When a UMD PDU having an RLC SN x is placed in the reception buffer, the receiving RLC entity operates as follows.
  If an RLC SN x is out of a window,
    Update RX_Next_Segment with x+1,
    Discard UMD PDUs out of a receiving window moved by the updated RX_Next_Segment variable.
  Attempt reassembly on other UMD PDU segments placed in the buffer with respect to a received UMD PDU, configure a complete RLC SDU if the reassembly is possible, remove a UMD PDU header, and deliver the reassembled RLC SDUs to a higher layer in sequence (if necessary, the RLC SDUs are not delivered in sequence, but may be delivered in order that they are reassembled).

(Examples for the Actions when an UMD PDU is Placed in the Reception Buffer)

When an UMD PDU with SN=x is placed in the reception buffer, the receiving UM RLC entity shall:
  if x falls outside of the receive (or reordering) window:
    update RX_Next_Segment to x+1;
    discard any UMD PDUs that falls outside of the reordering window;
  reassemble RLC SDUs from any UMD PDUs, remove UMD PDU header when doing so and deliver the reassembled RLC SDUs to upper layer in ascending order of the RLC SN.

FIG. 2O is a diagram showing a transmission operation of an RLC UM UE when the SI-based segmentation method according to the second embodiment of the present disclosure is applied.

The UE may perform a segmentation operation when a request necessary to perform the segmentation operation on an RLC SDU (PDCP PDU) received from a higher layer is received from a lower layer in the RLC UM. Furthermore, in the case of an RLC PDU whose RLC header has already been configured and which has been transmitted to a lower layer, when there is a segmentation request from the lower layer, the UE may perform the segmentation operation, may newly configure or update an RLC header, and may deliver an RLC PDU back to the lower layer. When the UE configures the RLC header of the RLC SDU, first, the UE identifies whether there is a need for the segmentation operation (2o-05). If there is a need for the segmentation operation, the UE assigns different RLC SNs to respective RLC SDUs on which the segmentation operation is performed and assigns the same RLC SN to segments belonging to the same RLC SDU.

If a first condition is satisfied, the UE performs a first operation (2o-10).

If a second condition is satisfied, the UE performs a second operation (2o-15).

If a third condition is satisfied, the UE performs a third operation (2o-20).

If a fourth condition is satisfied, the UE performs a fourth operation (2o-25).

The first condition refers to a case where a segmentation operation is not performed on an RLC SDU because the segmentation operation is not necessary for the RLC SDU.

The second condition refers to a case where an RLC header for the first RLC SDU segment needs to be configured after a segmentation operation is performed because the segmentation operation is necessary for an RLC SDU.

The third condition refers to a case where an RLC header for the middle RLC SDU segment not the first and last RLC SDUs needs to be configured after a segmentation operation is performed because the segmentation operation is necessary for an RLC SDU.

The fourth condition refers to a case where an RLC header for the last RLC SDU segment needs to be configured after a segmentation operation is performed because the segmentation operation is necessary for an RLC SDU.

The first operation refers to an operation for the UE to not use an RLC SN, to configure a 1-byte RLC header, and to set an SI field to 00 when configuring the 1-byte RLC header. Furthermore, a current TX_Next_Segment value is retained.

The second operation refers to an operation of setting an SI field to 01 when configuring an RLC header and assigning a current TX_Next_Segment value as an RLC SN. Furthermore, a current TX_Next_Segment value is increased by 1 and stored as a new TX_Next_Segment value.

The third operation refers to an operation of setting an SI field to 11 when configuring an RLC header and assigning a current TX_Next_Segment value as an RLC SN. Furthermore, a current TX_Next_Segment value is increased by 1 and stored as a new TX_Next_Segment value.

The fourth operation refers to an operation of setting an SI field to 10 when configuring an RLC header and assigning a current TX_Next_Segment value as an RLC SN. Furthermore, a current TX_Next_Segment value is increased by 1 and stored as a new TX_Next_Segment value.

Figure 2P:
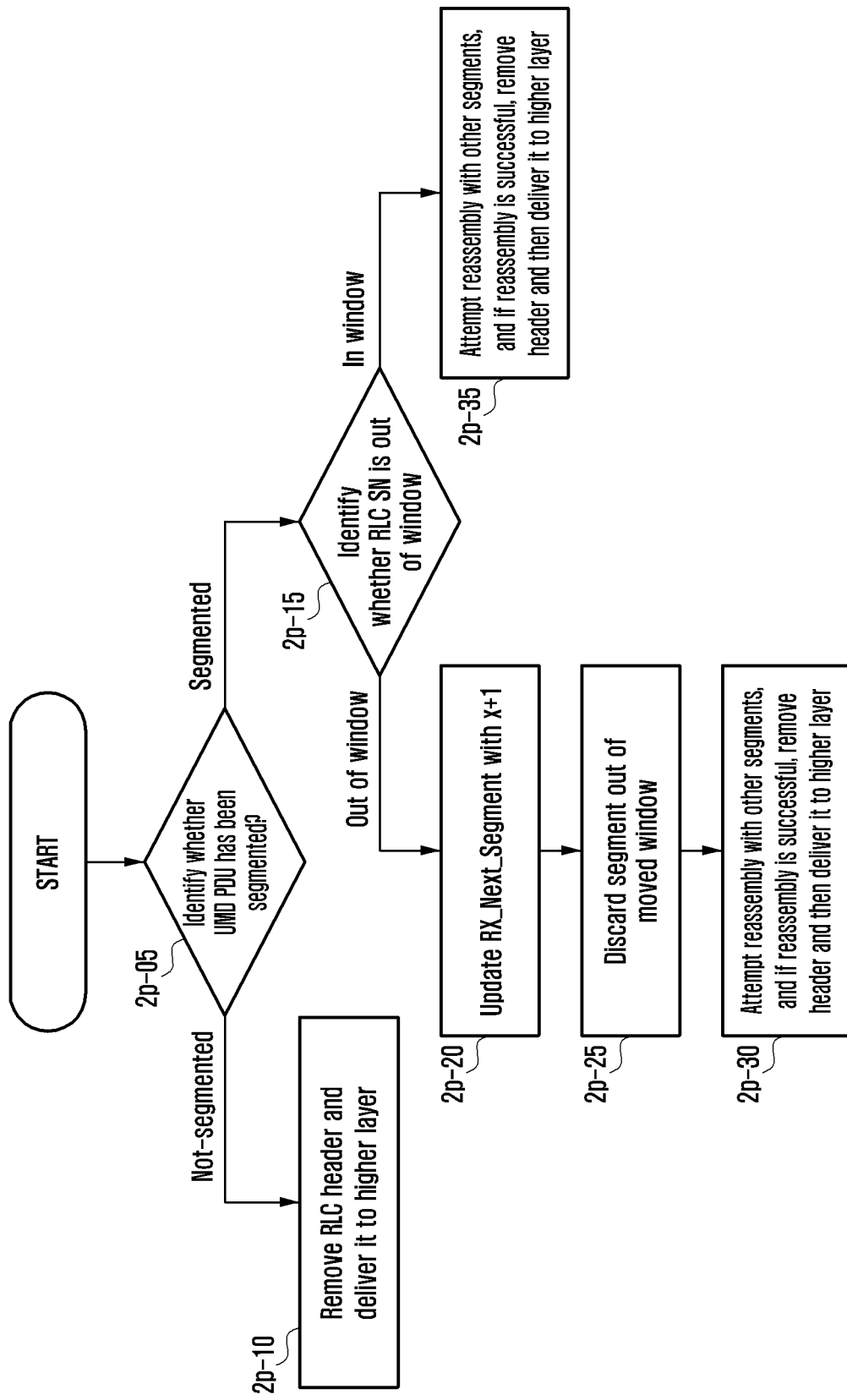
FIG. 2P illustrates a diagram showing the reception operation of an RLC UM UE when the SI-based segmentation method according to the second embodiment of the present disclosure is applied.

FIG. 2P is a diagram showing the reception operation of an RLC UM UE when the SI-based segmentation method according to the second embodiment of the present disclosure is applied.

In FIG. 2P, when a receiving RLC entity receives a UMD PDU from a lower layer, first, it identifies whether the UMD PDU has been segmented (2p-05). If the UMD PDU including a complete RLC SDU that has not been segmented is received from the lower layer, the actions of the receiving RLC entity are as follows. After removing a UMD PDU header, the receiving RLC entity delivers the RLC SDU to a higher layer (2p-10). If the UMD PDU including a segmented segment is received from a lower layer, the receiving RLC entity identifies whether the RLC SN of the received UMD PDU has been out of a window (2p-15). If an RLC SN x is out of the window, the receiving RLC entity updates RX_Next_Segment with x+1 (2p-20) and discards UMD PDUs out of a receiving window moved by an updated RX_Next_Segment variable (2p-25). The receiving RLC entity attempts reassembly with other UMD PDU segments placed in the buffer with respect to the received UMD PDU. If the reassembly is possible, the receiving RLC entity configures a complete RLC SDU, removes a UMD PDU header, and delivers the reassembled RLC SDUs to a higher layer in sequence (if necessary, the RLC SDUs are not delivered in sequence, but may be delivered in order that they are reassembled) (2p-30).

If the RLC SN of the received UMD PDU has not been out of the window, the receiving RLC entity attempts reassembly with other UMD PDU segments placed in the buffer with respect to the received UMD PDU. If the reassembly is possible, the receiving RLC entity configures a complete RLC SDU, removes a UMD PDU header, and delivers the reassembled RLC SDUs to a higher layer in sequence (if necessary, the RLC SDUs are not delivered in sequence, but may be delivered in order that they are reassembled) (2p-35).

Hereinafter, a data transmission operation and data reception operation of RLC UM according to a segmentation method and RLC UM reception method are proposed.

A (2-3) embodiment: a data transmission operation and data reception operation of RLC UM which applies an SO-based segmentation method and uses a window and timer as an RLC UM reception method.

In order to reduce unnecessary overhead in the RLC UM of an NR, various embodiments of the present disclosure propose an RLC UM transmitting and receiving window operation method in which a Tx stage RLC UM entity uses an SO segmentation method and an Rx stage RLC UM entity has a timer in order to efficiently drive a method of using an RLC SN for only an RLC PDU segment (or a segmented RLC PDU) without using an RLC SN for a complete RLC PDU (i.e., a not-segmented RLC PDU). Furthermore, in this method, duplication check is not performed based on an RLC SN.

First, window variables to be used in the window operation may be defined as follows.

The transmitting RLC entity may define a Tx state variable TX_Next_Segment and assign an RLC SN to a segmented UMD PDU segment.

1) TX_Next_Segment—Tx State Variable in UM
A TX_Next segment indicates an RLC SN value to be assigned to a UMD PDU including a segment of a next RLC SDU, and an initial value thereof may be set to 0. The transmitting RLC entity may update a TX_Next_Segment value whenever the first segment of a UMD PDU corresponding to TX_Next_Segment is delivered to a higher layer or may update the TX_Next_Segment value whenever the last segment of a UMD PDU corresponding to TX_Next_Segment is delivered to a higher layer (how the variable will be updated may be determined by definition).

(Examples for the Definition for the Window State Variable)

1) TX_Next_Segment—UM Transmit State Variable
This state variable holds the value of the SN to be assigned for a UMD PDU containing a segment of the next RLC SDU. It is initially set to 0, and is updated whenever the UM RLC entity delivers the first segment of a UMD PDU with SN=TX_Next_Segment (It can be updated whenever the UM RLC entity delivers the last segment of a UMD PDU with SN=TX_Next_Segment. It depends on how to define it).

The receiving RLC entity may define a window variable RX_Next_Segment and drive a receiving window with respect to a segmented UMD PDU segment.

2) RX_Next_Segment—Reception State Variable Having Highest Sequence Number in UM
RX_Next_Segment indicates a next RLC SN of the highest RLC SN from among received UMD PDU segments. The variable plays a role as an upper window edge of the receiving window, and an initial value thereof is set to 0. In the case of the STCH, the variable may be reset as the RLC SN of the first received UMD PDU segment.

(Examples for the Definition for the Window State Variable)

2) RX_Next_Segment—UM Highest Received State Variable
This state variable holds the value of the SN following the SN of the UMD PDU with the highest SN among received UMD PDUs containing segment, and it serves as the higher edge of the receive (or reordering) window. It is initially set to 0. For RLC entity configured for STCH, it is initially set to the SN of the first received UMD PDU containing segment.

3) RX_DELIV_Segment—Variable Indicative of First RLC SN not Completely Received in UM
The variable may indicate the first RLC SN that has not been completely received in the UM (i.e., the lowest RLC SN).

(Examples for the Definition for the Window State Variable)

3) RX_DELIV_Segment—UM Receive State Variable
This state variable holds the value of the SN of the first UMD PDU that has not been completely received;

4) RX_REORD_Segment—Variable Related to UM t-Reassembly
The variable indicates a next RLC SN of an RLC SN that has triggered t-Reassembly.

(Examples for the Definition for the Window State Variable)

4) RX_REORD_Segment—UM t-Reassembly State Variable
This state variable holds the value of the SN following the SN of the UMD PDU which triggered t-Reassembly.

5) t-Reassembly—Timer
The t-Reassembly timer may be used to detect a lost UMD PDU in the receiving AM RLC entity and the receiving UM RLC entity. Only one t-Reassembly timer may be driven. That is, when one t-Reassembly timer is driven, an additional t-Reassembly timer is not driven.

(Examples for the Definition of the Timer)

5) t-Reassembly
This timer is used by the receiving side of an receiving AM RLC entity and receiving UM RLC entity in order to detect loss of RLC PDUs at lower layer. If t-Reassembly is running, t-Reassembly shall not be started additionally, i.e. only one t Reassembly per RLC entity is running at a given time.

In the RLC UM of an NR according to various embodiments of the present disclosure, transmit operations and receive operations are as follows.

UM data transfer
Transmit Operations
General
The transmit operations and receive operations may operate according to any one of the following (2-3a) embodiment and (2-3b) embodiment.

(2-3a) Embodiment

When a UMD PDU including a segment is delivered to a lower layer, a transmitting RLC entity operates as follows.
If the UMD PDU has included the first segment,
Assign an RLC SN, such as TX_Next_Segment, to an RLC SDU and increase TX_Next_Segment by 1.
Set the RLC SN of the UMD PDU as the RLC SN of the corresponding RLC SDU.

(Examples for Transmission of UMD PDU)
When delivering an UMD PDU that contains a segment of a RLC SDU, to lower layer, the transmitting side of an UM RLC entity shall:
if the UMD PDU contains the first segment, associate a SN with the RLC SDU equal to TX_Next_Segment and increment TX_Next_Segment by one;

set the SN of the UMD PDU to the SN of the corresponding RLC SDU.

(2-3b) Embodiment

When a UMD PDU including a segment is delivered to a lower layer, a transmitting RLC entity operates as follows.
If the UMD PDU has included the last segment,
Assign an RLC SN, such as TX_Next_Segment, to an RLC SDU and increase TX_Next_Segment by 1.
Set the RLC SN of the UMD PDU as the RLC SN of the corresponding RLC SDU.
(Examples for Transmission of UMD PDU)
When delivering an UMD PDU that contains a segment of a RLC SDU, to lower layer, the transmitting side of an UM RLC entity shall:
if the UMD PDU contains the last segment, associate a SN with the RLC SDU equal to TX_Next_Segment and increment TX_Next_Segment by one;
set the SN of the UMD PDU to the SN of the corresponding RLC SDU.
Receive operations
General
A receiving RLC entity retains a receiving window as follows based on an RX_Next_Segment state variable.
If an RLC SN is within a (RX_Next_Segment−UM_Window_Size)<=SN<RX_Next_Segment section, the receiving RLC entity determines that the RLC SN is within the window,
If the RLC SN is out of the section, the receiving RLC entity determines that the RLC SN is out of the window.
When a UMD PDU is received from a lower layer, the actions of the receiving UM RLC entity are as follows.
Discard the received UMD PDU or place it in the reception buffer.
If the received UMD PDU is placed in the buffer,
Update window state variables, reassemble RLC SDUs, deliver them to a higher layer, and start or stop the t-Reassembly timer if necessary.
If the t-Reassembly timer expires, the receiving UM RLC entity operates as follows.
Update the window state variables, discard a UMD PDU including a segment, and start t-Reassembly if necessary.
(Examples for Reception of UMD PDU)
The receiving UM RLC entity shall maintain a reordering window according to state variable RX_Next_Segment as follows:
a SN falls within the reordering window if (RX_Next_Segment−UM_Window_Size)<=SN<RX_Next_Segment
a SN falls outside of the reordering window otherwise.
When receiving an UMD PDU from lower layer, the receiving UM RLC entity shall:
either discard the received UMD PDU or place it in the reception buffer;
if the received UMD PDU was placed in the reception buffer:
update state variables, reassemble and deliver RLC SDU to upper layer and start/stop t-Reassembly as needed;
When t-Reassembly expires, the receiving UM RLC entity shall:
update state variables, discard UMD PDUs containing segment, and start t-Reassembly as needed.

<Actions of Receiving RLC UM Entity when UMD PDU is Received from Lower Layer>
When a UMD PDU having an RLC SN x and including segments corresponding to a part from a y byte to a z byte is received from a lower layer, the receiving RLC UM entity operates as follows.
If the received RLC SN x is greater than RX_DELIV_Segment and smaller than RX_Next_Segment and has been received before or if the received RLC SN is greater than or equal to (RX_Next_Segment−UM_Window_Size) or smaller than RX_DELIV_Segment,
Discard the received UMD PDU.
If it is not the case,
Store the received UMD PDU in the reception buffer.
(Examples for the Actions when an UMD PDU is Received from Lower Layer)
When an UMD PDU is received from lower layer, where the UMD PDU contains byte segment numbers y to z of a RLC SDU with SN=x, the receiving side of an UM RLC entity shall:
if RX_DELIV_Segment<x<RX_Next_Segment and the UMD PDU with SN=x has been received before; or
if (RX_Next_Segment−UM_Window_Size) <=x<RX_DELIV_Segment:
discard the received UMD PDU;
else:
place the received UMD PDU in the reception buffer.
<Actions of Receiving RLC Entity when UMD PDU is Placed in Reception Buffer>
When a UMD PDU having an RLC SN x is placed in the reception buffer, the receiving UM RLC entity operates as follows.
If the received RLC SN x is out of a receiving window,
Update an RX_Next_Segment variable with x+1.
Remove UMD PDUs having segments corresponding to RLC SNs out of the window.
If RX_DELIV_Segment is out of the receiving window,
Update an RX_DELIV_Segment variable (RX_Next_Segment−UM_Window_Size).
If a UMD PDU having the same RLC SN as RX_DELIV_Segment is placed in the buffer,
Update the RX_DELIV_Segment variable with the RLC SN of the first UMD PDU that is greater than a current RX_DELIV_Segment value and that has not been completely received.
Perform reassembly on a segment having an RLC SN smaller than the updated RX_DELIV_Segment variable, remove an RLC header, and deliver UMD PDUs to a higher layer. If the reassembly fails, the receiving UM RLC entity discards the UMD PDUs.
If a t-Reassembly timer is driven,
If RX_REORD_Segment is smaller than or equal to RX_DELIV_Segment or RX_REORD_Segment is not equal to RX_Next_Segment,
Stop and reset the t-Reassembly timer.
If the t-Reassembly timer is not driven (including a case where the t-Reassembly has been stopped)
If RX_Next_Segment is greater than RX_DELIV_Segment,
Start the t-Reassembly timer.
Set RX_REORD_Segment as RX_Next_Segment.
(Examples for the Actions when an UMD PDU is Placed in the Reception Buffer)
When an UMD PDU with SN=x is placed in the reception buffer, the receiving side of an UM RLC entity shall:
if x falls outside of the receiving window:
update RX_Next_Segment to x+1;

discard any UMD PDUs containing segment with SN that falls outside of the receiving window;
if RX_DELIV_Segment falls outside of the receiving window:
set RX_DELIV_Segment to (RX_Next_Segment−UM_Window_Size);
if the reception buffer contains an UMD PDU with SN=RX_DELIV_Segment;
update RX_DELIV_Segment to the SN of the first UMD PDU with SN>current RX_DELIV_Segment that has not been completely received;
reassemble RLC SDU from any UMD PDUs with SN<updated RX_DELIV_Segment, remove RLC header when doing so and deliver the reassembled RLC SDU to upper layer (if it fails to be reassembled, then discard it);
if t-Reassembly is running:
if RX_REORD_Segment<=RX_DELIV_Segment; or
if RX_REORD_Segment falls outside of the receiving window and RX_REORD_Segment is not equal to RX_Next_Segment:
stop and reset t-Reassembly;
if t-Reassembly is not running (includes the case when t-Reassembly is stopped due to actions above):
if RX_Next_Segment>RX_DELIV_Segment:
start t-Reassembly;
set RX_REORD_Segment to RX_Next_Segment <Actions of Receiving RLC UM Entity when t-Reassembly Expires>

When the t-Reassembly timer expires, the receiving UM RLC entity operates as follows.
Update RX_DELIV_Segment with the first RLC SN that is greater than or equal to RX_REORD_Segment and that has not been completely received.
Discard UMD PDUs including a segment having an RLC SN smaller than the updated RX_DELIV_Segment.
If RX_Next_Segment is greater than RX_DELIV_Segment
Start the t-Reassembly timer.
Set an RX_REORD_Segment variable as RX_Next_Segment.

(Examples for the Actions when t-Reassembly Expires)

When t-Reassembly expires, the receiving UM RLC entity shall:
update RX_DELIV_Segment to the SN of the first UMD PDU with SN>=RX_REORD_Segment that has not been completely received;
discard any UMD PDUs containing segment with SN<updated RX_DELIV_Segment,
if RX_Next_Segment>RX_DELIV_Segment:
start t-Reassembly;
set RX_REORD_Segment to RX_Next_Segment.

In the (2-3) embodiment of the present disclosure, a condition in which the t-reassembly timer is triggered may be any one of the following cases as another method.
1. If a lost packet is detected by a window operation (the timer is not currently driven), that is, a gap is created between RLC SNs, or a case where a gap is created within the same RLC SN due to an SI field or an SO field,
2. If a random segment arrives as a received RLC UM PDU (the timer is not currently driven),
3. If a random segment arrives within one RLC SN as a received RLC UM PDU (the timer is not currently driven),
4. If segments are not received in sequence within one RLC SN as a received RLC UM PDU (the timer is not currently driven) and the loss of a segment is detected or if a gap is created between segments within one RLC SN.
5. If the second segment or subsequent segments have arrived other than a case where the first segment has arrived within one RLC SN as a received RLC UM PDU (the timer is not currently driven), but a complete RLC PDU cannot be configured (because it may not be preferred to drive the timer although the second segment has not been transmitted by a Tx stage)
6. If a segment other than the first segment arrives within one RLC SN as a received RLC UM PDU (the timer is not currently driven).

If a lost packet or a missed segment is detected or if the timer is to be triggered, one of the aforementioned embodiments may be applied as the timer triggering condition in relation to the (2-3) embodiment of the present disclosure. Furthermore, in order to check whether or not to trigger the timer when the timer expires, one of the aforementioned embodiments may be applied. In the (2-3) embodiment of the present disclosure, another embodiment in which the timer is triggered is as follows.

If the t-Reassembly timer is driven,
If RX_REORD_Segment is smaller than or equal to RX_DELIV_Segment or RX_REORD_Segment is not equal to RX_Next_Segment,
Stop and reset the t-Reassembly timer.
If the t-Reassembly timer is not driven (including a case where the t-Reassembly has stopped)
If RX_Next_Segment is greater than RX_DELIV_Segment and a missing part of an RLC SDU is detected (it may be detected by an RLC SN or an SO field or an SI field)
Start the t-Reassembly timer.
Set RX_REORD_Segment as RX_Next_Segment.

(Examples for Triggering the t-Reassembly Timer)

if t-Reassembly is running:
if RX_REORD_Segment<=RX_DELIV_Segment; or
if RX_REORD_Segment falls outside of the receiving window and RX_REORD_Segment is not equal to RX_Next_Segment:
stop and reset t-Reassembly;
if t-Reassembly is not running (includes the case when t-Reassembly is stopped due to actions above):
if RX_Next_Segment>RX_DELIV_Segment and if a missing part of a RLC SDU is detected (a gap is created by checking RLC SN, SO field, and SI field):
start t-Reassembly;
set RX_REORD_Segment to RX_Next_Segment In the (2-3) embodiment of the present disclosure, another embodiment in which the timer is triggered is as follows.
If the t-Reassembly timer is driven,
If RX_REORD_Segment is smaller than or equal to RX_DELIV_Segment or RX_REORD_Segment is not equal to RX_Next_Segment,
Stop and reset the t-Reassembly timer.
If the t-Reassembly timer is not driven (including a case where the t-Reassembly timer has been stopped)
If RX_Next_Segment is equal to RX_DELIV_Segment+1 and at least one missed RLC SDU segment is present with respect to RX_DELIV_Segment or RX_Next_Segment−1 other than the last RLC SDU segment,
Start the t-Reassembly timer.
Set RX_REORD_Segment as RX_Next_Segment.
If RX_Next_Segment is greater than RX_DELIV_Segment+1, Start the t-Reassembly timer.
Set RX_REORD_Segment as RX_Next_Segment.
(Examples for Triggering the t-Reassembly Timer)
if t-Reassembly is running:
  if RX_REORD_Segment<=RX_DELIV_Segment; or
  if RX_REORD_Segment falls outside of the receiving window and RX_REORD_Segment is not equal to RX_Next_Segment:
    stop and reset t-Reassembly;
if t-Reassembly is not running (includes the case when t-Reassembly is stopped due to actions above):
  if RX_Next_Segment=RX_DELIV_Segment+1 and at least one missing RLC SDU segment except the last RLC SDU segment exists for RX_DELIV_Segment (or RX_Next_Segment-1):
    (may be expressed, for example, if RX_Next_Segment=RX_DELIV_Segment+1 and if at least one missing part of a RLC SDU with RX_DELIV_Segment (or RX_Next_Segment-1) except the last part of that RLC SDU exists)
    start t-Reassembly;
    set RX_REORD_Segment to RX_Next_Segment
  if RX_Next_Segment>RX_DELIV_Segment+1:
    start t-Reassembly;
    set RX_REORD_Segment to RX_Next_Segment In the above, RX_Next_Segment=RX_DELIV_Segment+1 may be expressed like RX_Next_Segment-1=RX_DELIV_Segment. RX_Next_Segment RX_DELIV_Segment+1 may be expressed like RX_Next_Segment-1>RX_DELIV_Segment.

In the (2-3) embodiment of the present disclosure, the t-reassembly timer may be called a different name. For example, the t-reassembly timer may be called a different name such as a t-Reordering timer or a t-gab_detected_timer.

In the (2-3) embodiment of the present disclosure, if the variable RX_Next_Segment is defined as follows (if the definition of different variables is the same as that of the (2-3) embodiment and only the variable RX_Next_Segment is newly defined as follows), the RLC UM reception data processing operation proposed in the (2-3) embodiment of the present disclosure may be modified as follows (it has the same meaning and procedure in an overall operation).

2) RX_Next_Segment—Variable Corresponding to the RLC SN of Data Expected to be Received Next in the UM
RX_Next_Segment indicates the RLC SN of a UMD PDU segment expected to be received next. The variable plays a role as the upper window edge of a receiving window, and an initial value thereof is set to 0. In the case of STCH, the variable may be reset as the RLC SN of the first received UMD PDU segment.
(Examples for the Definition for the Window State Variable)
2) RX_Next_Segment—UM Highest Received State Variable
This state variable holds the value of the next expected SN of UMD PDU containing segment to be received, and it serves as the higher edge of the receive (or reordering) window. It is initially set to 0. For RLC entity configured for STCH, it is initially set to the SN of the first received UMD PDU containing segment.
In the RLC UM of an NR, another RLC UM data reception operation of the (2-3) embodiment according to the new variable definition is as follows.
UM data transfer
Receive operations General
A receiving RLC entity retains a receiving window as follows based on an RX_Next_Segment state variable.
  If an RLC SN is within an (RX_Next_Segment−UM_Window_Size)<SN<=RX_Next_Segment section, the receiving RLC entity determines that the RLC SN is within the window,
  If the RLC SN is out of the section, the receiving RLC entity determines that the RLC SN is out of the window.
When a UMD PDU is received from a lower layer, the actions of the receiving UM RLC entity are as follows.
  Discard the received UMD PDU or place the received UMD PDU in the reception buffer or remove an RLC header and deliver the UMD PDU to a higher layer (if it is not a segment, that is, in the case of a complete RLC SDU).
  If the received UMD PDU has been placed in the buffer,
    Update window state variables, perform reassembly, deliver the RLC SDUs to a higher layer, and start or stop the t-Reassembly timer, if necessary.
  If the t-Reassembly timer expires, the receiving RLC UM entity operates as follows.
    Update the window state variables, discard a UMD PDU including a segment, and start the t-Reassembly, if necessary.
(Examples for Reception of UMD PDU)
The receiving UM RLC entity shall maintain a reordering window according to state variable RX_Next_Segment as follows:
  a SN falls within the reordering window if (RX_Next_Segment−UM_Window_Size)
    <SN<=RX_Next_Segment
  a SN falls outside of the reordering window otherwise.
When receiving an UMD PDU from lower layer, the receiving UM RLC entity shall:
  either discard the received UMD PDU or place it in the reception buffer or remove the RLC header and deliver the RLC SDU to upper layer;
  if the received UMD PDU was placed in the reception buffer:
    update state variables, reassemble and deliver RLC SDU to upper layer and start/stop t-Reassembly as needed;
When t-Reassembly expires, the receiving UM RLC entity shall:
  update state variables, discard UMD PDUs containing segment, and start t-Reassembly as needed.
<Actions of Receiving RLC UM Entity when UMD PDU is Received from Lower Layer>
When a UMD PDU having an RLC SN x and including segments corresponding to a part from a y byte to a z byte is received from a lower layer, the receiving RLC UM entity operates as follows.
  If a UMD PDU not having an RLC SN is received,
    Remove a header and deliver the UMD PDU to a higher layer.
  If the received RLC SN x is greater than RX_DELIV_Segment and smaller than RX_Next_Segment and has been received before or the received RLC SN is greater than (RX_Next_Segment−UM_Window_Size) and smaller than RX_DELIV_Segment,
    Discard the received UMD PDU.
  If it is not the case,
    Store the received UMD PDU in the reception buffer.

(Examples for the Actions when an UMD PDU is Received from Lower Layer)

When an UMD PDU is received from lower layer, where the UMD PDU contains byte segment numbers y to z of a RLC SDU with SN=x, the receiving side of an UM RLC entity shall:
  if the UMD PDU does not contain an SN
    remove the RLC header and deliver the RLC SDU to upper layer
  else if RX_DELIV_Segment<x<RX_Next_Segment and the UMD PDU with SN=x has been received before; or
  else if (RX_Next_Segment−UM_Window_Size) <x<RX_DELIV_Segment:
    discard the received UMD PDU;
  else:
    place the received UMD PDU in the reception buffer.

<Actions of Receiving RLC Entity when UMD PDU is Placed in Reception Buffer>

When a UMD PDU having an RLC SN x is placed in the reception buffer, a receiving UM RLC entity operates as follows.
  If the received RLC SN x is out of a receiving window.
    Update an RX_Next_Segment variable with x.
    Discard UMD PDUs having a segment corresponding to an RLC SN out of the window.
    If RX_DELIV_Segment is out of the receiving window,
      Update the RX_DELIV_Segment variable with (RX_Next_Segment UM_Window_Size)+1.
  If not (i.e., if the received RLC SN x is within the receiving window)
    Reassemble an RLC SDU from UMD PDUs including a segment corresponding to the received RLC SN x (the reassembly may be performed by removing a header and using an SI field or SO field).
      If an RLC SDU having the RLC SN x is successful in the reassembly and has been completely received,
        Deliver the reassembled RLC SDU to a higher layer.
        If the RLC SN x is equal to RX_DELIV_Segment,
          Update a RX_DELIV_Segment value with the first RLC SN of a UMD PDU greater than a current RX_DELIV_Segment value and fully not-received.
        If the RLC SN x is equal to RX_Next_Segment,
          Update a RX_Next_Segment value with
  If t-Reassembly timer is driven,
    If RX_REORD_Segment is smaller than or equal to RX_DELIV_Segment or RX_REORD_Segment is not equal to RX_Next_Segment,
      Stop and reset the t-Reassembly timer.
  If the t-Reassembly timer is not driven (including a case where the t-Reassembly timer has been stopped)
    If RX_Next_Segment is greater than RX_DELIV_Segment,
      Start the t-Reassembly timer.
      Set RX_REORD_Segment as RX_Next_Segment.

(Examples for the Actions when an UMD PDU is Placed in the Reception Buffer)

When an UMD PDU with SN=x is placed in the reception buffer, the receiving side of an UM RLC entity shall:
  if x falls outside of the receiving window:
    update RX_Next_Segment to x;
    discard any UMD PDUs containing segment with SN that falls outside of the receiving window;
  if RX_DELIV_Segment falls outside of the receiving window:
    set RX_DELIV_Segment to (RX_Next_Segment ?UM_Window_Size)+1;
  else (if x falls within the receiving window)
  reassemble RLC SDU from any UMD PDUs containing segment with SN=x (and remove RLC headers when doing so;)
    if RLC SDU with SN=x is reassembled and completely received
      deliver the reassembled RLC SDU to upper layer;
      if x=RX_DELIV_Segment
        update RX_DELIV_Segment to the SN of the first UMD PDU with SN>current RX_DELIV_Segment that has not been completely received;
      if x=RX_Next_Segment
        update RX_Next_Segment to x+1;
  if t-Reassembly is running:
    if RX_REORD_Segment<=RX_DELIV_Segment; or
    if RX_REORD_Segment falls outside of the receiving window and RX_REORD_Segment is not equal to RX_Next_Segment:
      stop and reset t-Reassembly;
  if t-Reassembly is not running (includes the case when t-Reassembly is stopped due to actions above):
    if RX_Next_Segment>RX_DELIV_Segment:
      start t-Reassembly;
      set RX_REORD_Segment to RX_Next_Segment <Actions of Receiving RLC UM Entity when t-Reassembly Expires>

When the t-Reassembly timer expires, the receiving UM RLC entity operates as follows.
  Update RX_DELIV_Segment with the first RLC SN that is greater than or equal to RX_REORD_Segment and that has not been completely received.
  Discard UMD PDUs including a segment having an RLC SN smaller than the updated RX_DELIV_Segment.
  If RX_Next_Segment is greater than RX_DELIV_Segment,
    Start the t-Reassembly timer.
    Set an RX_REORD_Segment variable as RX_Next_Segment.

(Examples for the Actions when t-Reassembly Expires)

When t-Reassembly expires, the receiving UM RLC entity shall:
  update RX_DELIV_Segment to the SN of the first UMD PDU with SN>=RX_REORD_Segment that has not been completely received;
  discard any UMD PDUs containing segment with SN<updated RX_DELIV_Segment;
  if RX_Next_Segment>RX_DELIV_Segment:
    start t-Reassembly;
    set RX_REORD_Segment to RX_Next_Segment.

In the (2-3) embodiment of the present disclosure, another method of triggering the t-reassembly timer may be any one of the following cases.
  1. If a lost packet is detected by a window operation (the timer is not currently driven), that is, a gap is created between RLC SNs, or a case where a gap is created within the same RLC SN due to an SI field or an SO field,
  2. If a random segment arrives as a received RLC UM PDU (the timer is not currently driven),
  3. If a random segment arrives within one RLC SN as a received RLC UM PDU (the timer is not currently driven), 4. If segments are not received in sequence within one RLC SN as a received RLC UM PDU (the timer is not currently driven) and the loss of a segment is detected or if a gap is created between segments within one RLC SN.
5. If the second segment or subsequent segments have arrived other than a case where the first segment has arrived within one RLC SN as a received RLC UM PDU (the timer is not currently driven), but a complete RLC PDU cannot be configured (because it may not be preferred to drive the timer although the second segment has not been transmitted by a Tx stage).
6. If a segment other than the first segment arrives within one RLC SN as a received RLC UM PDU (the timer is not currently driven).

If a lost packet or a missed segment is detected or if the timer is to be triggered, one of the aforementioned embodiments may be applied as the timer triggering condition in relation to the (2-3) embodiment of the present disclosure. Furthermore, in order to identify whether or not to trigger the timer when the timer expires, one of the aforementioned embodiments may be applied. In the (2-3) embodiment of the present disclosure, another embodiment in which the timer is triggered is as follows.

If the t-Reassembly timer is driven,
    If RX_REORD_Segment is smaller than or equal to RX_DELIV_Segment or RX_REORD_Segment is not equal to RX_Next_Segment,
        Stop and reset the t-Reassembly timer.
If the t-Reassembly timer is not driven (including a case where the t-Reassembly timer has been stopped)
    If RX_Next_Segment is greater than RX_DELIV_Segment and a missing part of an RLC SDU is detected (it may be detected by an RLC SN or an SO field or an SI field)
        Start the t-Reassembly timer.
        Set RX_REORD_Segment as RX_Next_Segment.
(Examples for Triggering the t-Reassembly Timer)
if t-Reassembly is running:
    if RX_REORD_Segment<=RX_DELIV_Segment; or
        if RX_REORD_Segment falls outside of the receiving window and RX_REORD_Segment is not equal to RX_Next_Segment:
            stop and reset t-Reassembly;
if t-Reassembly is not running (includes the case when t-Reassembly is stopped due to actions above):
    if RX_Next_Segment>RX_DELIV_Segment and if a missing part of a RLC SDU is detected (a gap is created by checking RLC SN, SO field, and SI field):
        start t-Reassembly;
        set RX_REORD_Segment to RX_Next_Segment Another embodiment in which the timer of the (2-3) embodiment of the present disclosure is triggered is as follows.

If the t-Reassembly timer is driven,
    If RX_REORD_Segment is smaller than or equal to RX_DELIV_Segment or RX_REORD_Segment is not equal to RX_Next_Segment,
        Stop and reset the t-Reassembly timer.
If the t-Reassembly timer is not driven (including a case where the t-Reassembly timer has been stopped)
    If RX_Next_Segment is equal to RX_DELIV_Segment and at least one missed RLC SDU segment other than the last RLC SDU segment is present with respect to RX_DELIV_Segment or RX_Next_Segment,
        Start the t-Reassembly timer.
        Set RX_REORD_Segment as RX_Next_Segment.
    If RX_Next_Segment is greater than RX_DELIV_Segment,
        Start the t-Reassembly timer.
        Set RX_REORD_Segment as RX_Next_Segment.
(Examples for Triggering the t-Reassembly Timer)
if t-Reassembly is running:
    if RX_REORD_Segment<=RX_DELIV_Segment; or
        if RX_REORD_Segment falls outside of the receiving window and RX_REORD_Segment is not equal to RX_Next_Segment:
            stop and reset t-Reassembly;
if t-Reassembly is not running (includes the case when t-Reassembly is stopped due to actions above):
    if RX_Next_Segment=RX_DELIV_Segment and at least one missing RLC SDU segment except the last RLC SDU segment exists for RX_DELIV_Segment (or RX_Next_Segment):
    (if RX_Next_Segment=RX_DELIV_Segment and if at least one missing part of a RLC SDU with RX_DELIV_Segment (or RX_Next_Segment) except the last part of that RLC SDU exists:)
        start t-Reassembly;
        set RX_REORD_Segment to RX_Next_Segment
    if RX_Next_Segment>RX_DELIV_Segment:
        start t-Reassembly;
        set RX_REORD_Segment to RX_Next_Segment In the (2-3) embodiment of the present disclosure, the t-reassembly timer may be called a different name. For example, the t-reassembly timer may be called a different name such as a t-Reordering timer or a t-gab_detected_timer.

In the (2-3) embodiment of the present disclosure, if the variable RX_Next_Segment is defined as follows (if the definition of other variables is the same as those of the (2-3) embodiment and only the variable RX_Next_Segment is newly defined as follows), the RLC UM reception data processing operation proposed in the (2-3) embodiment of the present disclosure may be differently modified as follows.

2) RX_Next_Segment—Variable Corresponding to the RLC SN of Data Expected to be Received Next in the UM
    RX_Next_Segment indicates the RLC SN of a UMD PDU segment expected to be received next. The variable plays a role as the upper window edge of a receiving window, and an initial value thereof is set to 0. In the case of STCH, the variable may be reset as the RLC SN of the first received UMD PDU segment.

(Examples for the Definition for the Window State Variable)

2) RX_Next_Segment—UM Highest Received State Variable

This state variable holds the value of the next expected SN of UMD PDU containing segment to be received, and it serves as the higher edge of the receive (or reordering) window. It is initially set to 0. For RLC entity configured for STCH, it is initially set to the SN of the first received UMD PDU containing segment.

In the RLC UM of an NR, yet another RLC UM data reception operation of the (2-3) embodiment according to the according to the new variable definition is as follows.

UM data transfer
Receive operations
General
A receiving RLC entity retains a receiving window as follows based on an RX_Next_Segment state variable.

If an RLC SN is an (RX_Next_Segment−UM_Window_Size)<=SN<RX_Next_Segment section, the receiving RLC entity determines that the RLC SN is within the window, If the RLC SN is out of the section, the receiving RLC entity determines that the RLC SN is out of the window.

When a UMD PDU is received from a lower layer, the actions of the receiving UM RLC entity are as follows.

Discard the received UMD PDU or place the received UMD PDU in the reception buffer or remove an RLC header and deliver the UMD PDU to a higher layer (if it is not a segment, that is, in the case of a complete RLC SDU).

If the received UMD PDU has been placed in the buffer,

Updates window state variables, perform reassembly, deliver the RLC SDUs to a higher layer, and start or stop the t-Reassembly timer, if necessary.

If a t-Reassembly timer expires, the receiving RLC UM entity operates as follows.

Update the window state variables, discard a UMD PDU including a segment, and start the t-Reassembly, if necessary.

(Examples for Reception of UMD PDU)

The receiving UM RLC entity shall maintain a reordering window according to state variable RX_Next_Segment as follows:

a SN falls within the reordering window if (RX_Next_Segment−UM_Window_Size)
<=SN<RX_Next_Segment a SN falls outside of the reordering window otherwise.

When receiving an UMD PDU from lower layer, the receiving UM RLC entity shall:

either discard the received UMD PDU or place it in the reception buffer or remove the RLC header and deliver the RLC SDU to upper layer;

if the received UMD PDU was placed in the reception buffer:

update state variables, reassemble and deliver RLC SDU to upper layer and start/stop t-Reassembly as needed;

When t-Reassembly expires, the receiving UM RLC entity shall:

update state variables, discard UMD PDUs containing segment, and start t-Reassembly as needed.

<Actions of Receiving RLC UM Entity when UMD PDU is Received from Lower Layer>

When a UMD PDU having an RLC SN x and including segments corresponding to a part from a y byte to a z byte is received from a lower layer, the receiving RLC UM entity operates as follows.

If a UMD PDU not having an RLC SN is received,

Remove a header and deliver the UMD PDU to a higher layer.

If the received RLC SN x is greater than RX_DELIV_Segment and smaller than RX_Next_Segment and has been received before or the received RLC SN is greater than or equal to (RX_Next_Segment−UM_Window_Size) and smaller than RX_DELIV_Segment, Discard the received UMD PDU.

If it is not the case,

Store the received UMD PDU in the reception buffer.

(Examples for the Actions when an UMD PDU is Received from Lower Layer)

When an UMD PDU is received from lower layer, where the UMD PDU contains byte segment numbers y to z of a RLC SDU with SN=x, the receiving side of an UM RLC entity shall:

if the UMD PDU does not contain an SN remove the RLC header and deliver the RLC SDU to upper layer else if RX_DELIV_Segment<x<RX_Next_Segment and the UMD PDU with SN=x has been received before; or else if (RX_Next_Segment−UM_Window_Size) <=x<RX_DELIV_Segment:

discard the received UMD PDU;

else:

place the received UMD PDU in the reception buffer.

<Actions of Receiving RLC Entity when UMD PDU is Placed in Reception Buffer>

When a UMD PDU having an RLC SN x is placed in the reception buffer, the receiving UM RLC entity operates as follows.

If the received RLC SN x is out of a receiving window.

Update an RX_Next_Segment variable with x.

Discard UMD PDUs having a segment corresponding to an RLC SN out of the window.

If RX_DELIV_Segment is out of the receiving window,

Update RX_DELIV_Segment variable with (RX_Next_Segment−UM_Window_Size).

If not (if the received RLC SN x is within the receiving window)

Reassemble an RLC SDU from UMD PDUs including a segment corresponding to the received RLC SN x (the reassembly may be performed by removing a header and using an SI field or SO field).

If an RLC SDU having the RLC SN x is successful in the reassembly and has been completely received, Deliver the reassembled RLC SDU to a higher layer.

If the RLC SN x is equal to RX_DELIV_Segment,

Update an RX_DELIV_Segment value with the RLC SN of the first UMD PDU that is greater than a current RX_DELIV_Segment value and that has not been completely received.

If the RLC SN x is equal to RX_Next_Segment,

Update an RX_Next_Segment value with x+1.

If the t-Reassembly timer is driven,

If RX_REORD_Segment is smaller than or equal to RX_DELIV_Segment or RX_REORD_Segment is not equal to RX_Next_Segment, Stop and reset the t-Reassembly timer.

If the t-Reassembly timer is not driven (including a case where the t-Reassembly timer has been stopped)

If RX_Next_Segment is greater than RX_DELIV_Segment,

Start the t-Reassembly timer.

Set RX_REORD_Segment as RX_Next_Segment.

(Examples for the Actions when an UMD PDU is Placed in the Reception Buffer)

When an UMD PDU with SN=x is placed in the reception buffer, the receiving side of an UM RLC entity shall:

if x falls outside of the receiving window:

update RX_Next_Segment to x;

discard any UMD PDUs containing segment with SN that falls outside of the receiving window;

if RX_DELIV_Segment falls outside of the receiving window:
  set RX_DELIV_Segment to (RX_Next_Segment−UM_Window_Size);
else (if x falls within the receiving window)
  reassemble RLC SDU from any UMD PDUs containing segment with SN=x (and remove RLC headers when doing so;)
    if RLC SDU with SN=x is reassembled and completely received
      deliver the reassembled RLC SDU to upper layer;
        if x=RX_DELIV_Segment
        update RX_DELIV_Segment to the SN of the first UMD PDU with SN>current RX_DELIV_Segment that has not been completely received;
      if x=RX_Next_Segment
        update RX_Next_Segment to x+1;
    if t-Reassembly is running:
      if RX_REORD_Segment<=RX_DELIV_Segment; or
      if RX_REORD_Segment falls outside of the receiving window and RX_REORD_Segment is not equal to RX_Next_Segment:
        stop and reset t-Reassembly;
    if t-Reassembly is not running (includes the case when t-Reassembly is stopped due to actions above):
      if RX_Next_Segment>RX_DELIV_Segment:
        start t-Reassembly;
        set RX_REORD_Segment to RX_Next_Segment <Actions of Receiving RLC UM Entity when t-Reassembly Expires>

When the t-Reassembly timer expires, the receiving UM RLC entity operates as follows.
  Update RX_DELIV_Segment with the first RLC SN that is greater than or equal to RX_REORD_Segment and that has not been completely received.
  Discard UMD PDUs including a segment having an RLC SN smaller than the updated RX_DELIV_Segment.
  If RX_Next_Segment is greater than RX_DELIV_Segment,
    Start the t-Reassembly timer.
    Set an RX_REORD_Segment variable as RX_Next_Segment.

(Examples for the Actions when t-Reassembly Expires)

When t-Reassembly expires, the receiving UM RLC entity shall:
  update RX_DELIV_Segment to the SN of the first UMD PDU with SN>=RX_REORD_Segment that has not been completely received;
  discard any UMD PDUs containing segment with SN<updated RX_DELIV_Segment;
  if RX_Next_Segment>RX_DELIV_Segment:
    start t-Reassembly;
    set RX_REORD_Segment to RX_Next_Segment.

In the (2-3) embodiment of the present disclosure, yet another method of triggering the t-reassembly timer may be any one of the following cases.
  1. If a lost packet is detected by a window operation (the timer is not currently driven), that is, a gap is created between RLC SNs, or a case where a gap is created within the same RLC SN due to an SI field or an SO field,
  2. If a random segment arrives as a received RLC UM PDU (the timer is not currently driven),
  3. If a random segment arrives within one RLC SN as a received RLC UM PDU (the timer is not currently driven),
  4. If segments are not received in sequence within one RLC SN as a received RLC UM PDU (the timer is not currently driven) and the loss of a segment is detected or if a gap is created between segments within one RLC SN.
  5. If the second segment or subsequent segments have arrived other than a case where the first segment has arrived within one RLC SN as a received RLC UM PDU (the timer is not currently driven), but a complete RLC PDU cannot be configured (because it may not be preferred to drive the timer although the second segment has not been transmitted by a Tx stage).
  6. If a segment other than the first segment arrives within one RLC SN as a received RLC UM PDU (the timer is not currently driven).

If a lost packet or a missed segment is detected or if the timer is to be triggered, one of the aforementioned embodiments may be applied as the timer triggering condition in relation to the (2-3) embodiment of the present disclosure. Furthermore, in order to identify whether or not to trigger the timer when the timer expires, one of the aforementioned embodiments may be applied. In the (2-3) embodiment of the present disclosure, another embodiment in which the timer is triggered is as follows.
  If the t-Reassembly timer is driven,
    If RX_REORD_Segment is smaller than or equal to RX_DELIV_Segment or RX_REORD_Segment is not equal to RX_Next_Segment,
    Stop and reset the t-Reassembly timer.
  If the t-Reassembly timer is not driven (including a case where the t-Reassembly timer has been stopped)
    If RX_Next_Segment is greater than RX_DELIV_Segment and a missing part of an RLC SDU is detected (it may be detected by an RLC SN, an SO field or an SI field)
    Start the t-Reassembly timer.
    Set RX_REORD_Segment as RX_Next_Segment.

(Examples for Triggering the t-Reassembly Timer)
  if t-Reassembly is running:
    if RX_REORD_Segment<=RX_DELIV_Segment; or
    if RX_REORD_Segment falls outside of the receiving window and RX_REORD_Segment is not equal to RX_Next_Segment:
      stop and reset t-Reassembly;
  if t-Reassembly is not running (includes the case when t-Reassembly is stopped due to actions above):
    if RX_Next_Segment>RX_DELIV_Segment and if a missing part of a RLC SDU is detected (a gap is created by checking RLC SN, SO field, and SI field):
      start t-Reassembly;
      set RX_REORD_Segment to RX_Next_Segment Yet another embodiment in which the timer of the (2-3) embodiment of the present disclosure triggered is as follows.
  If the t-Reassembly timer is driven,
    If RX_REORD_Segment is smaller than or equal to RX_DELIV_Segment or RX_REORD_Segment is not equal to RX_Next_Segment,
    Stop and reset the t-Reassembly timer.
  If the t-Reassembly timer is not driven (including a case where the t-Reassembly timer has been stopped)
    If RX_Next_Segment is equal to RX_DELIV_Segment and at least one missed RLC SDU segment other than the last RLC SDU segment is present with respect to RX_DELIV_Segment or RX_Next_Segment,
    Start the t-Reassembly timer.
    Set RX_REORD_Segment as RX_Next_Segment.

If RX_Next_Segment is greater than RX_DELIV_Segment,
   Start the t-Reassembly timer.
   Set RX_REORD_Segment as RX_Next_Segment.
(Examples for Triggering the t-Reassembly Timer)
if t-Reassembly is running:
   if RX_REORD_Segment<=RX_DELIV_Segment; or
   if RX_REORD_Segment falls outside of the receiving window and RX_REORD_Segment is not equal to RX_Next_Segment:
      stop and reset t-Reassembly;
if t-Reassembly is not running (includes the case when t-Reassembly is stopped due to actions above):
   if RX_Next_Segment=RX_DELIV_Segment and at least one missing RLC SDU segment except the last RLC SDU segment exists for RX_DELIV_Segment (or RX_Next_Segment):
   (if RX_Next_Segment=RX_DELIV_Segment and if at least one missing part of a RLC SDU with RX_DELIV_Segment (or RX_Next_Segment) except the last part of that RLC SDU exists:)
      start t-Reassembly;
      set RX_REORD_Segment to RX_Next_Segment
   if RX_Next_Segment>RX_DELIV_Segment:
      start t-Reassembly;
      set RX_REORD_Segment to RX_Next_Segment In the (2-3) embodiment of the present disclosure, the t-reassembly timer may be called a different name. For example, the t-reassembly timer may be called a different name such as a t-Reordering timer or a t-gab_detected_timer.

Hereinafter, a data transmission operation and data reception operation of RLC UM according to a segmentation method and RLC UM reception method are proposed.

A (2-4) embodiment: a data transmission operation and data reception operation of RLC UM which applies an SO-based segmentation method and uses a window and timer as an RLC UM reception method.

In order to reduce unnecessary overhead in the RLC UM of an NR, various embodiments of the present disclosure propose an RLC UM transmitting and receiving window operation method in which a Tx stage RLC UM entity uses an SO-based segmentation method and an Rx stage RLC UM entity has a timer in order to efficiently drive a method of using an RLC SN for only an RLC PDU segment (or segmented RLC PDU) without using an RLC SN for a complete RLC PDU (i.e., a not-segmented RLC PDU). Furthermore, in this method, duplication check is not performed based on an RLC SN, and duplication check is performed based on a segment.

First, window variables to be used in the window operation may be defined as follows.

The transmitting RLC entity may define a Tx state variable called TX_Next_Segment and assign an RLC SN to a segmented UMD PDU segment.

1) TX_Next_Segment—Tx State Variable in the UM
TX_Next segment indicates an RLC SN value to be assigned to a UMD PDU including a segment of a next RLC SDU, and an initial value thereof may be set to 0. The transmitting RLC entity may update a TX_Next_Segment value whenever the first segment of a UMD PDU corresponding to TX_Next_Segment is delivered to a higher layer or may update a TX_Next_Segment value whenever the last segment of a UMD PDU corresponding to TX_Next_Segment is delivered to a higher layer (how the variable will be updated may be determined by definition).

(Examples for the Definition for the Window State Variable)
1) TX_Next_Segment—UM Transmit State Variable
This state variable holds the value of the SN to be assigned for a UMD PDU containing a segment of the next RLC SDU. It is initially set to 0, and is updated whenever the UM RLC entity delivers the first segment of a UMD PDU with SN=TX_Next_Segment (It can be updated whenever the UM RLC entity delivers the last segment of a UMD PDU with SN=TX_Next_Segment. It depends on how to define it).

The receiving RLC entity may define a window variable RX_Next_Segment and drive a receiving window with respect to a segmented UMD PDU segment.

2) RX_Next_Segment—a Reception State Variable Having the Highest Sequence Number in the UM
RX_Next_Segment indicates a next RLC SN having the highest RLC SN from among received UMD PDU segments. The variable plays a role as the upper window edge of a receiving window, and an initial value thereof is set to 0. In the case of STCH, the variable may be reset as the RLC SN of the first received UMD PDU segment.

(Examples for the Definition for the Window State Variable)
2) RX_Next_Segment—UM Highest Received State Variable
This state variable holds the value of the SN following the SN of the UMD PDU with the highest SN among received UMD PDUs containing segment, and it serves as the higher edge of the receive (or reordering) window. It is initially set to 0. For RLC entity configured for STCH, it is initially set to the SN of the first received UMD PDU containing segment.

3) RX_DELIV_Segment—a Variable Indicative of the First RLC SN that has not been Completely Received in the UM
The variable may indicate the first RLC SN that has not been completely received (i.e., the lowest RLC SN) in the UM.

(Examples for the Definition for the Window State Variable)
3) RX_DELIV_Segment—UM Receive State Variable
This state variable holds the value of the SN of the first UMD PDU that has not been completely received;

4) RX_REORD_Segment—a UM t-Reassembly-Related Variable
The variable indicates a next RLC SN of an RLC SN that has triggered t-Reassembly.

(Examples for the Definition for the Window State Variable)
4) RX_REORD_Segment—UM t-Reassembly State Variable
This state variable holds the value of the SN following the SN of the UMD PDU which triggered t-Reassembly.

5) t-Reassembly—Timer
The t-Reassembly timer may be used to detect a lost UMD PDU using a receiving AM RLC entity and a receiving UM RLC entity. Only one t-Reassembly timer may be driven at once. That is, when one t-Reassembly timer starts, an additional t-Reassembly timer is not driven.

(Examples for the Definition of the Timer)
5) t-Reassembly
This timer is used by the receiving side of an receiving AM RLC entity and receiving UM RLC entity in order to detect loss of RLC PDUs at lower layer. If t-Reassembly is running, t-Reassembly shall not be started additionally, i.e. only one t Reassembly per RLC entity is running at a given time.

Transmit operations and receive operations in the RLC UM of an NR are as follows.

UM data transfer
Transmit Operations
General

When a UMD PDU including a segment is delivered to a lower layer, the transmitting RLC entity operates as follows.
If the UMD PDU has included the last segment,
Assign an RLC SN, such as TX_Next_Segment, to an RLC SDU and increase TX_Next_Segment by 1.
Set the RLC SN of the UMD PDU as the RLC SN of the corresponding RLC SDU.

(Examples for Transmission of UMD PDU)

When delivering an UMD PDU that contains a segment of a RLC SDU, to lower layer, the transmitting side of an UM RLC entity shall:
if the UMD PDU contains the last segment, associate a SN with the RLC SDU equal to TX_Next_Segment and increment TX_Next_Segment by one;
set the SN of the UMD PDU to the SN of the corresponding RLC SDU.

Receive operations
General

The receiving RLC entity retains a receiving window as follows based on an RX_Next_Segment state variable.
If an RLC SN is within an (RX_Next_Segment−UM_Window_Size)<=SN<RX_Next_Segment section, the receiving RLC entity determines that the RLC SN is within the window,
If the RLC SN is out of the section, the receiving RLC entity determines that the RLC SN is out of the window.

When a UMD PDU is received from a lower layer, the actions of the receiving UM RLC entity are as follows.
Discard the received UMD PDU or place the received UMD PDU in the reception buffer or remove an RLC header and deliver the UMD PDU to a higher layer (if it is not a segment, that is, in the case of a complete RLC SDU).
If the received UMD PDU has been placed in the buffer,
Update window state variables, perform reassembly, deliver the RLC SDUs to a higher layer, and start or stop the t-Reassembly timer, if necessary.
If a t-Reassembly timer expires, the receiving RLC UM entity operates as follows.
Update the window state variables, discard a UMD PDU including a segment, and start the t-Reassembly timer, if necessary.

(Examples for Reception of UMD PDU)

The receiving UM RLC entity shall maintain a reordering window according to state variable RX_Next_Segment as follows:
a SN falls within the reordering window if (RX_Next_Segment−UM_Window_Size) <=SN<RX_Next_Segment
a SN falls outside of the reordering window otherwise.
When receiving an UMD PDU from lower layer, the receiving UM RLC entity shall:
either discard the received UMD PDU or place it in the reception buffer or remove the RLC header and deliver the RLC SDU to upper layer;
if the received UMD PDU was placed in the reception buffer:
update state variables, reassemble and deliver RLC SDU to upper layer and start/stop t-Reassembly as needed;
When t-Reassembly expires, the receiving UM RLC entity shall:
update state variables, discard UMD PDUs containing segment, and start t-Reassembly as needed.

<Actions of Receiving RLC UM Entity when UMD PDU is Received from Lower Layer>

When a UMD PDU having an RLC SN x and including segments corresponding to a part from a y byte to a z byte is received from a lower layer, the receiving RLC UM entity operates as follows.
If the received RLC SN x is greater than RX_DELIV_Segment and smaller than RX_Next_Segment and has been received before or the received RLC SN is greater than or equal to (RX_Next_Segment−UM_Window_Size) or smaller than RX_DELIV_Segment,
Discard the received UMD PDU.
If it is not the case,
Store the received UMD PDU in the reception buffer.

(Examples for the Actions when an UMD PDU is Received from Lower Layer)

When an UMD PDU is received from lower layer, where the UMD PDU contains byte segment numbers y to z of a RLC SDU with SN=x, the receiving side of an UM RLC entity shall:
if RX_DELIV_Segment<x<RX_Next_Segment and the UMD PDU with SN=x has been received before; or
if (RX_Next_Segment−UM_Window_Size) <=x<RX_DELIV_Segment:
discard the received UMD PDU;
else:
place the received UMD PDU in the reception buffer.

<Actions of Receiving RLC Entity when UMD PDU is Placed in Reception Buffer>

When a UMD PDU having an RLC SN x is placed in the reception buffer, the receiving UM RLC entity operates as follows.
If the received RLC SN x is out of a receiving window.
Update RX_Next_Segment variable with x+1.
Discard UMD PDUs having a segment corresponding to the RLC SN out of the window.
If RX_DELIV_Segment is out of the receiving window,
Update an RX_DELIV_Segment variable with the first RLC SN that is greater than or equal to (RX_Next_Segment ?UM_Window_Size) and that has not been completely received (not delivered to a higher layer) from among RLC SNs.
If not (if the received RLC SN x is within the receiving window)
Reassemble an RLC SDU from UMD PDUs including a segment corresponding to the received RLC SN x (the reassembly may be performed by removing a header and using an SI field or SO field).
If an RLC SDU having the RLC SN x is successful in the reassembly and has been completely received,
Deliver the reassembled RLC SDU to a higher layer.
If the RLC SN x is equal to RX_DELIV_Segment,
Update with an RX_DELIV_Segment value with the first RLC SN of a UMD PDU that is greater than a current RX_DELIV_Segment value and that has not been completely received.

If the t-Reassembly timer is driven,
   If RX_REORD_Segment is smaller than or equal to RX_DELIV_Segment or RX_REORD_Segment is not equal to RX_Next_Segment,
     or if RX_Next_Segment is equal to RX_DELIV_Segment+1 and an RLC SDU segment other than the last RLC SDU segment does not include a missed segment with respect to an RLC SDU having RX_DELIV_Segment as an SN,
     Stop and reset the t-Reassembly timer.

If a t-Reassembly timer is not driven (including a case where the t-Reassembly timer has been stopped)
   If RX_Next_Segment is equal to RX_DELIV_Segment+1 and at least one missed RLC SDU segment other than the last RLC SDU segment is present with respect to RX_DELIV_Segment or RX_Next_Segment−1,
     or if RX_Next_Segment is greater than RX_DELIV_Segment+1,
     Start the t-Reassembly timer.
     Set RX_REORD_Segment as RX_Next_Segment.

(Examples for the Actions when an UMD PDU is Placed in the Reception Buffer)

When an UMD PDU with SN=x is placed in the reception buffer, the receiving side of an UM RLC entity shall:
   if x falls outside of the receiving window:
     update RX_Next_Segment to x+1;
     discard any UMD PDUs containing segment with SN that falls outside of the receiving window;
     if RX_DELIV_Segment falls outside of the receiving window:
       set RX_DELIV_Segment to the SN of the first UMD PDU with SN>=(RX_Next_Segment−UM_Window_Size) that has not been completely received;
   else (if x falls within the receiving window)
     reassemble RLC SDU from any UMD PDUs containing segment with SN=x (and remove RLC headers when doing so;)
       if RLC SDU with SN=x is reassembled and completely received
       deliver the reassembled RLC SDU to upper layer;
         if x=RX_DELIV_Segment
           update RX_DELIV_Segment to the SN of the first UMD PDU with SN>current RX_DELIV_Segment that has not been completely received;
   if t-Reassembly is running:
     if RX_REORD_Segment<=RX_DELIV_Segment; or
     if RX_REORD_Segment falls outside of the receiving window and RX_REORD_Segment is not equal to RX_Next_Segment; or
     if RX_Next_Segment=RX_DELIV_Segment+1 and there is no missing RLC SDU segment except the last RLC SDU segment for RX_DELIV_Segment:
       stop and reset t-Reassembly;
   if t-Reassembly is not running (includes the case when t-Reassembly is stopped due to actions above):
     if RX_Next_Segment=RX_DELIV_Segment+1 and at least one missing RLC SDU segment except the last RLC SDU segment exists for RX_DELIV_Segment (or RX_Next_Segment−1); or
     (may be expressed, for example, if RX_Next_Segment=RX_DELIV_Segment+1 and if at least one missing part of a RLC SDU with RX_DELIV_Segment (or RX_Next_Segment−1) except the last part of that RLC SDU exists)
     if RX_Next_Segment>RX_DELIV_Segment+1:
       start t-Reassembly;
       set RX_REORD_Segment to RX_Next_Segment <Actions of Receiving RLC UM Entity when t-Reassembly Expires>

When the t-Reassembly timer expires, the receiving UM RLC entity operates as follows.
   Update RX_DELIV_Segment with the first RLC SN that is greater than or equal to RX_REORD_Segment and that has not been completely received.
   Discard UMD PDUs including a segment having an RLC SN smaller than the updated RX_DELIV_Segment.
   If RX_Next_Segment is equal to RX_DELIV_Segment+1 and at least one missed RLC SDU segment other than the last RLC SDU segment is present with respect to RX_DELIV_Segment or RX_Next_Segment−1,
   or if RX_Next_Segment is greater than RX_DELIV_Segment+1,
   Start the t-Reassembly timer.
   Set RX_REORD_Segment as RX_Next_Segment.

(Examples for the Actions when t-Reassembly Expires)

When t-Reassembly expires, the receiving UM RLC entity shall:
   update RX_DELIV_Segment to the SN of the first UMD PDU with SN>=RX_REORD_Segment that has not been completely received;
   discard any UMD PDUs containing segment with SN<updated RX_DELIV_Segment;
   if RX_Next_Segment=RX_DELIV_Segment+1 and at least one missing RLC SDU segment except the last RLC SDU segment exists for RX_DELIV_Segment (or RX_Next_Segment−1); or
   if RX_Next_Segment>RX_DELIV_Segment+1:
     start t-Reassembly;
     set RX_REORD_Segment to RX_Next_Segment The operation when the timer expires, the operation when the timer is triggered and the operation when the timer is stopped and reset, which have been proposed to reduce overhead and process a received packet in a segment level according to the (2-4) embodiment of the present disclosure, may also be identically applied to other embodiments (e.g., the (2-2) embodiment or the (2-3) embodiment).

Figure 2Q:
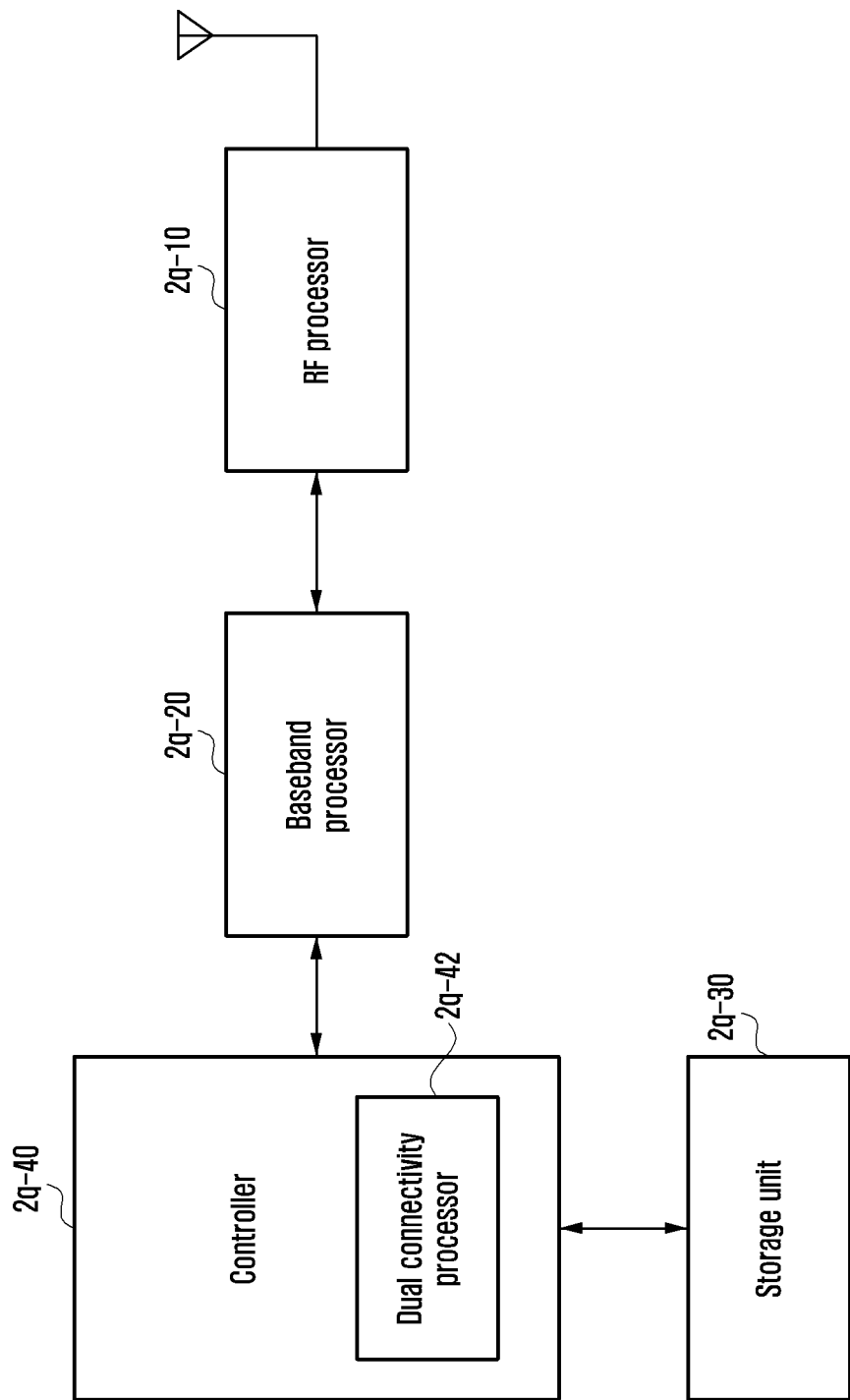
FIG. 2Q shows the configuration of a UE according to a second embodiment of the present disclosure.

FIG. 2Q shows the configuration of a UE according to a second embodiment of the present disclosure.

Referring to FIG. 2Q, the UE includes a radio frequency (RF) processor 2q-10, a baseband processor 2q-20, a storage unit 2q-30, and a controller 2q-40.

The RF processor 2q-10 performs functions for transmitting/receiving a signal through a radio channel, such as the band conversion and amplification of a signal. That is, the RF processor 2q-10 up-converts a baseband signal received from the baseband processor 2q-20 into an RF band signal, transmits the RF band signal through an antenna, and down-converts an RF band signal received through the antenna into a baseband signal. For example, the RF processor 2q-10 may include a transmission filter, a reception filter, an amplifier, a mixer, an oscillator, a DAC, and an ADC. In FIG. 2Q, only one antenna has been illustrated, but the UE may include multiple antennas. Furthermore, the RF processor 2q-10 may include multiple RF chains. Furthermore, the RF processor 2q-10 may perform beamforming. For the beamforming, the RF processor 2q-10 may adjust the phase and size of each of signals transmitted/received through multiple antennas or antenna elements. Furthermore, the RF processor may perform MIMO. When the MIMO operation is performed, the RF processor may receive multiple layers. The RF processor 2*q*-10 may properly configure multiple antenna or antenna elements under the control of the controller, and may perform received beam swiping or adjust the direction and beam width of the received beam so that the received beam cooperates with a transmitted beam.

The baseband processor 2*q*-20 performs a baseband signal and inter-bit stream conversion function based on the physical layer standard of a system. For example, when data is transmitted, the baseband processor 2*q*-20 generates complex symbols by coding and modulating a transmission bit stream. Furthermore, when data is received, the baseband processor 2*q*-20 reconstructs a reception bit stream from a baseband signal received from the RF processor 2*q*-10 through modulation and demodulation. For example, if an OFDM scheme is applied, when data is transmitted, the baseband processor 2*q*-20 generates complex symbols by coding and modulating a transmission bit stream, maps the complex symbols to subcarriers, and then configures OFDM symbols through inverse fast IFFT operation and CP insertion. Furthermore, when data is received, the baseband processor 2*q*-20 segments a baseband signal received from the RF processor 2*q*-10 in an OFDM symbol unit, reconstructs signals mapped to subcarriers through FFT operation, and reconstructs a reception bit stream through modulation and demodulation.

The baseband processor 2*q*-20 and the RF processor 2*q*-10 transmit and receive signals as described above. Accordingly, the baseband processor 2*q*-20 and the RF processor 2*q*-10 may be called a transmitter, a receiver, a transceiver or a communication unit. Furthermore, at least one of the baseband processor 2*q*-20 and the RF processor 2*q*-10 may include multiple communication modules in order to support different multiple radio access technologies. Furthermore, at least one of the baseband processor 2*q*-20 and the RF processor 2*q*-10 may include different communication modules in order to process signals of different frequency bands. For example, the different radio access technologies may include an LTE network and an NR network. Furthermore, the different frequency bands may include an SHF (e.g., 2.5 GHz, 5 GHz) band and a millimeter wave (e.g., 60 GHz) band.

The storage unit 2*q*-30 stores data, such as a basic program, an application program, and configuration information for the operation of the UE. The storage unit 2*q*-30 provides stored data in response to a request from the controller 2*q*-40.

The controller 2*q*-40 controls an overall operation of the UE. For example, the controller 2*q*-40 transmits/receives a signal through the baseband processor 2*q*-20 and the RF processor 2*q*-10. Furthermore, the controller 2*q*-40 writes data in the storage unit 2*q*-30 and reads data from the storage unit 2*q*-30. To this end, the controller 2*q*-40 may include at least one processor. For example, the controller 2*q*-40 may include a CP performing control for communication and an AP controlling a higher layer, such as an application program. Furthermore, the controller 2*q*-40 may include a dual connectivity processor 2*q*-42 configured to perform processing for an operation in a multi-connection mode.

Figure 2R:
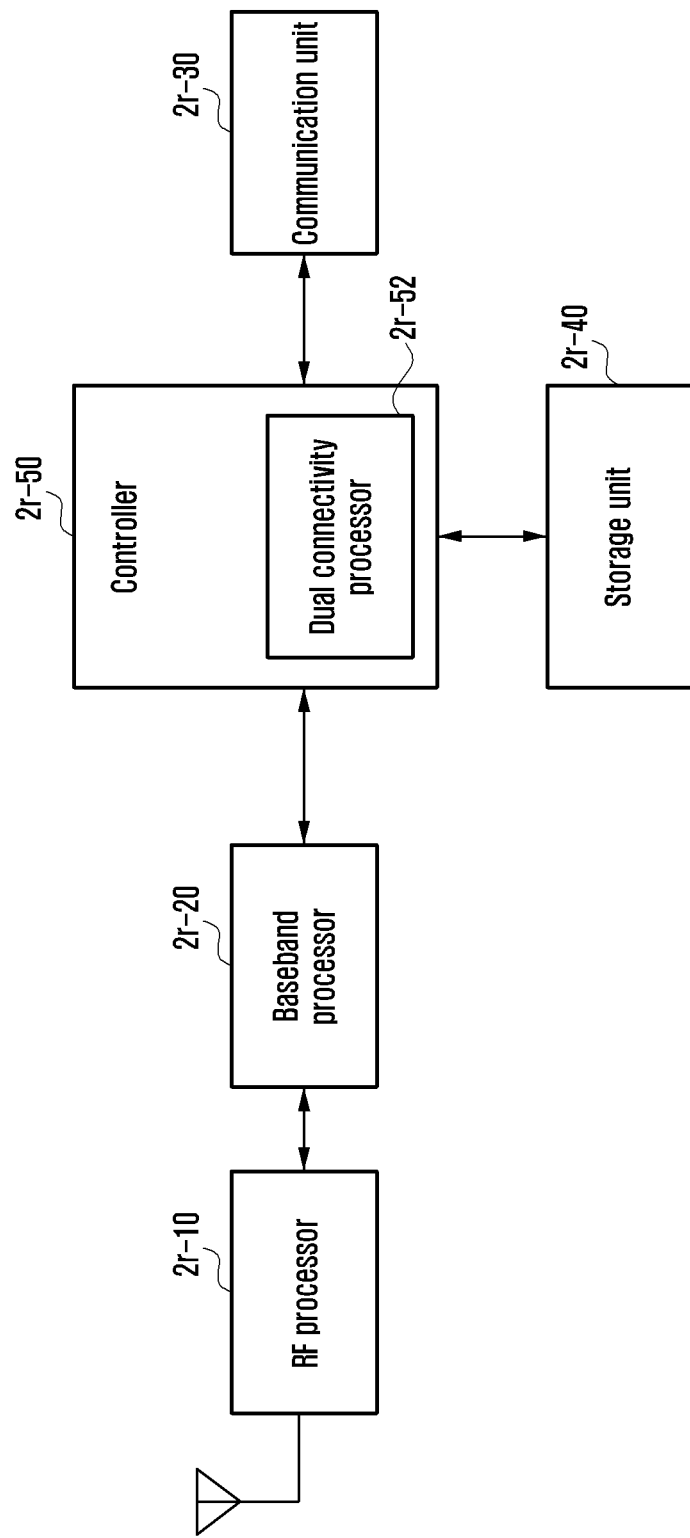
FIG. 2R shows a block diagram of an ENB in a wireless communication system according to a second embodiment of the present disclosure.

FIG. 2R shows a block diagram of a gNB in a wireless communication system according to a second embodiment of the present disclosure.

As shown in FIG. 2R, the gNB is configured to include an RF processor 2*r*-10, a baseband processor 2*r*-20, a backhaul communication unit 2*r*-30, a storage unit 2*r*-40 and a controller 2*r*-50.

The RF processor 2*r*-10 performs a function for transmitting/receiving a signal through a radio channel, such as the band conversion and amplification of a signal. That is, the RF processor 2*r*-10 up-converts a baseband signal received from the baseband processor 2*r*-20 into an RF band signal, transmits the RF band signal through an antenna, and down-converts an RF band signal received through the antenna into a baseband signal. For example, the RF processor 2*r*-10 may include a transmission filter, a reception filter, an amplifier, a mixer, an oscillator, a DAC, and an ADC. In FIG. 2R, only one antenna has been illustrated, but the gNB may include multiple antennas. Furthermore, the RF processor 2*r*-10 may include multiple RF chains. Furthermore, the RF processor 2*r*-10 may perform beamforming. For the beamforming, the RF processor 2*r*-10 may adjust the phase and size of each of signals transmitted/ received multiple antennas or antenna elements. The RF processor may perform a downlink MIMO operation by transmitting one or more layers.

The baseband processor 2*r*-20 performs a baseband signal and inter-bit stream conversion function based on the physical layer standard of a first radio access technology. For example, when data is transmitted, the baseband processor 2*r*-20 generates complex symbols by coding and modulating a transmission bit stream. Furthermore, when data is received, the baseband processor 2*r*-20 reconstructs a reception bit stream from a baseband signal received from the RF processor 2*r*-10 through modulation and demodulation. For example, if the OFDM scheme is applied, when data is transmitted, the baseband processor 2*r*-20 generates complex symbols by coding and modulating a transmission bit stream, maps the complex symbols to subcarriers, and configures OFDM symbols through IFFT operation and CP insertion. Furthermore, when data is received, the baseband processor 2*r*-20 segments a baseband signal received from the RF processor 2*r*-10 in an OFDM symbol unit, reconstructs signals mapped to subcarriers through FFT operation, and then reconstructs a reception bit stream through modulation and demodulation. The baseband processor 2*r*-20 and the RF processor 2*r*-10 transmit and receive signals as described above. Accordingly, the baseband processor 2*r*-20 and the RF processor 2*r*-10 may be called a transmitter, a receiver, a transceiver, a communication unit or a wireless communication unit.

The backhaul communication unit 2*r*-30 provides an interface for performing communication with other nodes within a network.

The storage unit 2*r*-40 stores data, such as a basic program, an application program, and configuration information for the operation of the gNB. Specifically, the storage unit 2*r*-40 may store information on a bearer allocated to an accessed UE and measurement results reported by an accessed UE. Furthermore, the storage unit 2*r*-40 may store information, that is, a criterion by which whether to provide a UE with multiple connections is determined. Furthermore, the storage unit 2*r*-40 provides stored data in response to a request from the controller 2*r*-50.

The controller 2*r*-50 controls an overall operation of the gNB. For example, the controller 2*r*-50 transmits/receives a signal through the baseband processor 2*r*-20 and the RF processor 2*r*-10 or through the backhaul communication unit 2*r*-30. Furthermore, the controller 2*r*-50 writes data in the storage unit 2*r*-40 and reads data from the storage unit 2*r*-40.

To this end, the controller 2r-50 may include at least one processor. Furthermore, the controller 2r-50 may include a dual connectivity processor 2r-52 configured to perform processing for an operation in a multi-connection mode.

Figure 3A:
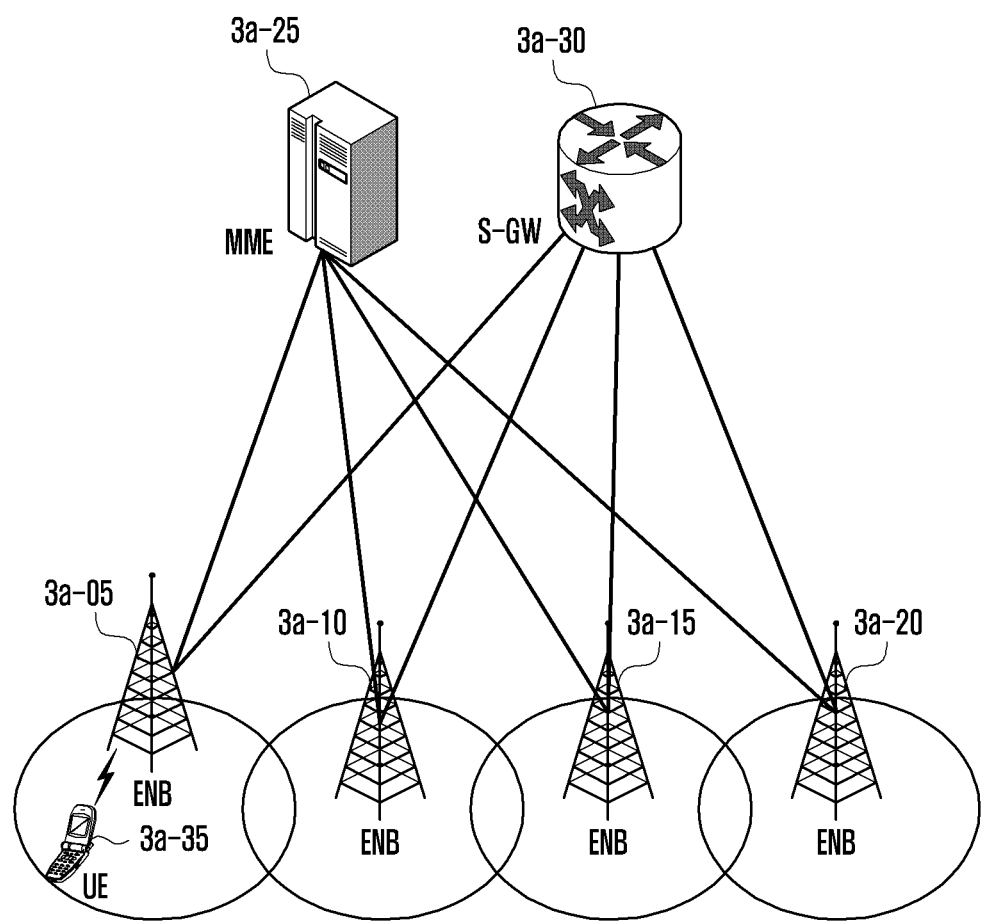
FIG. 3A illustrates a diagram showing the configuration of an LTE system to which the present disclosure may be applied.

FIG. 3A is a diagram showing the configuration of an LTE system to which the present disclosure may be applied.

Referring to FIG. 3A, the radio access network of the LTE system includes next-generation evolved Node Bs (hereinafter referred to as "ENBs", "Node Bs" or "base stations") 3a-05, 3a-10, 3a-15, and 3a-20, a mobility management entity (MME) 3a-25, and a serving-gate (S-GW) 3a-30. A user equipment (hereinafter referred to as a "UE or terminal") 3a-35 accesses an external network through the ENBs 3a-05~3a-20 and the S-GW 3a-30.

In FIG. 3A, the ENBs 3a-05~3a-20 correspond to the Node Bs of the existing UMTS system. The ENB is connected to the UE 3a-35 through a radio channel and performs a more complex function than the existing Node B. In the LTE system, all of types of user traffic including a real-time service, such as VoIP, through the Internet protocol, are served through a shared channel. Accordingly, a device that performs schedules by collecting state information, such as the buffer state, available transmission power state, and channel state of UEs, is necessary. The ENBs 3a-05~3a-20 are in charge of such a device. In general, one ENB controls multiple cells. For example, in order to implement the transfer rate of 100 Mbps, the LTE system uses OFDM as a radio access technology in the 20 MHz bandwidth, for example. Furthermore, the LTE system adopts an AMC scheme for determining a modulation scheme and a channel coding rate based on the channel state of a UE. The S-GW 3a-30 provides a data bearer and generates or removes a data bearer under the control of the MME 3a-25. The MME is in charge of various control functions in addition to a mobility management function for a UE, and is connected to multiple ENBs.

Figure 3B:
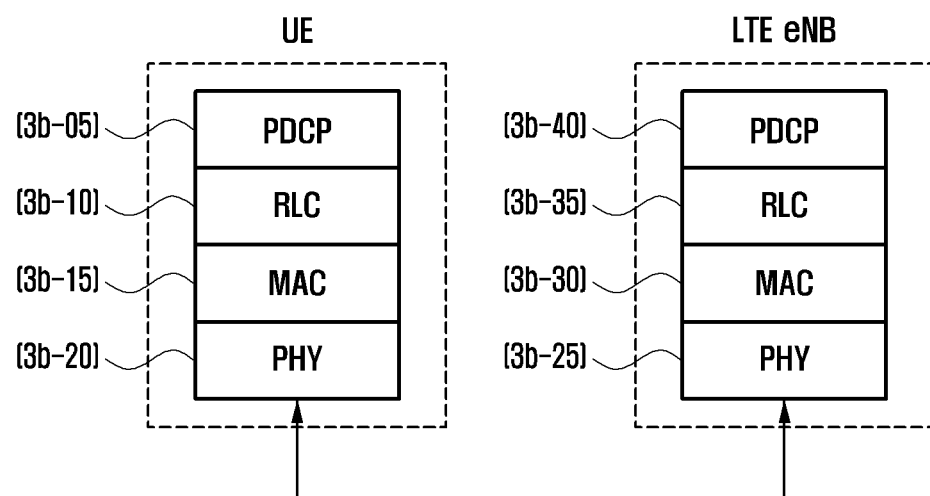
FIG. 3B illustrates a diagram showing radio protocol architecture in an LTE system to which the present disclosure may be applied.

FIG. 3B is a diagram showing radio protocol architecture in an LTE system to which the present disclosure may be applied.

Referring to FIG. 3B, the radio protocol of the LTE system includes PDCPs 3b-05 and 3b-40, RLC 3b-10 and 3b-35, and MAC 3b-15 and 3b-30 in a UE and an ENB, respectively. The PDCPs 3b-05 and 3b-40 are in charge of an operation, such as IP header compression/restoration. Major functions of the PDCP 3b-05, 3b-40 are summarized as follows.

Header compression and decompression: ROHC only
Transfer of user data
In-sequence delivery of upper layer PDUs in PDCP re-establishment procedure for RLC AM
Reordering function (for split bearers in DC (only support for RLC AM): PDCP PDU routing for transmission and PDCP PDU reordering for reception)
Duplicate detection of lower layer SDUs in PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The RLC 3b-10, 3b-35 reconfigures a PDCP packet data unit (PDU) in a proper size and performs an ARQ operation. Major functions of the RLC are summarized as follows.

Transfer of upper layer PDUs
ARQ function (Error Correction through ARQ (only for AM data transfer))
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 3b-15, 3b-30 is connected to multiple RLC layer devices configured in one UE, and performs an operation of multiplexing RLC PDUs with a MAC PDU and demultiplexing RLC PDUs from a MAC PDU. Major functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels)
Scheduling information reporting
Error correction through HARQ
Priority handling between logical channels of one UE
Priority handling between UEs by means of dynamic scheduling
MBMS service identification
Transport format selection
Padding A physical layer 3b-20, 3b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OPDM symbol to a higher layer.

Figure 3C:
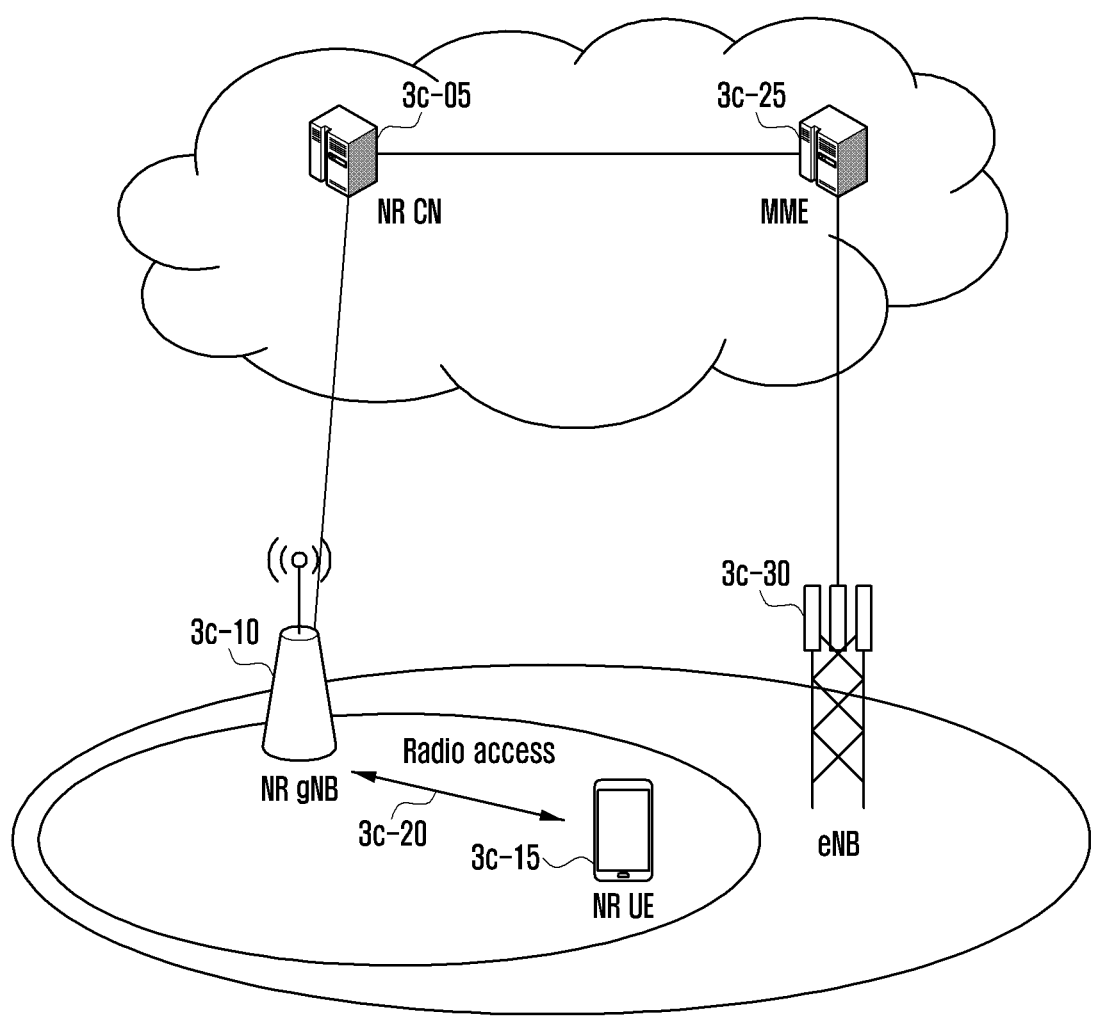
FIG. 3C illustrates a diagram showing the configuration of a next-generation mobile communication system to which the present disclosure may be applied.

FIG. 3C is a diagram showing the configuration of an NR to which the present disclosure may be applied.

Referring to FIG. 3C, the radio access network of a next-generation mobile communication system (hereinafter referred to as an "NR" or "5G") includes a new radio Node B (hereinafter referred to as an "NR gNB" or an "NR base station") 3c-10 and a new radio core network (NR CN) 3c-05. A new radio user equipment (hereinafter referred to as an "NR UE" or a "terminal") 3c-15 accesses an external network through the NR gNB 3c-10 and the NR CN 3c-05.

In FIG. 3C, the NR gNB 3c-10 corresponds to an evolved Node B (ENB) of the existing LTE system. The NR gNB is connected to the NR UE 3c-15 through a radio channel, and may provide an excellent service compared to the existing Node B. The NR requires a device for performing scheduling by collecting state information, such as the buffer state, available transmission power state, and channel state of UEs, because all of types of user traffic are served through a shared channel. The NR gNB 3c-10 is in charge of the device. In general, one NR gNB controls multiple cells. In order to implement ultra-high speed data transfer compared to the existing LTE, the NR may have the existing maximum bandwidth or more and may additionally graft the beam-forming technology using OFDM as a radio access technology. Furthermore, the NR adopts the AMC scheme that determines a modulation scheme and a channel coding rate based on the channel state of a UE. The NR CN 3c-05 performs functions, such as mobility support, a bearer configuration, and a QoS configuration. The NR CN 3c-05 is in charge of various control functions in addition to a mobility management function for a UE, and is connected to multiple ENBs. Furthermore, the NR may also operate in conjunction with the existing LTE system. The NR CN is connected to an MME 3c-25 through a network interface. The MME is connected to an ENB 3c-30, that is, the existing ENB.

Figure 3D:
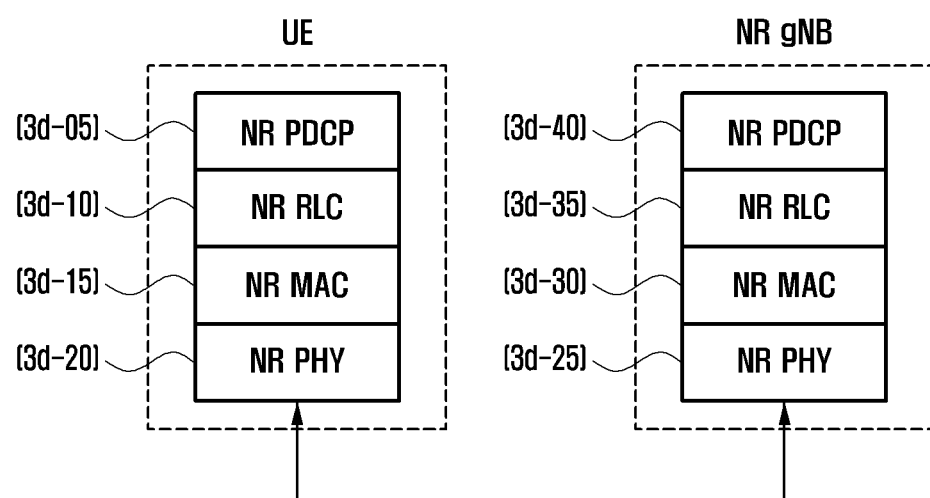
FIG. 3D illustrates a diagram showing radio protocol architecture of a next-generation mobile communication system to which the present disclosure may be applied.

FIG. 3D is a diagram showing radio protocol architecture of an NR to which the present disclosure may be applied.

Referring to FIG. 3D, the radio protocol of the NR includes NR PDCPs 3d-05 and 3d-40, NR RLC 3d-10 and 3d-35, and NR MAC 3d-15 and 3d-30, respectively, in a UE and an NR base station. Major functions of the NR PDCP 3d-05, 3d-40 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

The reordering function of the NR PDCP entity refers to a function of sequentially reordering PDCP PDUs received from a lower layer based on a PDCP sequence number (SN). The reordering function may include a function of transmitting data to a higher layer in a reordered sequence, a function of directly transmitting data to a higher layer without taking the sequence into consideration, a function of reordering the sequence and recording lost PDCP PDUs, a function of making a status report on lost PDCP PDUs to the transmission side, and a function of requesting the retransmission of lost PDCP PDUs.

Major functions of the NR RLC 3d-10, 3d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of the RLC SDUs
Re-segmentation of RLC data PDUs
Reordering of RLC data PDUs
Duplicate detection
Protocol error detection
RLC SDU discard
RLC re-establishment The in-sequence delivery function of the NR RLC entity refers to a function of transmitting RLC SDUs received from a lower layer to a higher layer in sequence, and may include a function of reassembling and transmitting multiple RLC SDUs if one RLC SDU has been originally segmented into the multiple RLC SDUs and received. The in-sequence delivery function may include a function of reordering received RLC PDUs based on an RLC SN (SN) or a PDCP SN, a function of reordering the sequence and recording lost RLC PDUs, a function of transmitting a status report on lost RLC PDUs to the transmission side, a function of requesting the retransmission of lost RLC PDUs, and a function of transmitting only RLC SDUs prior to a lost RLC SDU to a higher layer in sequence if a lost RLC SDU is present or a function of transmitting all of RLC SDUs received before a given timer expires to a higher layer in sequence when the timer expires although there is a lost RLC SDU or a function of transmitting all of RLC SDUs received so far to a higher layer when a given timer expires although there is a lost RLC SDU. Furthermore, the in-sequence delivery function may include a function of processing RLC PDUs in order that they are received (in order of arrival regardless of the sequence of a sequence number) and transmitting the RLC PDUs to a PDCP entity regardless of their sequence (i.e., out-of sequence delivery). The in-sequence delivery function may include a function of receiving segments placed in a buffer or segments to be received subsequently, reconfiguring the segments into one complete RLC PDU, processing the RLC PDU, and transmitting the RLC PDU to the PDCP entity. The NR RLC layer may not include a concatenation function. The concatenation function may be performed by the NR MAC layer or may be substituted with the multiplexing function of the NR MAC layer.

The out-of-sequence delivery function of the NR RLC entity refers to a function of directly transmitting RLC SDUs received from a lower layer to a higher layer regardless of their sequence. The out-of-sequence delivery function may include a function of reassembling multiple RLC SDUs if one RLC SDU has been originally segmented into the multiple RLC SDUs and received. The out-of-sequence delivery function may include a function of storing the RLC SN or PDCP SN of received RLC PDUs, reordering their sequence, and recording lost RLC PDUs.

The NR MAC 3d-15, 3d-30 may be connected to multiple NR RLC layer devices configured in one UE. Major functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 3d-20, 3d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

Figure 3E:
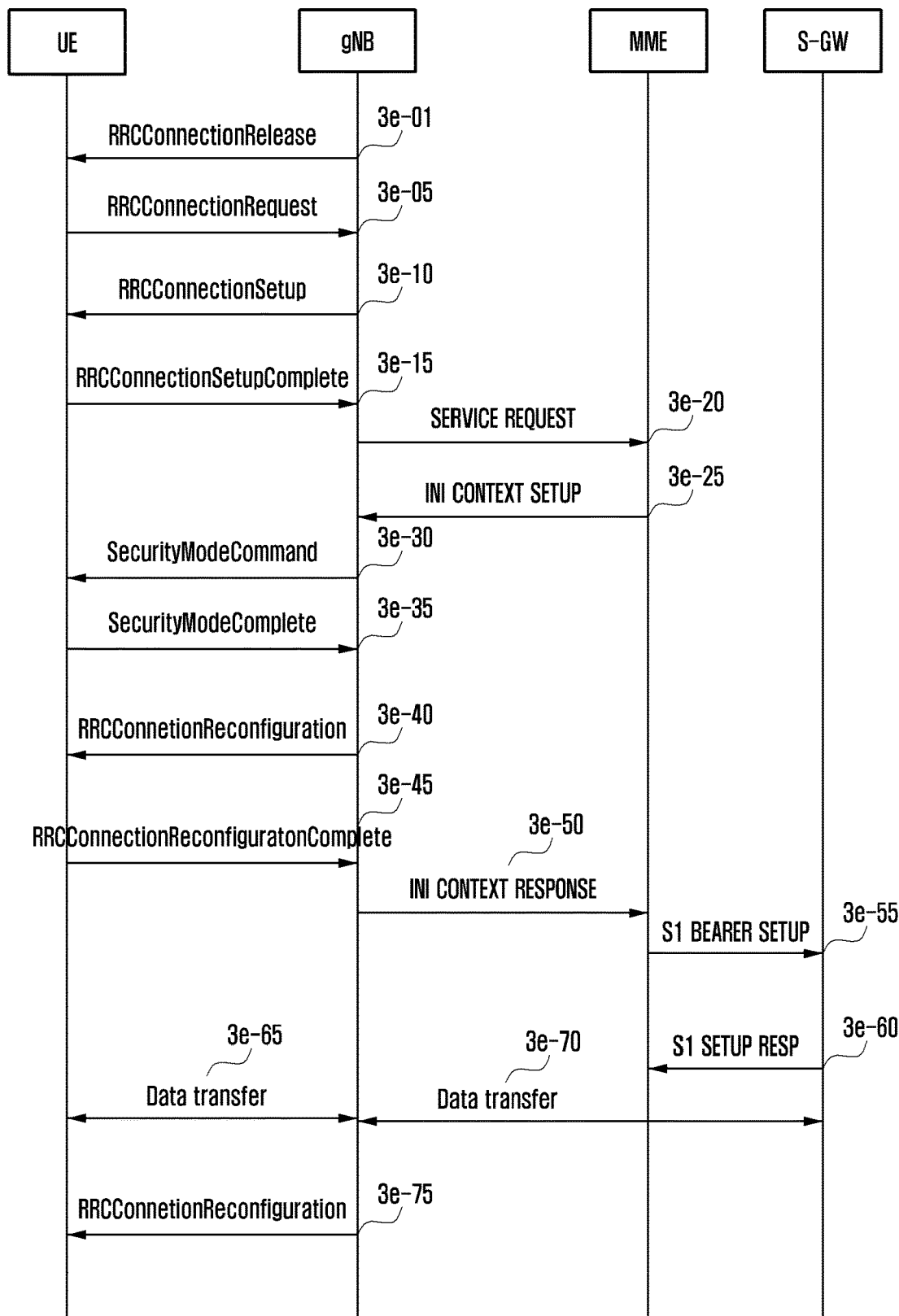
FIG. 3E is a diagram illustrating a procedure for a UE to switch from an RRC idle mode to an RRC connected mode and to establish a connection with a network according to a third embodiment of the present disclosure.

FIG. 3E is a diagram illustrating a procedure for a UE to switch from an RRC idle mode to an RRC connected mode and to establish a connection with a network according to a third embodiment of the present disclosure.

In FIG. 3E, if the UE that transmits and receives data in an RRC connected mode does not transmit and receive data for a given cause or for a given time, a gNB may transmit an RRCConnectionRelease message to the UE so that switches to an RRC idle mode (3e-01). When data to be transmitted subsequently occurs in the UE with which a connection is not now established (hereinafter referred to as "idle mode UE"), the UE performs an RRC connection establishment process with the gNB. The UE establishes backward transmission synchronization with the gNB through a random access process and transmits an RRCConnectionRequest message to the gNB (3e-05). The ID of the UE and a cause (establishmentCause) of establishing a connection are included in the RRCConnectionRequest message. The gNB transmits an RRCConnectionSetup message so that the UE establishes an RRC connection (3e-10).

The RRCConnectionSetup message may include the length of an RLC SN to be used when the RLC AM or UM is used for each service/bearer/RLC entity or for each logical channel, the length of an SO field applied when a segmentation operation is performed, a timer value if a timer (reassembly timer) is used in the Rx stage in the RLC UM, an indicator indicating whether or not to use an RLC SN with respect to a complete RLC PDU, information for configuring a VT(S) variable to be used in the Tx stage in the RLC UM, information such as an initial value, whether or not to perform an SI-based segmentation operation, etc. Furthermore, the RRCConnectionSetup message may include configuration information or reset information (e.g., initial values and configuration information of RX_Next, RX_Next_Highest_Rcvd, RX_Next_Status_Trigger, and RX_Highest_Status variables, for example, the initial value is set to 0) of window variables to be used in an RLC AM RLC entity, t-Reordering timer configuration information (e.g., a timer value or a triggering time) to be used in an RLC AM RLC entity (the information may be included in rlc-config, that is, RLC configuration information), etc.

Furthermore, the RRCConnectionSetup message includes RRC connection configuration information, etc. The RRC connection is also called a signaling radio bearer (SRB), and is used to transmit and receive RRC messages, that is, control message between the UE and the gNB. The UE that has established the RRC connection transmits an RRCConnectionSetupComplete message to the gNB (3e-15). The RRCConnectionSetupComplete message may include a control message called SERVICE REQUEST that the UE requests a bearer configuration for a given service from the MME. The gNB transmits a SERVICE REQUEST message included in the RRCConnectionSetupComplete message to the MME (3e-20). The MME determines whether to provide the service requested by the UE. If, as a result of the determination, the MME has determined to provide the service requested by the UE, the MME transmits a message called INITIAL CONTEXT SETUP REQUEST to the gNB (3e-25).

The INITIAL CONTEXT SETUP REQUEST message includes information, such as quality of service (QoS) information to be applied when a data radio bearer (DRB) is configured and security-related information (e.g., a security key, a security algorithm) to be applied to a DRB. The gNB exchanges a SecurityModeCommand message 3e-30 and a SecurityModeComplete message 3e-35 with the UE in order to configure security. When the security configuration is completed, the gNB transmits an RRCConnectionReconfiguration message to the UE (3e-40). The RRCConnectionReconfiguration message may include the length of an RLC SN to be used when the RLC AM or UM is used for each service/bearer/RLC entity or for each logical channel, the length of an SO field applied when a segmentation operation is performed, a timer value if a timer (reassembly timer) is used in the Rx stage in the RLC UM, an indicator indicating whether or not to use an RLC SN with respect to a complete RLC PDU, information for configuring a VT(S) variable to be used in the Tx stage in the RLC UM, information such as an initial value, whether or not to perform an SI-based segmentation operation, etc. Furthermore, the RRCConnectionReconfiguration message may include configuration information or reset information (e.g., initial values and configuration information of RX_Next, RX_Next_Highest_Rcvd, RX_Next_Status_Trigger, and RX_Highest_Status variables, for example, the initial value is set to 0) of window variables to be used in an RLC AM RLC entity, t-Reordering timer configuration information (e.g., a timer value or a triggering time) to be used in an RLC AM RLC entity (the information may be included in rlc-config, that is, RLC configuration information), etc.

Furthermore, the RRCConnectionReconfiguration message includes configuration information of a DRB in which user data will be processed. The UE configures a DRB by applying the information and transmits an RRCConnectionReconfigurationComplete message to the gNB (3e-45).

The gNB that has completed the DRB configuration with the UE transmits an INITIAL CONTEXT SETUP COMPLETE message to the MME (3e-50). The MME that has received the message exchanges an S1 BEARER SETUP message and an S1 BEARER SETUP RESPONSE message with an S-GW in order to configure an S1 bearer (3e-55, 3e-60). The S1 bearer is a connection for data transmission established between the S-GW and the gNB and corresponds to a DRB in a one-to-one manner. When the process is fully completed, the UE transmits and receives data through the gNB and the S-GW (3e-65, 3e-70). As described above, a known data transmission process basically includes the three steps of the RRC connection configuration, security configuration and DRB configuration. Furthermore, the gNB may transmit an RRCConnectionReconfiguration message to the UE in order to newly provide a configuration to the UE or add or change a configuration for a given cause (3e-75).

The RRCConnectionReconfiguration message may include the length of an RLC SN to be used when the RLC AM or UM is used for each service/bearer/RLC entity or for each logical channel, the length of an SO field applied when a segmentation operation is performed, a timer value if a timer (reassembly timer) is used in the Rx stage in the RLC UM, an indicator indicating whether or not to use an RLC SN with respect to a complete RLC PDU, information for configuring a VT(S) variable to be used in the Tx stage in the RLC UM, information such as an initial value, whether or not to perform an SI-based segmentation operation, etc. Furthermore, the RRCConnectionSetup message may include configuration information or reset information (e.g., initial values and configuration information of RX_Next, RX_Next_Highest_Rcvd, RX_Next_Status_Trigger, and RX_Highest_Status variables, for example, the initial value is set to 0) of window variables to be used in an RLC AM RLC entity, t-Reordering timer configuration information (e.g., a timer value or a triggering time) to be used in an RLC AM RLC entity (the information may be included in rlc-config, that is, RLC configuration information), etc.

Figure 3F:
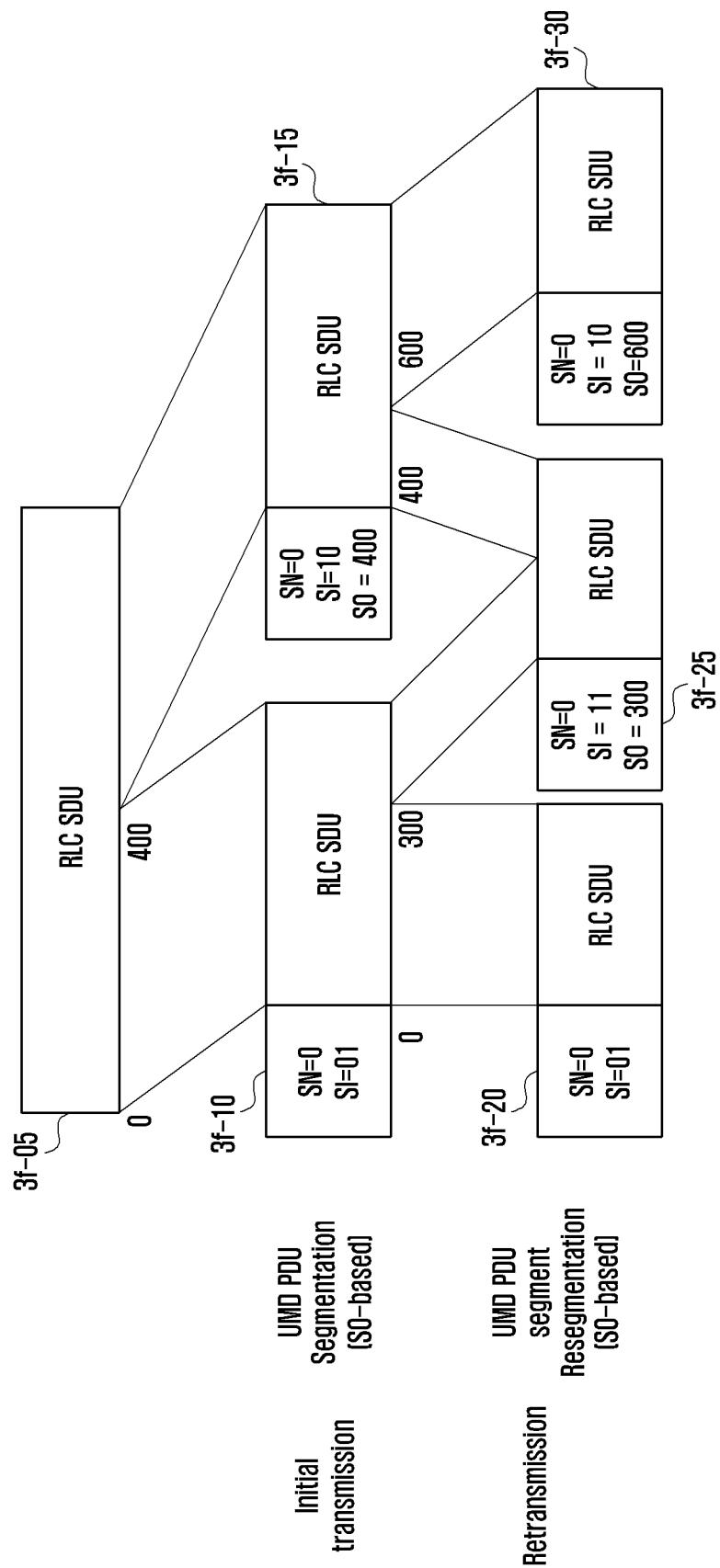
FIG. 3F illustrates a diagram showing an SO-based segmentation operation proposed in the RLC layer RLC AM according to a third embodiment of the present disclosure.

FIG. 3F is a diagram showing an SO-based segmentation operation proposed in the RLC layer RLC AM according to a third embodiment of the present disclosure.

In an NR, a procedure and method for performing a segmentation operation on a packet received from a higher layer based on a segment offset (SO) in the RLC layer may be applied. In the proposed method, an integrated segmentation operation may be performed regardless of a case where transmission is initially performed and a case where retransmission is performed when a segmentation operation is performed. Furthermore, concatenation may not be performed in the RLC layer. Furthermore, whether an RLC SDU, that is, a data part at the back of an RLC header, is a complete RLC SDU that has not been segmented, the first RLC SDU segment that has been segmented, the middle RLC SDU segment that has been segmented or the last RLC SDU segment that has been segmented may be determined by introducing an SI field into an RLC header. Furthermore, there is no a length field indicative of the length of an RLC header.

In FIG. 3F, an RLC layer receives a PDCP PDU (RLC SDU) 3f-05 from a PDCP layer that is a higher layer. The RLC SDU may be processed in a size indicated by a MAC layer. If an RLC SDU is segmented, it may include segmentation information of a header and may form an RLC PDU. The RLC PDU includes an RLC header and RLC payload (RLC SDU). The RLC header may include the property (data or control information) and segmentation information of the RLC PDU, and may include a data/control (D/C) field, a P field, an SI field, an SN field and an SO field. In the above, in the RLC UM in which an ARQ is not supported, the P field is not present and may be substituted with a reserved field.

Referring to Table 4, the D/C field is 1 bit and is used to indicate whether a formed RLC PDU is a control PDU or a data PDU.

TABLE 4

| Value | Description |
|-------|-------------|
| 0 | Control PDU |
| 1 | Data PDU |

The SN field indicates the sequence number of an RLC PDU and may have a given length. For example, the SN field may have a 12-bit or 18-bit length.

The SO field may have a size of 2 bytes and indicates that an RLC SDU segment has been first segmented at which location of the RLC SDU. The SO field is used to indicate the first byte of a segmented segment.

The P field may enable an Rx stage to perform an RLC status report by setting the P field to 1 when a condition in which polling is triggered occurs in a Tx stage. That is, the P field enables ACK/NACK information about RLC PDUs received so far to be delivered to the Tx stage.

When the RLC SDU 3f-05 is received, the RLC layer may generate an RLC header and generate an RLC PDU by directly inserting an RLC SN into the RLC SDU. If a segmentation operation is necessary for a given cause, RLC PDUs may be generated by updating an SI field and adding an SO field to the RLC header as in 3f-10 and 3f-15. That is, the SO field may be added or may not be added to a segmented segment depending on a given condition after a segmentation operation. The given condition is determined based on an SI field to be described below. A given reason why the segmentation operation is necessary may include a case where a segmentation operation for a given MAC SDU (RLC PDU) has been requested from the RLC layer because the size of a MAC subheader and MAC SDU that has now been generated is greater than the size of a transmission resource allocated by the MAC layer.

The SN field is the sequence number of an RLC PDU, and may reuse a PDCP SN if the PDCP SN is necessary or configured. The SO field is a field having a given length and may indicate that the first byte of a segmented RLC PDU data field (RLC SDU) corresponds to which byte of the original RLC PDU data field (RLC SDU) at the time of initial transmission. At the time of retransmission, the SO field may indicate that the first byte of a re-segmented RLC PDU data field corresponds to which byte of the original RLC PDU data field (RLC SDU). The length of the SO field may have a fixed length (e.g., 2 bytes) or may be configured by an RRC message (e.g., RRCConnectionSetup or RRC-ConnectionReconfiguration message, 2e-10, 2e-40, 2e-75). Referring to Table 5, the SI field may be defined as follows or may be called a different name.

TABLE 5

| Value | Description |
|-------|-------------|
| 00 | Complete RLC PDU |
| 01 | First segment of RLC PDU |
| 10 | Last segment of RLC PDU |
| 11 | Middle segment of RLC PDU |

If the SI field is 00, it indicates a complete RLC PDU that has not been segmented. In this case, an SO field is not necessary for an RLC header. If the SI field is 01, it indicates the first RLC PDU segment that has been segmented. In this case, an SO field is not necessary for an RLC header. The reason for this is that in the case of the first segment, an SO field always indicates 0. If the SI field is 10, it indicates the last RLC PDU segment that has been segmented. In this case, an SO field is necessary for an RLC header. If the SI field is 11, it indicates the middle RLC PDU segment that has been segmented. In this case, an SO field is necessary for an RLC header. A mapping relation between the 2-bit and the four types of information (i.e., the complete RLC PDU, the first segment, the last segment and the middle segment) may have a total of 4×3×2×1=24 types. Table 5 shows an example of the 24 types. The present disclosure includes all of the 24 cases mapping relation. If the RLC PDUs 3f-10 and 3f-15 fail in transmission, retransmission may be performed. In this case, if a transmission resource is not sufficient, re-segmentation may be performed like 3f-20, 3f-25, and 3f-30. When the Re-segmentation is performed, the SI fields and SO field of newly generated RLC PDUs 3f-20, 3f-25 and 3f-30 may be updated. In the case of the RLC PDU 3f-20, SI is updated with 01 and an SO field is not necessary because the RLD PDU is the first segment.

In the case of the RLC PDU 3f-25, since it is the middle segment, SI is updated with 11, and an SO field is updated with 300 so that the SO field may indicate that the first byte of an RLC PDU data field (RLC SDU) corresponds to which byte of the original RLC PDU data field (RLC SDU). In the case of the RLC PDU 3f-30, since it is the last segment, SI is updated with 10 and an SO field is updated with 600 so that the SO field may indicate that the first byte of an RLC PDU data field (RLC SDU) corresponds to which byte of the original RLC PDU data field (RLC SDU).

Figure 3G:
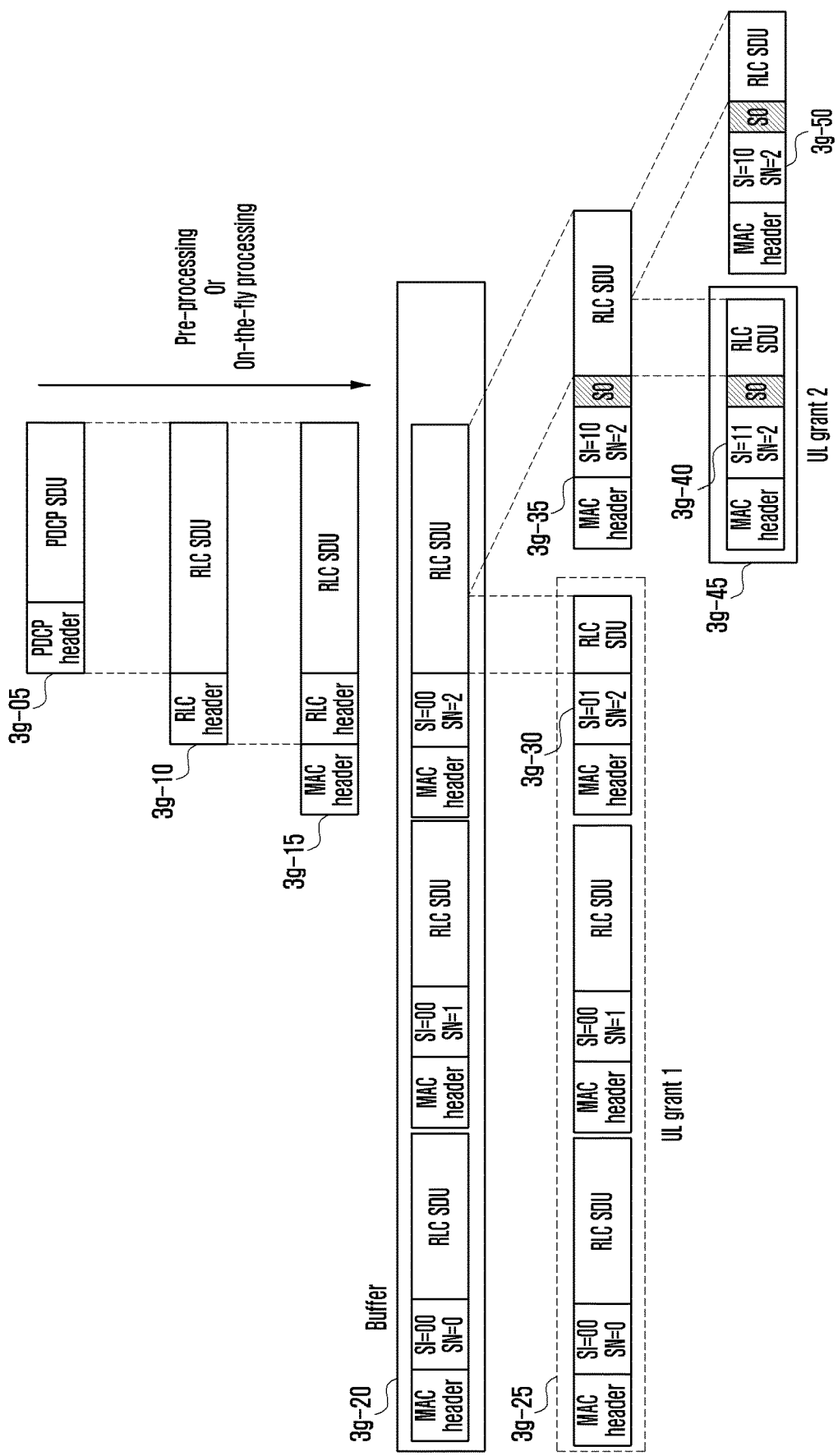
FIG. 3G illustrates a diagram showing a data processing operation to which the SO-based segmentation method of the RLC AM according to the third embodiment of the present disclosure has been applied.

FIG. 3G is a diagram showing a data processing operation to which the SO-based segmentation method of the RLC AM according to the third embodiment of the present disclosure has been applied.

In FIG. 3G, when an IP packet arrives at a PDCP layer, a PDCP header may be attached and a PDCP PDU (or RLC SDU) 3g-05 may be delivered to an RLC layer. The RLC layer may complete an RLC PDU 3g-10 by first generating an RLC header, assigning an RLC SN and configuring the RLC header, and may deliver the RLC PDU to a MAC layer. The MAC layer may calculate the size of a MAC SDU (or RLC PDU), may configure an L field, may configure a corresponding logical channel identifier, may configure an MAC subheader 3g-15, and may place the MAC subheader in a buffer 3g-20. Accordingly, according to such a method, data pre-processing may be performed on data packets received by the PDCP layer before a transmission resource (UL grant) is received from a gNB, and the data packets may be placed in the buffer. Alternatively, data processing may be directly performed on the data packets (on-the-fly processing) right after the transmission resource is received. If an uplink transmission resource (UL grant 1) 3g-25 has been received from a gNB, but a segmentation operation needs to be performed because the uplink transmission resource is not sufficient, after a segmentation operation is performed like 3g-30, an SI field may be configured in the RLC header of each segment based on each segment, and the RLC headers of the segments may be newly configured (3g-30, 2g35). Furthermore, as described in FIG. 3F, in the middle segment or the last segment other than the first segment, an SO field needs to be added and a corresponding offset needs to be indicated. Accordingly, an SO field may be added to the RLC header like 3g-35. Furthermore, a MAC PDU configured based on the uplink transmission resource may be transmitted. If a second uplink transmission resource (UL grant 2) 3g-45 has been received, but a segmentation operation is necessary once more because the size of the transmission resource is insufficient, SI fields are updated and SO fields are updated or added based on newly segmented segments, and RLC headers are configured like 3g-40 and 3g-50. Furthermore, MAC PDUs are configured based on the uplink transmission resource (UL grant 2) and transmitted.

The SO-based segmentation method is characterized in that although a segmentation operation is performed, the RLC SNs of the original RLC PDUs of segmented segments are the same. Accordingly, segments segmented from one RLC PDU have the same RLC SNs of the original RLC PDUs (3g-30, 3g-35, 3g-40, 3g-40, 3g-50).

An RLC layer may operate in the RLC AM, RLC UM, and RLC TM. In the RLC AM, the RLC layer supports an ARQ function, and a Tx stage may receive an RLC status report from an Rx stage and may perform retransmission on lost (ACKed) RLC PDUs through the status report. If the retransmission is performed, a re-segmentation operation may be performed when an uplink transmission resource is not sufficient. Accordingly, reliable transmission of data not having an error is guaranteed, and services that require high reliability are provided. In order to efficiently support the ARQ function, accurate information about lost RLC PDUs is necessary. Accordingly, an SO field may be usefully used. That is, which RLC PDU has been lost and which part of an RLC PDU has been lost may be indicated more specifically in an RLC status report through the SO field. When the Tx stage receives detailed information of a lost RLC PDU through an SO field, it may perform retransmission by performing an SO-based segmentation operation based on the detailed information.

Various embodiments of the present disclosure propose an Rx stage window operation for a receiving RLC entity of the RLC AM to efficiently detect a lost packet (RLC PDU) and report it to a Tx stage and a timer operation.

First, in order to describe the Rx stage window operation of the receiving RLC entity and the timer operation proposed in various embodiments of the present disclosure, the receiving side of each AM RLC entity shall maintain the following four state variables.

1) RX_Next—Receive State Variable

This state variable holds the value of an SN following the last one of in-sequence completely received RLC SDUs, and serves as the lower edge of the receiving window. The variable is initially set to 0 and is updated with RX_Next+1 whenever the AM RLC entity receives an RLC SDU with SN=RX_Next.

2) RX_Next_Status_Trigger—t-Reordering State Variable

The state variable indicates a next SN of an RLC SN that has triggered the t-Reordering timer. The t-Reordering timer is triggered when a lost packet is detected, and a t-Reordering timer value indicates how long should it wait for a lost packet. If a lost packet does not arrive although the t-Reordering timer value has expired, related window state variables are updated, and an RLC status report is configured and transmitted to a Tx stage, thus requesting retransmission. The timer value may be set through an RRC message, such as 3e-10, 3e-40 or 3e-75 of FIG. 3E.

3) RX_Highest_Status—Maximum STATUS Transmit State Variable

The state variable holds the highest possible value of an SN which can be indicated by "ACK_SN" when a STATUS PDU needs to be constructed. It is initially set to 0.

4) RX_Next_Highest_Rcvd—Highest Received State Variable

This state variable holds the value of an SN following the SN of an RLC SDU with the highest SN among received RLC SDUs. It is initially set to 0.

Figure 3H:
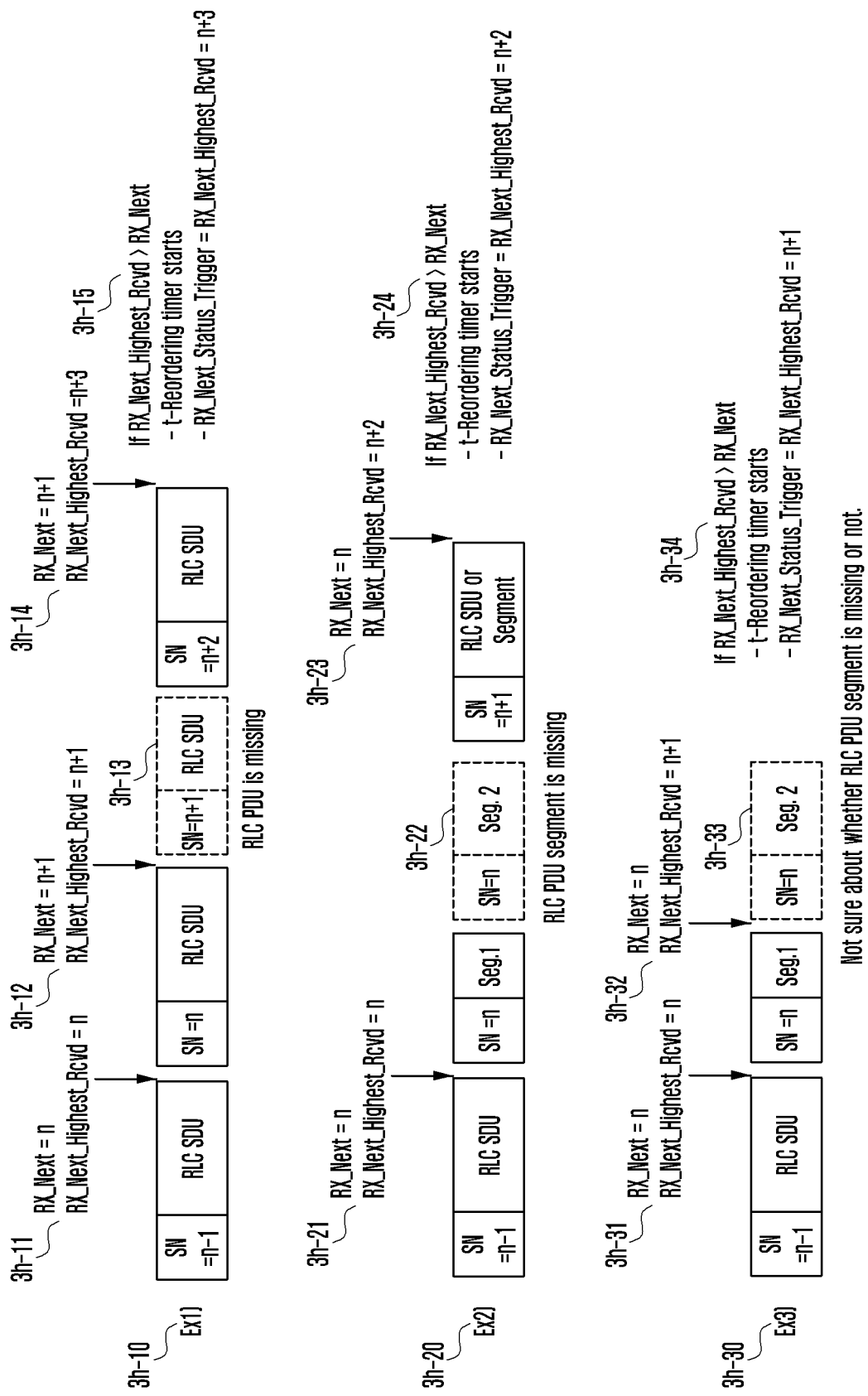
FIG. 3H illustrates a diagram showing a method of detecting a lost packet based on an RLC SN according to a (3-1) embodiment of the present disclosure.

FIG. 3H is a diagram showing a method of detecting a lost packet based on an RLC SN according to a (3-1) embodiment of the present disclosure.

In FIG. 3H, a receiving RLC entity updates and operates the window state variables defined above whenever an RLC PDU is received. In FIG. 3H, an example 1 (3h-10) is first described below. The receiving RLC entity may receive an RLC SDU having an RLC SN n−1. Accordingly, RX_Next is updated with a next RLC SN of an in-sequence completely received last RLC SDU, resulting in RX_Next=n. RX_Next_Highest_Rcvd is a next number of the highest RLC SN from among RLC SNs received so far, and is thus updated with RX_Next_Highest_Rcvd=n (3h-11).

In accordance with the method of detecting a lost packet based on an RLC SN according to the (3-1) embodiment of the present disclosure, the receiving RLC entity determines that a lost packet is present when the RX_Next_Highest_Rcvd variable value is greater than RX_Next, and triggers the t-Reordering timer.

Thereafter, the receiving RLC entity may receive an RLC SDU having an RLC SN n. Accordingly, RX_Next is updated with a next RLC SN of an in-sequence completely received last RLC SDU, thus resulting in RX_Next=n+1. RX_Next_Highest_Rcvd is updated with RX_Next_Highest_Rcvd=n+1 because it is a next number of the highest RLC SN of RLC SNs received so far (3h-12).

Thereafter, the receiving RLC entity may receive an RLC SDU having an RLC SN n+2. Accordingly, RX_Next maintains the value of RX_Next=n+1 without any change because it is updated with a next RLC SN of the in-sequence completely received last RLC SDU. RX_Next_Highest_Rcvd is updated with RX_Next_Highest_Rcvd=n+3 because it is a next number of the highest RLC SN of RLC SNs received so far (3h-14).

As described above, in the method of detecting a lost packet based on an RLC SN according to the (3-1) embodiment, the receiving RLC entity determines that an RLC SDU having an RLC SN n+1 has been lost (3h-13) because it determines that a lost packet is present when the RX_Next_Highest_Rcvd variable value is greater than RX_Next, and triggers the t-Reordering timer (3h-15). Furthermore, the receiving RLC entity updates RX_Next_Status_Trigger indicative of the time when the t-Reordering timer was triggered with RX_Next_Highest_Rcvd. That is, the receiving RLC entity may indicate that the t-Reordering timer was triggered when the RLC SN of n+3 was received. When the timer expires, the receiving RLC entity determines whether RLC PDUs having an RLC SN of less than n+3 have been successfully received, configures an RLC status report (RLC STATUS PDU), and transmits the report to a Tx stage, and may perform retransmission if the Tx stage wants the retransmission.

In FIG. 3H, an example 2 (3h-20) is described below. The receiving RLC entity may receive an RLC SDU having an RLC SN n−1. Accordingly, RX_Next is updated with a next RLC SN of an in-sequence completely received last RLC SDU, thus becoming RX_Next=n. RX_Next_Highest_Rcvd is updated with RX_Next_Highest_Rcvd=n because it is a next number of the highest RLC SN of RLC SNs received so far (3h-21).

In the method of detecting a lost packet based on an RLC SN according to the (3-1) embodiment proposed in the present disclosure, the receiving RLC entity determines that a lost packet is present when the RX_Next_Highest_Rcvd variable value is greater than RX_Next, and triggers the t-Reordering timer.

Thereafter, the receiving RLC entity may receive an RLC SDU segment having an RLC SN n and an RLC SDU or RLC SDU segment having an RLC SN n+1. Accordingly, RX_Next is updated with a next RLC SN of an in-sequence completely received last RLC SDU, thus resulting in RX_Next=n. RX_Next_Highest_Rcvd is updated with RX_Next_Highest_Rcvd=n+2 because it is a next number of the highest RLC SN of RLC SNs received so far (3h-23).

As described above, in the method of detecting a lost packet based on an RLC SN according to the (3-1) embodiment, the receiving RLC entity determines that an RLC SDU segment having an RLC SN n has been missed (3h-22) because it determines that a lost packet is present when the RX_Next_Highest_Rcvd variable value is greater than RX_Next, and thus triggers the t-Reordering timer (3h-24). Furthermore, the receiving RLC entity updates RX_Next_Status_Trigger indicative of the time when the t-Reordering timer was triggered with RX_Next_Highest_Rcvd. That is, the receiving RLC entity may indicate that the t-Reordering timer was triggered when the RLC SN n+2 was received. When the timer expires, the receiving RLC entity determines whether RLC PDUs having an RLC SN of less than n+2 have been successfully received, configures an RLC status report (RLC STATUS PDU), and transmits the report to a Tx stage, and may perform retransmission if the retransmission is requested by the Tx stage.

In FIG. 3H, an example 3 (3h-30) is described below. The receiving RLC entity may receive an RLC SDU having an RLC SN n−1. Accordingly, RX_Next becomes RX_Next=n because it is updated with a next RLC SN of an in-sequence completely received last RLC SDU. RX_Next_Highest_Rcvd is updated with RX_Next_Highest_Rcvd=n because it is a next number of the highest RLC SN of RLC SNs received so far (3h-31).

In the method of detecting a lost packet based on an RLC SN according to the (3-1) embodiment proposed in the present disclosure, the receiving RLC entity determines that a lost packet is present when the RX_Next_Highest_Rcvd variable value is greater than RX_Next, and triggers the t-Reordering timer.

Thereafter, the receiving RLC entity may receive an RLC SDU segment having an RLC SN n. Accordingly, RX_Next becomes RX_Next=n because it is updated with a next RLC SN of an in-sequence completely received last RLC SDU. RX_Next_Highest_Rcvd is updated with RX_Next_Highest_Rcvd=n+1 because it is a next number of the highest RLC SN of RLC SNs received so far (3h-32).

As described above, in the method of detecting a lost packet based on an RLC SN according to the (3-1) embodiment, the receiving RLC entity determines that an RLC SDU having an RLC SN n+1 has been lost (3h-33) because it determines that a lost packet is present when the RX_Next_Highest_Rcvd variable value is greater than RX_Next, and triggers the t-Reordering timer (3h-34). Furthermore, the receiving RLC entity updates RX_Next_Status_Trigger indicative of the time when the t-Reordering timer was triggered with RX_Next_Highest_Rcvd. That is, this may indicate that the receiving RLC entity may indicate that the t-Reordering timer was triggered when the RLC SN n+1 was received. When the timer expires, the receiving RLC entity determines whether RLC PDUs having an RLC SN of less than n+1 have been successfully received, configures an RLC status report (RLC STATUS PDU), and transmits the report to a Tx stage, and may perform retransmission if the retransmission is requested by the Tx stage.

However, in the example 3 (3h-30), 3h-33 may not be a missed RLC SDU segment. That is, the RLC SDU segment 3h-33 may have not yet been transmitted by the Tx stage. However, when the t-Reordering timer is triggered, the Rx stage may request retransmission from the Tx stage so early. The reason for this is as follows. The value of the t-Reordering timer is a value set by taking into considering that how long the Rx stage will wait assuming that the Tx stage has been transmitted the corresponding packet. If the t-Reordering timer is triggered although the packet has not been transmitted by the Tx stage, it will result in the waste of unnecessary transmission and an unnecessary retransmission request because the retransmission is requested so early.

As described above, the method of detecting a lost packet based on an RLC SN is not suitable for detecting a loss of a segment. Accordingly, various embodiments of the present disclosure propose a (3-2) embodiment in which a receiving RLC entity of an NR efficiently detects a lost packet in the RLC AM.

Figure 3I:
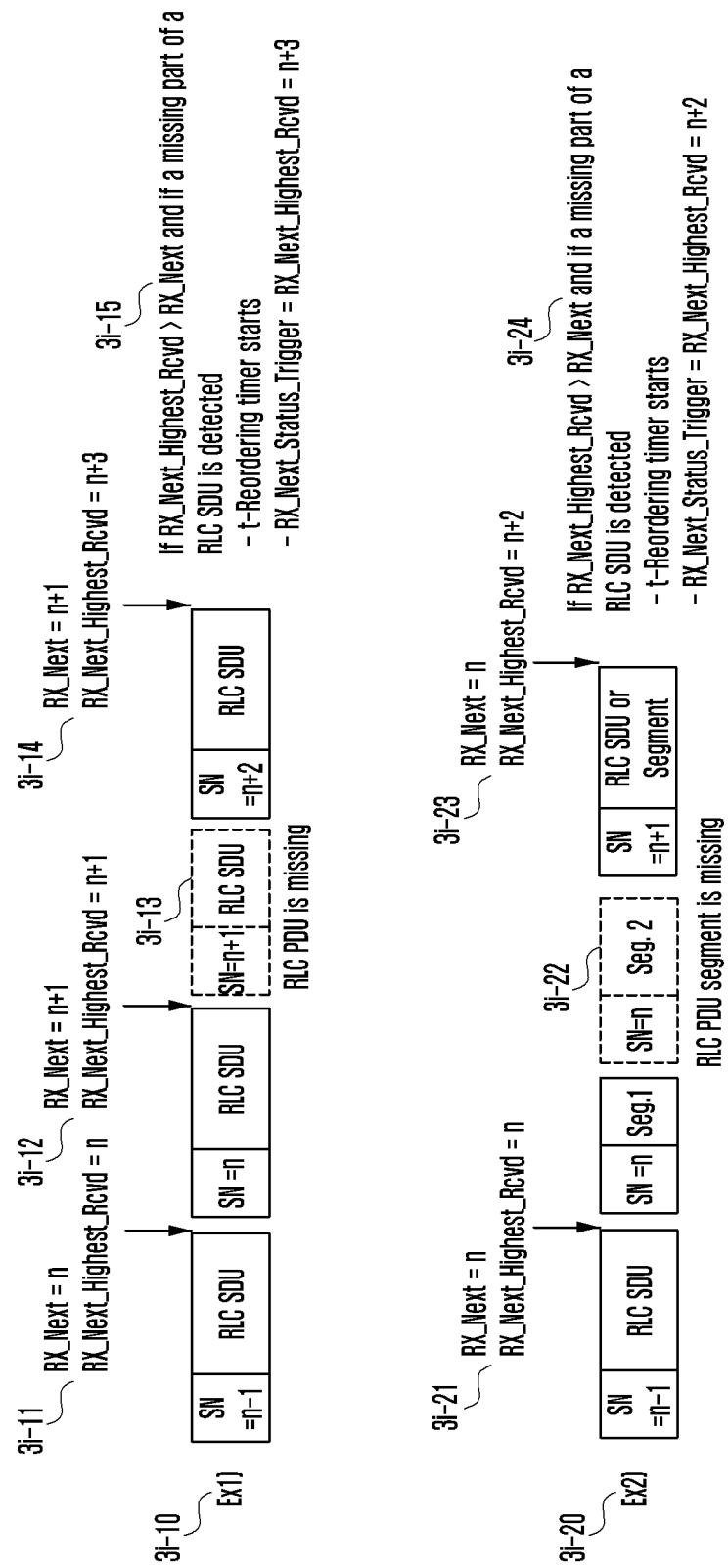
FIG. 3J shows an operation of driving a t-Reordering timer in the receiving RLC entity in the RLC AM according to a (3-2) embodiment of the present disclosure.
FIG. 3K shows the configuration of a UE according to a third embodiment of the present disclosure.
FIG. 3L shows a block diagram of an ENB in a wireless communication system according to a third embodiment of the present disclosure.
Figure 3I:
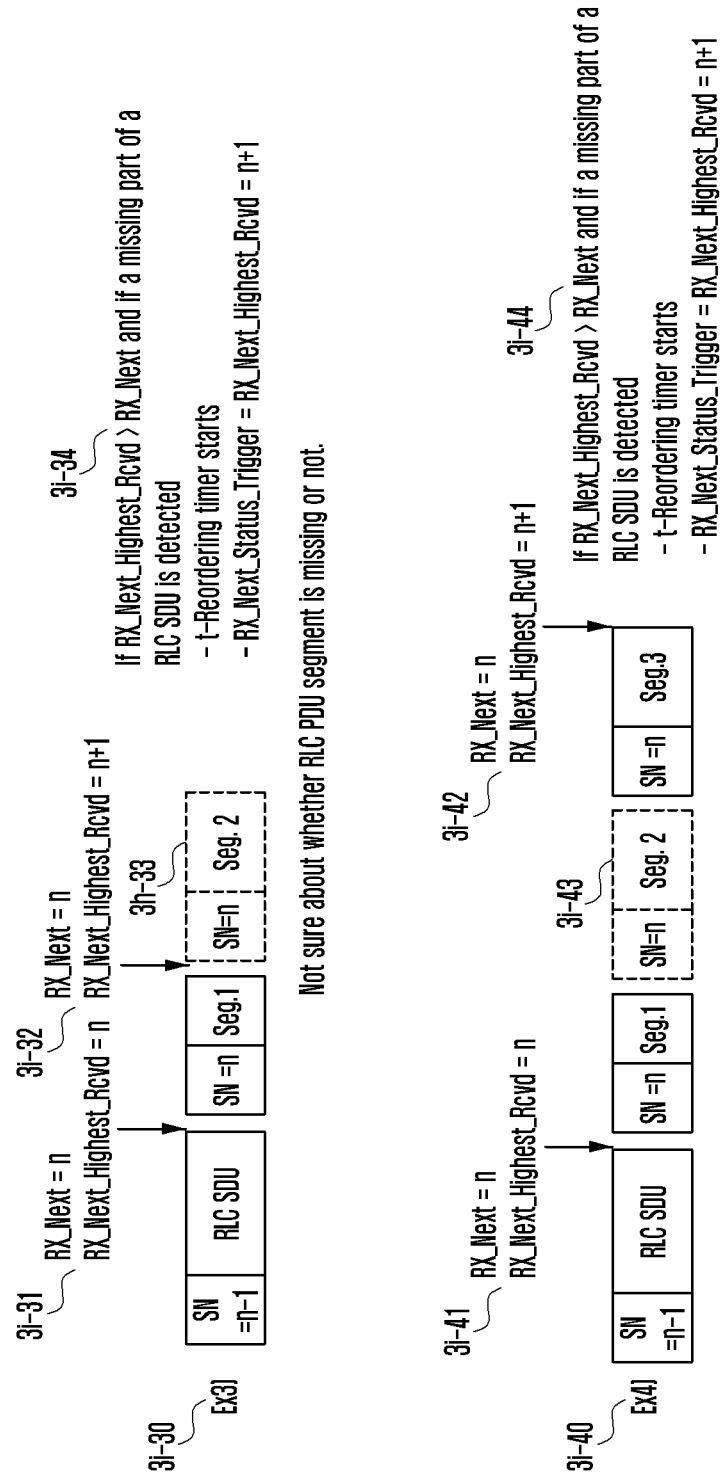

FIGS. 3IA and 3IB show a (3-2) embodiment proposed in the present disclosure, and are diagrams showing a method of detecting a lost packet based on an RLC SN, an SO and an SI field.

In the method of detecting a lost packet based on an RLC SN, a segment offset and an SI field according to the (3-2) embodiment of the present disclosure, if an RX_Next_Highest_Rcvd variable value is greater than RX_Next and a lost packet is present by determining a segment offset and a packet loss of an SI field, the t-Reordering timer is triggered. To determine a packet loss based on the offset and the SI field means to identify a lost packet based on the SO field and SI field of FIG. 3F. That is, the receiving RLC entity may receive the segmented segments 3f-20, 3f-25 and 3f-30 with respect to the RLC SDU 3f-05. An additional lost packet detection method is necessary because all the three segments have the same RLC SN. Accordingly, in the (3-2) embodiment, a missed segment between segments having the same RLC SN is determined more specifically based on an SO field and an SI field. That is, if the segment 3f-20 is not received and only the segment 3f-25 is received, it may be determined that a previous segment has been missed because the SI field of the segment 3f-25 indicates the corresponding segment is a middle segment and the SO field thereof starts from 300. If the segments 3f-20 and 3f-30 are received, it may be determined that the first segment and the last segment have been received based on corresponding SI fields. It may be determined that a segment has been missed in the middle because only segments from 600 to the last only have been received by identifying the SO field. Although the RLC SDU 3f-05 has been segmented into four segments, a packet loss may be determined based on an SI field and an SO field according to the aforementioned method. It is to be noted that if only the segment 3f-20 is received or if only the segments 3f-20 and 3f-25 are received, it is not determined that the rear part of the RLC SDU has been missed. The reason for this is that the remaining part of the RLC SDU may not have even been transmitted by the Tx stage. The loss detection method is a method of detecting a lost packet based on an RLC SN, an SO and an SI field proposed in the (3-2) embodiment.

In FIGS. 31A and 31B, the receiving RLC entity updates and operates the window state variables defined above whenever an RLC PDU is received. In FIGS. 31A and 3IB, an example 1 (3i-10) is first described as follows. The receiving RLC entity may receive an RLC SDU having an RLC SN n−1. Accordingly, RX_Next becomes RX_Next=n because it is updated with a next RLC SN of an in-sequence completely received last RLC SDU. RX_Next_Highest_Rcvd is updated with RX_Next_Highest_Rcvd=n because it is a next number of the highest RLC SN of RLC SNs received so far (3i-11).

Thereafter, the receiving RLC entity may receive an RLC SDU having an RLC SN n. Accordingly, RX_Next becomes RX_Next=n+1 because it is updated with a next RLC SN of an in-sequence completely received last RLC SDU. RX_Next_Highest_Rcvd is updated with RX_Next_Highest_Rcvd=n+1 because it is a next number of the highest RLC SN of RLC SNs received so far (3i-12).

Thereafter, the receiving RLC entity may receive an RLC SDU having an RLC SN n+2. Accordingly, RX_Next maintains RX_Next=n+1 without any change because it is updated with a next RLC SN of an in-sequence completely received last RLC SDU. RX_Next_Highest_Rcvd is updated with RX_Next_Highest_Rcvd=n+3 because it is a next number of the highest RLC SN of RLC SNs received so far (3i-14)

Accordingly, in the method of detecting a lost packet based on an RLC SN, an SO field and an SI field according to the (3-2) embodiment, the receiving RLC entity may identify that the RX_Next_Highest_Rcvd variable value is greater than RX_Next and a lost packet, determines that the RLC SDU having an RLC SN n+1 has been lost (3i-13), and triggers the t-Reordering timer (3i-15). Furthermore, the receiving RLC entity updates RX_Next_Status_Trigger indicative of the time when the t-Reordering timer was triggered with RX_Next_Highest_Rcvd. That is, the receiving RLC entity may indicate that the t-Reordering timer was triggered when the RLC SN n+3 was received. When the timer expires, the receiving RLC entity determines whether RLC PDUs having an RLC SN of less than n+3 have been successfully received, configures an RLC status report (RLC STATUS PDU), and transmits the report to a Tx stage, and may perform retransmission if the retransmission is requested by the Tx stage.

In FIGS. 3IA and 3IB, an example 2 (3i-20) is described below. The receiving RLC entity may receive an RLC SDU having an RLC SN n−1. Accordingly, RX_Next becomes RX_Next=n because it is updated with a next RLC SN of an in-sequence completely received last RLC SDU. RX_Next_Highest_Rcvd is updated with RX_Next_Highest_Rcvd=n because it is a next number of the highest RLC SN of RLC SNs received so far (3i-21).

Thereafter, the receiving RLC entity may receive an RLC SDU segment having an RLC SN n and an RLC SDU or RLC SDU segment having an RLC SN n+1. Accordingly, RX_Next maintains RX_Next-n without any change because it is updated with a next RLC SN of an in-sequence completely received last RLC SDU. RX_Next_Highest_Rcvd is updated with RX_Next_Highest_Rcvd=n+2 because it is a next number of the highest RLC SN of RLC SNs received so far (3i-23).

Accordingly, in the method of detecting a lost packet based on an RLC SN, an SO field and an SI field according to the (3-2) embodiment, the receiving RLC entity triggers the timer when the RX_Next_Highest_Rcvd variable value is greater than RX_Next and a lost packet is detected. Accordingly, the receiving RLC entity determines that the RLC SDU segment having the RLC SN n has been missed by identifying the SO field and SI field of the RLC SDU segment (3i-22), and triggers the t-Reordering timer (3i-24). Furthermore, the receiving RLC entity updates RX_Next_Status_Trigger indicative of the time when the t-Reordering timer was triggered with RX_Next_Highest_Rcvd. That is, the receiving RLC entity may indicate that the t-Reordering timer was triggered when the RLC SN n+2 was received. When the timer expires, the receiving RLC entity determines whether RLC PDUs having an RLC SN of less than n+2 have been successfully received, configures an RLC status report (RLC STATUS PDU), and transmits the report to a Tx stage, and may perform retransmission if the retransmission is requested by the Tx stage.

In FIGS. 3IA and 3IB, an example 3 (3i-30) is described below. The receiving RLC entity may receive an RLC SDU having an RLC SN n−1. Accordingly, RX_Next becomes RX_Next=n because it is updated with a next RLC SN of an in-sequence completely received last RLC SDU. RX_Next_Highest_Rcvd is updated with RX_Next_Highest_Rcvd=n because it is a next number of the highest RLC SN of RLC SNs received so far (3i-31).

Thereafter, the receiving RLC entity may receive an RLC SDU segment having an RLC SN n. Accordingly, RX_Next maintains RX_Next-n without any change because it is updated with a next RLC SN of an in-sequence completely received last RLC SDU. RX_Next_Highest_Rcvd is updated with RX_Next_Highest_Rcvd=n+1 because it is a next number of the highest RLC SN of RLC SNs received so far (3i-32).

As described above, in the method of detecting a lost packet based on an RLC SN, an SO field and an SI field according to the (3-2) embodiment, when the RX_Next_Highest_Rcvd variable value is greater than RX_Next and a lost packet is detected (3i-33), the receiving RLC entity triggers the timer (3i-34). However, in the method of the (3-2) embodiment, if a rear part of the RLC SDU having the RLC SN n is not present and only a front part thereof is present by identifying the SO field and the SI field as described above, the receiving RLC entity does not determine this to be a lost packet. The reason for this is that the rear part of the RLC SDU having the RLC SN n may not have even been transmitted by a Tx stage.

In FIGS. 3IA and 3IB, an example 4 (3i-40) is described below. The receiving RLC entity may receive an RLC SDU having an RLC SN n−1. Accordingly, RX_Next becomes RX_Next=n because it is updated with a next RLC SN of an in-sequence completely received last RLC SDU. RX_Next_Highest_Rcvd is updated with RX_Next_Highest_Rcvd=n because it is a next number of the highest RLC SN of RLC SNs received so far (3i-41).

Thereafter, the receiving RLC entity may receive an RLC SDU segment 1 and RLC SDU segment 3 having an RLC SN n. Accordingly, RX_Next maintains RX_Next-n without any change because it is updated with a next RLC SN of an in-sequence completely received last RLC SDU. RX_Next_Highest_Rcvd is updated with RX_Next_Highest_Rcvd=n+1 because it is a next number of the highest RLC SN of RLC SNs received so far (3i-42).

As described above, in the method of detecting a lost packet based on an RLC SN, an SO field and an SI field according to the (3-2) embodiment, when the RX_Next_Highest_Rcvd variable value is greater than RX_Next and a lost packet is detected, the receiving RLC entity triggers the timer. Accordingly, in the method of the (3-2) embodiment, if a front and rear part of the RLC SDU having the RLC SN n are present and a middle part thereof is not present by identifying the SO field and the SI field as described above, the receiving RLC entity determines this to be a lost packet. Accordingly, the receiving RLC entity determines that a middle RLC SDU segment having the RLC SN n has been missed by identifying the SO field and the SI field (3i-43), and triggers the t-Reordering timer (3i-44). Furthermore, the receiving RLC entity updates RX_Next_Status_Trigger indicative of the time when the t-Reordering timer was triggered with RX_Next_Highest_Rcvd. That is, the receiving RLC entity may indicate that the t-Reordering timer was triggered when the RLC SN n+1 was received. When the timer expires, the receiving RLC entity determines whether RLC PDUs having an RLC SN of less than n+1 have been successfully received, configures an RLC status report (RLC STATUS PDU), and transmits the report to a Tx stage, and may perform retransmission if the retransmission is requested by the Tx stage.

The receiving RLC entity may operate as follows in the RLC AM to which the method of detecting a lost packet based on an RLC SN, an SO field and an SI field according to the (3-2) embodiment of the present disclosure has been applied.

[Receiving RLC Entity Operation in RLC AM]

When an RLC AM bearer configuration control message is received through an RRC message, such as 3e-10, 3e-40 or 3e-75 of FIG. 3E, the receiving RLC entity sets and initializes the defined four variables. For example, all the variables are set to a value of 0. Furthermore, the receiving RLC entity sets a timer value as a t-Reordering timer value included in the message.

1) Receive Operations of Receiving RLC Entity in RLC AM (Receive Operations)

General

The receiving RLC entity maintains a receiving window based on an RX_Next window state variable. That is, the receiving RLC entity drives the receiving window to "RX_Next<=SN<RX_Next+AM_Window_Size", determines that an RLC SN (or SN) in a section is within the window, and determines that other RLC SNs are out of the window.

When an acknowledged mode data (AMD) PDU (RLC PDU) is received from a lower layer, the receiving RLC entity may discard if an SN is out of the window or is duplicated, may directly deliver the SN to a higher layer in the case of a complete RLC PDU (not-segmented), and may place a segment in the buffer. If other segments are placed in the buffer, the receiving RLC entity updates window variables, performs reassembly, and triggers or stops or resets a t-Reordering timer based on the window state variables. When the t-Reordering timer expires, the receiving RLC entity updates the window state variables and may restart the t-Reordering timer if necessary.

(Examples for Reception of UMD PDU)

The receiving side of an AM RLC entity shall maintain a receiving window according to the state variable RX_Next as follows:

a SN falls within the receiving window if RX_Next<=SN<RX_Next+AM_Window_Size;

a SN falls outside of the receiving window otherwise.

When receiving an AMD PDU from lower layer, the receiving side of an AM RLC entity shall:
  either discard the received AMD PDU or place it in the reception buffer;
  if the received AMD PDU was placed in the reception buffer:
    update state variables, reassemble and deliver RLC SDUs to upper layer and start/stop t-Reordering as needed.

When t-Reordering expires, the receiving side of an AM RLC entity shall:
  update state variables and start t-Reordering as needed.

2) Actions of Receiving RLC Entity when AMD PDU is Received from Lower Layer

When an AMD PDU having an SN x and including information indicating from the y byte to z byte of an RLC SDU having the SN x is received from a lower layer, the receiving RLC entity performs the following operation.

If the SN x is out of a window or data from the y byte to z byte corresponding to the received RLC SDU of the SN x has been received before, the receiving RLC entity discards the received AMD PDU. If not, the receiving RLC entity places the received AMD PDU in the buffer. If only some of the data from the y byte to the z byte correspond to the received RLC SDU of the SN x has been received before, the receiving RLC entity discards only a duplicated part.

(Examples for the Actions when an AMD PDU is Received from Lower Layer)

When an AMD PDU is received from lower layer, where the AMD PDU contains byte segment numbers y to z of a RLC SDU with SN=x, the receiving side of an AM RLC entity shall:
  if x falls outside of the receiving window; or
  if byte segment numbers y to z of the RLC SDU with SN=x have been received before:
    discard the received AMD PDU;
  else:
    place the received AMD PDU in the reception buffer;
    if some byte segments of the RLC SDU contained in the AMD PDU have been received before:
      discard the duplicate byte segments.

<Actions of Receiving RLC Entity when AMD PDU is Placed in Reception Buffer>

When an AMD SDU having an SN x is placed in the buffer, the receiving RLC entity operates as follows.
  If the SN x is greater than or equal to RX_Next_Highest_Rcvd,
    Update RX_Next_Highest_Rcvd with x+1.
  If all of RLC SDUs having the SN x have been received,
    Perform reassembly on the AMD SDUs having the SN x, remove an RLC header, and delivers reassembled RLC SDUs to a higher layer.
  If the SN x is equal to RX_Highest_Status,
    Update an RX_Highest_Status variable with an RX_Highest_Status value that is greater than a current RX_Highest_Status value and has the SN of the first RLC SDU whose all bytes have not been received.
  If the SN x is equal to RX_Next,
    Update an RX_Next variable with an RX_Next value that is greater than a current RX_Next value and has the SN of the first RLC SDU whose all bytes have not been received.

If the t-Reordering timer is driven,
  If RX_Next_Status_Trigger is equal to RX_Next or if an RX_Next_Status_Trigger value is out of a window and RX_Next_Status_Trigger is not equal to RX_Next+AM_Window_Size,
    Stop and reset the t-Reordering timer.

(Examples for the Actions when an AMD PDU is Placed in the Reception Buffer)

When an AMD PDU with SN=x is placed in the reception buffer, the receiving side of an AM RLC entity shall:
  if x>=RX_Next_Highest_Rcvd
    update RX_Next_Highest_Rcvd to x+1;
  if all bytes of the RLC SDU with SN=x are received:
    reassemble the RLC SDU from AMD PDU(s) with SN=x, remove RLC headers when doing so and deliver the reassembled RLC SDU to upper layer;
    if x=RX_Highest_Status,
      update RX_Highest_Status to the SN of the first RLC SDU with SN>current RX_Highest_Status for which not all bytes have been received;
    if x=RX_Next:
      update RX_Next to the SN of the first RLC SDU with SN>current RX_Next for which not all bytes have been received;
  if t-Reordering is running:
    if RX_Next_Status_Trigger=RX_Next; or
      if RX_Next_Status_Trigger falls outside of the receiving window and RX_Next_Status_Trigger is not equal to RX_Next+AM_Window_Size:
        stop and reset t-Reordering;

If the t-Reordering timer is not driven, the receiving RLC entity may operate according to any one of the following (3-2a) embodiment, (3-2b) embodiment, (3-2c) embodiment, (3-2d) embodiment and (3-2e) embodiment.

(3-2a) Embodiment

If the t-Reordering timer is not driven (including a case where the t-Reordering timer has stopped in the procedure)
  If RX_Next_Highest_Rcvd is greater than RX_Next and a missing part of an RLC SDU is detected (it may be detected by an RLC SN, an SO field or an SI field)
    Drive the t-Reordering timer and update an RX_Next_Status_Trigger value with the RX_Next_Highest_Rcvd value.

(Examples for the Operation)
if t-Reordering is not running (includes the case t-Reordering is stopped due to actions above):
  if RX_Next_Highest_Rcvd>RX_Next and if a missing part of a RLC SDU is detected (a gap is created by RLC SN, SO field, and SI field):
    start t-Reordering;
    set RX_Next_Status_Trigger to RX_Next_Highest_Rcvd.

In the above, the sentence "and if a missing part of a RLC SDU is detected (a gap is created by RLC SN, SO field, and SI field)" may be expressed as "and if at least one missing RLC SDU segment except the last RLC SDU segment exists for RX_Next (or RX_Next_Highest_Rcvd−1)."

(3-2b) Embodiment

If the t-Reordering timer is not driven (including a case where the t-Reordering timer has stopped in the procedure)
  If RX_Next_Highest_Rcvd is equal to RX_Next+1 and at least one missed RLC SDU segment other than the last RLC SDU segment is present for RX_Next or RX_Next_Highest_Rcvd−1,
    Drive the t-Reordering timer and update an RX_Next_Status_Trigger value with an RX_Next_Highest_Rcvd value.
  If RX_Next_Highest_Rcvd is greater than RX_Next+1,
    Drive the t-Reordering timer and update the RX_Next_Status_Trigger value with the RX_Next_Highest_Rcvd value.

(Examples for the Operation)
if t-Reordering is not running (includes the case t-Reordering is stopped due to actions above):
  if RX_Next_Highest_Rcvd=RX_Next+1 and if at least one missing RLC SDU segment except the last RLC SDU segment exists for RX_Next (or RX_Next_Highest_Rcvd−1):
    start t-Reordering;
    set RX_Next_Status_Trigger to RX_Next_Highest_Rcvd.
  if RX_Next_Highest_Rcvd>RX_Next+1:
    start t-Reordering;
    set RX_Next_Status_Trigger to RX_Next_Highest_Rcvd.

(3-2c) Embodiment

If the t-Reordering timer is not driven (including a case where the t-Reordering timer has stopped in the procedure)
  If RX_Next_Highest_Rcvd is equal to RX_Next+1 and at least one missing part other than the last part of an RLC SDU is present with respect to RX_Next or RX_Next_Highest_Rcvd−1,
    Drive the t-Reordering timer and update an RX_Next_Status_Trigger value with an RX_Next_Highest_Rcvd value.
  If RX_Next_Highest_Rcvd is greater than RX_Next+1,
    Drive the t-Reordering timer and update the RX_Next_Status_Trigger value with the RX_Next_Highest_Rcvd value.

(Examples for the Operation)
if t-Reordering is not running (includes the case t-Reordering is stopped due to actions above):
  if RX_Next_Highest_Rcvd=RX_Next+1 and if at least one missing part of a RLC SDU with RX_Next (or RX_Next_Highest_Rcvd−1) except the last part of that RLC SDU exists:
    start t-Reordering;
    set RX_Next_Status_Trigger to RX_Next_Highest_Rcvd.
  if RX_Next_Highest_Rcvd>RX_Next+1:
    start t-Reordering;
    set RX_Next_Status_Trigger to RX_Next_Highest_Rcvd.

(3-2d) Embodiment

If the t-Reordering timer is not driven (including a case where the t-Reordering timer has stopped in the procedure)
  If RX_Next_Highest_Rcvd−1 is equal to RX_Next and at least one missed RLC SDU segment other than the last RLC SDU segment is present with respect to RX_Next or RX_Next_Highest_Rcvd−1,
  Drive the t-Reordering timer and update an RX_Next_Status_Trigger value with an RX_Next_Highest_Rcvd value.
  If RX_Next_Highest_Rcvd−1 is greater than RX_Next,
    Drive the t-Reordering timer and update the RX_Next_Status_Trigger value with the RX_Next_Highest_Rcvd value.
(Examples for the Operation)
if t-Reordering is not running (includes the case t-Reordering is stopped due to actions above):
  if RX_Next_Highest_Rcvd−1=RX_Next and if at least one missing RLC SDU segment except the last RLC SDU segment exists for RX_Next (or RX_Next_Highest_Rcvd−1):
    start t-Reordering;
    set RX_Next_Status_Trigger to RX_Next_Highest_Rcvd.
  if RX_Next_Highest_Rcvd−1>RX_Next:
    start t-Reordering;
    set RX_Next_Status_Trigger to RX_Next_Highest_Rcvd.

(3-2e) Embodiment

If the t-Reordering timer is not driven (including a case where the t-Reordering timer has stopped in the procedure)
  If RX_Next_Highest_Rcvd−1 is equal to RX_Next and at least one missing part other than the last part of an RLC SDU is present with respect to RX_Next or RX_Next_Highest_Rcvd−1,
    Drive the t-Reordering timer and update an RX_Next_Status_Trigger value with an RX_Next_Highest_Rcvd value.
  If RX_Next_Highest_Rcvd−1 is greater than RX_Next,
    Drive the t-Reordering timer and update the RX_Next_Status_Trigger value with the RX_Next_Highest_Rcvd value.
(Examples for the Operation)
if t-Reordering is not running (includes the case t-Reordering is stopped due to actions above):
  if RX_Next_Highest_Rcvd−1=RX_Next and if at least one missing part of a RLC SDU with RX_Next (or RX_Next_Highest_Rcvd−1) except the last part of that RLC SDU exists:
    start t-Reordering;
    set RX_Next_Status_Trigger to RX_Next_Highest_Rcvd.
  if RX_Next_Highest_Rcvd−1>RX_Next:
    start t-Reordering;
    set RX_Next_Status_Trigger to RX_Next_Highest_Rcvd.

<Actions of Receiving RLC Entity when t-Reordering Expires>

When the t-Reordering timer expires, the receiving RLC entity operates as follows.
  Update an RX_Highest_Status variable with the first RLC SDU whose all bytes greater than or equal to RX_Next_Status_Trigger have not been received.
  If RX_Next_Highest_Rcvd is greater than RX_Highest_Status,
    Start the t-Reordering timer,
    Update an RX_Next_Status_Trigger variable with the RX_Next_Highest_Rcvd value.

(Examples for the Actions when t-Reordering Expires)
When t-Reordering expires, the receiving side of an AM RLC entity shall:
  update RX_Highest_Status to the SN of the first RLC SDU with SN>=RX_Next_Status_Trigger for which not all bytes have been received;
  if RX_Next_Highest_Rcvd>RX_Highest_Status:
    start t-Reordering;
    set RX_Next_Status_Trigger to RX_Next_Highest_Rcvd.

Figure 3J:
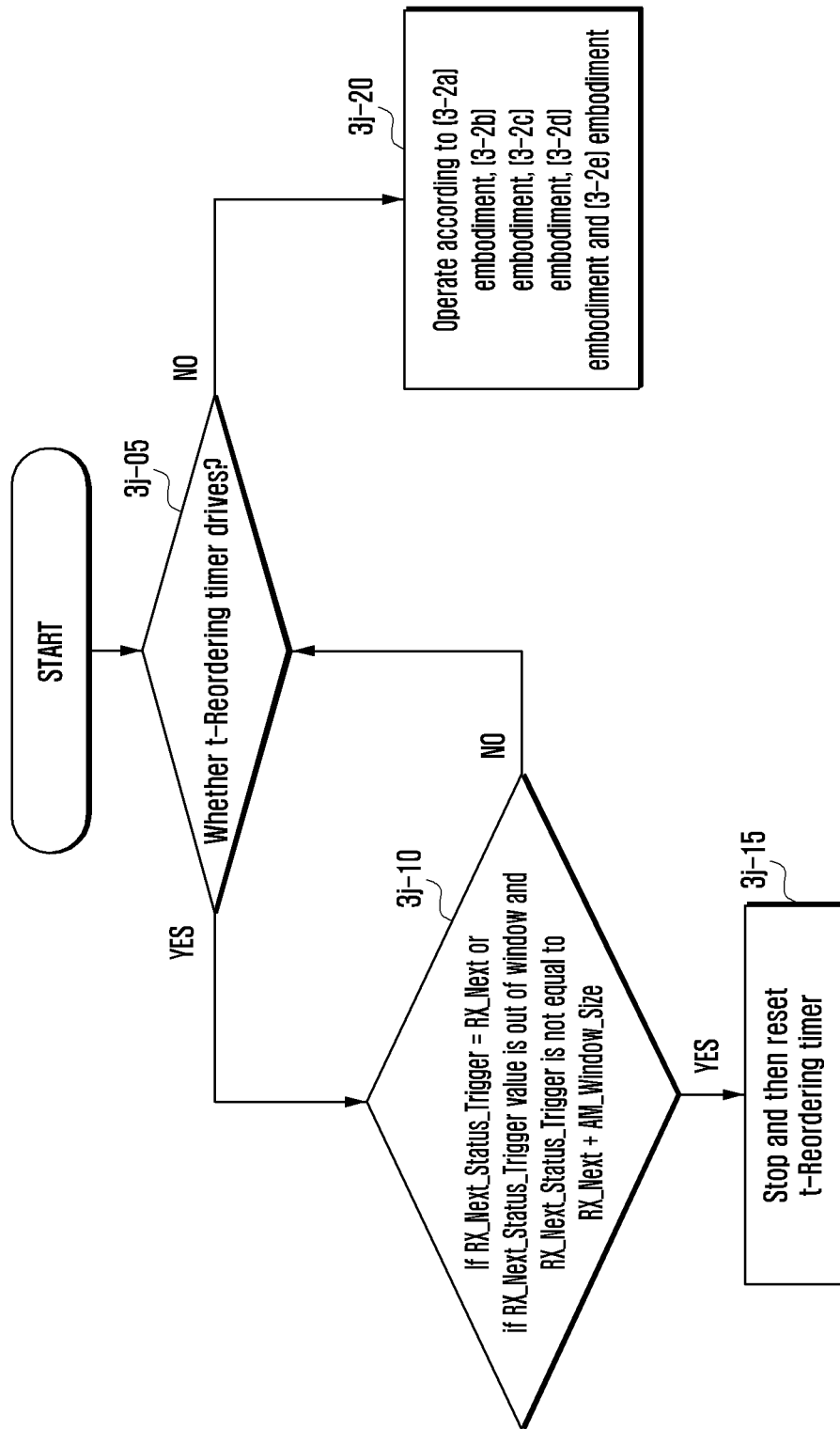

FIG. 3J shows an operation of driving a t-Reordering timer in the receiving RLC entity in the RLC AM according to a (3-2) embodiment of the present disclosure.

In FIG. 3J, the receiving RLC entity receives an AMD PDU, and identifies whether the t-Reordering timer drives when it places the AMD PDU in the buffer (3*j*-05). If the t-Reordering timer is driven, the receiving RLC entity proceeds at operation 3*j*-10. If RX_Next_Status_Trigger is equal to RX_Next or if the RXNext_Status_Trigger value is out of a window and RX_Next_Status_Trigger is not equal to RX_Next+AM_Window_Size in operation 3*j*-10, the receiving RLC entity stops and resets the t-Reordering timer (3*j*-15). If the t-Reordering timer is not driven at operation 3*j*-05, the receiving RLC entity proceeds to operation 3*j*-20. At operation 3*j*-20, the receiving RLC entity drives the t-Reordering timer and update related window variables according to any one of the proposed (3-2a) embodiment, (3-2*b*) embodiment, (3-2c) embodiment, (3-2d) embodiment and (3-2e) embodiment.

Figure 3K:
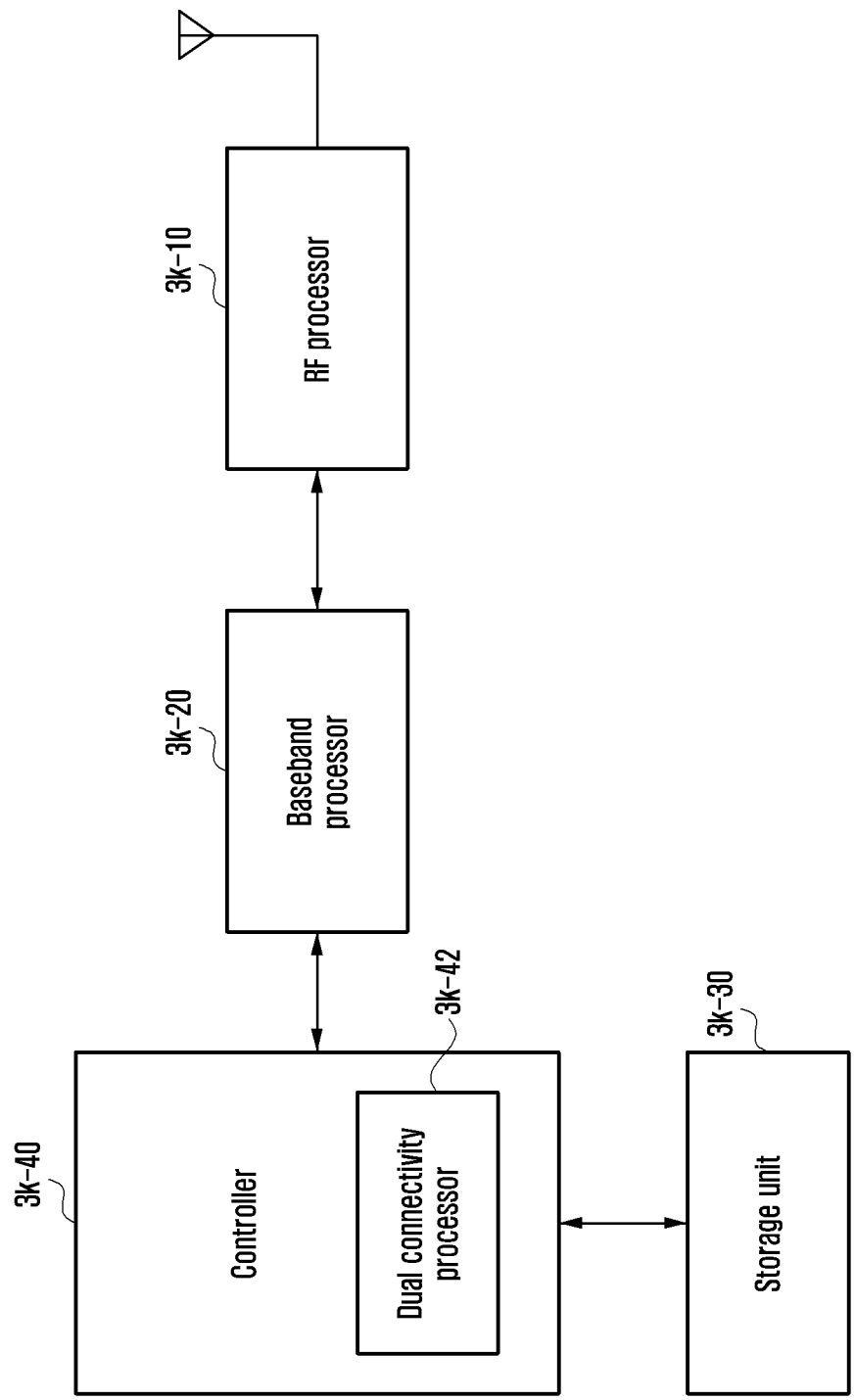

FIG. 3K shows the configuration of a UE according to a third embodiment of the present disclosure.

Referring to FIG. 3K, the UE includes an RF processor 3*k*-10, a baseband processor 3*k*-20, a storage unit 3*k*-30 and a controller 3*k*-40.

The RF processor 3*k*-10 performs functions for transmitting/receiving a signal through a radio channel, such as the band conversion and amplification of a signal. That is, the RF processor 3*k*-10 up-converts a baseband signal received from the baseband processor 3*k*-20 into an RF band signal, transmits the RF band signal through an antenna, and down-converts an RF band signal received through the antenna into a baseband signal. For example, the RF processor 3*k*-10 may include a transmission filter, a reception filter, an amplifier, a mixer, an oscillator, a digital to analog convertor (DAC), and an analog to digital convertor (ADC). In FIG. 3K, only one antenna has been illustrated, but the UE may include multiple antennas. Furthermore, the RF processor 3*k*-10 may include multiple RF chains. Furthermore, the RF processor 3*k*-10 may perform beamforming. For the beamforming, the RF processor 3*k*-10 may adjust the phase and size of each of signals transmitted/received through multiple antennas or antenna elements. Furthermore, the RF processor may perform MIMO. When the MIMO operation is performed, the RF processor may receive multiple layers. The RF processor 3*k*-10 may properly configure multiple antenna or antenna elements under the control of the controller, and may perform received beam swiping or adjust the direction and beam width of the received beam so that the received beam cooperates with a transmitted beam.

The baseband processor 3*k*-20 performs a baseband signal and inter-bit stream conversion function based on the physical layer standard of a system. For example, when data is transmitted, the baseband processor 3*k*-20 generates complex symbols by coding and modulating a transmission bit stream. Furthermore, when data is received, the baseband processor 3k-20 reconstructs a reception bit stream from a baseband signal received from the RF processor 3k-10 through modulation and demodulation. For example, if an OFDM scheme is applied, when data is transmitted, the baseband processor 3k-20 generates complex symbols by coding and modulating a transmission bit stream, maps the complex symbols to subcarriers, and then configures OFDM symbols through IFFT operation and CP insertion. Furthermore, when data is received, the baseband processor 3k-20 segments a baseband signal received from the RF processor 3k-10 in an OFDM symbol unit, reconstructs signals mapped to subcarriers through FFT operation, and reconstructs a reception bit stream through modulation and demodulation.

The baseband processor 3k-20 and the RF processor 3k-10 transmit and receive signals as described above. Accordingly, the baseband processor 3k-20 and the RF processor 3k-10 may be called a transmitter, a receiver, a transceiver or a communication unit. Furthermore, at least one of the baseband processor 3k-20 and the RF processor 3k-10 may include multiple communication modules in order to support different multiple radio access technologies. Furthermore, at least one of the baseband processor 3k-20 and the RF processor 3k-10 may include different communication modules in order to process signals of different frequency bands. For example, the different radio access technologies may include an LTE network and an NR network. Furthermore, the different frequency bands may include a SHF (e.g., 2.5 GHz, 5 GHz) band and a millimeter wave (e.g., 60 GHz) band.

The storage unit 3k-30 stores data, such as a basic program, an application program, and configuration information for the operation of the UE. The storage unit 3k-30 provides stored data in response to a request from the controller 3k-40.

The controller 3k-40 controls an overall operation of the UE. For example, the controller 3k-40 transmits/receives a signal through the baseband processor 3k-20 and the RF processor 3k-10. Furthermore, the controller 3k-40 writes data in the storage unit 3k-30 and reads data from the storage unit 3k-30. To this end, the controller 3k-40 may include at least one processor. For example, the controller 3k-40 may include a CP performing control for communication and an AP controlling a higher layer, such as an application program. Furthermore, the controller 3k-40 may include a dual connectivity processor 3k-42 configured to perform processing for an operation in a multi-connection mode.

Figure 3L:
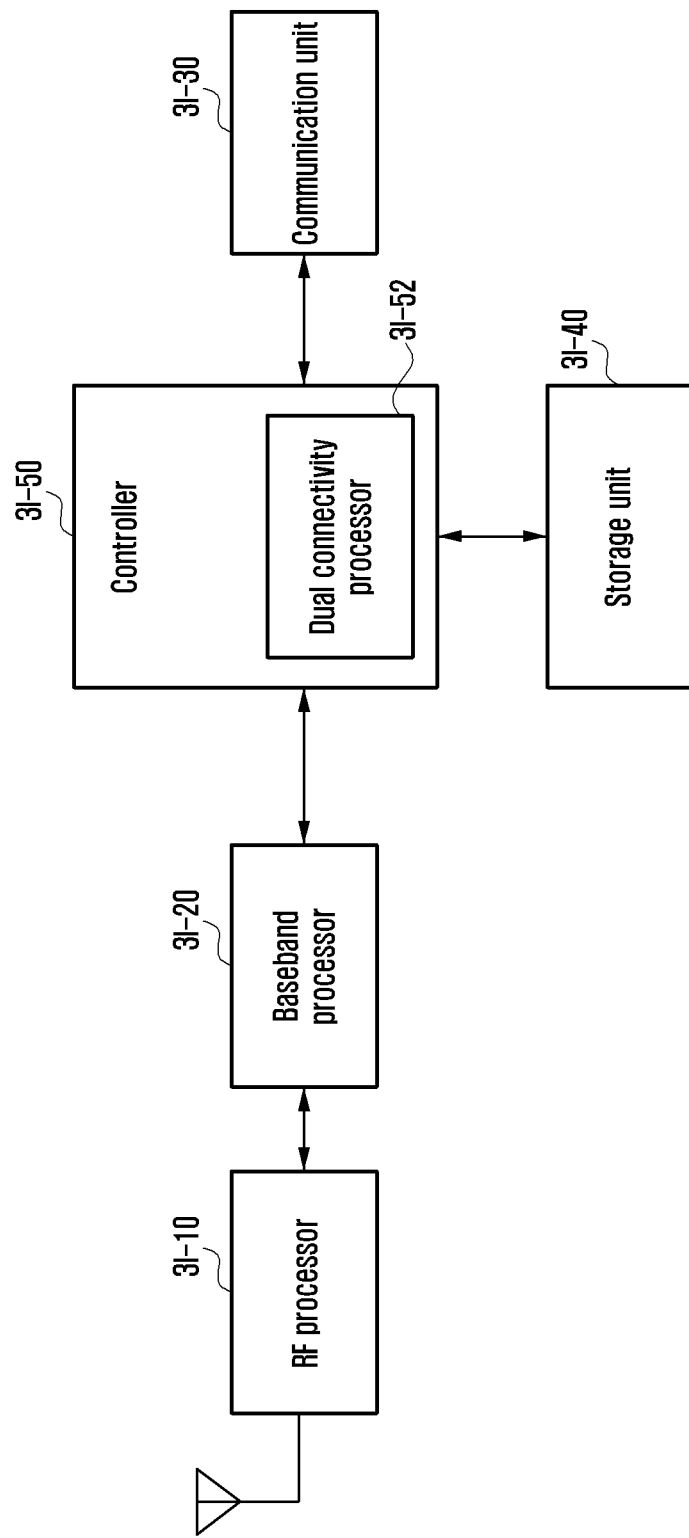

FIG. 3L shows a block diagram of a gNB in a wireless communication system according to a third embodiment of the present disclosure.

As shown in FIG. 3L, the gNB may include an RF processor 3l-10, a baseband processor 3l-20, a backhaul communication unit 3l-30, a storage unit 3l-40 and a controller 3l-50.

The RF processor 3l-10 performs a function for transmitting/receiving a signal through a radio channel, such as the band conversion and amplification of a signal. That is, the RF processor 3l-10 up-converts a baseband signal received from the baseband processor 3l-20 into an RF band signal, transmits the RF band signal through an antenna, and down-converts an RF band signal received through the antenna into a baseband signal. For example, the RF processor 3l-10 may include a transmission filter, a reception filter, an amplifier, a mixer, an oscillator, a DAC, and an ADC. In FIG. 3L, only one antenna has been illustrated, but the gNB may include multiple antennas. Furthermore, the RF processor 3l-10 may include multiple RF chains. Furthermore, the RF processor 3l-10 may perform beamforming. For the beamforming, the RF processor 3l-10 may adjust the phase and size of each of signals transmitted/received multiple antennas or antenna elements. The RF processor may perform a downlink MIMO operation by transmitting one or more layers.

The baseband processor 3l-20 performs a baseband signal and inter-bit stream conversion function based on the physical layer standard of a first radio access technology. For example, when data is transmitted, the baseband processor 3l-20 generates complex symbols by coding and modulating a transmission bit stream. Furthermore, when data is received, the baseband processor 3l-20 reconstructs a reception bit stream from a baseband signal received from the RF processor 3l-10 through modulation and demodulation. For example, if the OFDM scheme is applied, when data is transmitted, the baseband processor 3l-20 generates complex symbols by coding and modulating a transmission bit stream, maps the complex symbols to subcarriers, and configures OFDM symbols through IFFT operation and CP insertion. Furthermore, when data is received, the baseband processor 3l-20 segments a baseband signal received from the RF processor 3l-10 in an OFDM symbol unit, reconstructs signals mapped to subcarriers through FFT operation, and then reconstructs a reception bit stream through modulation and demodulation. The baseband processor 3l-20 and the RF processor 3l-10 transmit and receive signals as described above. Accordingly, the baseband processor 3l-20 and the RF processor 3l-10 may be called a transmitter, a receiver, a transceiver, a communication unit or a wireless communication unit.

The communication unit 3l-30 provides an interface for performing communication with other nodes within a network.

The storage unit 3l-40 stores data, such as a basic program, an application program, and configuration information for the operation of the gNB. Specifically, the storage unit 3l-40 may store information on a bearer allocated to an accessed UE and measurement results reported by an accessed UE. Furthermore, the storage unit 3l-40 may store information, that is, a criterion by which whether to provide a UE with multiple connections is determined. Furthermore, the storage unit 3l-40 provides stored data in response to a request from the controller 3l-50.

The controller 3l-50 controls an overall operation of the gNB. For example, the controller 3l-50 transmits/receives a signal through the baseband processor 3l-20 and the RF processor 3l-10 or through the communication unit 3l-30. Furthermore, the controller 3l-50 writes data in the storage unit 3l-40 and reads data from the storage unit 3l-40. To this end, the controller 3l-50 may include at least one processor. Furthermore, the controller 3l-50 may include a dual connectivity processor 3l-52 configured to perform processing for an operation in a multi-connection mode.

The embodiments of the present disclosure propose the method for a PDCP layer to efficiently process an outdated or duplicated data. Accordingly, in an NR, a loss of information is prevented from occurring in a handover process when the ROHC is used.

Furthermore, the embodiments of the present disclosure propose the efficient RLC UM transmitting and receiving window operation in an NR. Accordingly, when data transmission is performed, overhead can be reduced, radio resources can be efficiently used, and unnecessary processing of a UE can be minimized.

Furthermore, in the embodiments of the present disclosure, if an RLC layer detects a lost packet based on a sequence number in an NR, an error may occur in a procedure of detecting a partial loss of a packet. Accordingly, in order to solve this problem, a new lost packet detection method is necessary.

The methods according to the embodiments described in the claims or specification of the present disclosure may be implemented in the form of hardware, software or a combination of hardware and software.

If the method is implemented in software, a computer-readable storage medium storing one or more programs (software modules) may be provided. The one or more programs stored in the computer-readable storage medium are configured for execution by one or more processors within an electronic device (e.g., UE or server). The one or more programs include instructions that enable the electronic device to execute the methods according to the embodiments described in the claims or specification of the present disclosure.

Such a program (software module or software) may be stored in non-volatile memory including random access memory and flash memory, read only memory (ROM), electrically erasable programmable read only memory (EEPROM), a magnetic disc storage device, compact disc-ROM (CD-ROM), digital versatile discs (DVDs) or other forms of optical devices or a magnetic cassette. Alternatively, the program may be stored in memory consisting of some or all of them. Furthermore, a plurality of each of the pieces of element memory may be included.

Furthermore, the program may be stored in an attachable storage device capable of accessing a communication network, such as the Internet, Intranet, a local area network (LAN), a wide LAN (WLAN) or a storage area network (SAN) or a communication network consisting of a combination of them. Such a storage device may be connected to a device capable of performing the embodiment of the present disclosure through an external port. Furthermore, a separate storage device over a communication network may be connected to a device that performs the embodiment of the present disclosure.

In the aforementioned detailed embodiments of the present disclosure, the elements included in the invention may be expressed in the singular or plural form depending on the proposed detailed embodiment. However, the singular or plural expression has been selected suitably for a situation proposed for convenience of description, and the present disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Although the detailed embodiments of the present disclosure have been described in the detailed description of the present disclosure, the present disclosure may be modified in various ways without departing from the scope of the present disclosure. Accordingly, the scope of the present disclosure should not be limited to the aforementioned embodiments, but should be defined by not only the claims, but equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a receiving device in a wireless communication system, the method comprising:
   identifying a sequence number (SN) of a radio link control (RLC) protocol data unit (PDU) placed in a reception buffer;
   identifying if a value of the identified SN falls outside of a reassembly window, wherein the reassembly window is identified based on a range greater than or equal to a specific value and smaller than a value of a first state variable, wherein the specific value is obtained by subtracting a value of a window size from the value of the first state variable, and wherein the first state variable holds a value of an SN following an SN of an RLC PDU with a highest SN among received RLC PDUs;
   in case that the value of the identified SN falls outside of the reassembly window, updating the value of the first state variable to a value of the identified SN plus 1;
   identifying if a value of a second state variable falls outside of the reassembly window based on the updated value of the first state variable
   wherein the second state variable holds a value of an earliest SN that has not been completely received; and
   in case that the value of the second state variable falls outside of the reassembly window based on the updated value of the first state variable, setting the value of the second state variable to a value of an earliest SN larger than or equal to the specific value that has not been completely received.

2. The method of claim 1, further comprising:
   discarding an RLC PDU with an SN that falls outside of the reassembly window, based on the updated value of the first state variable.

3. The method of claim 1, further comprising:
   obtaining, by an RLC entity from a lower layer of the RLC entity, the received RLC PDUs;
   identifying if a header of a first PDU among the received RLC PDUs does not contain an SN; and
   delivering, from the RLC entity to an upper layer, a service data unit (SDU) for the first PDU, in case that the header of the first PDU does not contain the SN.

4. The method of claim 3, further comprising:
   identifying if a value of the SN of the first PDU is smaller than the value of the second state variable and larger than or equal to the specific value, in case that the header of the first PDU contains the SN; and
   discarding the first PDU, in case that the value of the SN of the first PDU is smaller than the value of the second state variable and larger than or equal to the specific value.

5. The method of claim 4, further comprising:
   placing the first PDU in the reception buffer, in case that the SN of the first PDU is larger than the value of the second state variable.

6. The method of claim 1, further comprising:
   identifying that all byte segments with the identified SN are received;
   reassembling a RLC service data unit (SDU) from the all segments with the identified SN; and
   delivering the reassembled RLC SDU to an upper layer.

7. The method of claim 6, further comprising:
   identifying if a value of the identified SN is same as the value of the second state variable; and updating the value of the second state variable to a value of an earliest SN larger than the value of the second state variable that has not been reassembled and delivered to the upper layer.

8. The method of claim 1, wherein an RLC entity is an unacknowledged mode (UM) RLC entity.

9. A receiving device in a wireless communication system, the receiving device comprising:
a transceiver; and
a controller configured to:
identify a sequence number (SN) of a radio link control (RLC) protocol data unit (PDU) placed in a reception buffer;
identify if a value of the identified SN falls outside of a reassembly window, wherein the reassembly window is identified based on a range greater than or equal to a specific value and smaller than a value of a first state variable, wherein the specific value is obtained by subtracting a value of a window size from the value of the first state variable, and wherein the first state variable holds a value of an SN following an SN of an RLC PDU with a highest SN among received RLC PDUs;
in case that the value of the identified SN falls outside of the reassembly window, update the value of the first state variable to a value of the identified SN plus 1;
identify if a value of a second state variable falls outside of the reassembly window based on the updated value of the first state variable, wherein the second state variable holds a value of an earliest SN that has not been completely received; and
in case that the value of the second state variable falls outside of the reassembly window based on the updated value of the first state variable, set the value of the second state variable to a value of an earliest SN larger than or equal to the specific value that has not been completely received.

10. The receiving device of claim 9,
wherein the controller is further configured to discard an RLC PDU with an SN that falls outside of the reassembly window, based on the updated value of the first state variable.

11. The receiving device of claim 9,
wherein the controller is further configured to obtain, by an RLC entity from a lower layer of the RLC entity, the received RLC PDUs, identify if a header of a first PDU among the received RLC PDUs does not contain an SN, and deliver, from the RLC entity to an upper layer, a service data unit (SDU) for the first PDU, in case that the header of the first PDU does not contain the SN.

12. The receiving device of claim 11,
wherein the controller is further configured to identify if a value of the SN of the first PDU is smaller than the value of the second state variable and larger than or equal to the specific value, in case that the header of the first PDU contains the SN, and discard the first PDU, in case that the value of the SN of the first PDU is smaller than the value of the second state variable and larger than or equal to the specific value.

13. The receiving device of claim 12,
wherein the controller is further configured to place the first PDU in the reception buffer, in case that the SN of the first PDU is larger than the value of the second state variable.

14. The receiving device of claim 9,
wherein the controller is further configured to identify that all byte segments with the identified SN are received, reassemble a RLC service data unit (SDU) from the all segments with the identified SN, and deliver the reassembled RLC SDU to an upper layer.

15. The receiving device of claim 14,
wherein the controller is further configured to identify if a value of the identified SN is same as the value of the second state variable, and update the value of the second state variable to a value of an earliest SN larger than the value of the second state variable that has not been reassembled and delivered to the upper layer.

16. The receiving device of claim 9, wherein an RLC entity is an unacknowledged mode (UM) RLC entity.

* * * * *